US012367337B2

(12) United States Patent
Gutierrez et al.

(10) Patent No.: US 12,367,337 B2
(45) Date of Patent: Jul. 22, 2025

(54) METHODS AND SYSTEMS FOR SHARED LANGUAGE FRAMEWORK TO MAXIMIZE COMPOSABILITY OF SOFTWARE, TRANSLATIVITY OF INFORMATION, AND END-USER INDEPENDENCE

(71) Applicant: COMAKE, INC., Los Angeles, CA (US)

(72) Inventors: Andres Gutierrez, Los Angeles, CA (US); Adler Faulkner, Los Angeles, CA (US)

(73) Assignee: COMAKE, INC., Los Angeles, CA (US)

( * ) Notice: Subject to any disclaimer, the term of this patent is extended or adjusted under 35 U.S.C. 154(b) by 0 days.

(21) Appl. No.: 18/303,890

(22) Filed: Apr. 20, 2023

(65) Prior Publication Data

US 2023/0252233 A1 Aug. 10, 2023

Related U.S. Application Data

(63) Continuation of application No. 18/088,485, filed on Dec. 23, 2022, now abandoned, which is a
(Continued)

(51) Int. Cl.
*G06F 40/20* (2020.01)
*G06F 16/21* (2019.01)
*G06F 16/215* (2019.01)

(52) U.S. Cl.
CPC ............ *G06F 40/20* (2020.01); *G06F 16/213* (2019.01); *G06F 16/215* (2019.01)

(58) Field of Classification Search
CPC ...... G06F 40/20; G06F 16/215; G06F 16/213; G06F 16/14; G06F 16/182; G06F 16/178;
(Continued)

(56) References Cited

U.S. PATENT DOCUMENTS 6,370,537 B1   4/2002  Gilbert et al.
7,099,885 B2   8/2006  Hellman et al.
(Continued)

FOREIGN PATENT DOCUMENTS

WO   WO-2021/127550 A1   6/2021
WO   WO-2023/122344 A1   6/2023
WO   WO-2025/029343 A1   2/2025

OTHER PUBLICATIONS

Scanagatta et al. "A Survey on Bayesian network structure learning from data" Department of Informatics, Systems and Communication, University of Milan-Bicocca, Milano, Italy, May 14, 2019 (Year: 2019).*
(Continued)

*Primary Examiner* — Ajay M Bhatia
*Assistant Examiner* — Berhanu Mitiku
(74) *Attorney, Agent, or Firm* — Foley & Lardner LLP

(57) ABSTRACT

Disclosed herein are methods and systems for generating and using a shared knowledge language. In one embodiment, a method comprises retrieving data generated as a result of at least one computing device accessing one or more applications from a set of applications; generating a computer model comprising a set of nodes where each node having an identifier corresponding to a series of nouns and verbs generated in accordance with a schema associated with a shared knowledge language; when the processor receives a request: identifying a node that corresponds to the request; retrieving a pair of related nodes within the nodal data structure the processor identifying whether the relevance threshold has been satisfied using each respective node's identifier corresponding to the schema.

20 Claims, 62 Drawing Sheets

Related U.S. Application Data continuation-in-part of application No. 17/707,888, filed on Mar. 29, 2022.

(60) Provisional application No. 63/354,563, filed on Jun. 22, 2022, provisional application No. 63/351,690, filed on Jun. 13, 2022, provisional application No. 63/308,305, filed on Feb. 9, 2022, provisional application No. 63/293,600, filed on Dec. 23, 2021, provisional application No. 63/191,852, filed on May 21, 2021, provisional application No. 63/167,401, filed on Mar. 29, 2021.

(58) Field of Classification Search
CPC .. G06F 16/9038; G06F 40/30; G06F 16/3329; G06F 16/367; G06F 16/7844; G06F 16/90344; G06F 40/211; G06F 16/322; G06F 40/205

See application file for complete search history.

(56) References Cited

U.S. PATENT DOCUMENTS

| | | |
|---|---|---|
| 7,162,427 B1 | 1/2007 | Myrick et al. |
| 7,424,701 B2 | 9/2008 | Kendall et al. |
| 9,201,966 B2 | 12/2015 | Lundberg |
| 9,715,518 B2 | 7/2017 | Ducott, III et al. |
| 10,467,344 B1 | 11/2019 | Jade et al. |
| 10,762,060 B1 | 9/2020 | Faulkner et al. |
| 11,314,692 B1 | 4/2022 | Gutierrez et al. |
| 11,409,820 B1 | 8/2022 | Gutierrez et al. |
| 11,586,591 B1 | 2/2023 | Gutierrez et al. |
| 11,720,642 B1 | 8/2023 | Gutierrez et al. |
| 11,741,115 B2 | 8/2023 | Gutierrez et al. |
| 2003/0028370 A1* | 2/2003 | Leffert .................. G06F 40/211 |
| 2003/0179228 A1 | 9/2003 | Schreiber et al. |
| 2003/0216919 A1* | 11/2003 | Roushar ................ G06F 40/284 704/260 |
| 2009/0138454 A1 | 5/2009 | Rayner et al. |
| 2012/0047149 A1 | 2/2012 | Zhou et al. |
| 2013/0117219 A1* | 5/2013 | Malka .................. G06F 16/215 707/603 |
| 2014/0136531 A1 | 5/2014 | Aflalo et al. |
| 2016/0042058 A1 | 2/2016 | Nguyen |
| 2016/0308982 A1* | 10/2016 | Greene .................. G06Q 40/00 |
| 2019/0050378 A1 | 2/2019 | Novak et al. |
| 2019/0087691 A1 | 3/2019 | Jelveh |
| 2019/0361860 A1 | 11/2019 | Rogynskyy et al. |
| 2019/0361934 A1 | 11/2019 | Rogynskyy et al. |
| 2020/0234155 A1 | 7/2020 | Ares et al. |
| 2020/0334313 A1 | 10/2020 | Kussmaul et al. |
| 2021/0248534 A1* | 8/2021 | Ares .................. G06Q 10/3396 |
| 2022/0309037 A1 | 9/2022 | Gutierrez et al. |
| 2023/0143597 A1 | 5/2023 | Gutierrez et al. |
| 2023/0252233 A1 | 8/2023 | Gutierrez et al. |

OTHER PUBLICATIONS

"Action", https://schema.org/Action, visited on Dec. 28, 2022.
"Automatically Categorized Bookmarks", Stash, 2020, 7 pages, visited on Mar. 26, 2021.
"Block Protocol", https://blockprotocol.org, visited on Dec. 28, 2022.
"Browser support for JavaScript APIs", https://developer.mozilla.org/en-US/docs/Mozilla/Add-ons/WebExtensions/Browser_support_for_JavaScript_APIs. Visited on Dec. 28, 2022.
"Chrome Extensions Reference", https://developer.chrome.com/docs/extensions/reference. Visited on Dec. 28, 2022.
"Comake SKL Demo for Delta", https://youtu.be/m_KsDWW84VU?t=177. Visited on Dec. 28, 2022.
"Data modeling for modern data warehouses", https://www.activityschema.com. Visited on Dec. 28, 2022.
"Design Tokens Format Module", https://tr.designtokens.org/format, Dec. 13, 2022.
"Dolt—It's Git for Data", DoltHub,10 pages. Visited on Mar. 25, 2021.
"Events", https://developer.nylas.com/docs/api/#tag--Events. Visited on Dec. 28, 2022.
"HoloLens 2 AR Headset: On Stage Live Demonstration", UploadVR, Feb. 24, 2019, https://youtu.be/ulHPPtPBgHk?t=106 , 3 pages.
"Mem", https://get.mem.ai. Visited on Dec. 28, 2022.
"OpenAPI Generator", https://openapi-generator.tech. Visited on Dec. 28, 2022.
"Patient", https://www.flexpa.com/docs/fhir-resources/patient. Visited on Dec. 28, 2022.
"Protege", https://protege.stanford.edu. Visited on Dec. 28, 2022.
"Speech Recognition", Web Accessibility Initiative (WAI), W3C, retrieved Oct. 27, 2021 from URL: https://www.w3.org/WAI/perspective-videos/voice/ (6 pages).
"Superface", https://superface.ai. Visited on Dec. 28, 2022.
"Surfingkeys", Chrome Web Store, retrieved Oct. 27, 2021 from URL: https://chrome.google.com/webstore/detail/surfingkeys/gfbliohnnapiefjpjlpjnehglfpaknnc?hl=en-US (6 pages).
"Theneo wins Pitch contest at Web Summit 2022", M.Taylor, Nov. 4, 2022, https://websummit.com/blog/theneo-pitch-2022-siemens.
"Unabomber Manifesto", Wikipedia, Mar. 23, 2021, 7 pages.
"Using the Web Speech API", MDN Web Docs, Mozilla, retrieved Oct. 27, 2021 from URL: https://developer.mozilla.org/en-US/docs/Web/API/Web_Speech_API/Using_the_Web_Speech_API (13 pages).
"Vimium", Chrome Web Store, retrieved Oct. 27, 2021 from URL: https://chrome.google.com/webstore/detail/vimium/dbepggeogbaibhgnhhndojpepiihcmeb?hl=en (6 pages).
"Wasting time and energy trying to stay organized? We can help" Journal—Bring your projects to life, 6 pages. Visited on Mar. 26, 2021.
"Welcome to DoltHub", DoltHub Home | DoltHub, 1 page. Visited on Mar. 26, 2021.
8.1.15 Resource Patient—Detailed Descriptions, https://build.fhir.org/patient-definitions.html. Visited on Dec. 28, 2022.
Cruz et al, Using a Layered Approach for Interoperability on the Semantic Web, Proceedings of the Fourth International Conference on Web Information Systems Engineering 12-12 Dec. 2003 (WISE'03) 0-7695-1999-7/03.
Gates B., "Why do we believe lies?" Bill Gates and Rashida Jones Ask Big Questions—Episode 3, Nov. 30, 2020, 1 page.
Hall S., "Dolt, a Relational Database with Git-Like Cloning Features", Aug. 19, 2020, 15 pages.
http://example.com/idlab/function/getMIMEType, visited on Dec. 28, 2022.
https://airbyte.com, visited on Mar. 21, 2023.
https://metaphacts.com/, visited on Mar. 21, 2023.
https://supabase.com/blog/postgres-foreign-data-wrappers-rust, visited on Mar. 21, 2023.
https://virtuoso.openlinksw.com/, visited on Mar. 21, 2023.
https://web.archive.org/web/20220117015712/https:/hash.ai, visited on Dec. 28, 2022.
https://www.adept.ai/, visited on Mar. 21, 2023.
https://www.apollographql.com/, visited on Mar. 22, 2023.
https://www.fivetran.com, visited on Mar. 21, 2023.
https://www.marklogic.com, visited on Mar. 22, 2023.
https://www.raycast.com/, visited on Mar. 21, 2023.
https://www.starburst.io/, visited on Mar. 21, 2023.
https://www.withbroadcast.com/, visited on Mar. 21, 2023.
International Search Report and Written Opinion on PCT App. PCT/US2022/053994 dated Apr. 7, 2023 (14 pages).
International Search Report on PCT Appl. Ser. No. PCT/US2022/022341 dated Jul. 7, 2022 (8 pages).
Matney L., "Facebook debuts Infinite Office, a virtual reality office space", , Sep. 16, 2020, 8 pages.
Merge SDKs, https://docs.merge.dev/sdk. Visited on Dec. 28, 2022.
Metriport, https://github.com/metriport/metriport/tree/master/api/app/src/mappings. Visited on Dec. 28, 2022.
Non-Final Office Action on U.S. Appl. No. 17/707,888 dated Mar. 28, 2023 (46 pages).

(56) References Cited

OTHER PUBLICATIONS

Storage Files, https://developers.kloudless.com/docs/latest/storage#files. Visited on Dec. 28, 2022.
Swagger Codegen, https://swagger.io/tools/swagger-codegen. Visited on Dec. 28, 2022.
Thacker N., "Microsoft Mesh—A Technical Overview" Mar. 2, 2021, 8 pages.
The Employee object, https://docs.merge.dev/hris/employees. Visited on Dec. 28, 2022.
The Lead object, https://docs.merge.dev/crm/leads/#leads-object. Visited on Dec. 28, 2022.
Universal API for Healthcare Data,https://metriport.com/. Visited on Dec. 28, 2022.
International Preliminary Report on Patentability for PCT App. PCT/US2022/022341 dated Oct. 3, 2023 (7 pages).
Ives et al. "Interactive Data Integration through Smart Copy & Paste" National Electronics and Computer Technology Center CIDR 2009 (Year: 2009).
Marquardt et al. "Designing User-, Hand-, and Handpart-Aware Tabletop Interactions with Touch ID Toolkit" Research Report 2011-1004-16, Department of Computer Science, University of Calgary, Calgary, AB, Canada T2N 1 N4, Jul. 2011.
International Preliminary Report on Patentability and Written Opinion on International Application No. PCT /US2022/053994 dated Jun. 20, 2024 (7 pages).
Extended European Search Report on EPO Application No. 22782019.8 dated Feb. 5, 2025 (10 pages).
International Search Report and Written Opinion on International Application No. PCT/US24/43652 dated Nov. 6, 2024 (13 Pages).
A Framework for Cooperative Ontology Construction Based on Dependency Management of Modules—CiteSeerX, accessed Apr. 9, 2025, https://citeseerx.ist.psu.edu/document?repid=rep1&type=pdf&doi=6a313da7cf5ec8d4d900e953bd29 1979a7394e84.
A Large-scale Investigation of Semantically Incompatible APIs behind Compatibility Issues in Android Apps—arXiv, accessed Apr. 9, 2025, https://arxiv.org/html/2406.17431v1.
A Model-Driven Method for automatic generation of Rule-based Web Applications—CEUR-WS.org, accessed Apr. 9, 2025, https://ceur-ws.org/vol. 486/kese2009-02.pdf.
A new paradigm for Continuous Alignment of Business and IT: Combining Enterprise Architecture Modeling and Enterprise Ontology, Repository.up.ac.za, accessed Apr. 9, 2025, https://repository.up.ac.za/bitstream/2263/50927/1/Hinkelmann_New_2016.pdf.
AA'01 Tutorial on Agent Communication Languages - Umbc Csee, accessed Apr. 9, 2025, https://www.csee.umbc.edu/~finin/talks/691m.pdf.
Agent Certification Standards and Federated Meta-Orchestration: Building Reliable and Scalable AI Systems—Ve3 Global, Dec. 30, 2024, accessed Apr. 9, 2025, https://www.ve3.global/agent-certification-standards-and-federated-meta-orchestration-building-reliable-and-scalable-ai-systems/.
Agent Communications Language—Wikipedia, accessed Apr. 9, 2025, https://en.wikipedia.org/wiki/Agent_Communications_Language.
Agentic Workflows: Everything You Need to Know—Automation Anywhere, accessed Apr. 9, 2025, https://www.automationanywhere.com/rpa/agentic-workflows.
AI-Generated Infrastructure-as-Code: The Good, the Bad and the Ugly, Paul Foryt, published Feb. 2, 2023, accessed Apr. 9, 2025, https://www.styra.com/blog/ai-generated-infrastructure-as-code-the-good-the-bad-and-the-ugly/.
Alenezi, M., & Akour, M. (2025). AI-Driven Innovations in Software Engineering: A Review of Current Practices and Future Directions. Applied Sciences, 15(3), 1344., accessed Apr. 9, 2025, https://www.mdpi.com/2076-3417/15/3/1344.
Ali, A., Tufail, A., De Silva, L. C., & Abas, P. E. (2024). Innovating Patent Retrieval: A Comprehensive Review of Techniques, Trends, and Challenges in Prior Art Searches. Applied System Innovation, 7(5), 91., accessed Apr. 9, 2025, https://www.mdpi.com/2571-5577/Jul. 5, 91.
Alsaeh, Amal & Sezen, Arda. (2024). Semantic Interoperability and Reusability in IoT: a Systematic Mapping Study. 1-7. 10.1109/IDAP64064.2024.10710911.
Automated Database Schema Evolution in Microservice, André, ceur-ws.org, accessed Apr. 9, 2025, https://ceur-ws.org/Vol-3452/paper10.pdf.
Baldwin, Donald & Perjons, Erik. (2015), A Domain Neutral Enterprise Architecture Framework for Enterprise Application Integration and Pervasive Platform Services., accessed Apr. 9, 2025, https://www.researchgate.net/publication/321596806_A_Domain_Neutral_Enterprise_Architecture_Framework_for_Enterprise_Application_Integration_and_Pervasive_Platform_Services.
Categories of Ontologies' Applications in the Realm of Enterprise Modeling, Monika Kaczmarek, 2015 IEEE 17th Conference on Business Informatics, published Jul. 13, 2015, https://ieeexplore.IEEE.org/abstract/document/7264721.
Challenges and solutions for distributed data management-. NET | Microsoft Learn, accessed Apr. 9, 2025, https://learn.microsoft.com/en-us/dotnet/architecture/microservices/architect-microservice-container-applications/distributed-data-management.
Code Generation—How Agentic Workflows Transform Requirements into Code, K G Aravinda Kumar, Feb. 9, 2025, accessed Apr. 9, 2025, https://aravindakumar.medium.com/code-generation-how-agentic-workflows-transform-requirements-into-code-61aecd683cbb.
Common Information Model (CIM) Infrastructure—DMTF, accessed Apr. 9, 2025, https://www.dmtf.org/sites/default/files/standards/documents/DSP0004_2.5.pdf.
Comparing Agent Communication Languages and Protocols: Choosing the Right Framework for Multi-Agent Systems—SmythOS, accessed Apr. 9, 2025, https://smythos.com/ai-agents/ai-agent-development/agent-communication-languages-and-protocols-comparison/.
Critical Schema Compatibility: The Key to Preventing Data Disasters, accessed Apr. 9, 2025, https://blog.devops.dev/critical-schema-compatibility-the-key-to-preventing-data-disasters-5ac8044d0643.
Data mesh—Wikipedia, accessed Apr. 9, 2025, https://en.wikipedia.org/wiki/Data_mesh.
Data Mesh Principles (Four Pillars) Guide for 2025—Atlan, accessed Apr. 9, 2025, https://atlan.com/data-mesh-principles/.
Data Mesh: Delivering Data-Driven Value at Scale: Dehghani, Zhamak—Amazon.com, accessed Apr. 9, 2025, https://www.amazon.com/Data-Mesh-Delivering-Data-Driven-Value/dp/1492092398.
Distributed Construction of Ontologies Using Hozo—CEUR-WS, accessed Apr. 9, 2025, https://ceur-ws.org/vol. 273/paper_19.pdf.
Djuric, Dragan & Gasevic, Dragan & Devedzic, Vladan. (2006). The Tao of Modeling Spaces. Journal of Object Technology. 5. 125-147.10.5381/jot.2006.5.8.a4, accessed Apr. 9, 2025, https://www.researchgate.net/publication/220299599_The_Tao_of_Modeling_Spaces.
Elevate Data Mesh with Kyvos Semantic Layer, accessed Apr. 9, 2025, https://www.kyvosinsights.com/data-mesh/.
Enterprise Collaboration Architecture (ECA) Specification—Object Management Group, accessed Apr. 9, 2025, https://www.omg.org/spec/EDOC/1.0/PDF.
Extensible and Dynamic Topic Types for DDS—Object Management Group, Feb. 2012, accessed Apr. 9, 2025, https://www.omg.org/spec/DDS-XTypes/1.0/Beta2/PDF.
Federal Enterprise Architecture Framework—Obama White House, accessed Apr. 9, 2025, https://obamawhitehouse.archives.gov/sites/default/files/omb/assets/egov_docs/fea_v2.pdf.
Health informatics—Interoperability and Integration Reference Architecture—Model and Framework—HL7—Confluence, accessed Apr. 9, 2025, https://confluence.hl7.org/download/attachments/86967864/ISO-DIS%2023903%20-%20Interoperability%20Reference%20Architecture_Final_without%20Figure%20E1.pdf?version=1&modificationDate=1591980934242&api=v2.
Introducing Ontology Evolution Management—SEDICI, accessed Apr. 9, 2025, http://sedici.unlp.edu.ar/bitstream/handle/10915/21301/Documento_completo.pdf?sequence=1&isAllowed=y.
Lee, Juhyun & Park, Sangsung & Lee, Junseok. (2022). A Fast and Scalable Algorithm for Prior Art Search. IEEE Access. pp. 1-1.

(56) References Cited

OTHER PUBLICATIONS 10.1109/ACCESS.2022.3141494., accessed Apr. 9, 2025, https://www.researchgate.net/publication/357663630_A_Fast_and_Scalable_Algorithm_for_Prior_Art_Search.
Linkerd vs. Istio: 7 Key Differences—Solo.io, accessed Apr. 9, 2025, https://www.solo.io/topics/linkerd/linkerd-vs-istio.
Louhichi, Soumaya & Graiet, Mohamed & Kmimech, Mourad & Bhiri, Mohamed & Gaaloul, Walid & Cariou, Eric. (2011). ATL Transformation for the Generation of SCA Model. 164-167. 10.1109/SKG.2011.37., accessed Apr. 9, 2025, https://www.researchgate.net/publication/221510895_ATL_Transformation_for_the_Generation_of_S CA Model.
Matchmaker: Self-Improving Large Language Model Programs for Schema Matching, University of Cambridge, published Oct. 31, 2024, https://arxiv.org/abs/2410.24105.
Meta Object Facility | Enterprise Architect User Guide - Sparx Systems, accessed Apr. 9, 2025, https://sparxsystems.com/enterprise_architect_user_guide/17.0/modeling_languages/mof.html.
Mining Android API Usage to Generate Unit Test Cases for Pinpointing Compatibility Issues—arXiv, accessed Apr. 9, 2025, https://arxiv.org/pdf/2208.13417.
Mining Android API Usage to Generate Unit Test Cases for Pinpointing Compatibility Issues—Yanjie Zhao, accessed Apr. 9, 2025, https://yanjiezhao96.github.io/files/sun2022mining.pdf.
Model-Driven Development of AI for Digital Games—bac-lac.gc.ca, accessed Apr. 9, 2025, https://dam-oclc.bac-lac.gc.ca/download?is_thesis=1&oclc_number=922582798&id=2c06f462-9b58- 4c7a-91c4-4fac9e31fc2c&fileName=vh53wz77q.pdf.
Model-driven Software Development, accessed Apr. 9, 2025, https://profs.info.uaic.ro/adrian.iftene/Licenta/Documentatie/2_Model-driven%20software%20developm%20-%20Sami%20Beydeda%20&%20Matthias%20Book%20&_317.pdf.
MOF 2.0/XMI Mapping Specification, v2.1—Object Management Group, Sep. 2005, accessed Apr. 9, 2025, https://www.omg.org/spec/XMI/2.1/PDF.
NextGRID Architectural Concepts—SciSpace, accessed Apr. 9, 2025, https://scispace.com/pdf/nextgrid-architectural-concepts-143ws4ctcz.pdf.
OGC Testbed-14: Characterization of RDF Application Profiles for Simple Linked Data Application and Complex Analytic Application, published Feb. 4, 2019, accessed Apr. 9, 2025, https://docs.ogc.org/per/18-094r1.pdf.
OMG Meta Object Facility (MOF) Core Specification, Oct. 2019, accessed Apr. 9, 2025, https://www.omg.org/spec/MOF/2.5.1/PDF.
Ontology-based multi-agent system to support business users and management—arXiv, accessed Apr. 9, 2025, https://arxiv.org/pdf/1807.03646.
Ontology-Driven Generation of Guidelines for Content Creation Purposes—IGI Global, accessed Apr. 9, 2025, https://www.igi-global.com/chapter/ontology-driven-generation-of-guidelines-for-content-creation-purposes/113127.
Palma et al., "Ontology Evolution, " Ontology Engineering in a Networked World, Chapter 11, Jan. 2011, pp. 235-255.
Principles of data mesh | dbt Labs, Daniel Poppy, published Sep. 12, 2023, accessed Apr. 9, 2025, https://www.getdbt.com/blog/what-are-the-four-principles-of-data-mesh.
Representation of levels and instantiation in a metamodelling environment—Scientific Figure on ResearchGate. Available from: https://www.researchgate.net/figure/The-four-layer-metamodel- architecture_fig1_228569882 [accessed Apr. 22, 2025].
Requirements for enterprise-referencing architectures and methodologies Bs Iso 15704:2019—BSI Standards Publication, accessed Apr. 9, 2025, https://webstore.ansi.org/preview-pages/BSI/preview_30360657.pdf.
S. D. J. McArthur; E. M. Davidson; V. M. Catterson; A. L. Dimeas; N. D. Hatziargyriou; F. Ponci; T. Funabashi, "Multi-Agent Systems for Power Engineering Applications-Part I: Concepts, Approaches, and Technical Challenges", IEEE Transactions on Power Systems, vol. 22, No. 4, Nov. 2007, accessed Apr. 9, 2025, https://site.IEEE.org/pes-mas/agent-technology/standards-and-interoperability/.
Salatge et al., "Fault Tolerance Connectors for Unreliable Web Services," 37th Annual IEEE/IFIP International Conference on Dependable Systems and Networks (DSN'07), Jun. 2007, 10 pages.
Saraiva, João & Silva, Alberto. (2008). Evaluation of MDE Tools from a Metamodeling Perspective. Journal of Database Management. 19. 21-46. 10.4018/jdm.2008100102, accessed Apr. 9, 2025, https://www.researchgate.net/figure/An-example-of-OMGs-four-layer-metamodel-architecture_fig2_220373664.
Sascha Welten, Laurenz Neumann, Yeliz Ucer Yediel, Luiz Olavo Bonino da Silva Santos, Stefan Decker, Oya Beyan; Dams: A Distributed Analytics Metadata Schema. Data Intelligence 2021; 3 (4): 528-547., accessed Apr. 9, 2025, https://direct.mit.edu/dint/article/3/4/528/101036/DAMS-A-Distributed-Analytics-Metadata-Schema.
Security and Microservice Architecture on AWS: Architecting and Implementing a Secured, Scalable Solution [1 ed.] 1098101464, 9781098101466—DOKUMEN.PUB, accessed Apr. 9, 2025, https://dokumen.pub/security-and-microservice-architecture-on-aws-architecting-and-implementing-a-secured-scalable-solution-1nbsped-1098101464-9781098101466-i-4320235.html.
Semantic Data Mesh for Scalable Data Management | Timbr.ai, Tzvi Weitzner, accessed Apr. 9, 2025, https://timbr.ai/blog/semantic-data-mesh-for-scalable-data-management/.
Semantic Interoperability Methods for Smart Service Systems: A Survey—Uni Mannheim, accessed Apr. 9, 2025, https://www.uni-mannheim.de/media/Einrichtungen/ines/Preprints/tems-online.pdf.
Semantic service discovery in the service ecosystem | QUT ePrints, accessed Apr. 9, 2025, https://eprints.qut.edu.au/50872/.
Service Mesh in Kubernetes: A Comparison of Istio and Linkerd | by Yasinkartal | Medium, accessed Apr. 9, 2025, https://medium.com/@yasinkartal2009/service-mesh-in-kubernetes-istio-and-linkerd- f4865a9bcc86.
Service Meshes Decoded: Istio vs Linkerd vs Cilium | LiveWyer, Oleksandr, published May 8, 2024, accessed Apr. 9, 2025, https://livewyer.io/blog/service-meshes-decoded-istio-vs-linkerd-vs-cilium/.
Service Meshes: Istio and Linkerd for Advanced Traffic Management | by Platform Engineers, accessed Apr. 9, 2025, https://medium.com/@platform.engineers/service-meshes-istio-and-linkerd-for-advanced-traffic-management-8f6150e575d8.
Slides: How a Semantic Layer Makes Data Mesh Work At Scale—Dataversity, accessed Apr. 9, 2025, https://www.dataversity.net/slides-how-a-semantic-layer-makes-data-mesh-work-at-scale/.
Source code generation using deep learning: revolutionizing software development, accessed Apr. 9, 2025, https://www.byteplus.com/en/topic/419556.
Stojanovic, Ljiljana & Maedche, Alexander & Motik, Boris & Stojanovic, Nenad. (2002). User-Driven Ontology Evolution Management. Proc of the 13th Intl Conf On Knowledge Engineering and Knowledge Management. 10.1007/3-540-45810-7_27., accessed Apr. 9, 2025, https://www.researchgate.net/publication/200827810_User-Driven_Ontology_Evolution Management.
Sun, et al., "Mining Android API Usage to Generate Unit Test Cases for Pinpointing Compatibility Issues," accessed Apr. 23, 2025, https://arxiv.org/pdf/2208.13417, 13 pages (2022).
The Essence of Multilevel Metamodeling—School of Engineering and Computer Science Wiki, accessed Apr. 9, 2025, https://homepages.ecs.vuw.ac.nz/~tk/publications/papers/essence.pdf.
The Principles of Data Mesh and the Semantic Layer - AtScale, Elif Tutuk, accessed Apr. 9, 2025, https://www.atscale.com/resource/data-mesh-principles-semantic-layer/.
Thiagarajan et al., "Semantic Service Discovery by Consistency-Based Matchmaking," Lecture Notes in Computer Science (LNCS) 5446, pp. 492-505, 2009.
Tools for Developing Applications in the Semantic Web of Things: A Systematic Literature Review | Revista Facultad de Ingenieria, accessed Apr. 9, 2025, https://revistas.uptc.edu.co/index.php/ingenieria/article/view/17959/14943.
Types of Agent Communication Languages—SmythOS, accessed Apr. 9, 2025, https://smythos.com/ai-agents/ai-agent-development/types-of-agent-communication-languages/.
UBL NDR Version 1pt0—Oasis Open, accessed Apr. 9, 2025, https://docs.oasis-open.org/ubl/prd-UBL-NDR-2.0.htm.

(56) References Cited

OTHER PUBLICATIONS

Understanding Data Mesh Principles—Dataversity, accessed Apr. 9, 2025, https://www.dataversity.net/understanding-data-mesh-principles/.

Wang, Hongwei & Wang, Guoxin & Jinzhi, Lu & Ma, Changfeng. (2019). Ontology Supporting Model- Based Systems Engineering Based on a GOPPRR Approach. 10.1007/978-3-030-16181-1_40, accessed Apr. 9, 2025, https://www.researchgate.net/publication/332025938_Ontology_Supporting_Model-Based_Systems_Engineering_Based_on_a_GOPPRR_Approach.

Weaving the Extensible Bills of Materials (xBOM) Fabric, Erica Dretzka, Brent Smith, Nathaniel Fuller, MODSIM World 2023, published May 22, 2023, http://modsimworld.org/about/publications/2023.

What are Agentic Workflows? | IBM, Cole Stryker and Anna Gutowska, Mar. 7, 2025, accessed Apr. 9, 2025, https://www.IBM.com/think/topics/agentic-workflows.

"What Are Agentic Workflows?", Mansi Shah, Feb. 27, 2025, accessed Apr. 9, 2025, https://arya.ai/blog/agentic-workflows.

What is a Semantic Layer? (Components and Enterprise Applications), Lulit Tesfaye, Feb. 1, 2024, accessed Apr. 9, 2025, https://enterprise-knowledge.com/what-is-a-semantic-layer-components-and-enterprise-applications/.

What Is Service Mesh in Kubernetes & 4 Tools to Get Started, accessed Apr. 9, 2025, https://www.tigera.io/learn/guides/service-mesh/service-mesh-kubernetes/.

\* cited by examiner

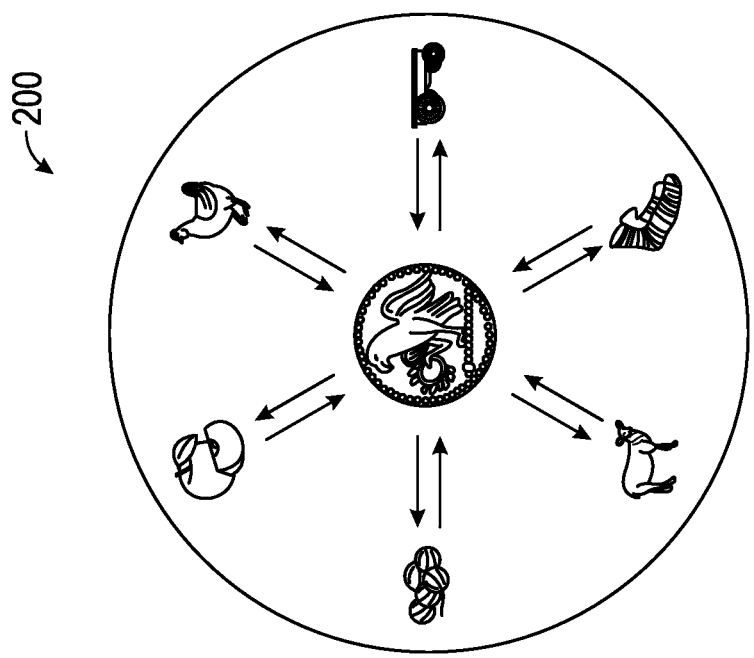
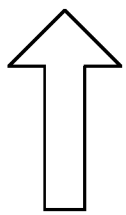
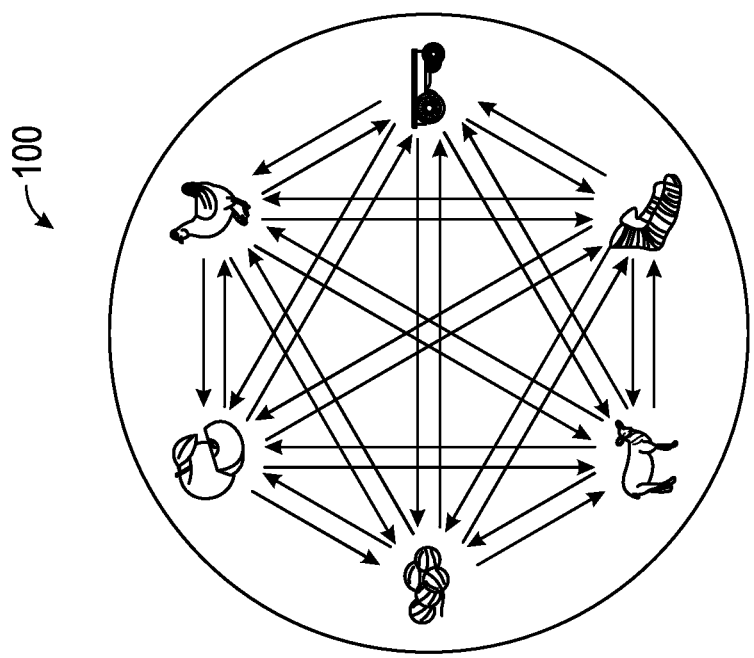
FIG. 1A

RULES ENGINE > PASSENGER RECOGNITIONS > EDIT FILTER BLOCK

NAME
WELCOME BACK — 2610

MESSAGE
HI [PASSENGER NAME], WE ARE VERY HAPPY TO WELCOME YOU BACK! 2020 WAS A HARD YEAR FOR MANY OF US. IF THERE'S ANYTHING WE CAN DO ON THIS FLIGHT TO [DESTINATION] THEN PLEASE DO — 2620

SHOW ME
PASSENGERS ▼
WHERE
LAST_FLOWN ▼ | IS ON OR BEFORE ▼ | 2020 ◇ MARCH ▼ 10 ▼  — 2602a
☐ RELATIVE
AND
LOYALTY_NUM ▼ | IS SET ▼  — 2602b
AND
BIRTHDAY ▼ | IS MORE THAN ▼ | 18 YEARS AGO  — 2602c
+ ADD FILTER
SORT BY
LAST_FLOWN ▼ | ASCENDING ▼  — 2603a
THEN SORT BY
LOYALTY_RANK ▼ | DESCENDING ▼  — 2603b
+ ADD SORT
SEARCH

2604

2605

SAVED  SAVE

17 RESULTS

| PASSENGER ID | SEAT | PASSENGER TYPE | CUSTOMER ID | |
|---|---|---|---|---|
| 39067 | 24E | MILITARY | 9067 | RD20221107 |

 Saved on Google
 Calendar Meeting
Message on WhatsApp
 Liked Post w/ Geotag
 Airbnb Booking
VIEW DATA ON MAP
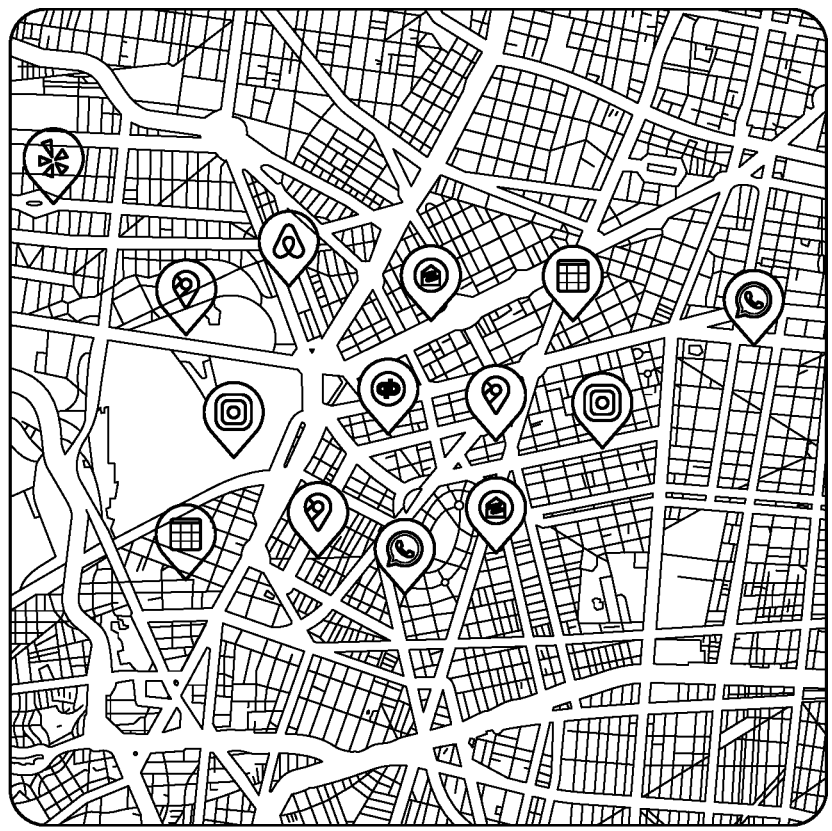
 Saved on Zillow
 Invoice in QuickBooks
 Reserved on Yelp
FIG. 31

≡ ⋆⋆ STANDARDKNOWLEDGE [SEARCH ANYTHING]                LOG IN [SIGN UP]

SKL ▸ INTEGRATIONS
GOOGLE DRIVE
GOOGLE DRIVE IS A FREE WAY TO KEEP YOUR FILES BACKED UP AND EASY TO REACH FROM ANY PHONE, TABLET, OR COMPUTER. START WITH 15GB OF GOOGLE STORAGE – FREE.

GENERAL   UI   API   NOUNS   VERBS   SKAPPS   TIMELINE   ISSUES   PULL REQUESTS   ...

NAME: [GOOGLE DRIVE]

DOMAIN STRINGS: [DRIVE.GOOGLE.COM, DOCS.GOOGLE.COM]
URL DOMAINS THAT ARE ASSOCIATED WITH THIS APP TYPE. CAN INCLUDE A PATH.
ONLY ADD DOMAINS HERE FOR WHICH ALL URLS THAT MATCH IT ARE ASSOCIATED WITH THIS APP TYPE.
SEPARATE MULTIPLE DOMAINS USING *, * (COMMA AND SPACE).
EG. SALESFORCE.COM FOR THE SALESFORCE APP
EG. LOGIN.MICROSOFTONLINE.COM OR LOGIN.LIVE.COM FOR THE OUTLOOK APP.

DOMAIN REGEXES [^HTTPS?:\/\/(?:[^\/]+\.)?DRIVE\.GOOGLE\.[^\/]+\/, ^HTTPS?:\/\/(?:[^\/]+\.)?DOCS\.GOOGLE\.[^\/]+\/]
OPTIONAL - REGEXES TO MATCH URL DOMAINS THAT ARE ASSOCIATED WITH THIS APP TYPE. CAN INCLUDE A PATH.
ONLY ADD DOMAINS HERE FOR WHICH ALL URLS THAT MATCH IT ARE ASSOCIATED WITH THIS APP TYPE.
SEPARATE MULTIPLE DOMAINS USING *, * (COMMA AND SPACE).
USE REGEX 101 TO CONSTRUCT A VALID ECMASCRIPT (JAVASCRIPT) REGEX. YOU DON'T NEED TO INCLUDE A LEADING OR TRAILING / OR ANY REGEX FLAGS.
EG. \W+\.SALESFORCE\.COM FOR THE SALESFORCE APP
EG. LOGIN\.MICROSOFTONLINE\.COM OR LOGIN\.LIVE\.COM FOR THE OUTLOOK APP.

DEFAULT URL: [HTTPS://DRIVE.GOOGLE.COM/DRIVE/U/[EMAIL]/MY-DRIVE]
ADD {EMAIL} ANYWHERE IN THE URL AND IT WILL BE REPLACED WITH THE EMAIL A USER USES FOR THEIR APP. IF THE URL IS USED FOR AN APP TYPE AND NOT A SPECIFIC APP, THE WHOLE {EMAIL} WILL BE REMOVED.

DEFAULT URL FORMAT REGEX: [/REGEX/]
ENTER A REGEX WHICH THE DEFAULT URL OF APPS OF THIS TYPE SHOULD MATCH. THIS WILL BE USED TO AUTOMATICALLY UPDATE USERS' APPS WITH A MORE SPECIFIC URL ONCE THEY LOGIN. USE REGEX101 TO CONSTRUCT A VALID ECMASCRIPT (JAVASCRIPT) REGEX. YOU DON'T NEED TO INCLUDE A LEADING OR TRAILING / OR ANY REGEX FLAGS.

FIG. 33

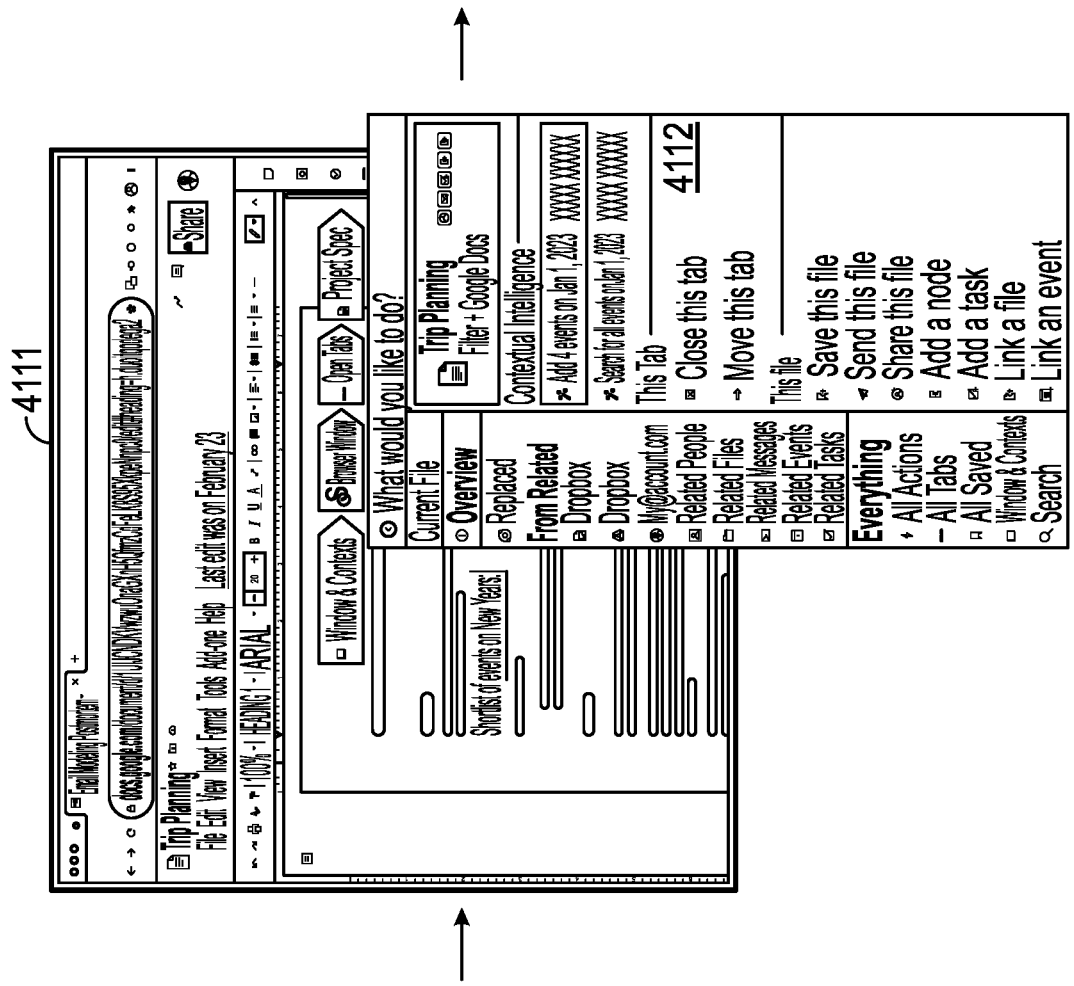
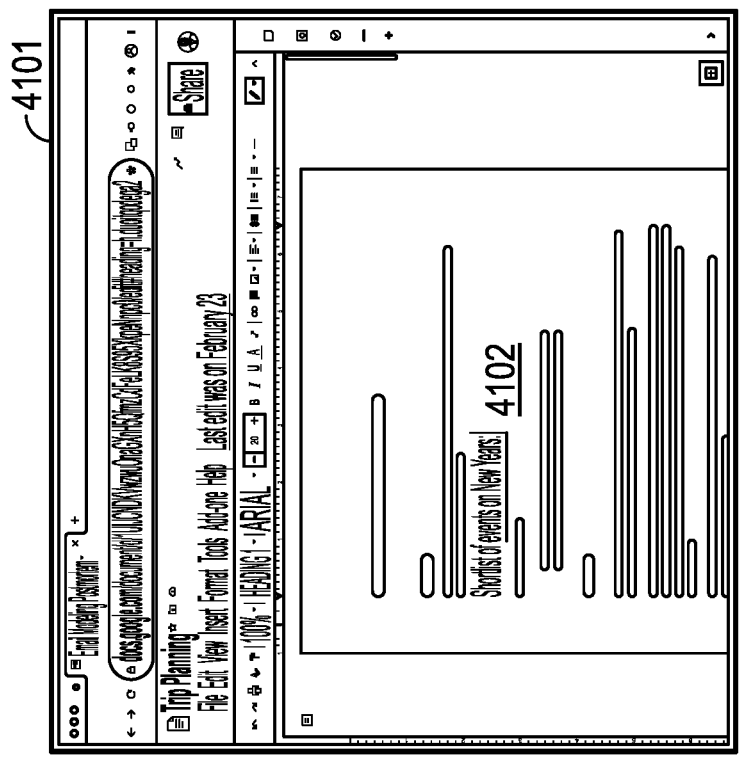
FIG. 41

FIG. 42B

- STANDARD KNOWLEDGE LANGUAGE
  - NOUNS
  - PROPERTIES
  - INTEGRATIONS
  - VERBS
  - MAPPINGS
  - ACCOUNTS
    - COMAKE KNOWLEDGE GRAPH...
    - COMAKE KNOWLEDGE GRAPH...
    - TICKETMASTER ACCOUNT
    - TICKETMASTER SECURITY CRE...
  - INTERFACE COMPONENTS
  - THEMES
  - SYNCED DATA

+CREATE NEW

TICKETMASTER ACCOUNT 4222
SYNC THIS ACCOUNT    SAVED  CLOSE

```
1  {
2    "@ID": "HTTPS://SKL.STANDARD.STORAGE/DATA/TICKETMASTERACCOUNT",
3    "@TYPE": "HTTPS://SKL.STANDARD.STORAGE/NOUNS/ACCOUNT",
4    "HTTPS://SKL.STANDARD.STORAGE/PROPERTIES/INTEGRATION": {
5      "@ID": "HTTPS://SKL.STANDARD.STORAGE/INTEGRATIONS/TICKETMAS
6    },
7    "HTTPS://SKL.STANDARD.STORAGE/PROPERTIES/NAME": "TICKETMASTER
8    "HTTPS://SKL.STANDARD.STORAGE/PROPERTIES/SYNCSTEPDEFAULTARGS"
9      "@TYPE": "@JSON",
10     "@VALUE": {
11       "HTTPS://SCHEMA.ORG/EVENT": {  4221b
12         "CITY": "ATLANTA",
13         "PAGESIZE": 40
14       }
15     }
16   }
17 }
```

CHOOSE A TYPE: 4231    CHOOSE A VIEW: 4232b
EVENTS ●                CARDS ● 4233b

- ATLANTA HAWKS VS. PHOENIX SUNS
  STATE FARM ARENA
- ATLANTA HAWKS VS. LOS ANGELES LAKERS
  STATE FARM ARENA
- FALCONS VS. CARDINALS
  MERCEDES-BENZ STADIUM
- ATLANTA HAWKS VS. DETROIT PISTONS
  STATE FARM ARENA
- ATLANTA BRAVES VS. NEW YORK YANKEES
  TRUIST PARK
- ATLANTA BRAVES VS. LOS ANGELES DODGERS
  TRUIST PARK
- ATLANTA BRAVES VS. NEW YORK YANKEES
  TRUIST PARK
- ATLANTA BRAVES VS. LOS ANGELES DODGERS
  TRUIST PARK
- DISNEY ON ICE PRESENTS INTO THE MAGIC
  ENMARKET ARENA

METHODS AND SYSTEMS FOR SHARED LANGUAGE FRAMEWORK TO MAXIMIZE COMPOSABILITY OF SOFTWARE, TRANSLATIVITY OF INFORMATION, AND END-USER INDEPENDENCE

CROSS REFERENCE TO RELATED APPLICATIONS

This application is a Continuation Application of U.S. patent applicant Ser. No. 18/088,485, filed Dec. 23, 2022, which claims priority to U.S. Provisional Patent Application No. 63/308,305, filed Feb. 9, 2022, U.S. Provisional Patent Application No. 63/293,600, filed Dec. 23, 2021, U.S. Provisional Patent Application No. 63/351,690, filed Jun. 13, 2022, U.S. Provisional Patent Application No. 63/354,563, filed Jun. 22, 2022, and which is also a continuation-in-part of U.S. patent application Ser. No. 17/707,888, filed Mar. 29, 2022, which claims priority to U.S. Provisional Patent Application No. 63/191,852, filed May 21, 2021 and 63/167,401, filed Mar. 29, 2021, which are incorporated by reference herein for all purposes.

TECHNICAL FIELD

This application relates generally to electronic data management and data mapping.

BACKGROUND

Many engineering processes lack a universal standard for the accumulation, translation, and transformation of digital information across disparate end-user needs and work processes. An increase in connectivity among different computing device has led to large volume of data being created and relied upon across fragmented environments and domain areas. The more friction there is in connecting data and capabilities across and within any given set of software tools, the harder it is for data creators and for end users to draw value from the underlying information, and the easier it is for "middle-men" to monetize said data and data pipelines. As a result, entire secondary markets have emerged to try to connect data and capabilities across disparate software tools. This incompatibility of data fragments has led to many technical shortcomings. For instance, various computing infrastructure cannot efficiently communicate because they cannot freely exchange data.

SUMMARY

For the aforementioned reasons, there is a need for a unified data model that can allow different computing device and infrastructure to communicate efficiently. There are a wide range of standards for different aspects of dealing with data such as communication and connection (e.g., OSLC, LDP etc.), data transfer (e.g., HTTP, SMTP, etc.), data storage (e.g., PostgreSQL, RDF store, Solid Pod, etc.), data ontologies (e.g., BFO, Common Core, Schema.org, FHIR, etc.), and more, including higher-level abstractions for each purpose. Many companies are dedicated to facilitating the integration of specific software tools to building and managing data pipelines between specific data sources and/or to building tools, dashboards, automations, models, and more that may help users draw value from said data and/or pipelines. However, there is a missing link in facilitating highly modular and easily configurable software and data that may be "standardized" within certain domain areas and environments.

For example, there is no standard that defines how to accumulate digital knowledge across processes, storage locations, and software components, including how to associate/link data in semantically consistent or translatable manners. There is no standard that defines how different applications and software components may access, understand, and process the same or related data across use cases and environments. There is no standard that allows end users to easily access relevant and innovative software processes without significant effort in integrating these new methods (e.g., by first packaging that process as a part of an application).

Existing solutions that accumulate knowledge for the most part: (1) store data in proprietary structures and with limited storage options within walled gardens/ecosystems/platforms (e.g., Microsoft® 365, Apple®, Google®); (2) require expensive, custom-built data lakes/warehouses with custom-built and isolated Schemas/ontologies that need dedicated teams to manage the data and data transformations; and/or (3) are built over open standards that have not gained enough adoption across a wide enough range of end-user needs/work processes due to (a) the standards' domain specificity or feature limitations, and/or (b) the reliance on software companies to implement standards (e.g., RDF) that may be misaligned with their priorities (e.g., custom architectures, no perceived need for semantic web integration, user lock-in through data storage in proprietary formats, etc.).

A simpler system for the integration of digital processes is necessary to increase humanity's potential for innovation and to generate and independently store and accumulate knowledge. People and businesses are increasingly trying to trade and accumulate digital information across processes in useful formats, and they do not have effective ways to affordably and scalably do so.

Many software tools have emerged to solve some need or to otherwise digitize some process. Since most software applications were developed independently, by independent groups of people, the data and capabilities associated with each are usually and logically also independently stored and managed. In other words, each of these processes and related data tend to not be natively interconnected with each other. Most processes and needs, however, are not isolated given that they exist within, and as part of, societies that are in turn comprised of many overlapping systems and processes. It is therefore logical and natural that any digital process should then try to connect, or "integrate," with other relevant processes. The need to connect these software tools together further increases as we collectively and independently digitize an increasing number of processes. This results in each independent stakeholder trying to connect their tool with any other relevant tools, ultimately trying to exchange attributes of each end system by directly comparing each system to every other system.

Integrating data with conventional approaches requires translation from one proprietary format to another (e.g., integrate Salesforce® data into QuickBooks® to maintain up-to-date information about customers and sales numbers for accounting): in other words, exchanging and translating digital goods (e.g., data) and services (e.g., software processes) via one-to-one connections, at scale. Exchanging information between every end condition is a sub-optimal way to translate data across multiple workflows and processes. It is akin to a bartering economy, where a society tries to trade goods & services before the standard of money, where goods and services are exchanged via one-to-one comparisons, and where wealth may only be accumulated with respect to a particular good (e.g., the number of shoes produced/week).

Trying to manage a messy web of one-to-one integrations that directly compares data and capabilities between every tool is complicated, prone to errors, and results in unnecessary overhead. For example, developers commonly use SDKs or other code packages (node modules, ruby gems, etc.) to interact with the API of a software tool they want to integrate into their application. These methods provide convenience over having to writing code to communicate directly using HTTP requests but still have limitations. Due to resource constraints, software tools may not have an SDK or code package targeting every programming language or execution environment that a developer may be programming their application in. In addition, even if they find suitable wrappers for the API they wish to interact with, developers are still left with the task of reading API documentation to know how to translate the unique data formats and capabilities of each API to the data formats and features of their application. This is not a trivial task, especially as the number of integrations they need increases.

There are still proponents who call upon tech companies to convert their APIs or build linked data compatible versions of their APIs. There are also proponents for establishing standard API features that solve for common needs of software tools and developers who use their APIs. However, the methods they propose require that developers at different companies collectively agree to architect their APIs according to a shared criteria that does not yet exist and that could limit their innovation or development cycles. In the fast-moving world of software startups, where growth tends to be among the highest priorities, convincing enough companies to invest in the collective establishment of these standards (sometimes in concert with their competitors) is difficult. Large companies are also loath to convert to more standard data formats, ontologies, and APIs because they amass great value by controlling the data flow in and out of their proprietary APIs. This leads to vendor lock-in and stifles software innovation. In addition, for those software tools that do choose to invest in building Linked Data APIs, the independent proliferation of various (and sometimes competing) ontologies of Linked Data makes it so that there remains additional manual coding that must be done by developers to integrate data which is formatted according to different ontologies and/or types of APIs.

There are several ontologies that have been created for specific domain areas like healthcare and website search engines, such as FHIR and Schema.org, respectively. Some of these have been able to achieve a significant level of adoption across their applicable industries. In some other industries and markets, there are many competing ontologies which a given developer may leverage. Finding and comparing said ontologies is no easy feat. In many cases, this leads to developers deciding to establish new Schemas rather than build over existing ontologies that might be able to facilitate development efforts.

Furthermore, the existing developer tooling for working with ontologies is often rigid, and thus makes it difficult for people to customize, extend, or otherwise adapt existing ontologies. For example, when a developer's use case is not fully satisfied by an existing or "first-mover" ontology in some domain area, they currently have no obvious way to add the desired additional features or capabilities without creating a new ontology or convincing the publishers of the existing ontologies to incorporate the desired changes. Creating a new ontology is done at great expense. Even creating a "fork" or a variation of a given ontology will likely result with the developer struggling to manage the relationships between the new ontology and any other related ontologies. Since Linked Data is fully distributed, the developer will have to continuously research and monitor other ontologies for relationships and then incorporate those into their new ontology. The amount of effort involved in doing so over extended periods of time means that, in many cases, ontologies are likely to end up fragmented, and the interoperability between them suffers. In other words, due to limitations with the current landscape of technologies and tooling, the new ontology and any related software components will likely not be interoperable and composable with other third-party software components that have been or will be built around other Schemas and ontologies.

There is no perfect ontology for all use cases, and part of the value of Linked Data is that anyone may easily create their own or contribute to existing ontologies. For those software tools that do choose to invest in building Linked Data APIs, this independent proliferation of various (and sometimes competing) ontologies of Linked Data may make it so that there is still a lot of manual work that has to be done by humans to integrate data which is formatted according to different ontologies. An important missing piece is therefore the standard translation across various ontologies, representations of data, and software capabilities.

Software applications often need to read or write data to or from persistent storage on behalf of end users or for some long running process within the function of the. To do so, developers often write code to execute statements in a query language specific to their database of choice (e.g., SQL, Cypher, SPARQL, etc.). Often, developers need to translate data between different types of persistent storage or otherwise switch out the storage systems they use for different use cases. For example, to (1) send, copy, or move data from one application or micro-service to another or (2) use different database types for different environments (the local file system for development, in memory for tests, a cheap database for staging, and a high availability database for production).

One may configure environments to use the IP address and security credentials for different databases of the same type (e.g., staging vs. production PostgreSQL databases), but it requires much more complex programming and layers of abstraction to support the same functionality when switching between databases of different types (e.g., PostgreSQL database and MongoDB document store). There are software categories focused on solving for some of these use cases such as ETL software (Extract, Transform, and Load).

Furthermore, the Schemas for how data is stored and shared matter. Storing data exclusively in proprietary formats mandated by each tool is not conducive to the long-term accumulation of knowledge, as doing so has a higher risk of (1) loss of, (2) misunderstanding of, and (3) incomplete data across time and domain, tool, and/or database boundaries. For example, a certain product (e.g., Slack® or Skype®) might have marketed knowledge accumulation and easy information retrieval as its core capabilities and use cases. Users are therefore likely to start accumulating knowledge within the proprietary formats for said product. The problem arises when the overarching company decides to sell the product, shut it down, or otherwise change its functionality, such that users will no longer be able to access any knowledge accumulated in said tool. This is a common problem and serious consideration many software purchasers must make today: "will this product and company be around long enough to meet our needs?"

Many visions for web3 and web 3.0 propose a headless architecture where data storage is separated from the business logic of given software applications. This concept is commonly discussed by data lake and warehouse companies, crypto enthusiasts, Linked Data communities, Metaverse theorists, and more. However, an equally common problem arises when various discrete developers and companies try to build software tools that try to work with the same data.

Knowledge accumulation is ultimately as useful as our ability to leverage that knowledge. Therefore, having clean, de-duplicated, and properly interrelated data is crucial. Relying on individuals to manually and properly de-duplicate, update, and/or bi-directionally link data across software is at the very least a productivity drain and prone to errors. All of these points could lead to faulty analysis results and poor decisions during key stages of whatever processes are reliant on such data. This will directly impact the output and success of such processes.

Many companies and organizations have data in stored databases that is read from, and written to, for operational purposes by an application that is critical to the core business. Being so critical, these applications, and the databases that back them, are a core focus of resources for the business or organization. However, frequently departments other than the core engineering and operations teams want to access the data stored in these databases. For example, a marketing department may want to analyze purchase history of a company's products to determine the success of their campaigns. Likewise, a customer success team may want to determine the perks and discounts to give to loyalty customers based on their spending habits and history. Both of these functions need access to data the company has, but may require extensive engineering efforts to build out beyond the normal resource allocation towards the critical function of selling products or services.

An easy option would be for IT departments to give these auxiliary teams access to the databases to be queried directly via a query language like SQL. It would be relatively easy and inexpensive resource wise to find, hire, or train one or more employees in these other departments how to write proper SQL queries. However, this method is incredibly insecure as it opens up the database for possible abuse via unconstrained complexity or quantity of queries, or for attack via a malicious actor.

Another alternative would be to have the auxiliary teams build out secure web applications of their own. However, as stated previously, these teams likely do not have the technical expertise or resources to build and manage an entire web application and the resulting infrastructure, and may not pull engineering resources away from the business' critical teams. Also, often the use cases and data that teams need change frequently as they iterate on their campaigns or target analyses and other data-driven processes. This requires a highly configurable environment which requires experienced engineers to design and implement.

APIs have become increasingly popular as "software ate/eats the world." As explained herein, allowing various tools to programmatically communicate with one another has been crucial in facilitating the use of software with broader, more numerous, more varied, and more customized processes. For example, Google Drive®, Box®, and Dropbox® all offer very similar capabilities. Each makes it easy for users to store files in the cloud and access those files from anywhere with an internet connection. For example, a given user stores the exact same file within each of those services, and then tries to programmatically access the file through the services' APIs. That user will find that he/she has to spend significant amount of time researching three different APIs, figuring out how to connect to them, how to find the file in question, and how to interact with that file. Furthermore, the same file will be represented differently in each system's database, will have different sets of "permissions" (e.g., "may edit" vs. "editor"), and will have different API endpoints to expose relevant data and capabilities because each system was developed independently and has slightly different feature sets.

A whole market of "Unified APIs" has emerged to facilitate the connection to all relevant tools within certain domain areas. While no universal ontology exists to represent data across all needs, and no universal API exists to satisfy data selection needs of all clients, significant value may be added by facilitating the connection to various APIs related to a certain domain area via a standard abstraction of their collective data and capabilities.

As described herein, there are several problems associated with trying to convince various companies to standardize their features and APIs, such as the need for flexibility in innovation and such as large players drawing value from proprietary frameworks and walled gardens. Unified APIs were therefore mostly created by third parties that were willing to take on the responsibilities of creating standard or "unified" feature sets and capabilities on behalf of a variety of products and services. For example, a company trying to sell a logistics or fulfillment service that must integrate with Warehouse Management Systems (WMS) might realize that directly integrating with each WMS is their biggest expense when onboarding new customers. They might similarly realize that many other logistic businesses likely have a similar problem and therefore decide that building a "Unified API" that all logistics software businesses may use might be a lucrative business. Importantly, the company creating the Unified API is independent of the companies that make most of the products that need to integrate with each other.

In theory, this Unified WMS API should remove all of the integration problems for logistics companies, in exchange for a usage fee. The reality is that these logistics companies ultimately become reliant on the Unified API company's standardization decisions and integration timeline. Not being able to quickly customize solutions and connect with additional tools might become problematic for the logistics companies that want to use the Unified WMS API. This "closed" approach to the creation and management of a Unified API may limit developers' flexibility and therefore limit the innovation potentials of the products trying to integrate with each other. Furthermore, there might be cases where the integrations are proprietary, not public, or otherwise not easily accessible by the company responsible for making and managing the Unified API. For these reasons, and more, relying on Unified API companies that provide solutions that are not easily customizable, configurable, and/or expandable may be problematic and limit innovation.

There are many examples of different products that offer similar features, and that represent the data for these similar features quite differently. For example, Meta® and Alphabet® each offer products and services that make it easy for companies to advertise through videos. That said, companies buying video ads in each service may have a hard time directly comparing the impact of video ads across both services because of discrepancies in what each company considers a "view," how they model attribution, the differences between "ad clicks," "sessions," etc. While Meta's Facebook® and Instagram® consider viewing three seconds of a video as a "view," Alphabet's YouTube® considers a "view" of TrueView® ads as roughly thirty seconds.

Sometimes these differences are simply a byproduct of different product visions and independent innovation. Through sometimes, companies will purposely obfuscate data or make it difficult to unify or otherwise compare. For example, it is common for pharmaceutical companies to give a wide range of different rebates to purchasers that make it difficult for others to know the exact prices of certain drugs.

Developers make use of a wide range of interface frameworks and components. These are software libraries built to display, select, or edit particular types of data. In recent years, there has been an explosion of front-end frameworks and components of different types ready to be dropped into a developer's application and populated with users' data for them to interact with. These all have their own definition of what data they accept, how to send data into them, and how they send data back out. Making use of these libraries often requires learning a specific data interface and its idiosyncrasies. This problem mirrors that of working with the APIs of external software tools: a developer must learn and write code defining how their application will transfer data in and out of the unique formats used by each front-end framework or component they include. This setup does not scale easily.

In addition to the explosion in the number of UI components each requiring their own unique data formats, there is a burgeoning class of software tools that demand UI systems that are more flexible in how they manifest the relationship between data and UI components. This requirement is driven by the desire to allow end users to switch between different views (UI components) on the same set of data. For example, a user may have a list of their contacts. The application they use to view those contacts may allow the user to view them as a list of cards, as rows and columns in a table, on a KANBAN board, or as a graph visualizing the connections between them. Similarly, such applications may want to allow users to browse data of many different types and formats in a single unified view. For example, a universal search application might want to display a user's files, messages, and tasks all within a single list of cards representing search results. Thus, their UI system needs to know how to translate each data format (files, message, and tasks) into the proper inputs for the card UI component. Developers of these types of tools often need to write custom code to translate between each data type and the formats required by each UI component.

Common classes of such tools that support, or desire to support, such functionality may be: (1) note taking tools such as Notion®, Coda®, and Roam Research®; (2) knowledge management tools such as Moot®, Unigraph®, and HASH Editor®; and (3) website builders such as WordPress®, Squarespace®, etc. For maximal scalability, the process of translating between data and UI components should happen automatically within the UI system, not manually by developers.

A third, higher level, problem exists within the software industry wherein developers working at different companies, or even just building different applications within the same company, do not often reuse UI components created by other teams. Each development team has to re-implement the same or very similar UI components as their counterparts on a different team building applications with similar functionality. This is largely due to a lack of protocols surrounding UI components built to standardize the way they may be embedded and communicated with by the applications embedding them. Recently, several protocols have come to fruition to solve this problem such as OpenComponents®, Bit.dev®, Blockprotocol®, and SemCom®. However, none have been able to gain sufficient traction among interface developers.

As described herein, today's world of Apps (e.g., Google Drive®, Slack®, Salesforce®, etc.) and proprietary software ecosystems (e.g., Microsoft® 365, Adobe Creative Cloud®, iCloud®, etc.) create fragmented digital environments where people and organizations lack clarity because each app they work with only shows them a partial view of their work. Trying to offer a holistic and integrated experience is hard as it often results in a messy web of one-to-one integrations that is overly complex to build and maintain. This is true both for end users and organizations trying to consolidate data between tools they use, as well as for software vendors wanting to connect their offerings with their users' other software tools.

According to some embodiments, Standard Knowledge Language ("SKL") may be a framework for software that empowers data sovereignty, software interoperability, and end-users' capacity to create and innovate through software. SKL may facilitate the abstraction of software into components and create a standard for semantic connection between software components and data. SKL may empower the use of data by software based on what the data represents rather than where it is stored or what application stored it there. In other words, in this non-limiting embodiment, SKL may allow developers to build software components that may recognize and use specific ontologies, thereby removing the need for different software applications to be directly integrated with each other.

According to some embodiments, SKL includes (1) flexible and dynamic Schemas to represent data, software components, and software capabilities and (2) the Standard Knowledge Query Language ("SKQL") which serves as the interface between data, software components, and software capabilities. According to these non-limiting embodiments, SKL describes a methodology for building and connecting software to maximize modular and parametrically editable architectures. SKL may be understood as a methodology rather than a taxonomy.

In an embodiment, a method comprises periodically retrieving, by a processor, a plurality of electronic data repositories accessible to a plurality of computing devices to identify data generated as a result of at least one computing device accessing one or more applications from a set of applications; generating, by the processor, a computer model comprising a set of nodes where each node comprises corresponds to data identified as associated with each application within the set of applications accessed by each computing device; generating, by the processor, an identifier for each node within the computer model by executing a shared knowledge language protocol to generate a series of nouns and verbs in accordance with a schema associated with a shared knowledge language; linking, by a processor, a pair of nodes within a set of nodes of a nodal data structure based on a first node within the pair of nodes satisfying a relevance threshold with respect to a second node within the pair of nodes, the processor identifying whether the relevance threshold has been satisfied using each respective node's identifier corresponding to the schema; and when the processor receives a request associated with a node within the set of nodes, displaying, by the server, data for at least one node that is linked the node associated with the request.

The method may further comprise configuring, by the processor, an application programming interface to scan the plurality of electronic data repositories and generate a series of nouns and verbs for each node.

The application programming interface may be hosted by a different processor than the processor.

The method may further comprise mapping, by the processor, the application programming interface to the schema.

Identifying whether the relevance threshold is satisfied may correspond to the first node and the second node having semantically similar identifies.

At least one rule of the schema may be received from an end-user.

The method may further comprise de-duplicating, by the processor, a second pair of nodes in accordance with their respective identifiers.

In another embodiment, a system may comprise a non-transitory computer readable medium having a set of instructions that when executed, cause a processor to: periodically scan a plurality of electronic data repositories accessible to a plurality of computing devices to identify data generated as a result of at least one computing device accessing one or more applications from a set of applications; generate a computer model comprising a set of nodes where each node comprises corresponds to data identified as associated with each application within the set of applications accessed by each computing device; generate an identifier for each node within the computer model by executing a shared knowledge language protocol to generate a series of nouns and verbs in accordance with a schema associated with a shared knowledge language; link a pair of nodes within a set of nodes of a nodal data structure based on a first node within the pair of nodes satisfying a relevance threshold with respect to a second node within the pair of nodes, the processor identifying whether the relevance threshold has been satisfied using each respective node's identifier corresponding to the schema; and when the processor receives a request associated with a node within the set of nodes, display data for at least one node that is linked the node associated with the request.

The set of instructions may further cause the processor to configure an application programming interface to scan the plurality of electronic data repositories and generate a series of nouns and verbs for each node.

The application programming interface is hosted by a different processor than the processor.

The set of instructions further cause the processor to map the application programming interface to the schema.

Identifying whether the relevance threshold may be satisfied corresponds to the first node and the second node having semantically similar identifies.

At least one rule of the schema may be received from an end-user.

The set of instructions further cause the processor to de-duplicate a second pair of nodes in accordance with their respective identifiers.

In another embodiment, a system comprises a plurality of electronic data repositories; and a processor in communication with the plurality of electronic data repositories, the processor configured to periodically scan the plurality of electronic data repositories accessible to a plurality of computing devices to identify data generated as a result of at least one computing device accessing one or more applications from a set of applications; generate a computer model comprising a set of nodes where each node comprises corresponds to data identified as associated with each application within the set of applications accessed by each computing device; generate an identifier for each node within the computer model by executing a shared knowledge language protocol to generate a series of nouns and verbs in accordance with a schema associated with a shared knowledge language; link a pair of nodes within a set of nodes of a nodal data structure based on a first node within the pair of nodes satisfying a relevance threshold with respect to a second node within the pair of nodes, the processor identifying whether the relevance threshold has been satisfied using each respective node's identifier corresponding to the schema; and when the processor receives a request associated with a node within the set of nodes, display data for at least one node that is linked the node associated with the request.

The processor may be further configured to configure an application programming interface to scan the plurality of electronic data repositories and generate a series of nouns and verbs for each node.

The processor is further configured to de-duplicate a second pair of nodes in accordance with their respective identifiers.

The processor may be further configured to map the application programming interface to the schema.

Identifying whether the relevance threshold may be satisfied corresponds to the first node and the second node having semantically similar identifies.

At least one rule of the schema may be received from an end-user.

In an embodiment, a method comprises periodically retrieving, by a processor from a plurality of electronic data repositories accessible to a plurality of computing devices, data generated as a result of at least one computing device accessing one or more applications from a set of applications; generating, by the processor, a computer model comprising a set of nodes where each node corresponds to data identified as associated with each application within the set of applications accessed by each computing device, each node having an identifier corresponding to a series of nouns and verbs generated in accordance with a schema associated with a shared knowledge language; when the processor receives a request: identifying, by the processor, a node within the set of nodes that corresponds to the request; retrieving, by the processor, a pair of related nodes within the set of nodes of the nodal data structure that correspond to the node associated with the request, wherein when a first node within the pair of nodes satisfies a relevance threshold with respect to a second node within the pair of nodes, the first node and the second node are linked as related, the processor identifying whether the relevance threshold has been satisfied using each respective node's identifier corresponding to the schema; and displaying, by the processor, data for at least one node that is linked the node associated with the request.

The method may further comprise generating, by the processor, the nouns and verbs based on an application programming interface.

An indication of the schema may be received from a user from a library of schemas.

The method may further comprise executing, by the processor, a natural language protocol to identify the indication of the schema.

The schema may be uploaded by a user.

The schema may have a set of parameters corresponding to a set of schemas of a schema library.

The method may further comprise de-duplicating, by the processor, the pair of nodes, based on their respective identifiers.

The method may further comprise executing, by the processor, an artificial intelligence model to identify the nouns or verbs.

The method may further comprise displaying, by the processor, a user interface configured to receive an input corresponding to at least one of installing, uninstalling, or editing the schema.

In another embodiment, a system comprises a non-transitory computer readable medium having a set of instructions that when executed, cause a processor to: periodically retrieve, from a plurality of electronic data repositories accessible to a plurality of computing devices, data generated as a result of at least one computing device accessing one or more applications from a set of applications; generate a computer model comprising a set of nodes where each node corresponds to data identified as associated with each application within the set of applications accessed by each computing device, each node having an identifier corresponding to a series of nouns and verbs generated in accordance with a schema associated with a shared knowledge language; when the processor receives a request: identify a node within the set of nodes that corresponds to the request; retrieve a pair of related nodes within the set of nodes of the nodal data structure that correspond to the node associated with the request, wherein when a first node within the pair of nodes satisfies a relevance threshold with respect to a second node within the pair of nodes, the first node and the second node are linked as related, the processor identifying whether the relevance threshold has been satisfied using each respective node's identifier corresponding to the schema; and display data for at least one node that is linked the node associated with the request.

The set of instructions may further cause the processor to generate the nouns and verbs based on an application programming interface.

An indication of the schema may be received from a user from a library of schemas.

The set of instructions further cause the processor to execute a natural language protocol to identify the indication of the schema.

The schema may be uploaded by a user.

The schema may have a set of parameters corresponding to a set of schemas of a schema library.

The set of instructions may further cause the processor to de-duplicate the pair of nodes, based on their respective identifiers.

The set of instructions may further cause the processor to execute an artificial intelligence model to identify the nouns or verbs.

The set of instructions may further cause the processor to display a user interface configured to receive an input corresponding to at least one of installing, uninstalling, or editing the schema.

In another embodiment, a system comprises a plurality of electronic data repositories; and a processor in communication with the plurality of electronic data repositories, the processor configured to: periodically retrieve from a plurality of electronic data repositories accessible to a plurality of computing devices, data generated as a result of at least one computing device accessing one or more applications from a set of applications; generate a computer model comprising a set of nodes where each node corresponds to data identified as associated with each application within the set of applications accessed by each computing device, each node having an identifier corresponding to a series of nouns and verbs generated in accordance with a schema associated with a shared knowledge language; when the processor receives a request: identify a node within the set of nodes that corresponds to the request; retrieve a pair of related nodes within the set of nodes of the nodal data structure that correspond to the node associated with the request, wherein when a first node within the pair of nodes satisfies a relevance threshold with respect to a second node within the pair of nodes, the first node and the second node are linked as related, the processor identifying whether the relevance threshold has been satisfied using each respective node's identifier corresponding to the schema; and display data for at least one node that is linked the node associated with the request.

An indication of the schema may be received from a user from a library of schemas.

BRIEF DESCRIPTION OF FIGURES

Non-limiting embodiments of the present disclosure are described by way of example with reference to the accompanying figures, which are Schematic and are not intended to be drawn to scale. Unless indicated as representing the background art, the figures represent aspects of the disclosure.

FIG. 1A is a graphical representation of using the methods and system described herein to generate a unified memory bank, in accordance with an embodiment.

FIG. 26 is a graphical user interface displayed by a rules engine, in accordance with an embodiment.

FIG. 28 is a graphical user interface displayed by a rules engine, in accordance with an embodiment.

FIG. 31 is a visual representation of a graphical user interface using the methods of a Standard Knowledge Language, in accordance with an embodiment.

FIG. 33 illustrates an Integration's profile on the Official Library, in accordance with an embodiment.

FIG. 42b illustrate the graphical user interface of a SKApp, in accordance with an embodiment.

FIG. 43 illustrate the graphical user interface of a SKApp, in accordance with an embodiment.

FIG. 44 illustrate the graphical user interface of a SKApp, in accordance with an embodiment.

FIG. 49 illustrates a graphical user interface for SKApp, in accordance with an embodiment.

FIGS. 52-53 illustrate user interfaces displayed using the methods and systems discussed herein, in accordance with an embodiment.

FIG. 55 illustrate user interface displayed using the methods and systems discussed herein, in accordance with an embodiment.

DETAILED DESCRIPTION OF FIGURES

Figure 1B:
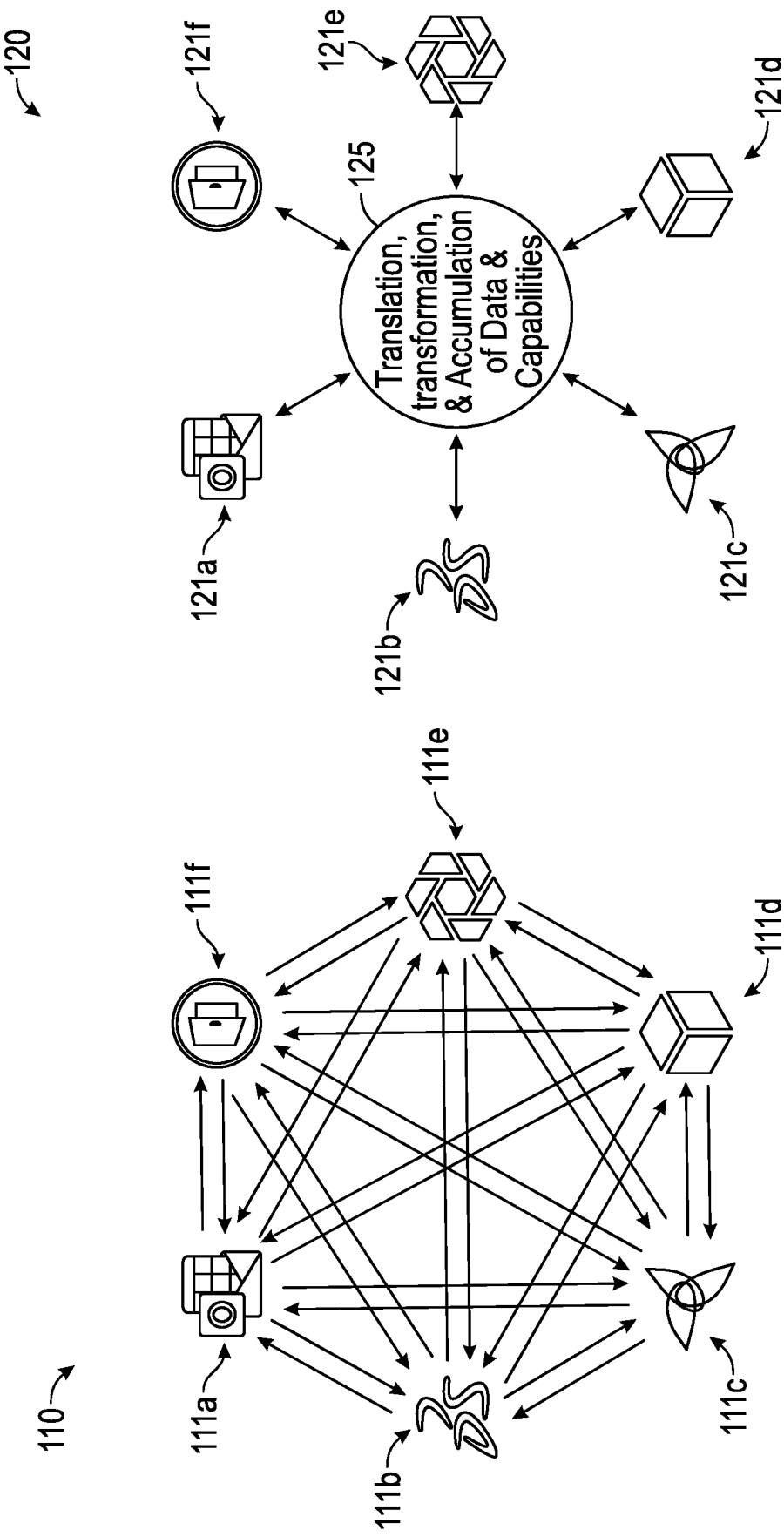
FIG. 1B is a graphical representation of two methods for integrating various applications together, in accordance with an embodiment.

Reference will now be made to the illustrative embodiments depicted in the drawings, and specific language will be used here to describe the same. It will nevertheless be understood that no limitation of the scope of the claims or this disclosure is thereby intended. Alterations and further modifications of the inventive features illustrated herein, and additional applications of the principles of the subject matter illustrated herein, which would occur to one skilled in the relevant art and having possession of this disclosure, are to be considered within the scope of the subject matter disclosed herein. Other embodiments may be used and/or other changes may be made without departing from the spirit or scope of the present disclosure. The method, systems, and illustrated architectures are non-limiting to the concepts discussed herein. The SKL discussed herein may be understood as a methodology rather than a taxonomy.

Turning now to FIG. 1A, which illustrates two different models for comparing attributes of different objects and being able to exchange and/or translate those objects. The way people integrate software today generally requires translation from one proprietary format to another (e.g., integrate Salesforce® with QuickBooks®). These one-to-one connections and translations are a sub optimal way to translate data across multiple workflows and processes. This is like society trying to trade goods and services before the standard of money as is shown in diagram 100. Before money, goods and services were bartered one-to-one and wealth was always understood in terms of a particular good (e.g., number of chickens, number of chickens produced per week, etc.).

Storing data in proprietary formats is not conducive to the accumulation of knowledge. Doing so has a higher risk of loss of, misunderstanding of, and/or incomplete data. For example, a software provider may get bought, go out of business, change some aspect of the software without your approval, etc. This is like people trying to accumulate wealth before the standard of money. Before money, people had to accumulate wealth in goods that were harder to trade with and had more inherent risks than money (e.g., all the chickens die, grain can grow stale, society decides a particular good is taboo, etc.) as is shown in diagram 102.

Turning now to FIG. 1B, two conceptual alternative embodiments for how a set of applications 111a-f (collectively applications 111) and applications 121a-f (collectively applications 121) may be integrated is illustrated. The network of integrations 110 show an approach where each application 111 is directly integrated with every other application. In this embodiment, a developer creates, uses, and/or maintains custom software that translates the way data is represented between every pair of applications. Furthermore, the developer also creates, uses, and/or manages custom software that translates whatever capabilities (e.g., identity and access management) need to be programmatically accessed between any pair of software applications. In some embodiments, the developer of each application vendor tends to be responsible for connecting their application with as many other relevant applications as makes viable business sense.

Figure 2:
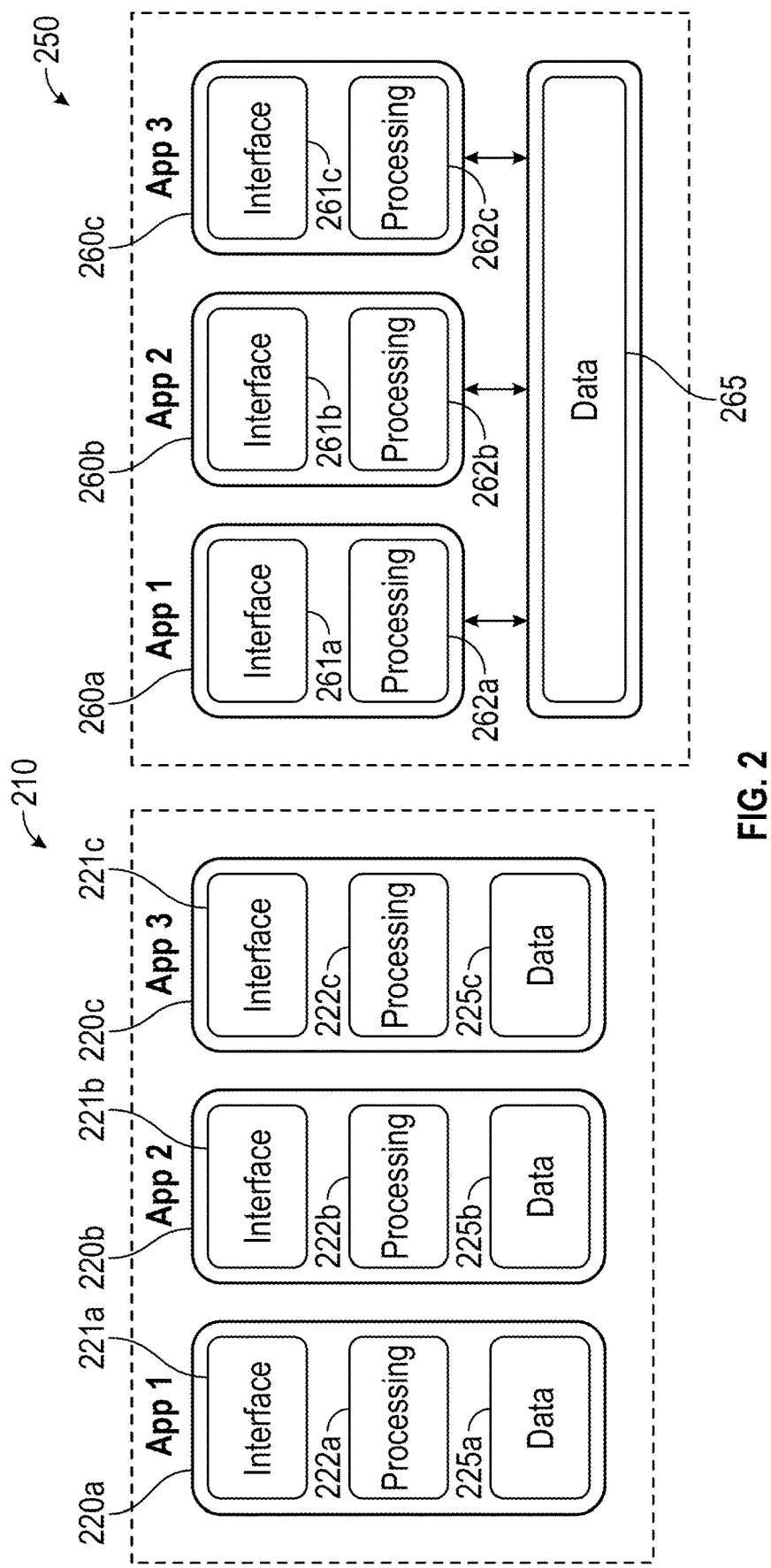
FIG. 2 is a visual representation of storing data in a unified memory bank, in accordance with an embodiment.

FIG. 2 illustrates two exemplary conceptual architectural diagrams for a set of software applications used by a given person or organization. Architecture diagram 210 is illustrative of a software architecture for applications where the software developer or vendor for each application bundles custom interfaces 221a-c, custom processing logic 222a-c, and custom data models 225a-c with the corresponding data storage (e.g., infrastructure, etc.) into their platform 220a-c. Integrating the various platforms 220a-c may be done according to the network of integration 110 of FIG. 1B. Each custom interface 221a-c may be built to only support the capabilities from its respective platform 220a-c, creating one-to-one integrations between each pair of platforms 220a-c.

Referring back to FIG. 1B, a semantic network of integration 120 provides an alternative embodiment wherein rather than integrating each application 121 with every other application 121, each application 121 is only integrated once through a common data and capabilities model 125. This semantic network of integration 120 may shift the integration paradigm away from trying to integrate each application with other applications, and towards integrating each application through a relevant ontology or ontologies (e.g., the common data and capabilities model 125) that represent the necessary data types and software capabilities. In this embodiment, each application 121 may still expose a programmatic interface (e.g., an API) that facilitates integration.

Further, a developer may choose to translate the data and capabilities from at least two applications 121 into or through a common—or "standard"—ontology rather than trying to build an integration that translates the custom logic and data exposed via the programmatic interface of a first application 121 with the custom logic and data from a second application 121. In one illustrative embodiment, the semantic network of integration 120 may not require the data be stored in a standard ontology, but rather that it is translated through that standard ontology. In another embodiment, the semantic network of integration 120 may store a portion of the data in a standard ontology and translate another portion through the standard ontology.

This non-limiting alternative semantic network of integration 120 embodiment may encourage application developers to offer integrations to ontologies, rather than integrations to other applications. This semantic network of integration 120 may be more scalable as an application only has to be integrated once with a given ontology (and through it, connect to many different applications) rather than being integrated multiple times for every other relevant application. It encourages building, using, and maintaining integrations "to" use cases and domain areas (through the related ontologies) rather than simply trying to directly integrate every application within those use cases and domain areas. For example, developers of a healthcare application might offer a single integration to the FHIR ontology rather than trying to integrate directly with every other application. In industries, like productivity, where a standard ontology has been more historically elusive, developers could offer integrations to a variety of different ontologies in order to meet various the needs of their users.

Figure 3:
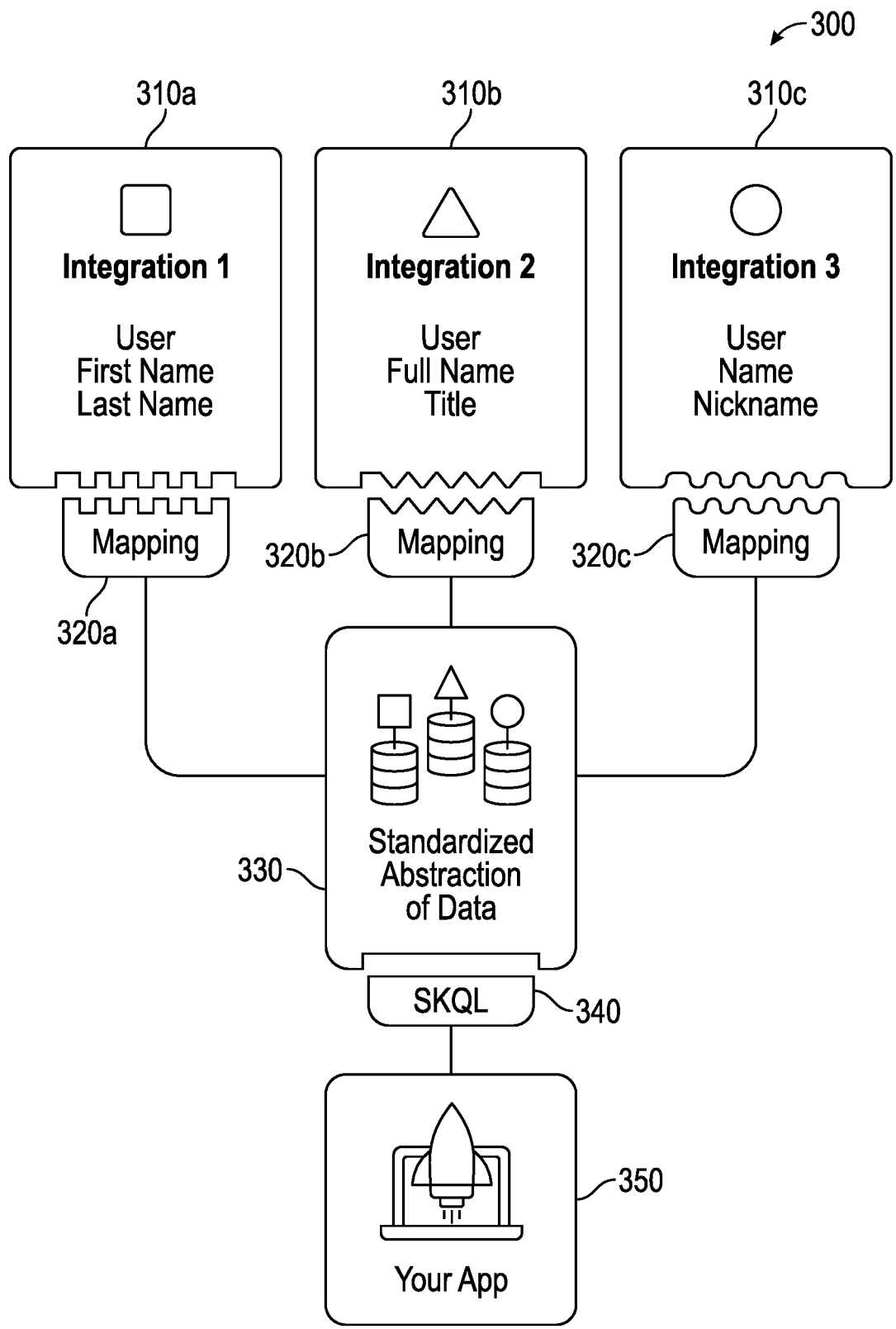
FIG. 3 is a visual representation of an abstraction of data to integrate with various applications, in accordance with an embodiment.

FIG. 3 illustrates a non-limiting embodiment of a data integration method 300 showing four different applications 310a-c and 350 that are semantically integrated through a standardized data Schema 330. Each application 310a, 310b, 310c, or 350 may choose to store and represent data in custom ways (e.g., according to custom Schemas). For instance, the developer(s) of application 310a may choose to represent to a user in a different way than how application 310b or application 310c represent users. Similarly, the developer(s) of application 350 may also choose to store a user's data according to a custom Schema or representation that is different from the other applications 310, and also different than the standardized data Schema 330. In other words, each application 310a-c or 350 may use unique representations of user data that follows custom Schemas with custom fields and properties.

In this embodiment, the standardized data Schema 330 establishes standardized fields or properties for the necessary data types, such as user data type. In this non-limiting example, these standardized data Schema 330 may be mapped, translated, and/or transformed with Mappings 320a-c to the custom Schemas for the integrated applications 310a-c. The business logic and associated processing for this embodiment may be invoked through application 350, which means that application 350 may use an interface 340 to call on data according to its standardized data Schema 330. The developers of application 350 may then determine the appropriate action to take with the returned data.

Referring back to FIG. 2, the software architecture 250 shows yet another non-limiting alternative embodiment wherein the software architecture allows the multiple applications 260a-c to access data in a standardized way, according to a standardized data model. This software architecture 250 may use the various data integration methods described through in FIG. 1B and FIG. 3. Regardless of whether the data from applications 260a-c are consolidated in a standardized way, each application 260 may be able to access the data in a standardized way. In this way, the applications 260a-c may collectively provide data through a single interface, which may be considered an authoritative source of truth (the "ASOT"). More than offering a standard interface for data access, alternate embodiments may also offer standard ways of accessing software capabilities, interfaces, infrastructure, AI-models, and more.

Figure 4:
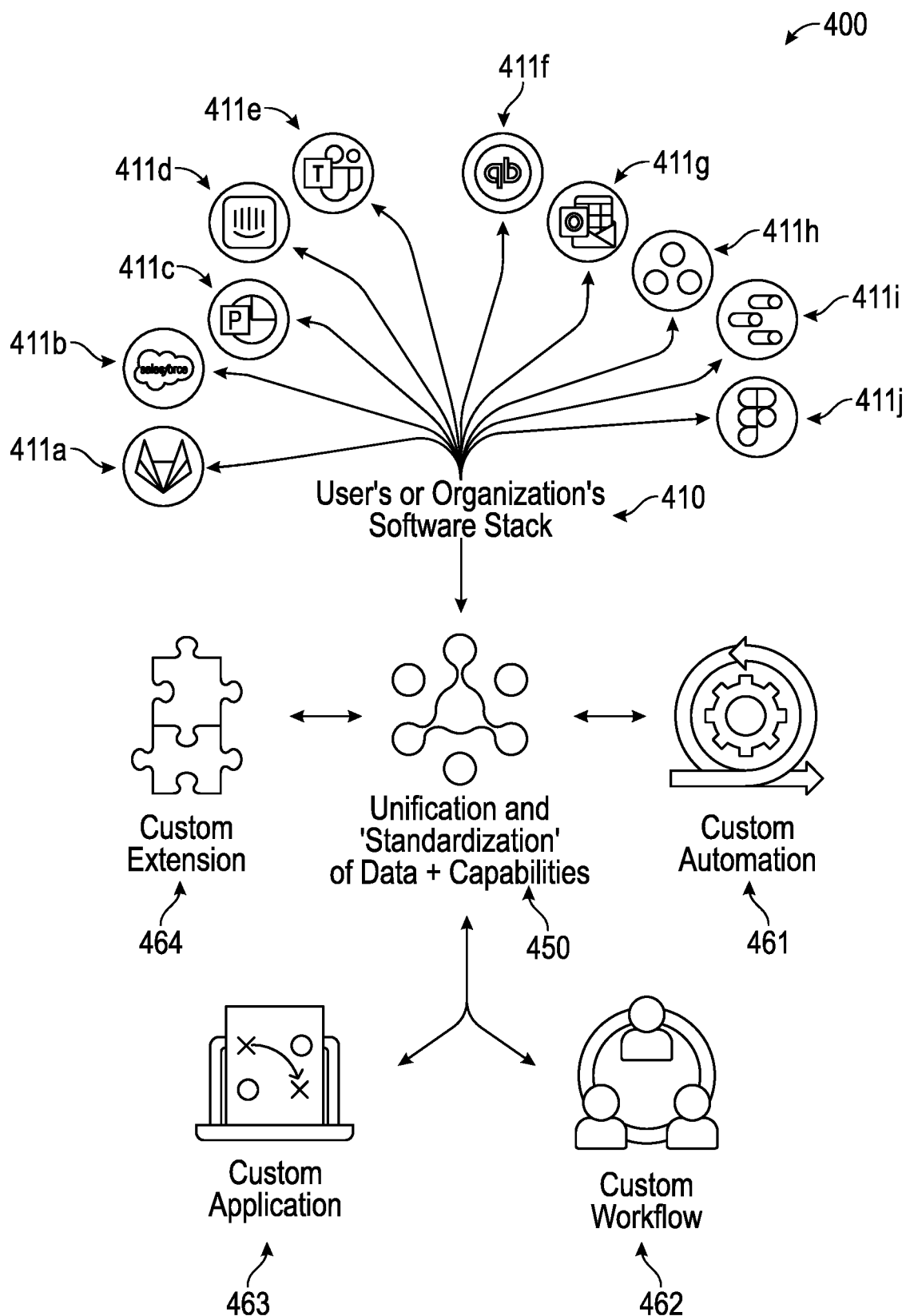
FIG. 4 is a visual representation of using a unified standardization of data for various benefits, in accordance with an embodiment.

Turning now to FIG. 4, according to some embodiments, a standard knowledge language ("SKL") framework 400 illustrates an embodiment wherein data and capabilities may be unified and shared across software applications 411a-j (e.g., applications, platforms, tools, extensions, etc.). By way of example, using the methods described herein, a user or an organization may establish a standardized and unified interface 450 to access all the data and software capabilities they rely on. Applications 411a-j, like those from a user's or an organization's existing software stack 410, may be semantically integrated so that any software may independently interact with the data and software capabilities from the one or more of the various applications through a unified data and standardized and unified interface 450. In this way, the SKL framework 400 may provide a flexible methodology to transform a user's or an organization's fragmented software experience into a unified and parametrically configurable one that exposes all the relevant data and software capabilities pertaining to that user or organization. This, in turn, may allow the user or organization to easily build and manage custom automations 461, custom workflows 462, custom applications 463, custom extensions 464, and more. In other words, establishing a unified and standardized access point to software components such as data and software capabilities may significantly improve a user's or organization's capacity to innovate.

Developers may use software development kits ("SDK") or other code packages to connect data and capabilities from each unique codebase with data and capabilities from other external software platforms. For example, a developer creating a new custom software application might use Apple's iOS® SDKs or Google's Android® SDKs to help the software exchange information with and leverage the capabilities of each third-party platform. Similarly a developer building an app that needs to interact with external file storage systems like Dropbox® and Box® might add the SDK for each platform into the app's codebase in order to facilitate interactions between the app's data and capabilities and those from Dropbox® and Box®. These SDKs may facilitate the communication between the app's codebase and the APIs offered by each platform, for example by including tools that handle HTTP requests, errors, and more.

In some configurations, the SKL framework 400 uses the SDKs, which may be written in a variety programming languages. Like the aforementioned SDKs (e.g., proprietary SDKs), a Standard SDK is a packaged collection of software development tools that may help developers connect their codebases with one or more external databases, software, platforms, etc. In one embodiment, the SKL framework 400 uses a Standard SDK to allow the developer to use one SDK to establish connections with a theoretically infinite number of external platforms rather than having to use a different SDK for each platform that the developer is trying to connect with however. However, in some configurations, the SKL framework 400 may use multiple software development kits.

In this configuration, developers need not rely on multiple different proprietary SDKs to offer core tools (e.g. that help handle HTTP requests, rate limits, errors, etc.), because a Standard SDK offers these as shared tooling that may be used to interact with many different external databases, platforms, APIs, etc. The differences between and across various external platforms APIs and/or their respective SDKs are represented through easily manageable configurations according to the SKL framework 400, such as Mappings from various data representations to a standardized data model. This may remove a significant amount of complexity from a codebase as well as the need for a given codebase to use many different SDKs. Moreover, because the customization necessary for a Standard SDK to support different platforms and use-cases is largely stored as configurations (e.g., the flexible and dynamic Schemas mentioned herein), these customizations may be shared across different applications and various Standard SDKs written in different programming languages (e.g., Standard SDK in JavaScript®, Standard SDK in Rust®, etc.).

The Schemas and configurations, for example, may be used to describe external databases, APIs, platform capabilities, etc. in a way that a Standard SDK may understand them. The Schemas and configurations may also be used to describe a codebase's data model and capabilities, as well as Mappings and translations between external platforms' data and capabilities models and those within the codebase using a Standard SDK.

Turning to FIG. 4, the SKL framework 400 is now described in various non-limiting embodiments herein to illustrate various alternative Schemas and configurations wherein a Standard SDK may be used.

A conceptual example aids in the understanding of the SKL framework: a developer 502 is building a workplace chat software application that brings teams together and empowers them deliver work more efficiently in an asynchronous way. The app does this by helping team members organize their communication into conversations with a dedicated purpose (e.g., a channel dedicated to a given project). Naturally, its users end up sharing and discussing relevant information, links to research, docs, presentations, and more with each other through the chat application.

Currently, when the users share a link to a file or a task with someone, the app has no way of knowing if the person the user sent the link to actually has access to the file or task. The sender of that link has no way of checking or controlling whether the receiver of the link may access its contents without leaving the app. The receiver often has to check their email for sharing notifications, which reduces the value of the app. Overall, this process may result in some back and forth between the sender and receiver trying to coordinate the shared element's permissions, which leads to lost productivity for the app's users, and which may ultimately hurt the app's chances at success in the market. The developer decides that a better, more integrated solution, is one that automatically checks the permissions of the shared element when a user sends it. If the app identifies that the receiver does not have access to the shared element, then the application immediately prompts the sender about modifying the permissions accordingly within its interface. In this way the sender and the receiver save time in achieving the desired result, the application is appreciated for streamlining that process, and the value of consolidating all related work in a contextual conversation is achieved.

Solution Method 1—Solve the problem without the SKL framework 400 of FIG. 4 (in conjunction with FIGS. 5-6):

As the developer 502 plans for how to build this with their available resources, they likely need to decide which integrations are the most valuable and which to prioritize. They start to evaluate which tools are most prevalent amongst their users and identify Dropbox® 504 and Asana® 506 as the top two, so they decide to build those integrations first.

Their immediate next step is likely to look through the API documentation 514, 516 for each tool in order to understand if and how they support the functionality they want to offer. They find that Dropbox® 504 provides unique API endpoints with custom arguments to manage permissions and sharing, and that Asana® 506 similarly has its own custom API endpoints and formats. Ultimately, they confirm that the platforms both support the functionality they want, albeit in different ways.

As the developer 502 moves past research into planning and execution, they likely start to write out the logic 604, 606 for potential functions and processes in the app's code that may call the respective endpoints for each of these APIs. They look for and install SDKs for Asana® and Dropbox® that match the programming language the app is written in and start building out some methods to test. They try to architect their system with maximum modularity, but ultimately end up having to create different functions that call the respective SDKs and/or APIs for each integration they want to support. Finally, they have to test that each of these functions works well and debug each until it performs as desired.

Figure 5:
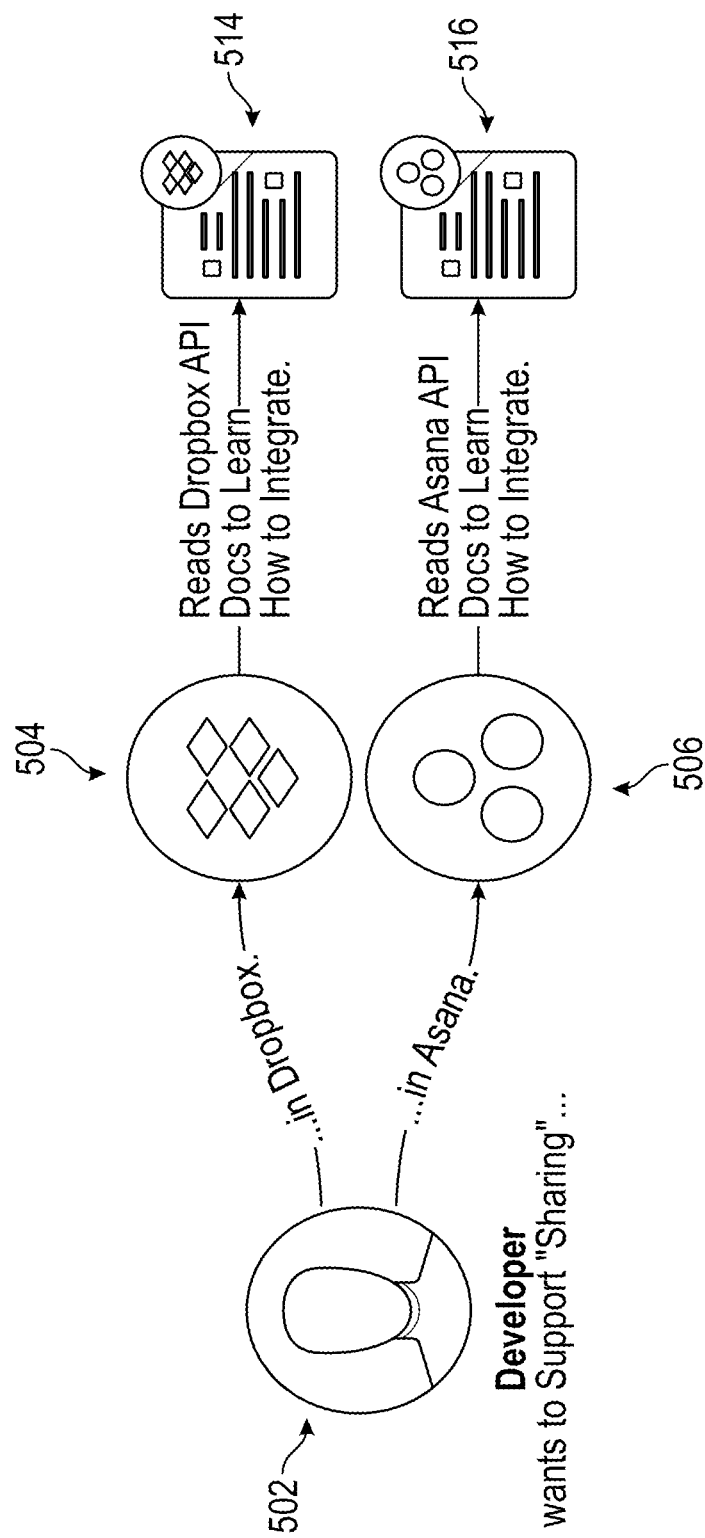
FIG. 5 is a visual representation of a developer's method of integrating data between various APIs, in accordance with an embodiment.
Figure 6:
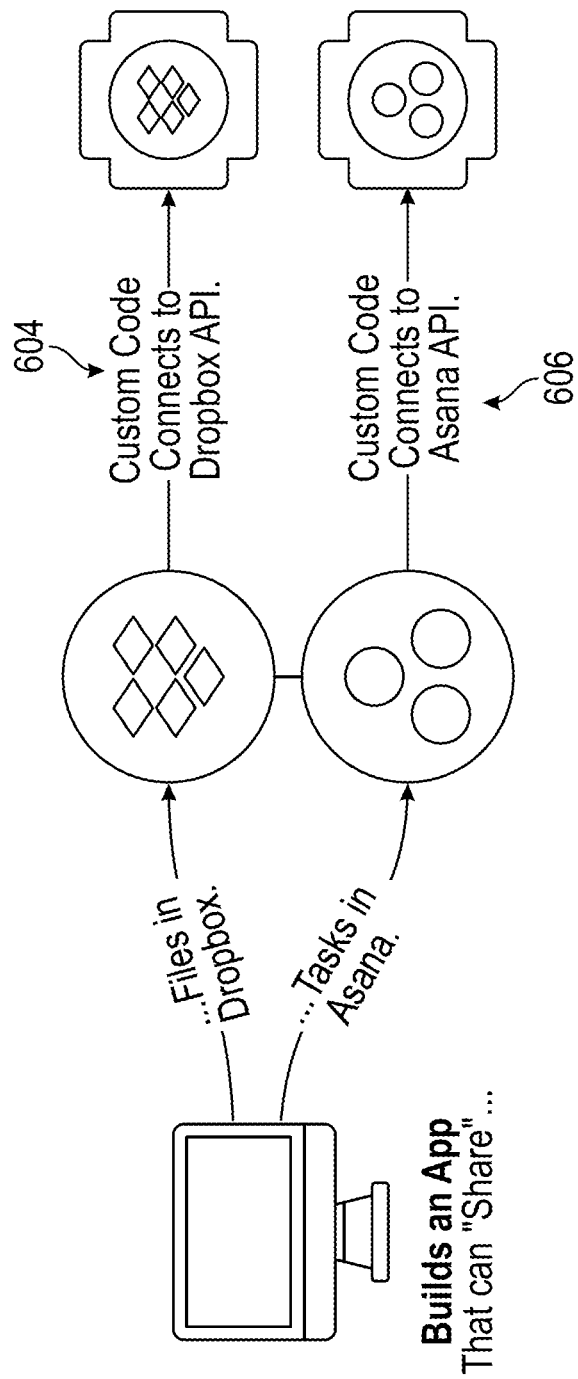
FIG. 6 is a visual representation of an application's method of integrating data between various APIs, in accordance with an embodiment.

Developer 502 of FIG. 5 then is ready to release their first two integrations, and the users enjoy the results. The users ask the developer to do the same type of integration for twenty other apps. The developer quickly realizes that their success has created a lot more work and they go back to thinking about how to build the next ones. Looking back, the developer recognizes how much more time integrating the first two took than they would have liked. In many cases, this process is measured in weeks or months (or even years in particular circumstances) from the start of research, through planning, execution, testing, and the final production-ready release. As the developer moves on to the next integrations they hope the process is faster and simpler than before, however, they still need to research each new tool's API and find SDKs that exist in their programming language, create new functions that call the SDKs or APIs in order to achieve a desired result, test them, maintain them, and so on.

Figure 7:
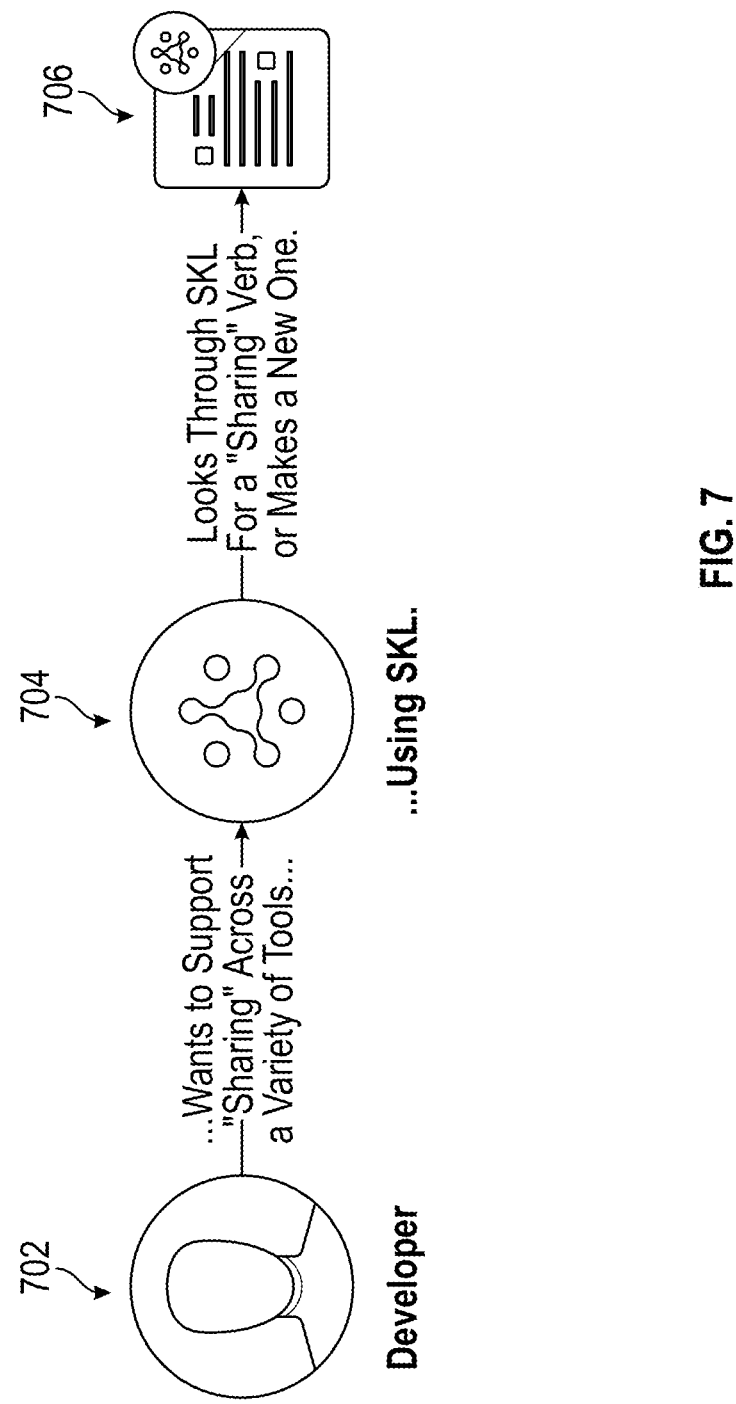
FIG. 7 is a visual representation of a developer's method in using a Standard Knowledge Language, in accordance with an embodiment.

Solution Method 2—Solve the problem with the SKL framework 400 of FIG. 4 (in conjunction with FIGS. 7-8):

Turning now to FIG. 7, the moment that the developer 702 decides they want their users to be able to share work elements from other tools within the app's interface, they could instead decide to use the SKL framework 704 to integrate the various applications. Instead of choosing a few specific tools to build their first integrations with and researching each of their third-party APIs, now they simply have to install a Standard SDK and either find existing or create new Schemas that the Standard SDK may use to connect the codebase with the various external platforms.

In this case, the developer 702 wants their users to be able to "share" work elements from other platforms within the app, so they either find Schema 706, either existing (e.g., publicly available) or create their own to represent the "sharing" capability they want their app to support. Similarly the developer will add other Schemas (e.g., OpenAPI and OpenRPC Schemas) to the codebase that represent the APIs of the various platforms they want to integrate as well as Mappings that relate the "sharing" Schema with the capabilities in the various platform APIs.

By using the SKL framework 704, the developer 702 is then able to reference the "share" capability directly within their code. This means that they do not have to write out any unique code or logic for each third-party integration. Furthermore, the app's code does not need to have any custom code that deals with third party SDKs or APIs. Instead, the developer is now able to build all the application logic over the "share" capability represented through the Schema, which abstracts and standardizes the capabilities from a potentially infinite number of unique third-party "sharing" endpoints.

Figure 8:
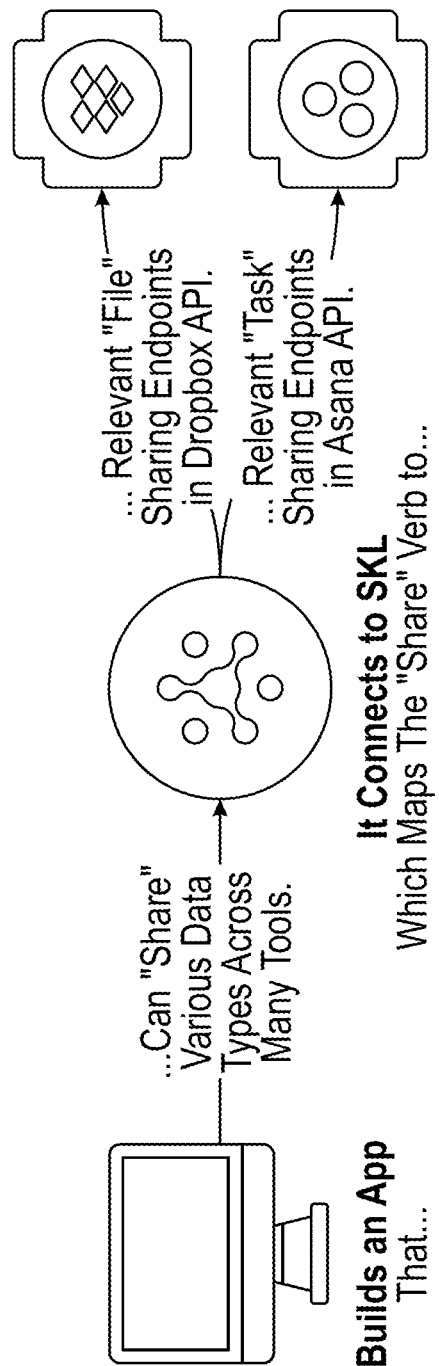
FIG. 8 is a visual representation of an application's method in using a Standard Knowledge Language to integrate data between various APIs, in accordance with an embodiment.

FIG. 8 further illustrates the extended benefits of SKL framework 704 of FIG. 7. Now no custom logic has to be rewritten as code every time a developer wants build a new integration. All that remains to be done is find or create a Mapping between the Schema for "share" and the sharing endpoint for each desired external platform's API. This enables the developer to now build each of their next twenty integrations in a matter of minutes or hours, rather than weeks or months. Moreover, because the "sharing" capability and the Mappings are represented as Schema and are therefore defined through configuration rather than some specific programming language, they are able to be shared across projects written in different programming languages (e.g., Python or JavaScript).

Descriptions of Terms and Concepts

In some non-limiting embodiments, standard knowledge language ("SKL") may define a protocol that empowers data sovereignty, software interoperability, and end-users' capacity to create and innovate through software. It may facilitate the abstraction of software into components and create a standard for semantic connection between software components and data. Through these abstractions, SKL may empower developers and end users to more easily create combine, customize, and maintain software components in order to build solutions that are tailored to their unique needs. Moreover, SKL may provide a way for developers and end-users to have more control of their data by storing data locally, on a cloud, or on other infrastructure of their choice. More than data, applications may also be deployed in a decentralized way as SKL enables anyone to contribute components (e.g., ontologies, interfaces, data stores, etc.) to the ecosystem, as well as develop components for use in private ecosystems.

Schemas

According to some embodiments, the abstractions in an SKL framework that make up the components may be called Schemas. A "Schema" in a SKL framework may define the composition and configuration of a data type, software capability, interface component, Mapping, cron schedule, OpenAPI specification, and/or some other aspect of SKL-powered software function. SKL Schemas may be compatible with existing technologies such as the W3C Semantic Web technology stack (RDF/OWL/SPARQL) and existing libraries/dictionaries like Schema.org and FHIR that represent rich and complex knowledge about things, groups of things, and relations between things. Schemas in SKL may inherit from other Schemas. Schemas may be stored in a variety of ways such as, but not limited to, one or more files in a codebase, a set of triples in a graph database, one or more rows in a relational database, and data in decentralized blockchains or other networks. Schemas may similarly be accessed and/or referenced in a variety of different ways, including REST APIs, GraphQL APIs, SQL queries, SPARQL queries, and more.

Entities

According to some embodiments, an "Entity" may be an instance of data conforming to a Schema, often corresponding to a thing or capability in the real world. Like Schemas, Entities may be stored in a multitude of ways, including one or more rows in a relational database, in multiple triples in a single RDF store, in multiple triples across multiple databases, and so on.

Unique Ids

According to some embodiments, a SKL may support the demarcation of certain properties on an Entity as identifiers, including but not limited to uniform resource identifiers ("URIs"), contextually unique entity identifiers ("CueID"), universally unique entity identifiers ("Unique IDs" or "UIDs"), or universally unique identifiers ("UUIDs"). SKL Schemas may use these various identifiers extensively to access and/or compare Entities. Identifiers like CueIDs and UIDs may be used to de-duplicate Entities.

A CueID may be used to identify the uniqueness of a given Entity within a certain context. For example, if a given database contains two different Entities that represent the same thing and a user manually confirms that the two Entities are instances of same thing, then the two Entities may be given the same CueID (e.g., the URI of an Entity of type DEDUPLICATED ENTITY). In some embodiments, CueIDs may be automatically generated (e.g., through the creation of Relevance Scores). SKL may allow for a certain tolerance of uncertainty in determining the uniqueness of an Entity in order to create or use a corresponding CueIDs.

In some embodiments, a UID may be used to identify the uniqueness of a given Entity across all contexts. For example, take two entities that represent the same thing yet exist on two independent systems. If those entities are processed by a third system using SKL to generate UIDs, then they may each be given the same UID and subsequently identified as duplicates. Certain software processes may be used to generate UIDs for given Entities so that they may be compared across all contexts in which an Entity might exist (e.g., a SHA-3 hash for file contents, feature vectors built with the data within and/or related to an Entity, etc.). In an alternative embodiment, certain properties on a given Entity may be used to establish a UID (e.g., a social security number for Entities of type PERSON).

SKL Schemas may be used to indicate which fields may be used as UIDs with given types of data. Using the methods described elsewhere herein, the configuration necessary to do so may be recorded in any number of ways. For example, a PERSON data type could have a property that lists what fields are UIDs for PERSON Entities. In a separate example, a PROPERTYIDENTIFIER data type could be established. The Schema for the PROPERTYINDETIFIER data type could specify that it is composed of the following properties: a URI, a SchemaEntity, a property, and an IDENTIFIERTYPE. An Entity of type PROPERTYIDENTIFIER could be instantiated as follows:

URI=HTTPS://EXAMPLE.COM/PERSONSOCIALISPROPERTYUID
    SCHEMAENTITY=PERSON
    PROPERTY=SOCIALSECURITYNUMBER
    IDENTIFIERTYPE=UID.

This https://example.com/personSocialIsPropertyUID Entity could then be used by a software process (e.g., "Verb" as defined below) that looks for UIDs associated with given types of data (e.g., "Nouns" as defined below) in order to deduplicate the Entities of those types.

Schemas and Entities in the SKL may have URIs, including Nouns, Verbs, Integrations, SKDSs, Events, Code Packages, and the like (these terms are defined below). This increases the ability of SKL's linked data structure to semantically track provenance of data and the activity of users. Moreover, Interfaces may query and display any information associated with a given URI. For example, an Interface displaying the profile of a PATIENT Entity (according to FHIR ontology), may also display other information associated with that patient Entity's URI, including activity Events, related DOCTORS, MEDICATIONS, and so on. Similarly, provenance and activity may be queried and used by a software process to generate insights about data, deduplicate data from different Data Sources, or alert users of abnormal data or behaviors by their collaborators.

Relevance Scores

According to some embodiments, a SKL may use "Relevance Scores" to establish likeliness of relatedness between any two Entities. Relevance Scores (sometimes referred to herein as confidence scores) may be used to de-duplicate data and Entities, to establish a likelihood that a given classification may be added to data, capabilities, and/or relationships between Entities, and for other reasons. There are many methods that may be used to establish Relevance Scores and that may be used for a variety of different use cases. Any pair of Entities may have one or more Relevance Scores that may be calculated in any number and/or combination of ways.

Non-limiting embodiments of methods to calculate Relevance Scores are described briefly here. Unique feature vectors of n-dimensions may be created for each Entity and the underlying data, properties, and relationships in order to compare them by, for example, calculating the L2 distance (Euclidean distance), cosine similarity, and inner product (dot product). Jaccard similarity coefficients may also be calculated to measure the similarity between two Entities and compare their underlying data, properties, and relationships. Pearson correlation coefficients may also be calculated in order to measure the linear correlation between two Entities and compare their underlying data, properties, and relationships. Machine learning, computer vision, and/or natural language processing algorithms may also be used to train models that may establish one or more Relevance Scores between two Entities.

These and other various embodiments may use the data associated with an Entity to create CueIDs and/or UIDs, including but not limited to the Entities' properties, contents, related Entities, related activity and interaction data, related provenance data, etc.

Nouns

According to some embodiments, Nouns may define the Metadata fields and properties which Entities that follow that Noun's Schema may include. These properties may include Primitives and relationships to other Nouns. "Primitives" include the standard primitives in most programming languages: NUMBER, BOOLEAN, STRING, ARRAY, etc. Relationships may be of any cardinality (one-to-one, one-to-many, or many-to-many), though they will likely be labeled (making cardinality obsolete) because implementations of persistence in SKL software may often be built using a graph model.

In yet another embodiment, a Noun may provide a "standardized" representation of a type of data structure used by one or more software tools (e.g., FILE, PERSON, TASK, PATIENT, etc.). Nouns may allow for those data types to be used by a Standard SDK. Many software tools use data structures with the same name but with slight differences. The data source Facebook® has a variety of different data types (e.g., PERSON, EVENT, PRODUCT, VIDEO, IMAGE, MESSAGE). Other versions of these data types may also be found in other data sources. Some version of the PERSON data type also exists in Gmail®, Dropbox®, LinkedIn®, Salesforce®, etc., as contacts, sender, user, social profiles, and more. Nouns may be used to represent the unique data representations from each data source, as well as to establish standardized data representations that facilitate the data access and manipulation across software tools.

In one non-limiting embodiment, Google Drive® and Dropbox® each use their own data structure FILE to represent files. Two copies of the exact same file that are stored in each service are likely to be stored, represented, and accessed differently across the two services. While Nouns may be used to represent the unique ways that FILE data types are represented in both tools, they also enable the creation of a standardized representation of a FILE data type which acts as a sort of shared middle ground that developers may write code to interact with. In other words, a standardized FILE Noun may be used by a developer along with Mappings to each software tool's unique data structures, and/or the interfaces that expose them, so that the developer may not have to integrate with and build custom logic for different representations of files provided by the two data sources. A standardized Noun may have fields that are not supported by every tool. For example, a FILE on a hard drive might not have sharing permissions, whereas a FILE on OneDrive® might. Both may be mapped to a standardized FILE Noun.

According to some embodiments, Nouns may be extendable and customizable, allowing developers to add or change data types and fields according to their unique needs. For example, a developer might start using the FHIR ontology and the representation of PATIENT it offers when building a custom application. This developer might realize that their custom application may need additional fields that FHIR does not offer. Using SKL, the developer may create a "fork" of the FHIR PATIENT Noun, in order to make whichever changes or add whichever fields they need for their use case. SKL's Schema manager may automatically create and manage the Mapping of fields between the Schema for FHIR PATIENT and the developer's custom PATIENT Schema. In this way, the developer may customize and extend Schemas without losing interoperability with other components that have been mapped to FHIR PATIENT.

As mentioned herein, in some embodiments, Nouns may have relationships with other Nouns. For example, one Noun may be a sub-type of another Noun, causing it to inherit properties and other attributes from their parent Noun or Nouns. Any particular Entity (e.g., an image of George Washington with a mountain in the background) may be associated multiple types of Nouns (e.g., FILE, PNG, embedded PERSON, and embedded MOUNTAIN). This means that the image Entity may contain or access properties and attributes from the various Nouns that are associated with it according the Schemas available. In this example, SKL may provide a way for the image Entity to add properties from the various associated Nouns, as well as make it easy to access actions and/or software processes (a.k.a. "Verbs" as defined below) associated with various related Nouns. For instance, the IMAGE Noun could help software applications automatically provide the image Entity with related capabilities such as COPY, RENAME, IMAGEOBJECTRECOGNITION, etc., and the PERSON Noun could help provide capabilities such as RUNFACIALRECOGNTION, CALL, etc.

Because a PERSON Noun may have been identified in the image Entity, SKL is able to help the application easily configure a process that automatically uses the RUNFACIALRECOGNITION capability on the image, thereby creating a Unique ID or CueID in order to link the image with a corresponding person Entity (e.g., an Entity of type PERSON for George Washington). In turn, linking the image with the George Washington Entity may establish connections to the data and capabilities that the George Washington Entity has associated with it. This means that the application could provide capabilities such as CALL or MESSAGE George Washington. Similarly, if the there is a process that may be used to identify a location based on the image of the mountain in the background, then the application may offer capabilities such as GETDIRECTIONS, GETWEATHER, and the like.

Verbs

According to some embodiments, the types of Schemas that define extensible, and often standardized, abstractions of software capabilities in SKL may be called "Verbs." In other words, a "Verb" may provide a "standardized" representation of a certain software process or capability offered by one or more software tools (e.g., SHARE, SEND, DOWNLOAD, LIKE, SUMMARIZETEXT, GENERATEIMAGE, etc.). Verbs may allow for those capabilities to be used by a Standard SDK. Like their unique data structures, many software tools expose similar capabilities that vary slightly in their inputs, outputs, and execution methods, even though they may have the same meaning or eventual effect.

A task management platform such as Asana® is likely to offer capabilities such as create task, assign task, and share project. Other software tools may also offer similar functionality, and expose those capabilities in very different ways. For example, the SHARE capability also exists in Egnyte®, Medium®, Polymail®, etc. However, the sharing that each of these tools offers may correspond to different data types, have different options for controlling permissions, and more. Verbs may be used to represent each software's unique capabilities, as well as to establish standardized representations for capabilities that may be used in conjunction with other Schema and configurations, such as Mappings, to be able to access capabilities across software tools.

In some embodiments, Verbs may use, act on, and process data (e.g., provided as Nouns or primitives), their relationships, and provenance in standardized ways. They may create a simplified way through which developers may use the capabilities of multiple software tools and services without having to know the distinct requirements of each. Verbs may be configured to be run at a specific time, upon a specific schedule, or in response to specific events, for example in response to an event from a webhook registered with the API of an Integration. Verbs may be composed together to form larger processes or other Verbs.

The Schema for a particular Noun may include configuration that specifies relevant Verbs for Entities of that data type. In some embodiments, certain Verbs may be listed under a DEFAULTACTIONS property for Entities of a given Noun. In this scenario the Schema for that type of Noun would define DEFAULTACTIONS.

For example, the Schema for a person Noun might define:
DEFAULTACTIONS=HTTPS://STANDARDKNOWLEDGE.COM/VERBS/CALL, HTTPS://STANDARDKNOWLEDGE.COM/VERBS/MESSAGE.

An application which uses that PERSON Noun may therefore easily provide the capabilities that correspond to the default Verbs listed on the Schema of that Noun. An application may also provide other capabilities that are not listed as DEFAULTACTIONS for in the Schema of that Noun. For example, the developer of the application could create custom functions that could be mapped to Verbs. The developer might choose do so in order to increase composability, and to facilitate the reuse of software functions across applications and use cases. In this way, that developer could upload their Verbs to a library and be able to semantically and contextually find them, and use them, at a future point in time.

In yet other embodiments, the Verbs available to an application using a Standard SDK (defined below), or to an end user of such an application, may be defined via Schemas. Each Verb Schema may define Metadata about the Verb such as its name and description, as well as its standard inputs and outputs. In addition to a Verb Schema, a Mapping (defined below) Schema may determine what will happen when a Verb is called, how the Verb's standard inputs will be translated into the inputs of the specific implementation referenced by the Mapping, and how that implementation's output will be translated into the standard outputs of the Verb.

Non-limiting examples of what may happen when a Verb is called include:
1. one or more web requests are sent to an external server in the form of: (i) HTTP requests to an API such as a REST API or GraphQL API, or (ii) a Remote Procedure Call (RPC) such as JSON RPC;
2. the execution of one or more functions or methods from a code package either: (i) included in the server, container, or other accessible infrastructure of the Standard SDK in any way, including as one or more files, as a variable stored in memory of a running software program which Standard SDK has access to, etc., (ii) downloaded from a remote address; or
3. one or more queries are sent to a database for example using a JDBC Driver, ODBC driver, or other connection manager or protocol which a database communicates with.

In an embodiment represented herein, Verbs may trigger processes that run on a different server, or a different network address, than the server, container, or infrastructure running Standard SDK. For example, there may be a process running on a server separate from the application that invoked a Verb which is built to run background jobs to parse the contents of files. In such a case, a Mapping may be used to specify how to translate the Verb and its inputs into the IP address, endpoints, and parameters to send in the form of a web request to the external service. The Mapping also may specify how to translate the response of the web request into the expected standard output of the Verb. In some embodiments, to perform these translations, SKL defines Integrations as an abstraction of tools, services, or data sources running externally to the application that invokes a Verb, such as the integrations discussed herein.

In an embodiment represented herein, Verbs may trigger the execution of code that is run within the same application, server, container, infrastructure, or environment as the application that invokes the Verb. This code may be run in either the same or a separate process or thread than the one which invoked the Verb. For example, a Mapping associated with a Verb may specify a translation in the RDF Mapping Language (see RML) which includes one or more functions to execute and as well as their parameters, identified via URIs. When the Verb is called, a Standard SDK may use an RML Mapping Engine, implemented in a specific programming language, to execute the RML Mapping.

The application or program running the Standard SDK may either supply the implementations of the functions identified via URI to the RML Mapping Engine, or they may be pre-packaged with the RML Mapping Engine. In another example, an SKL Mapping associated with a Verb being invoked, may specify one or more functions or methods exposed by a package of code to execute. In some embodiments, SKL may define an abstraction called a Code Package to represent these packages of code and the functions and methods they expose in a standard way (see Code Package). Code Packages may specify their required environments and dependencies and may only be used by an application, server, container, or other infrastructure running a Standard SDK if it adheres to those requirements.

Figure 9:
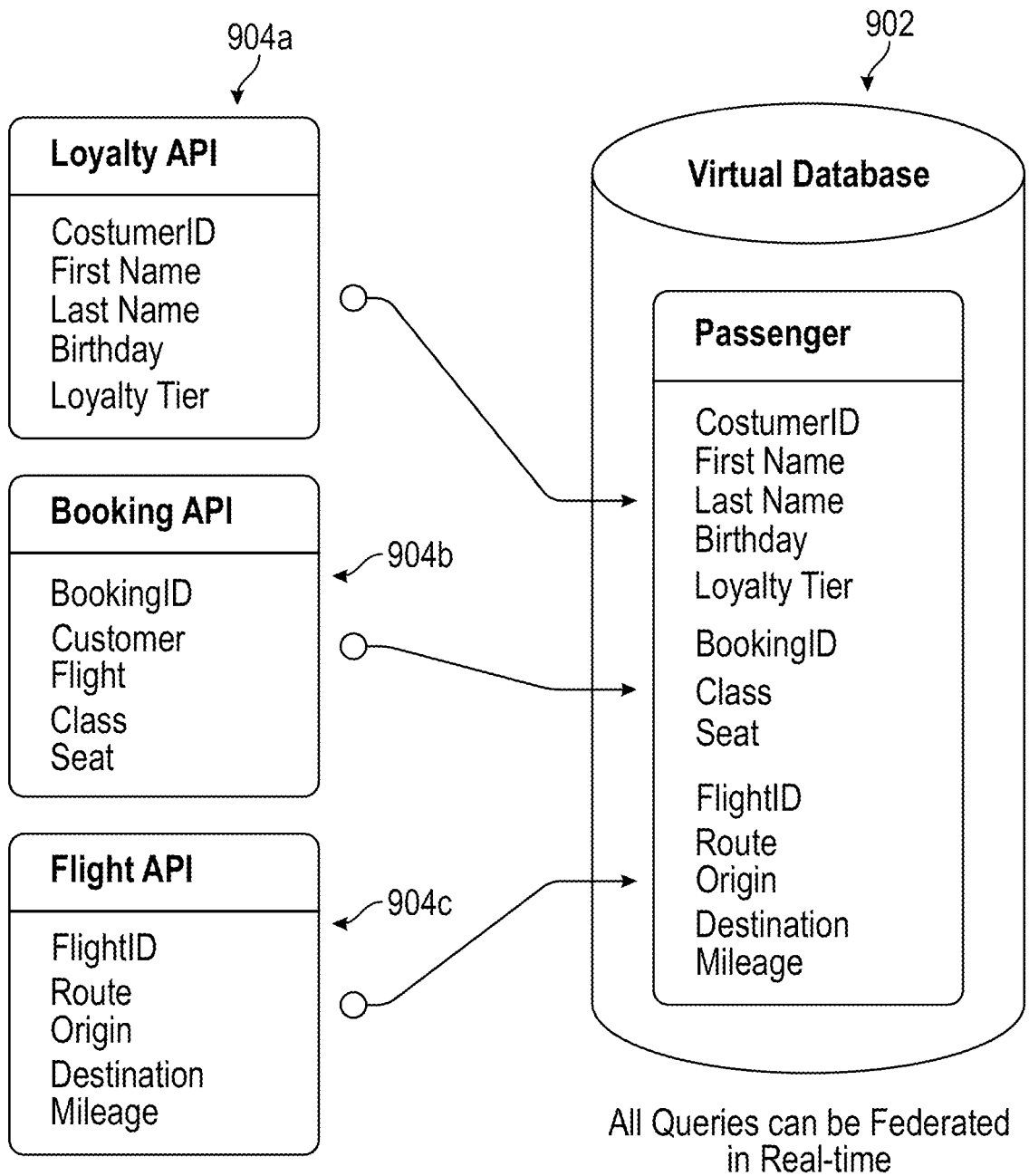
FIG. 9 is a visual representation of a Virtual Database with contents from various constituent databases, in accordance with an embodiment.

In an embodiment represented herein, and illustrated in FIG. 9, Verbs may trigger one or more queries to be sent to one or more databases. In one such embodiment, there may be an SKL Schema which serves as an abstraction of queries to the database. For example, the abstraction might include an operation called "getUsers." This operation could be mapped to a hard-coded query to a database to select a subset of fields from all records in the "users" table of the database. This abstracted operation could be listed along with any expected parameters and/or return values. Alternatively, there may be an SKL Schema which serves as an abstraction on the structure of the database(s) so that queries may be submitted to the database(s) in a domain model more familiar with a developer. To do so, a Standard SDK might use a Virtual Database 902 technology which, when queried, federates requests to multiple databases and/or multiple tables of those databases to construct a complete response in the format of the domain model. Such a Virtual Database 902 may be used not only to federate queries to multiple databases but also to one or more web APIs 704a-c (e.g., REST, GraphQL, etc.), or files (e.g., JSON, CSV, etc.).

Verbs may also use as input a collection of Entities of one or more types of Nouns. For example, the Verb to send a file may require an Entity of type file to be sent, along with a list of one or more Entities of type person. Instead of using the full object representation of a piece of data, the Action could use an identifier or unique identifier to match the input with an existing node/record in the Data Store (e.g., a person's name, email, phone number, etc.

Verbs may also be configured to be contextually aware of the execution environments they work in and do not work in. For example, when working with cloud-based file storage tools, a download button may appear viewing a file. However, if a user of SKL uses a SKApp running locally on their computer, they may interact with local APIs like their computer's local file system API. Thus, the DOWNLOAD Verb may not be relevant and may not be displayed by an Interface querying for data with that local SKApp.

AI Processor

According to some embodiments, Verbs may have a Mapping to an Integration or Code Package that runs some algorithm over input data to produce new or updates to data stored as Nouns or to relationships between data. Non limiting examples include:
1. an image recognition algorithm which accepts raw images and data of the Noun Person as input, processes them, identifies that there are people in the image, runs facial recognition to identify who the people are, and returns relationships between the images and the respective Person Noun entities; and
2. a named entity recognition algorithm that may locate and classify named entities mentioned in unstructured text through identifiers for Nouns such as person names, organizations, locations, medical codes, ISBN numbers, etc. Primitives and other data could also be identified and returned to be used to query and SKDS for relationships, such as time expressions, quantities, monetary values, percentages, etc.

Data Encryption

According to some embodiments, Verbs may have a Mapping to an Integration or Code Package which runs an encryption algorithm over input data to encrypt or decrypt data.

Integrations

According to some embodiments, an "Integration" may be a type of Schema, and more specifically, a type of Noun that may represent the data, capabilities, and other aspects of an external software tool, application, platform, database, and the like. Integrations may represent software tools which may have data and capabilities accessible via an interface (e.g., REST, GraphQL, JSON RPC, OData, SQL, ODBC, etc.) that a Standard SDK may communicate with to query for, mutate, receive messages about, or otherwise access or perform actions over data.

In some embodiments, Integrations may provide data and events through an interface which may be accessed via a program or code in any code execution environment, not just the standard format of JSON APIs exposed by many popular web applications. The Schema that defines an Integration may, for example, detail the following:

1. Metadata about the Integration such as Name, domain, keyboard shortcuts, etc.;
2. descriptions of methods and their parameters which may be used to read raw data from the Integration;
3. descriptions of methods and their parameters which may be used to write data to the Integration; and
4. descriptions of methods which emit Events that an application may subscribe to.

According to some embodiments, the Schema for an Integration may reference, or is referenced by, a Schema that contains an abstraction of the API of the Integration. This may make it easier and more concise for Mappings to reference the capabilities the Integration exposed and their inputs, outputs, required credentials, etc. Examples of these abstractions of the capabilities offered by an Integration's API include OpenAPI specifications for REST APIs, OpenRPC specifications for JSON RPC APIs, and AsyncAPI specifications for event-driven APIs. If the integration offers other types of interfaces (e.g., SQL), similar abstractions of their data and capabilities may be represented through Schemas. A Mapping between a service such as Google Drive®, and the Verb download, may reference the operationID of the operation listed in an OpenAPI specification for Google Drive's® REST API which represents the endpoint to download a file. Subsequently, Standard SDK may execute the Mappings for the parameters of the Verb and may properly use them to construct a web request that will be sent to the Google Drive® API according to the OpenAPI specification.

Non-limiting examples of types of Integrations are described herein:

First, web applications such as Google Drive®, Slack®, Gmail®, or Evernote®. These web applications commonly expose a JSON REST API with methods to read and write raw data from and to the application. Many also consist of web pages (e.g., drive.google.com) which contain data that may be scraped by a Data Processor using CSS selectors or Javascript code (e.g., Schema.org information, email addresses on the page, etc.). Google Drive® is a file storage tool which has a REST API exposing capabilities to upload, delete, edit sharing permissions, and manage versions of files and folders. MedFusion is a healthcare IT company which has REST APIs built according to the FHIR standards exposing patients' medical data from John Hopkins Medicine;

Second, the scripts loaded by a browser extension or browser add-on. These scripts, particularly the background script or service worker, may access the Javascript Extension API. A browser extension could also use JavaScript to scrape data from websites a user visits.

Third, a computing device's operating system such as macOS, iOS, Microsoft Windows, Linux, or Android. An operating system typically exposes APIs in order to allow programs running on the operating system to interact with the input devices, sensors, and storage and memory systems, on the device on behalf of the user/owner of the device (e.g., File system API, video and image processing APIs, etc.). There are many packages which developers may develop or use to interact with these APIs in a simplified or more abstracted way. The term computing device does not only mean smart phones, laptops, and desktop personal computers, it may also be used to describe embedded systems or wearable computing devices such as virtual reality headsets, smart watches, or brain smaynning devices. These other types of computing devices typically will gather some kind of biometric and/or environmental data and have an API for accessing that data through software on device or web requests. Sensors or trackers that provide access to a repository of data and recorded events (e.g., such as a digital camera with internal storage, or a heart monitor with internal storage)

Fourth, a program running on a computing device which has its own storage and/or processing and which exposes an API. Examples: (1) an application which records a user's computer screen, stores the video, runs processing to label key moments in the video, indexes it, and provides an API to search and access those key moments; (2) A program which tracks and stores a log of web requests originating from the computing device and exposes and API for querying or accessing those logs; and (3) An application installed on a smart fridge that track's the inventory of food within the fridge and exposes API to access the inventory data (via web request, Bluetooth, etc.).

Fifth, databases and data stores such as: Wikidata, World Bank Open Data, WHO (World Health Organization)—Open data repository, and European Union Open Data Portal.

Sixth, a blockchain such as the Ethereum blockchain. Data may be stored within Smart Contracts on a blockchain and read or written to using transactions. The data in a blockchain could also be indexed outside of the chain by systems like The Graph (https://thegraph.com/), which expose APIs to query data. For example, Go Ethereum is an open-source execution client for the Ethereum Protocol which has a JSON-RPC API exposing capabilities to get information about blocks, send transactions, and much more.

Code Package

According to some embodiments, a Code Package may be a Schema that represent a package of code. Each Code Package Schema, like all other Schemas in SKL, may have a unique identifier in the form of a URI which allows it to be referenced in SKL. A Code Package Schema may serve as an abstraction of the interface that the Code Package exposes, similar to how an Integration has a Schema which abstracts its API so that its capabilities may be accessed and performed in a standard way using Verbs and Mappings. A Code Package may not be hosted or otherwise made available to SKL via some external interface. Instead, Code Packages may be run on the same server, container, or infrastructure that SKL is being used in. The SKL engine or application running an SKL engine may either have the Code Package included in its environment as one or more files or as a variable stored in memory, or may download it from an external source during runtime. In the same way that a VERBINTEGRATIONMAPPING (further defined below) relates a Verb to an Integration, a VERBCODEMAPPING (further defined below) relates a Verb to a Code Package. Thus, a user of SKL may have the option to execute a certain Verb using either an Integration or a Code Package.

Non-limiting examples of types of Code Package Schema are described herein.

First, the execution environments that the Code Package may be run in. Non-limiting examples include: (1) an operating system running on a personal computing device, (2) a Virtual Machine such as the Java Virtual Machine or a JavaScript Engine, and (3) container running a specific image such as a Docker Image.

Second, the dependencies of the Code Package.

Third, specifications of the functions, methods, or variables which the Code Package exposes and the data types and formats of the inputs and outputs of those methods and functions.

Interfaces

According to some embodiments, an "Interface," or "Interface Component" in SKL may be a type of Schema, and more specifically a type of Noun that represents a discrete component displayed on a webpage or other application with a graphical user interface, according to an embodiment. Interface Components may be to display, select, or edit particular types of Nouns to end users. Interface Components may be combined into sets, networks, or hierarchies to form a larger or more domain specific component (e.g., a Card component that includes a Table component specifically built to render previews of Excel spreadsheets).

Non-limiting examples of types of Interfaces are described herein.

First, an Interface may be the Schema representing a GUI and/or code of an application or program running on the operating system of a personal computing device.

Second, an Interface may be the Schema representing a GUI and/or code of a web application running in a web browser.

Third, an Interface may be the Schema representing a voice assistant software agent which may interpret human speech and run code in response to prompts or on a schedule.

Fourth, an Interface may be biometric tracking devices, which may be preprogrammed to respond to changes or events in their wearer's biometric signals.

Fifth, an Interface may be software running in an augmented or virtual reality environment. For example, a HAT Entity in a VR environment could be associated with the Nouns 3DMODEL, OBJFILE, CLOTHING, and HAT. Its associations to those Nouns could make at least some of the Entity's data accessible within, or at least translatable to different applications outside of the virtual reality environment, such as a spreadsheet, a file browser, a "clothing browser" (e.g., software that lets you browse and "try on" clothes with AR or mixed reality), etc. Similarly, the HAT could be understood as having certain distinguishing characteristics that could be described in a way that different virtual reality environments interpret and render differently.

The geometry could also be described via a mathematical representation that is not human readable/understandable (e.g., in a way similar to how an AI-based object recognition model represent HAT objects in order to recognize HATS in images), and it could use that representation to translate between different three-dimensional environments by first comparing other items in each environment and creating a mathematical model to represent the types of geometries that are acceptable in each environment.

Interface Components

According to some embodiments, an SKL Interface Component may be a type of SKL Noun. Its SKL Schema may define the Metadata about the component and may either (a) define its implementation through declarative rules, or (b) link to its implementation defined in a specific package or repository of code. These interface components may be used to display, interact with, and/or edit data in any format, as long as an SKL Mapping(s) exist to translate between the data and the component.

In various embodiments, the Schema for an SKL Interface Component may include the following:

ID—the URI of the component (as is required by any named node within an RDF graph).

NAME (or label)—a textual label by which to refer to component.

DESCRIPTION—a textual description of the component.

PARAMETERS—a specification of the parameters that the component accepts. Each parameter should specify constraints if it is required or not, its data type, and its allowed cardinality.

PARAMETERSCONTEXT—a JSON-LD context object defining a more human readable format which each parameter may be supplied in if desired by application developers.

SOURCEURL—The location of the component's source code (likely stored on a CDN or other blob storage like AWS S3). May or may not be used in conjunction with the nodes field.

NODES—An ordered list of nodes that declaratively configure a tree of UI building blocks to render, each with a type, styling, a tree of sub nodes, and an optional properties Mapping (More on this below). May or may not be used in conjunction with the sourceUrl field.

In some embodiments of the SKL Interface Components, the Schema for a component may need to specify information about the author, organization, and/or version of the component as additional fields. This information may also be incorporated within the URI that makes up the component's id field.

Interface Components may be used to build interfaces using composable blocks without having to know exactly how those blocks work or what their contents are. An Interface Component may be nothing more than a representation and description of a component implemented in code using a language such as HTML or JavaScript®. Examples of JavaScript® components include those built using frameworks like React®, Vue®, Svelte®, etc. In such embodiments, the Schema for these components may a sourceUrl field to point to the location of an implementation of the described component. This location may be remote, meaning the component is hosted on a server, or local to the running application.

In addition to serving as a wrapper round components implemented in a specific programming language, Interface components which do not require complex logic defined through code may have their entire content specified through their Schema. SKL Interface Components Schemas may have a set of declarative configuration detailing the implementation of the component.

In some embodiments, this is done through the nodes field. The nodes field can contain an ordered list of nodes that declaratively configure a tree of UI building blocks to render, each with a type, styling, a tree of sub nodes, Examples of the UI building blocks this field would use are line, box, text, and image. Many UI frameworks include a set of built in herein "primitives." For example, HTML has a set of standard tags which are expected to be implemented in the same way by any HTML rendering engine such as wherein "div," herein "p," herein "h1," "h2," etc. Likewise, SKL expects Interface Engines or applications doing their own interface rendering to implement a standard set of primitive interface components including but not limited to:

CONTAINER—defines a section which can contain a sub tree of other components herein.

TEXT—defines a block which contains a text which may be styled.

IMAGE—defines a block which displays an image through a source URL.

According to an embodiment, these primitive components can be composed as a tree of RDF nodes in RDF serialization. A non-limiting example may include the following code in JSON-LD (context omitted for brevity):

```
{
  ...
  "https://skl.standard.storage/properties/nodes": [
    {
      "@type": "https://skl.standard.storage/interface/Container",
      "https://skl.standard.storage/properties/styling": { ... },
      "https://skl.standard.storage/properties/nodes": [
        {
          "@type": "https://skl.standard.storage/interface/Text",
          "https://skl.standard.storage/properties/styling": { ... },
          "https://skl.standard.storage/properties/propertiesMapping": {
            "@type": "rr:TriplesMap",
            "rml:logicalSource": { ... },
            "rr:subjectMap": { ... },
            "rr: predicateObjectMap": [. ... ]
          }
        }
      ]
    }
  ],
  ...
}
```

As shown herein, in addition to a tree of sub-nodes, a Node may include properties specifying styling, and a property Mapping. In this way, Interface Components can be an abstraction on certain structures and content which can be rendered by any (or most) application using that application's framework of choice.

In some embodiments, the Schemas for Interface Components can define the types of data they expect as inputs, properties, or available variables or values. This makes it so that an end-user can easily choose an entity of any Noun and be able see data from that entity without having to have preexisting Mappings. For instance, if a Card component has two fields, specified to accept data of type image and string respectively, then the first occurrence of each of those types of data in the Schema of the Noun of the Entity passed to the Interface Engine can be automatically loaded into the Card Interface Component. Alternatively and/or additionally, an end-user may be able to choose and/or change the fields of the entity that are used by the Card Interface Component from a list of compatible fields from the Noun Schema of the Entity.

Interface Engine

According to some embodiments, interface components defined through configuration makes it so that the interfaces of applications may be controlled, configured, and customized without changing code. To enable this, a developer may use an SKL Interface Engine.

In some configurations, an SKL Interface Engine is a set of code, which takes as input (1) an SKL Interface Component Schema; (2) a set of data adhering to a specific SKL Noun to be rendered by that component; and, optionally, (3) the chosen theme styling to apply to the component. The Engine may then find and perform the Mappings necessary to translate the data, according to its Schema, into correctly formatted parameters for the component and renders the component. In some embodiments, the Engine may update in real time if any changes are made to (1) the input data, (2) the chosen component, or (3) the supplied theme (among various other alternatives). Additionally, the Engine may have the ability to perform such real-time updates by re-rendering the applicable section of an HTML DOM tree after a component's properties are changed.

In addition to supplying data to components, an SKL Interface Engine may need to supply callbacks, or bind event handlers to components in order to respond to user interaction with the components. According to some embodiments, there may be a general callback or bound event listener which may be used by any Interface Component rendered by an Engine. When a component calls the callback, or sends an event, the payload may include an identifier about the meaning of the event. Using this identifier, and the name of the component that executed the event or callback, the Engine may either find and perform a Mapping to translate the payload of the event or callback into a data format used by the application, or simply pass the payload as is to the application.

In yet another embodiment, there could be a pre-defined set of operations or "event types" which the SKL Interface Components may execute as callbacks or events to the Engine and/or embedding application. For example, this predefined set of operations may encompass all possible CRUD (Create, Read, Update, Destroy) operations on an individual, or collection, of SKL Entities or Schemas. As such, the components may offer the ability for users of applications to modify the entities in their SKDS through SKL Interface Components. This would also allow Interface Components to query for SKL entity data themselves.

In an alternate embodiment, the set of possible operations could include all the SKL Verbs a user or application has defined in its set of Schemas. This may allow SKL Interface Components to execute callbacks or send events with a payload containing the name of the Verb to be executed as well as the specified parameters for that Verb.

In an alternate embodiment, Engines or applications may define multiple "services," "sets," or "domains" of operations allowed. For example, such a scenario may allow Interface Components to use an "Entity" service to execute callbacks or events about CRUD operations on entities, and a "Verb" service to execute callbacks or events Mapping to SKL Verbs defined in a user or application's Schemas.

Mappings

According to some embodiments, the types of Schemas that define how a program may translate data, capabilities, and more between SKL components may be called "Mappings." Mappings specify, for example, how a Noun may be translated to or from a unique data format specific to an Integration or an Interface, or how a Verb may be translated to or from a unique capability of a software tool.

In some embodiments, each Schema representing a Noun, Verb, Integration, Code Package, Interface, and/or SKDS may have embedded within it the logic and translations for how it relates to, uses, or produces every other artifact. Alternatively, Mappings defined separately from the Schemas, configurations, or code of Nouns, Verbs, Integrations, Code Packages, or Interfaces, users or developers may compose components of the system together. This setup makes it so that the internal implementation of each component may be edited and updated independently. For example, the developer of an Interface Component could change the structure of the HTML code, and any Nouns and Verbs that have been Mapped to that Interface Component are able to continue working seamlessly. No other developer would have to alter their code or configuration as long as their data is mapped to the standard PERSON Noun, which has one or more Mappings to the Interface Component's inputs.

Mappings may be used to allow SKLs to interoperate. Each Mapping may consist of configurations specifying the name and type of the Mapping, and sets of declarative rules, code, or other logic that define how a data structure or API capability is transformed into another. In one embodiment, Mappings may scale across as many different programming languages and environments as possible. When written as code, either the Mappings may have to be manually translated into each programming language or infrastructure would have to be built to automatically compile them to each programming language (e.g., Javascript, Java, Python, etc.). Alternatively, Mappings may be written as declarative rules within JSON files, or other data-interchange formats or RDF serializations that may easily be translated to JSON (e.g., YAML, Terse RDF Triple Language (Turtle)). JSON is a data-interchange format that many programming languages may parse and generate. In this way, according to a non-limiting embodiment, people and systems may easily find related components and join them together.

Mapping Language

According to some embodiments, SKL may use the RDF Mapping Language (RML) serialized in the JSON-LD format to encode the logic of Mappings as declarative rules. Using RML, a Mapping may: (1) reference any field within an input dataset (including nested data and iterations over lists); (2) use constant values such as strings, integers, booleans, etc.; and (3) use other ontologies including: (i) the Hydra Core Vocabulary (HYDRA) to load data from remote web APIs; (ii) D2RQ to access data in a remote database; and (iii) the Function Ontology (FNO) to execute control logic, conditional logic, and any other arbitrary function.

For example, in one non-limiting embodiment, when using or displaying files in their applications, many developers may want to know the mime type of the file, thus the Schema for a file Noun may include mimeType as a field. However, the Dropbox® API does not provide a mimeType field in its response when getting Metadata about a file stored in Dropbox®. Using an SKL Mapping which defines declarative rules and logic using RML and FNO, the Dropbox® representation of the file may be translated to be compliant with the file Noun's Schema. The Mapping may get the file's extension by referencing the Dropbox® file's filename field within the input data and uses it as input to a getMIMEType function executed by an RML execution library written in Java.

Types of Mappings

According to some embodiments, the SKL Library may include multiple types of Mappings for translating between different types of artifacts. Non-limiting examples of these include:

1. NounDataMapping:

According to some embodiments, a NOUNDATAMAPPING may translates an Entity conforming to the Schema of a Noun into a unique data structure to be used as the input of an Integration capability, an Interface Component, or a Code Package, or it may translates a unique data structure output from an Integration capability, Interface Component, or Code Package, into the Schema of a Noun. NOUNDATAMAPPINGS may be used by VERBINTEGRATIONMAPPINGS by reference to avoid duplication of Mappings.

2. OntologyMapping:

According to some embodiments, an ONTOLOGYMAPPING is type of NOUNDATAMAPPING that may describe how to map the Schema and structure of a different Linked Data ontology to an SKL conformant Schema (e.g., Noun or Verb).

3. NounInterfaceMapping:

According to some embodiments, a NOUNINTERFACEMAPPING may translate an Entity conforming to the Schema of a Noun into a unique data structure to be used as the input of an Interface Component. It may reference one or more NOUNDATAMAPPINGS. This type of Mapping may be executed using an Interface Engine and the response is used to render the component.

4. VerbintegrationMapping:

According to some embodiments, a VERBINTEGRATIONMAPPING may translate the inputs of a Verb to the unique inputs and correct capability (API endpoint, SDK function call, etc.) of an Integration to execute and perform the intent of the Verb using the Integration. The Mapping may also include a conversion of the outputs of the executed capability to the standard outputs of the Verb. It may reference one or more NOUNDATAMAPPINGS.

5. VerbCodeMapping:

According to some embodiments, a VERBCODEMAPPING may translate the inputs of a Standard Verb to the unique inputs and execution format of a Code Package to execute and perform the intent of the Verb using the Code Package. The Mapping may also include a conversion of the outputs of the executed code to the standard outputs of the Verb. It may reference one or more NOUNDATAMAPPINGS.

6. VerbNounMapping:

According to some embodiments, a VERBNOUNMAPPING may translate from one Verb into another Verb based on a Noun parameter supplied to the original verb called. For example, suppose a developer has created a Standard Knowledge Application which may sync data from any Integration a user has added to their SKL Schema. This syncer application may need to sync many types of Nouns such as FILES, MESSAGES, TASKS, etc. In some embodiments, the developer may have to write code to call specific Verbs to fetch each type of Noun in an Integration (e.g., GETFILESINFOLDER, GETMESSAGESININBOX, GETTASKS). In order to make their code more scalable, the developer may create a SYNC Verb which, when called with a noun parameter, uses a VERBNOUNMAPPING to determine a "noun-specific" Verb to execute. Thus, the developer writes one line of code through which many different types of data may be synced.

7. VerbQueryLanguageMapping:

According to some embodiments, a VERBQUERYLANGUAGEMAPPING may translate the inputs of a Verb into a query in a database language and the outputs of the query back to the standard outputs of the Verb. It may also reference one or more NOUNDATAMAPPINGS.

Solid

According to an embodiment, SKL's decentralized ecosystem may adhere to the principles and interfaces defined in the Solid Protocol (https://solidproject.org/). Solid is a specification that lets people store their data securely in decentralized data stores called "Solid Pods."

The Solid specification defines how applications may access and manage data from user's personal data stores, as summarized below:

First, Linked Data Solid supports storing Linked Data so that different applications may more easily work with the same data. Specifically, it uses the Linked Data Platform for accessing, updating, creating and deleting Linked Data resources.

Second, Solid-OIDC Authentication defines how the servers hosting personal data stores verify the identity of users and applications based on the authentication performed by an OpenID provider.

Third, Web Access Control Authorization is a decentralized cross-domain access control system providing a way for Linked Data systems to set authorization conditions on resources using access control lists.

Certain components of the SKL ecosystem may conform to Solid. According to an embodiment, Standard Knowledge Data Stores ("SKDS," as defined below) are required to be compliant with Solid's concept of personal data stores called "Solid Pods." As such, implementations of SKDSs may implement Solid-OIDC, Web Access Control, and the Linked Data Platform. In this embodiment, Standard Knowledge Applications ("SKApp," as defined below) are also compliant with Solid's concept of "Solid Apps." This means that any SKApp may expect to communicate with SKDSs using the Linked Data Platform and authenticate users using Solid-OIDC.

According to one non-limiting embodiment, the SKL specification may recommend that each user's SKDS store its own Schemas. In this way, end users may customize and extend SKL as they see fit. When using SKL Verbs, a SKApp may use a Standard SDK and set the Standard SDK's Schema source to the user's SKDS. In one non-limiting embodiment, SKApps may use a Standard SDK to query an SKDS. As described elsewhere herein, a Standard SDK may use a variety of methods to interact with data (e.g., create, read, update, and destroy) within an SKDS. The mediums for interaction with data in an SKDS may include the SKDS's native query language such as SPARQL or GraphQL, as well as the Standard Knowledge Query Language ("SKQL" as defined below) which is in effect an Object-Relational Mapping tool.

Standard Knowledge Data Stores

According to some embodiments, a standard knowledge data store ("SKDS") may be a nodal that is accessible to one or more users on one or more computing devices that may be manifested in any number of ways. For example, the nodal data structure may be represented as files on a user's local computer, data on a blockchain, data in one or more relational databases, data in a graph database, data in a distributed database system, etc. In some embodiments, an SKDS may follow the specification for a Solid Pod. Accordingly, an SKDS may be more than a Solid Pod. It could have other manifestations, similar to the nodal data structure described herein.

A Standard Knowledge Data Store or "SKDS" may be a type of Integration that stores Entities, and in some embodiments, also stores the Schemas that make up the Nouns, Verbs, and Mappings and/or other SKL components on behalf of a developer, end-user, and/or system. SKDSs may be referred to herein as standard data stores, data stores, Standard Storage, knowledge pods, and nodal data structures.

In order to use SKL according to some embodiments, a developer must first decide where they will store the desired SKL Schemas, Mappings, and the code their application will work with as well their end users' data, or how such artifacts will otherwise be accessed. One of the first decisions to make will be whether to use an SKL-compliant Standard Knowledge Data Store (SKDS), to store or reference the artifacts and configuration directly from other sources (e.g., schema.org, the SKL Dictionary as defined below, etc.), or to use their own method (hard-coding schemas into their code).

Any kind of information may be stored in an SKDS. Non-limiting examples of a data store that could serve as an SKDS include: (1) a server connected to the internet running a relational or graph database or a key-value store, (2) a web browser's IndexedDB store, (3) a database running on a personal computing device, (4) and a decentralized blockchain or decentralized file storage system like IPFS. Depending on the type of data storage available, the method or mechanism an SKDS uses to store data can be manifested in a number of ways including, but not limited to, as files on a computer, server, or container, as data on a blockchain, as data in one or more relational databases, graph databases, or key-value stores, as data stored by one or more machines in a distributed system, as data stored in memory by a program etc.

In some embodiments, an SKDS is similar to a secure personal web server for a user's SKL nodal data structure. In this scenario, users control access to the data in their SKDS. Users may decide what data to share and with whom to share it (be it individuals, organizations, or applications). Access may be revoked at any time. To store and access data in an SKDS, applications use standard, open, and interoperable data formats and protocols. In one embodiment, the data creator may be in full control of their data as shown in FIG. 2.

In some embodiments, a developer will have a predetermined set of SKL artifacts that they know their application will need. In such embodiments, the developer may download and bundle them along with their application's code or download the artifacts via the SKL Library API at runtime, as their use case necessitates. This situation may not need an SKDS, though it may still use one for the application itself. In other embodiments, a developer may choose to let the decision be made by end users. An application could choose to store SKL artifacts on behalf of end users in any format they choose. For example, the developer may store all SKL artifacts in a MongoDB® database with a key specifying which end user they are used for.

In one non-limiting exemplary embodiment, several criteria of an SKDS may be defined to do the following: (1) be compatible with the world of Linked Data by exposing APIs that accept formats such as Resource Description Framework (RDF) as input, (2) allow end users to choose from a market of database providers for storage of their data, (3) have robust authorization over data such as access control lists on each resource (each end user may be able to share and revoke third-party access to their data), (4) be able to verify the identity of agents (users or applications) accessing or modifying data, and (5) allow for the validation of any data written to the SKDS according to SKL Schemas.

One embodiment of a system which fulfills these criteria may be built using the Solid Protocol. Solid is a secure, robust, and highly configurable decentralized storage system. Solid uses Solid OIDC, an authentication protocol built on top of OpenID Connect 1.0, which allows for secure authentication between storage providers, identity providers, and applications. It uses Web Access Control to implement authorization via access control lists. It also utilizes Linked Data and mandates usage of the Linked Data Platform as a standard interface for reading and writing resources. Many implementations of the Solid Protocol are open source and architected in a way that makes it easy for developers to build off of, for example to add custom SKL Schema validation. Solid may also be seen as accessible to many developers because it does not specify constraints on the type of persistent storage used to store resources, developers may choose whatever works best for them. While Solid Protocol is used in this embodiment, it should be noted that the SKDS may be built using a variety of different methods.

In some embodiments, the specification of an SKDS need not to be compatible with Linked Data, and thus would not use Solid. Its REST APIs may be built to accept request bodies that are not a serialization of RDF such as JSON. In such embodiments, the embodiment may specify a distributed storage system—that uses the Oauth2.0 protocol, for example—for authorization between identity providers, storage providers, and applications.

In other embodiments, an SKDS may be a nodal data structure stored in a graph database hosted on a private cloud controlled by a private company. In this case, the SKDS would not necessarily implement the Solid specification but instead implement a proprietary interface unique to the company. According to the embodiment, any application, SKApp or not, would need to implement a data persistence strategy in accordance with the company's SKDS specifications. In addition, the specificities of the company's interfaces and security might make them unable to leverage open source Standard SDK and/or SKQL libraries.

In an alternate embodiment, an SKDS could be implemented using blockchain technologies. For example, there are several layer one chains that support smart contracts and that may be programmed such that only certain people are able to access and un-encrypt certain data stored on chain. This may, in a similar way to Solid, provide individuals with the ability to have more complete control over their data. In this scenario the SKDS could store its database on a chain in an encrypted way such that only a given user (or wallet) is able to control the data that is assigned to that wallet. The "owner" of such data could then choose to share any subset of their data with other users or wallets as desired. Furthermore, certain restrictions could be placed on data via a smart contract. For example, the data on chain could specify that it may only be accessed by components that meet certain qualifications, beyond simply other users, as described further herein in the operating environments section. Also similar to the Solid Protocol, a blockchain based system would also separate the user's identity from the data and from the applications which access said data.

In yet other embodiments, a mixture of the examples described herein could be used, ranging from semantic blockchains, to a Solid-based system that uses a blockchain-based wallet for authentication, to an SKDS that stores assets using a distributed peer-to-peer storage solution like IPFS, and more.

In some configurations, an end user may not be able to use the developer's application until they have installed or downloaded a specific SKL package or set of Schemas, Mappings and/or code. At least one embodiment includes an easy-to-use package for application developers to query and check against the user's SKDS whether the user has all necessary SKL artifacts installed.

An SKDS may have column, property names, or relationship names which differ slightly from the popular ontologies such as FHIR and Schema.org. For these cases, SKL may include Mappings between the popular ontologies and their altered representations in the Schema of the data store.

Developers of SKApps may be able to switch persistent storage types without altering (or at least with minimal alterations) functionality, support for features, or data structures.

A Data Store (which in some embodiments may be called the nodal data structure) may be a location where standardized Data Types and their relationships are persisted. Non-limiting example of a system architecture and nodal data structures are illustrated in FIG. 38, FIG. 40, FIG. 45, and FIG. 46. SKDS enable developers of applications will be able to switch persistent storage types without altering, or at least with minimal alterations to functionality, support for features, or data structures.

Figure 56:
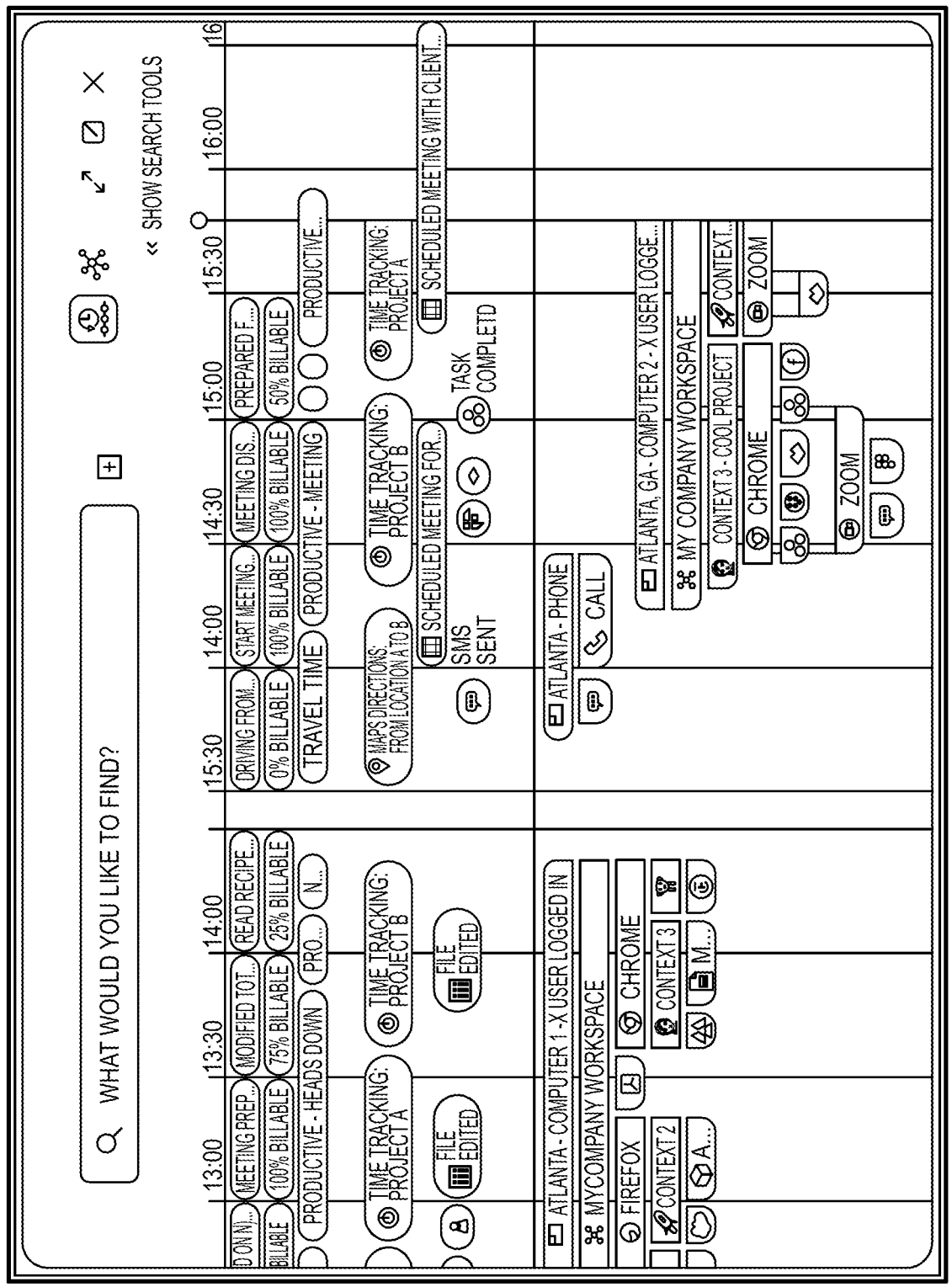
FIG. 56 shows a database including information about an activity, in accordance with an embodiment.

According to a non-limiting embodiment, an SKDS can be comprised of multiple databases such as a vector database, a graph database, and/or a relational database. For example, an SKDS may include a first database for Entities related productivity data, a second database for Entities related to health data, and a third database for information related to activity by the SKDS' user(s). In this case, the third database could include information about activity as shown in FIG. 56. The activity in this third database could follow Schemas related to activity (e.g., activityschema.com), could support activity spans (e.g., OpenTracing) to better track electronic content and electronic context, could track notifications sent from other sources, and more. In this way a single SKDS can be configured and optimized for a variety of criteria ranging from security needs, performance needs, ease of analysis, to support privacy-conscious personalization and advertising capabilities, and more.

Standard Knowledge Query Language

According to some embodiments, Standard Knowledge Query Language ("SKQL") may be an abstraction that standardizes the interaction with different types of databases by providing a single interface for operations that may be performed using various database query languages. It may be designed to facilitate object-oriented interactions, as this is a common requirement of most application developers who use persistent databases. It may be described as either an Object Relational Mapping (ORM) or Object Graph Mapping (OGM), depending on if it is being used to query a relational database or a graph database. However, it may not go so far as "Active Record" style ORMs in that it may not tie the database implementation to models or classes and their business logic. Instead, it may works with the data structures provided in Schemas. SKQL may expose methods for basic operations such as create, read, update, destroy (CRUD) on data according to the Schema or ontology that a user is using.

Instead of manually constructing and sending web requests to an SKDS to query or modify Schemas or user data, a developer may set the SKDS as the source of SKQL and specify valid authentication credentials for SKQL to use and it may automatically send requests to the SKDS when needed. For example, if a developer's code needs to save a new blog post a user just submitted using a Standard Knowledge Application for blogging, the application code may call SKQL.save(blogPost) or blogPost.save( ). Subsequently, SKQL may communicate with the user's SKDS to save the blog post. If the user's SKDS is a Solid Pod, SKQL may send a web request compliant with the Linked Data Platform with the body being an RDF representation of all the blog post's attributes.

Given that SKQL may work with SKL Schemas, it may be extended by developers, systems, and/or end-users. For example, a Verb to move a file from one folder to another may use a specialized query to modify the file's relationship to its old and new parent folder in a single request instead of using the standard operation to delete the old relationship and create the new one. Likewise, an application attempting to uncover insights from a data store may need to perform a complex path traversal query using the native query language of a graph database (e.g., Cypher, SPARQL, etc.) which could be preconfigured with Schema. SKQL may also expose special methods to write queries in the native query language of databases which users have chosen to use.

In some embodiments, SKL Schemas may be used by an Integrated Development Environment (IDE) while a developer is programming to perform type checking of fields, variables, functions, and methods accessed and used. SKQL could have its own programming language which may be compiled either as a developer programs or at build time to a more well supported target programming language such as Python, Java, or JavaScript—similar to how TypeScript is typically type checked by an IDE as a developer writes code and is compiled into JavaScript when they build and/or package their application.

While this would result in less composable and less interoperable components, in other embodiments, SKL Schemas could be represented as classes in a programming language like Ruby® or Java®, type interfaces and/or classes in JavaScript® or Typescript®, etc.

SKQL may allow for high composability of databases and SKDSs to the point where an end-user, system, or developer may "swap out" a database or SKDS of one type for another type. This also enables seamless replication of databases in any format and enables applications to easily offer multiple database options to users. Mappings may include translations from SKQL queries into various native query languages and/or web requests or other API requests to third-party tools according to the Schema of the target data source.

In addition to the basic translation of operations to database query languages, SKQL may also include a suite to manage a connection pool with each database.

Different database types may have differing levels of support for SKQL features. For example, users would only be able to add custom properties/relationships to their Schemas if their database supports that. A relational database may require a database migration to be able to support the additional properties or relationships, while a graph database or other NoSQL database could theoretically support any arbitrary property or relationship.

According to some embodiments, SKQL may be used to allow developers or users to "program," or define, logic in near-natural language. This natural language may be parsed and compiled into a series of commands to run against databases and/or data sources. In an alternate embodiment, SKQL could be used to automatically generate migrations for relational databases based on changes to SKL Schemas. In an alternate embodiment, SKQL could be used to automatically generate Mappings between SKL Schemas and the Schemas of the databases that store Entities. In an alternate embodiment, SKQL may expose the ability for developers to supply a raw query or web request and any necessary connection details or credentials. In this case, SKQL would not do any transformation and would simply send the query or web request to a database. For example, SKQL could expose a sendSqlQuery function which, when supplied with a SQL query, database IP address, and credentials, will make the connection to the database, perform the query, and return the result. Similarly, SKQL could expose a function such as sendWebRequest, or fetch which would send a web request to a REST API based on a supplied endpoint/URL, required parameters or data, and necessary credentials. SKQL could then expose a function such as executeOpenApiOperation which takes as input an OpenApi operationID and the operation's required and/or optional parameters and credentials. These SKQL functions would allow developers to access functionality and perform queries which fall outside the boundaries of the standard CRUD operations.

Figure 11:
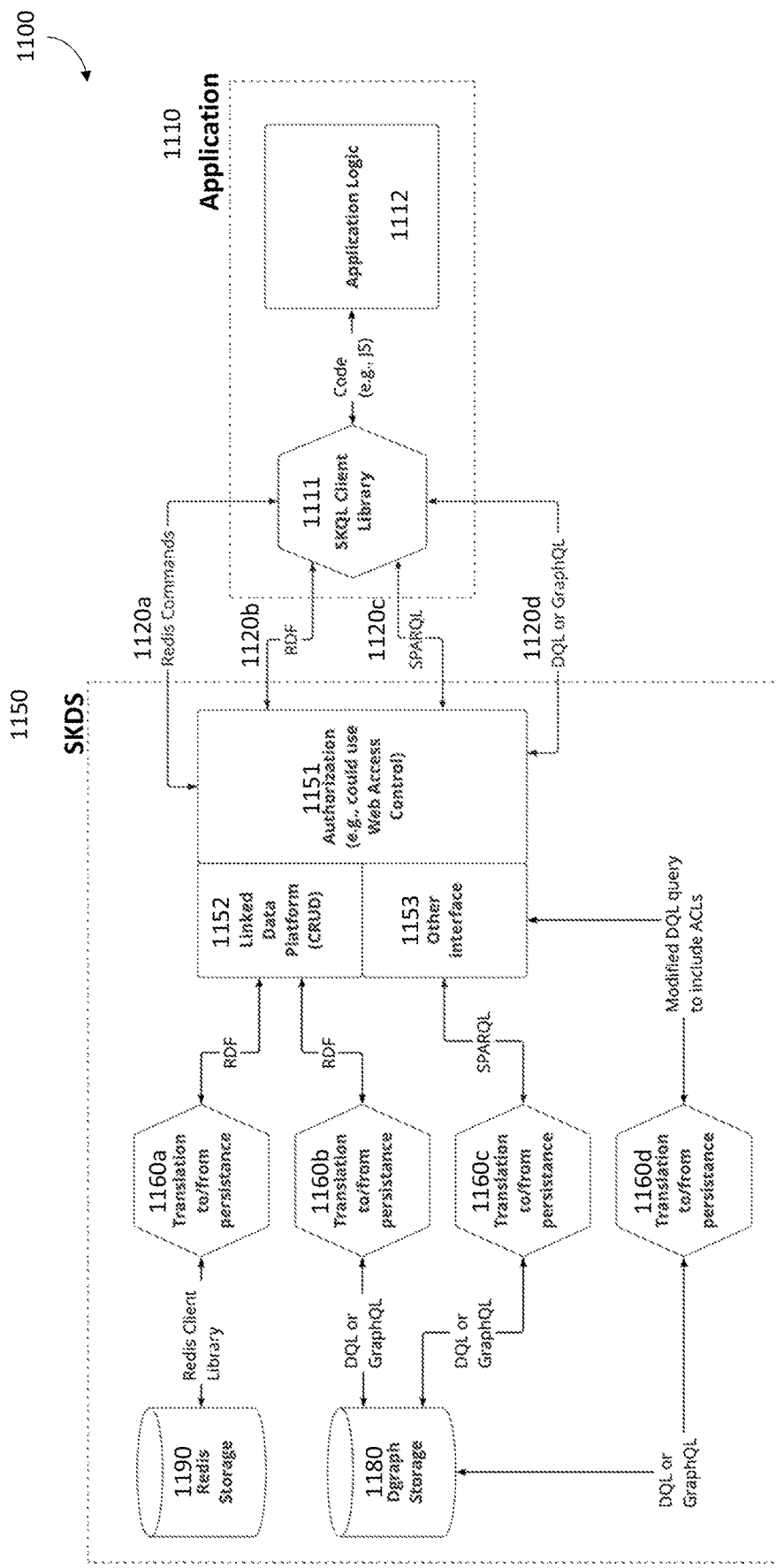
FIG. 11 illustrates an architectural diagram, in accordance with an embodiment.

FIG. 11 illustrates a system architectural diagram (computer infrastructure) of how an application 1110 can use SKQL to query (or otherwise interact with) an SKDS 1150, according to an embodiment. In this example, the application 1110 uses an SKQL Client Library 1111, which may be included as part of a Standard SDK, as an ORM and/or OGM that the application's codebase 1112 can use to interact with the SKDS 1150.

The SKDS in this example could follow the Solid specification and send web requests according to the Linked Data Protocol 1152 to an SKDS 1150. In doing so, it would communicate about resources using the Resource Description Framework (RDF) 1120b. In this example, multiple and alternate means for the SKQL Client Library 1111 to communicate with the SKDS 1150 are presented. These mean Redis Commands 1120a, SPARQL 1120c, DQL or GraphQL 1120d. In each case, if any of these alternate communication formats are used, the SKDS 1150 may be required to implement an interface other than Linked Data Platform 1153. Regardless of communication format, the SKDS 1150 may perform authorization 1151 of the application making the request. In the case where the SKDS is conformant to the Solid specification, this authorization must be conformant to the Web Access Control specification. In some embodiments, the authorization step 1151 may require re-writing or re-building a query to include authorization information. This would likely happen if Redis Commands 1120a, SPARQL 1120c, DQL or GraphQL 1120d were used.

After re-writing a query to include authorization, the SKDS 1150 may translate the query into a format acceptable by its type or types of persistent storage. This example shows two examples of persistent storage used by the SKDS 1150, which may be used alone or in combination, a Redis key-value store 1190, and a Dgraph graph database 1180. In either case, the chosen communication format in 1120 may be translated and sent to the persistent storage 1160. Examples of the translations that may be required include but are not limited to, from RDF to commands executed using a Redis Client Library 1160a to send to a Redis key-value store 1190, from RDF to DQL or GraphQL queries 1160b to send to a Dgraph database 1180, from SPARQL to DQL or GraphQL queries 1160b to send to a Dgraph database 1180, and from DQL to GraphQL or kept as DQL 1160d to send to a Dgraph database 1180. Once the persistent store performs the request, any response may be translated back 1160 and returned to the Application's code 1112 via the SKQL Client Library 1111.

Standard Knowledge Applications

According to some embodiments, a "Standard Knowledge Application" (also referred to herein as a "Knowledge App" or "SKApp") is a software application, program, or any other set of code which downloads, bundles, or otherwise accesses SKL Schemas, configurations, and/or code and uses them to interact with Integrations, Code Packages, and/or Interface Components through a Standard SDK (e.g., Mapping the unique data structures and capabilities of those Integrations, Code Packages or Interfaces in and out of Noun and Verb Schemas according to the SKL protocol).

In some embodiments, a SKApp may be code which uses any aspect of the SKL framework to achieve a goal. The SKApp may be different from an Integration or Code Package because by not directly using any aspect of SKL internally; but is rather represented by SKL Schemas. In some embodiments, a SKApp may be represented by an SKL Schema, but it may also use SKL Schemas, Standard SDK, Standard UI, Standard API, etc. to perform its function.

Non-limiting examples of Standard Knowledge Applications include the following: (1) an application which integrates with other software using Standard SDK and/or SKL Schemas, (2) a script which uses Standard SDK and SKL Schemas to scrape data from websites, or (3) a mobile application which uses Schemas and an Interface Engine according to Standard. UI to run ifs user facing GUI.

In some embodiments, a SKApp may store and access data in SKDSs using the SKL protocol and the Solid specification. In this way, instead of every application using a separate data silo that it independently controls, different SKApps may interact with the same data stored in a given user's SKDSs. In other words, a user may give multiple SKApps access to read and/or write Schemas and data to/from a single SKDS.

In another embodiment, a SKApp may store and access data independently in its own database. In yet another embodiment, a SKApp may interact with data in multiple data stores, both public and private. In some embodiments the SKApp may be Solid compliant.

A data syncing application could be a non-limiting embodiment of a SKApp. This SKApp may periodically check for updates to, or subscribe to events about data in a data source, extract the new or updated data, standardize it according to the Schemas and then write those updates to a data store. Other non-limiting examples include the following: (1) an application that uses one or more servers to poll the Google Drive® API for changes to files and writes updates to a data store or (2) a Chrome extension that subscribes to web navigation events, classifies the corresponding website as a particular Noun, and writes data associated with that Noun to a data store.

A data-duplication application could also be an example of a SKApp. This SKApp may use data (e.g., Metadata, interaction data, etc.) from a data source in order to identify two or more Entities which represent the same data. For example, a data-duplication application may run code which calculates a unique hash with the contents of every file in a data source, in order to identify any duplicates. According to an embodiment, SKDSs could come pre-packaged with a data deduplication SKApp to help keep the data clean.

Figure 47:
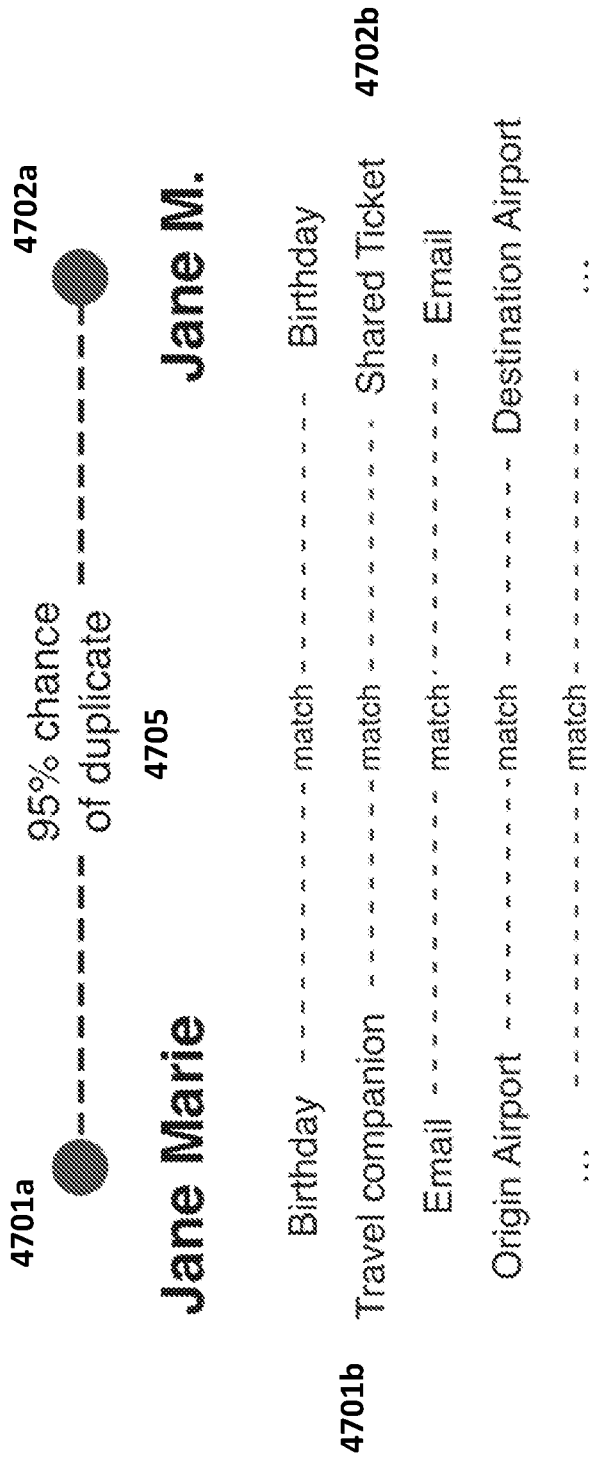
FIG. 47 illustrates a diagram of two Entities sharing similar properties and relationships in a nodal data structure, in accordance with an embodiment.

FIG. 47 illustrates a conceptual diagram where two Entities 4701a and 4702b share similar properties and relationships 4701b and 4702b in the nodal data structure 4600, according to a non-limiting embodiment. In this case, one or more of the methods described above could be used to establish a relevance score 4705 between both Entities in order to automatically deduplicate them or otherwise establish a recommendation for deduplication.

Coordinator

In some embodiments, certain types of SKApps may be referred to as Coordinators. A Coordinator is a SKApp, which executes the settings of a developer or end-user. These settings and configurations may include, for instance, which Nouns, Verbs, Integrations, SKDSs, SKApps, etc. a given user is using. The data a Coordinator uses may be stored in an SKDS, and could include configuration of Verbs that specify the times or the frequency at which they are meant to be run, as well as any events from external systems that the Coordinator should subscribe to and pass along to a Verb, such as an Integration's webhook. Coordinators may be responsible for adhering to configurations that trigger Verbs to run at certain times. Coordinators may also responsible for maintaining connections to SKDSs which may need to be read from or written to by a Verb or to fulfill a request from an Interface Component. In some embodiments, the Coordinator is included on the same server as an SKDSs. In other embodiments the Coordinator may exist as a Standard Knowledge Application or in part between one or more SKDSs and/or Standard Knowledge Applications.

Figure 12:
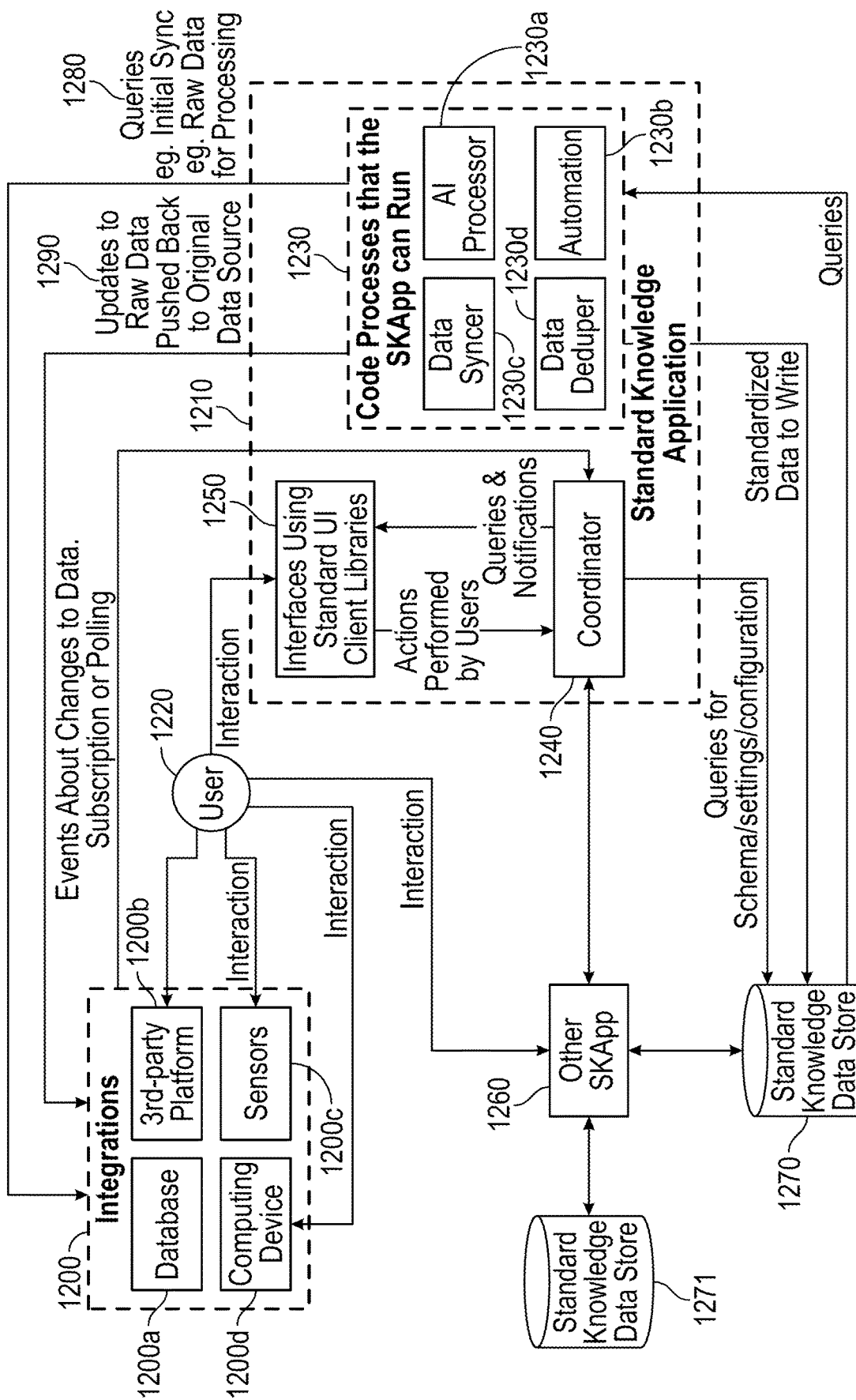
FIG. 12 illustrates an architectural diagram, in accordance with an embodiment.

FIG. 12 illustrates an architectural diagram of the ecosystem in which a User 1220 separately interacts with one or more Integrations 1200 and Standard Knowledge Applications 1210 and 1260 while a Coordinator 1240 executes code processes 1230 in the background on their behalf. The user 1220 can use the interface 1250 of one of their SKApps 1210 in order to set settings for the processes 1230 they want to be run over their data in any Integration 1200. These settings get stored in their SKDS 1270. Non-limiting examples of processes a SKApp include AI Processing to generate text or images from data 1230a, workflow automation to move or update information in one Integration from another 1230b, data syncing to create a knowledge base in their SKDS 1230c, and data deduplication across Integrations 1230d. In some embodiments, these processes may be controlled by a Coordinator 1240. The Coordinator 1240, reads the Schema, settings and other configuration chosen by the User 1220 from their SKDS 1270, then periodically upon a schedule, or upon certain events, or at a certain time, runs any applicable code process 1230 to fulfil the User's 1220 settings. The user may also interact with other SKApps 1260 which do not have a Coordinator to run code processes in the background and only read or write data to or from one or more of a user's SKDSs 1271 or 1270. Importantly, each piece in the architecture can communicate with others via SKL Nouns and Verbs using Standard SDK. For example, the data syncer code process 1230c can use Standard SDK to send queries for data to an Integration 1200. Likewise, the Coordinator 1240 or a code process 1230, can use SKQL to read or write Nouns or Schemas to or from an SKDS 1270.

Analytics Server

In some embodiments, an Analytics Server represents one or more computing devices which runs some aspect of the SKL ecosystem. As such, an Analytics Server may be made up of one or more computing devices such as a mobile phone, personal computer, virtual reality headset, server, blockchain infrastructure, browser, etc. Any of these pieces of hardware or environments may perform one or more operations that SKL defines including but not limited to— the following: (1) running a SKApp that uses a Standard SDK to access data from an SKDS, (2) running an application that uses a Standard SDK to interact with an Integration, and (3) running an application that uses a Standard UI Engine to present and interface to a user, be it graphical, auditory, haptic, etc. An example of a system architecture is provided in FIG. 37 that includes an analytics server.

Authentication Server

According to some embodiments, in SKL's decentralized embodiment, it may provide end users with control over their data, and in other embodiments, separate entity and Schema storage from authentication. As such, an Authentication Server is a service, program, server, or other interface which a user designates as the authority for their identity. An Authorization Server is responsible for allowing a user to sign up and create, or have automatically generated for them, a unique identifier such as a WebID, email address, username, a cryptographically signed key, etc. The Authorization Server may pair a unique identifier with a method of authentication and provide whatever interfaces are necessary for the user to authenticate themselves. Examples of these authentication methods include, but are in no way limited to, OpenID Connect (OIDC), Solid OpenID Connect (Solid OIDC), Oauth2.0, Public Key authentication such as RSA and DSA, username and password, LDAP, Kerberos, SAML or RADIUS.

In the embodiment wherein SKApps and SKDSs are conformant to the Solid specification, any request to an SKDS from a SKApp may either respond with a link to the user's Authorization Server if the request is unauthenticated or will verify the identity of the SKApp and/or end user based on the authentication performed by an Authorization Server. As such, an Authorization Server may be conformant to an OpenID Provider.

In order to authenticate users and provide an authorization code to a Solid Application, A Solid OpenID Provider may be required to have a web page wherein a user authenticates themselves. In such an embodiment, although a user is identified via a WebID and a WebID Profile document, the implementation of authentication of the user as that WebID may be up to the OpenID Provider. As such, the OpenID Provider could use, among other techniques, a username and password, public key authentication, Oauth2.0, etc. In this way, Solid OIDC and its WebIDs may serve as an Authorization wrapper for resources controlled by any Authentication method.

In other embodiments, an Authorization Server may consist of, or leverage third party or proprietary authentication services such as Okta® or Aikon.com to facilitate access to Data Sources.

In another embodiment, A Coordinator or SKDS running locally on a user's computer may not need authentication for interactions between locally running SKApps since it is running on a machine that the user owns and which the SKApp is also running on. However, some users may require their SKDS to be encrypted and access to it to be password or key protected. According to some embodiments, local SKDS APIs will not need any authentication if operating on a system with proper user permissions.

Standard SDK

According to some embodiments, a Standard SDK may be a code package that may simplify the developer experience when building an application. It may execute Verbs by using Mappings to translate between Nouns and Verbs and the APIs of Integrations (e.g., REST, SQL, etc.) or the functions and methods of Code Packages. Standard SDKs are sometimes referred to herein as "SKL Engines."

According to one decentralized embodiment of SKL, wherein an application does not need to have preexisting knowledge of what Schemas (e.g., Noun, Verb, and Mappings) a user has installed, Standard SDKs may dynamically respond to a developer's execution of a standard Verb. To do so, a Standard SDK may query for and read SKL Schemas from, for example, an SDKS. A Standard SDK may use SKQL as a convenient way to query for Schemas from a user's SKDS using its simplified ORM style interface. Alternatively, a Standard SDK may not use SKQL and instead submit queries in the native query language of the user's SKDS.

Figure 13:
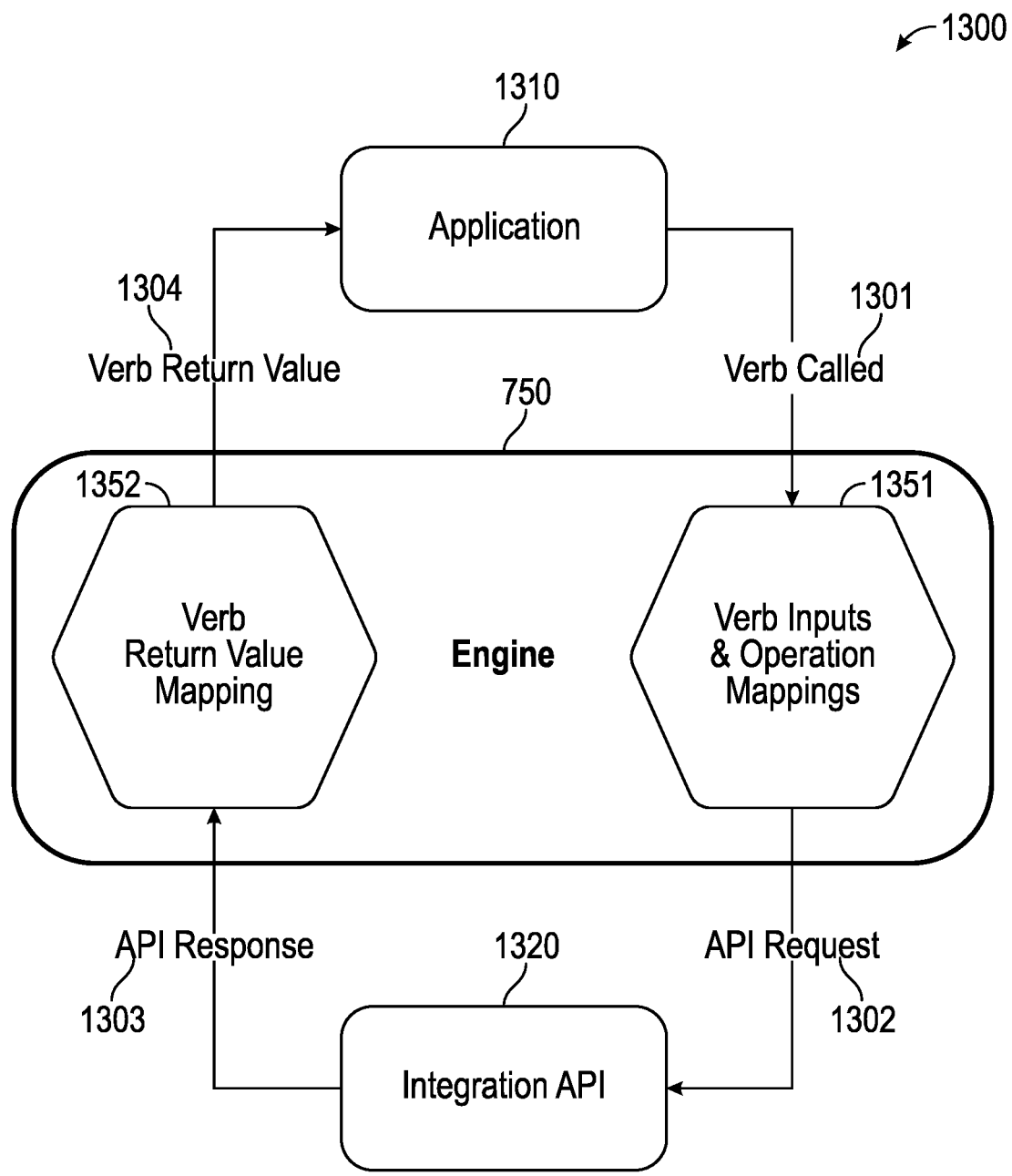
FIG. 13 is a flow diagram of a process executed by a Standard SDK, in accordance with an embodiment.

FIG. 13 is a conceptual diagram illustrating how an application may use a Standard SDK to interact with an Integration API, according to an embodiment. In this embodiment, an application 1310 needs to interact with an Integration API 1320 (e.g., to share a file, or otherwise change the permissions on a file hosted by the Integration). As described herein, the developer of application 1310 could choose to write custom code and logic to help interact with the custom functions provided by a proprietary SDK. Alternatively, as illustrated by SKL framework 1300, the developer may use a Standard SDK 1350, which has a standardized set of functions that facilitate interactions with a variety of Integration APIs and then use certain Schemas to determine exactly how to interact with a given Integration API 1320 in order to perform a certain operation, as represented by Verb 1301. The Standard SDK then uses the Verb 1301 and the corresponding Mapping or Mappings 1351 as configuration on its standardized functions in order to interact 1302 with the Integration API 1320. The Integration API 1320 then responds 1303 with data that may use a Mapping to transform 1352 according to the Schemas provided and thereby return the data 1304 to the application 1310 according to the Schemas and configuration provided.

Figure 14:
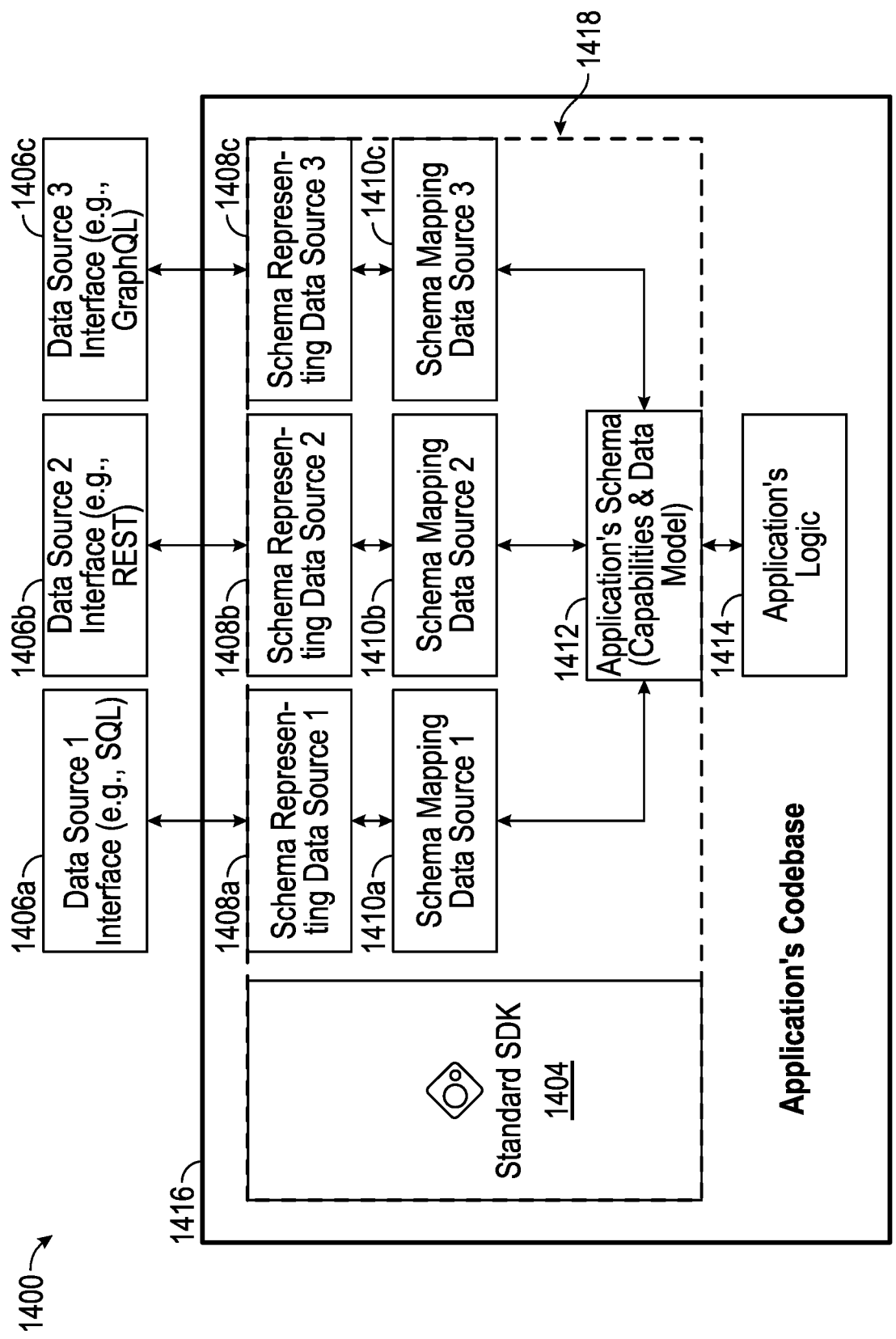
FIG. 14 is a visual representation of an application that uses a Standard SDK together with Schemas to integrate with various different data sources, in accordance with an embodiment.

FIG. 14 illustrates a non-limiting embodiment of a composition of a software application 1400 that uses a Standard SDK 1404 together with a set of Schemas and configurations to integrate three different data sources 1406a-c. In this example, the software application 1400 aggregates data from multiple sources and includes hard-coded logic 1414 to allow users to interact with and manipulate the consolidated data, as well as to create new data. As described herein, rather than using multiple SDKs to connect to the three data sources 1406a-c, the application's codebase may only interact with the one Standard SDK 1404. The one Standard SDK then uses a set of Schemas 1418 included in the application's codebase 1416 to facilitate interactions between the application's logic 1414 and the data sources 1406a-c.

In this embodiment, the Schemas 1418 included in the application's codebase 1416 may represent data and capabilities 1412 according to the application's needs (e.g., the application might need a data type for a person, and it may therefore define the Schema for a person and include whatever fields are needed, or it could use a copy of a commonly used data model for a person such as FOAF:person). In a similar way, the Schemas 1418 may also describe the data and capabilities of the data sources 1406a-c (e.g., using OpenAPI or OpenRPC). In this example, the last set of Schemas 1410a-c then establish relationships or Mappings between the data source Schemas 1408a-c and the application's Schema 1418.

In other embodiments, the application may reference a Schema from a data source external to the codebase 1416, including but not limited to a database, another application, a website, a Solid Pod, etc. In this example, the application's Schema 1418 could reference an ontology managed and hosted by third parties such as FHIR or Schema.org. Similarly, the application's codebase could reference an externally hosted Schema representing Data Source 1 1406a, such as an OpenAPI Schema stored on a public website or an external repository of Schemas compatible with SKL (e.g., an SKL library). As mentioned, in the event that one or more Schemas are not included in the application's codebase 1416, they could be requested for use by the Standard SDK at a specific point in time, such as when a certain process requires them.

According to an embodiment, the procedure for Standard SDK 1350 to execute a Verb 1301 of FIG. 13 may proceed in the following manner:

First, the Standard SDK finds the configuration for the Verb called by its name from the currently set Schema source. The Schema source may, for example, be the SKL Library REST API, an object in memory of the application code being executed, or a remote SKDS. The Schemas may be accessed using SKQL or a custom method, for example by submitting queries in the native query language of the SKDS.

Second, the Standard SDK may assert the validity of the input arguments supplied according to the Verb's configuration. The Verb's configuration may specify for each parameter (1) what its name is, (2) if it is required or not, (3) if it is allowed to be null, and (4) its data type. Its data type may, for example, be either a scalar data type (e.g., String, Boolean, Integer, etc.), or a reference to a Noun. The Standard SDK may also return an error if the inputs are invalid.

Third, the Standard SDK may perform the Mapping(s) defined in the configuration of the Verb to obtain the inputs and operation to perform the Verb.

Fourth, the Standard SD may perform the Verb's operation. Different types of Verbs and their associated Mappings may result in different types of operations. For example, a VerbIntegrationMapping may specify that the Verb should use an OpenApi description for the Integration's REST API endpoints to send an HTTP request and obtain the response. A VerbQueryLanguageMapping may specify that the Verb should execute a SQL request with inputted username and password credentials via an HTTP request to a specific server running PostgreSQL. A VerbCodeMapping may specify that the Verb should execute a certain function or method of a code package and obtain the response. In another embodiment, Standard SDK may perform operations via other methods such as a Remote Procedure Call (RPC) according to an OpenRPC specification.

Fifth, the Standard SDK may support one or more types of operations by the Standard SDK Code Package.

Sixth, the Standard SD may obtain the response from performing the Verb's operation.

Seventh, the Standard SDK may perform the Mapping defined in the configuration of the Verb to obtain the standardized output of the Verb.

Eighth, the Standard SDK may assert the validity of the outputs according to the Verb's configuration. Throw an error if the outputs are invalid.

Ninth, the Standard SDK may return the outputs of the Verb.

The foregoing process is provided merely as illustrative examples and is not intended to require or imply that the steps must be performed in the order presented. The steps in the foregoing embodiment may be performed in any order.

A conceptual example helps illustrate the Standard SDK procedure. A developer of a file management application needs to get the contents of a folder stored on Google Drive®. They may use the GETFILESINFOLDER Verb to do so, as long as the user has it installed. When calling STANDARDSDK.GETFILESINFOLDER(ARGUMENTS), a Standard SDK may first use SKQL to check the source SKDS if a Verb with such a name is "installed." If not, an error may be returned to the developer, which may be presented to the end user telling them to install the necessary Verbs and/or Mappings. In some embodiments, the StandardSDK might automatically look for the Verb elsewhere (e.g., the SKL Library) and ask the user or developer if they want to use that Verb. If the Verb is installed, Standard SDK may search for the appropriate Mapping to translate the inputs of the standard GETFILESINFOLDER Verb to the specific inputs and URL of the Google Drive® API endpoint to obtain the contents of a folder. The Standard SDK code package may handle parsing Schemas and Mappings and the translation of the inputs and outputs of the Verb. In this way, a developer only interacts with the standards specified in their SKL Schemas.

In some embodiments, a Verb may be called as a function on the root Standard SDK object, or as an instance method on any instance of an SKL Noun. In other words a developer may call STANDARDSDK.SAVE(FILE) where StandardSDK is the "root StandardSDK object" or they may call FILE.SAVE( ) when FILE is an instance of an SKL Noun.

In other embodiments, the module or library could be called anything (e.g., SKQL.DO.SAVE(FILE) rather than STANDARDSDK.SAVE(FILE)) and Verbs can be called via any means, such as a top-level method or function, a nested method or function, as an argument to another method or function, etc.

In some embodiments, a Verb may be mapped to multiple operations and/or functions of one or more Integrations or Code Packages which may be executed in series or parallel. The responses of one or more of these operations or functions may be translated to the standard output of the Verb.

Figure 16:
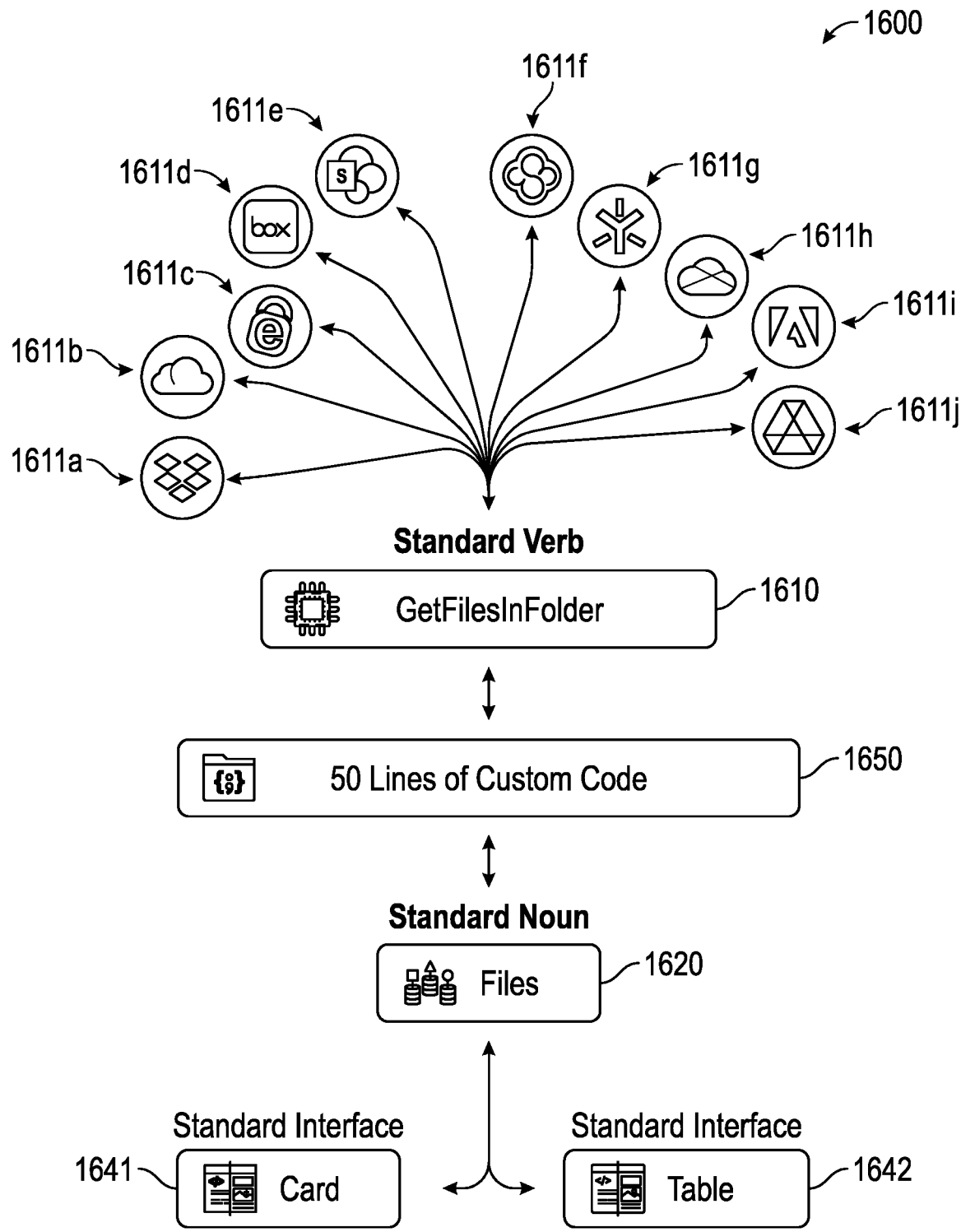
FIG. 16 is a illustrates a conceptual diagram of how a developer may leverage the concepts behind SKL to integrate with many different applications and/or accounts.

FIG. 16 illustrates a conceptual diagram 1600 of how the developer of the file management application above can leverage the concepts behind SKL to easily integrate with many different applications and/or accounts 1611a-j using the same GETFILESINFOLDER Verb 1610. In this example conceptual example, the developer above wrote custom logic 1650 in order to recursively call the GETFILESINFOLDER Verb 1610 over every nested FOLDER returned by GETFILESINFOLDER Verb 1610 the so that users of the file management application can sync all the FILES and FOLDERS they may have on a given Google Drive® account 1611j. In this case, the GETFILESINFOLDER Verb 1610 may accept a FOLDER and Google Drive® account 1611j as the arguments that the StandardSDK can use to query the data source API with. The StandardSDK using the GETFILESINFOLDER Verb 1610 automatically transforms the data according to the Schemas and provided to the application according to the FILE and FOLDER Nouns in the Schemas. This means that the custom logic described in the applications code base, only needs to interact with these Schemas and therefore no (or almost no) additional custom logic is needed to integrate with the other applications 1611a-i. All that the developer needs is to provide is the additional Schemas that correspond to each Integrations and the Mappings and the StandardSDK will be able to return the data according to the Schemas of FILE and FOLDER Nouns. Any additional capabilities provided by the developer as part of the application (e.g., card interface 1641 and table interface 1642) can be built to only interact with the Schemas of FILE and FOLDER Nouns, and can thereby also automatically work once the developer (or the users) provides the application with the necessary Schemas.

Figure 15:
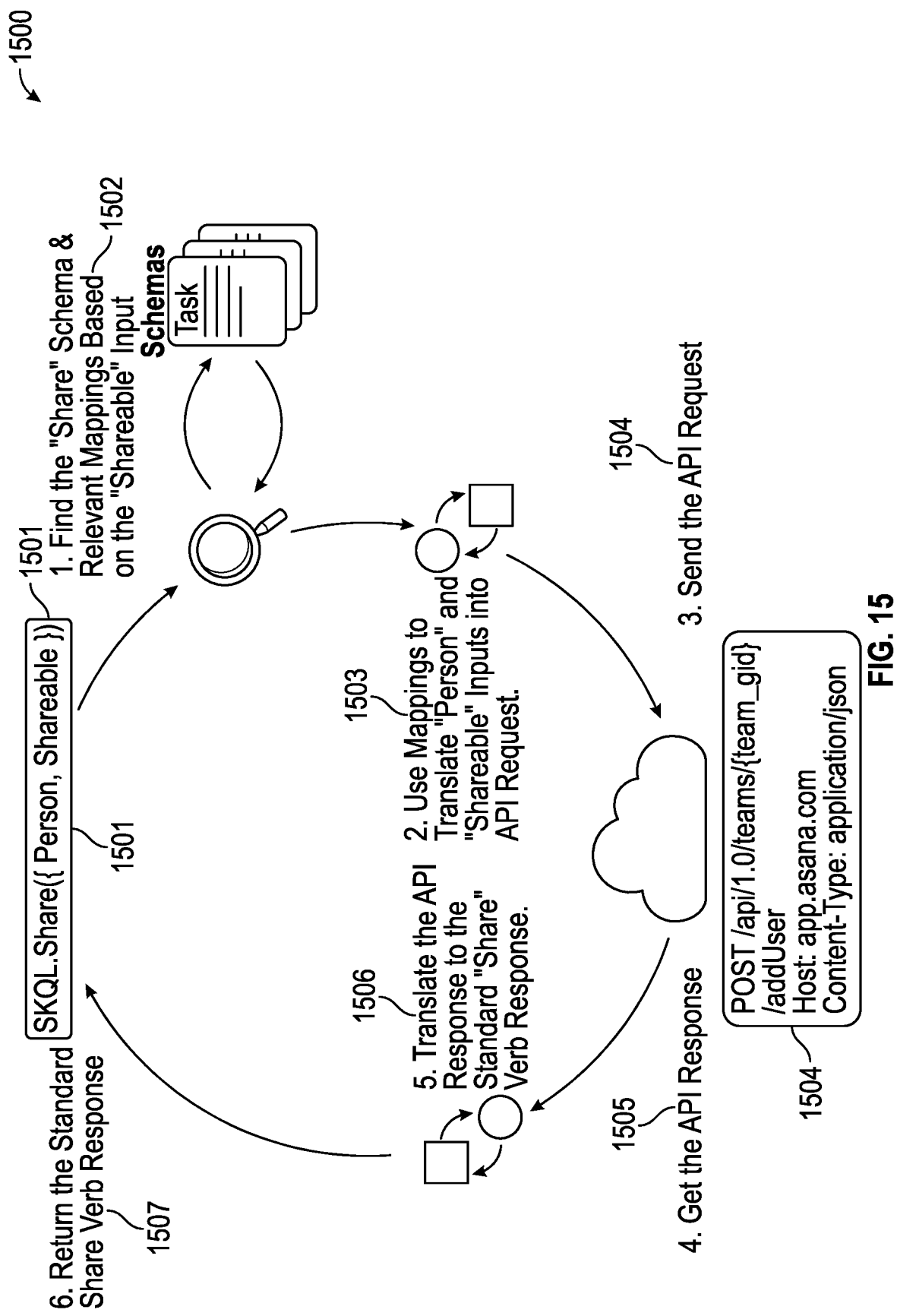
FIG. 15 is a flow diagram of a representation of a Shared Knowledge Language process, in accordance with an embodiment.

FIG. 15 illustrates a flow diagram of a representation of a Shared Knowledge Language process 1500, in accordance with an embodiment. At step 1501 an application uses a Standard SDK to call a SHARE Verb with shareable Entity (e.g., a task) and a PERSON Entity (or an ACCOUNT Entity if a person has more than one ACCOUNT). At step 1502 the Standard SDK find the Schemas and relevant Mappings for that correspond with the PERSON, the shareable Entity, and the Integration(s) associated with the PERSON and the shareable Entity (e.g., from the codebase, from an SKL Library, etc.). At step 1503 the Standard SDK uses the Schemas and Mappings to translate the arguments provided to the SHARE Verb (e.g., the PERSON Entity and the shareable Entity) into the formats expected by the Integration API. At step 1504 the Standard SDK uses its standard functions, such as EXECUTEOPENAPIOPERATION( ), to send a request to the corresponding Integration's API endpoint according to the API's specification (e.g., as defined through its OpenAPI spec). At step 1505 the Integration's API returns the data to the Standard SDK. At step 1506 the Standard SDK uses the Schemas and Mappings to transform the Integration API's response to the expected outputs of the SHARE Verb. At step

1507 the Standard SDK returns the standard response from the SHARE Verb to the application.

Figure 17:
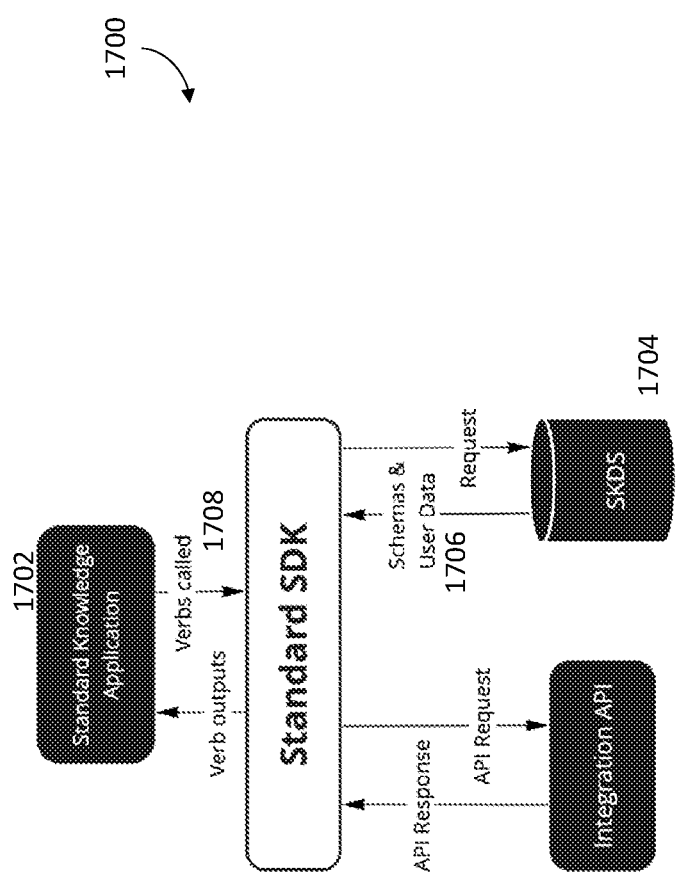
FIG. 17 is a flow diagram of a Shared Knowledge Language framework using a Standard SDK, in accordance with an embodiment.

Turning now to FIG. 17, the flow of data in the SKL framework 1700 is shown. A Universal File Browser application 1702 which displays to users all their files and folders from multiple Integrations (e.g., Dropbox®, Google Drive®, OneDrive®, etc.) is shown. The application 1702 may contain code which uses Verbs to recursively request and copy the Metadata of all files and folders within a user's accounts regardless of what service they exist in so that it may display them to the user.

Instead of the developer storing the Metadata about files and folders in a siloed database they control, the developer may store the data in a user's SKDS. The SKL framework 1700 includes Schema 1706 and special Verbs 1708 for querying and saving data to SKDS 1704.

In the future, the user may use another SKApp for signing documents. This application, once authorized by the user to read data from their SKDS, may query for Entities conforming to the standard FILE Noun in the SKDS which the user may need to sign. In this way, the two applications may interoperate on the same data because they have a common understanding of its Schema.

Referring back now to FIG. 1B and FIG. 3, a non-limiting embodiment of a Standard SDK framework is shown. Application 121*a-f* of FIG. 1B may use a Standard SDK to integrate with all other applications 121*a-f* by only building one integration each. A first application 121*a* may be considered as application 150 of FIG. 3, and the other applications 121*b-f* that need to be integrated with the first application 121*a* may be thought of as applications 130 of FIG. 1B.

Application 121*b-c* may use a Standard SDK together with the Schemas and Mappings to integrate with each other, without requiring a central server to act as a "unified API" by having all interactions route through it. In this embodiment, the various applications may, communicate with each other in a one-to-one manner, similar to network of integrations 110, but rather than translating information directly from the first application 121*a* to the other applications 121*b-f*, each application only needs to be integrated once with a given standardized ontology, and through that standardized ontology, they may be integrated with each other. This non-limiting embodiment demonstrates that a SKL framework may be a highly composable and customizable. Through the abstraction of software, and providing access through an ontology, SKL allows each independent software developer to reuse components such as Mappings for other integrations.

An SKL, framework may enable the reuse of components across software applications, codebases, and more by providing composable Schemas to link components together. For example, in the process of creating an application, a developer may create Mappings between the FHIR ontology and twenty different healthcare platforms. Those twenty integrations may then be shared with other applications and developers (e.g., through the SKL Library). Over time, certain ontologies may emerge as "standards" in a given domain area and/or within a given industry. In this embodiment, developers and end users may remain in control of the Schemas and the Standard SDK so as to make changes to any standard according to a specific need.

Figure 19:
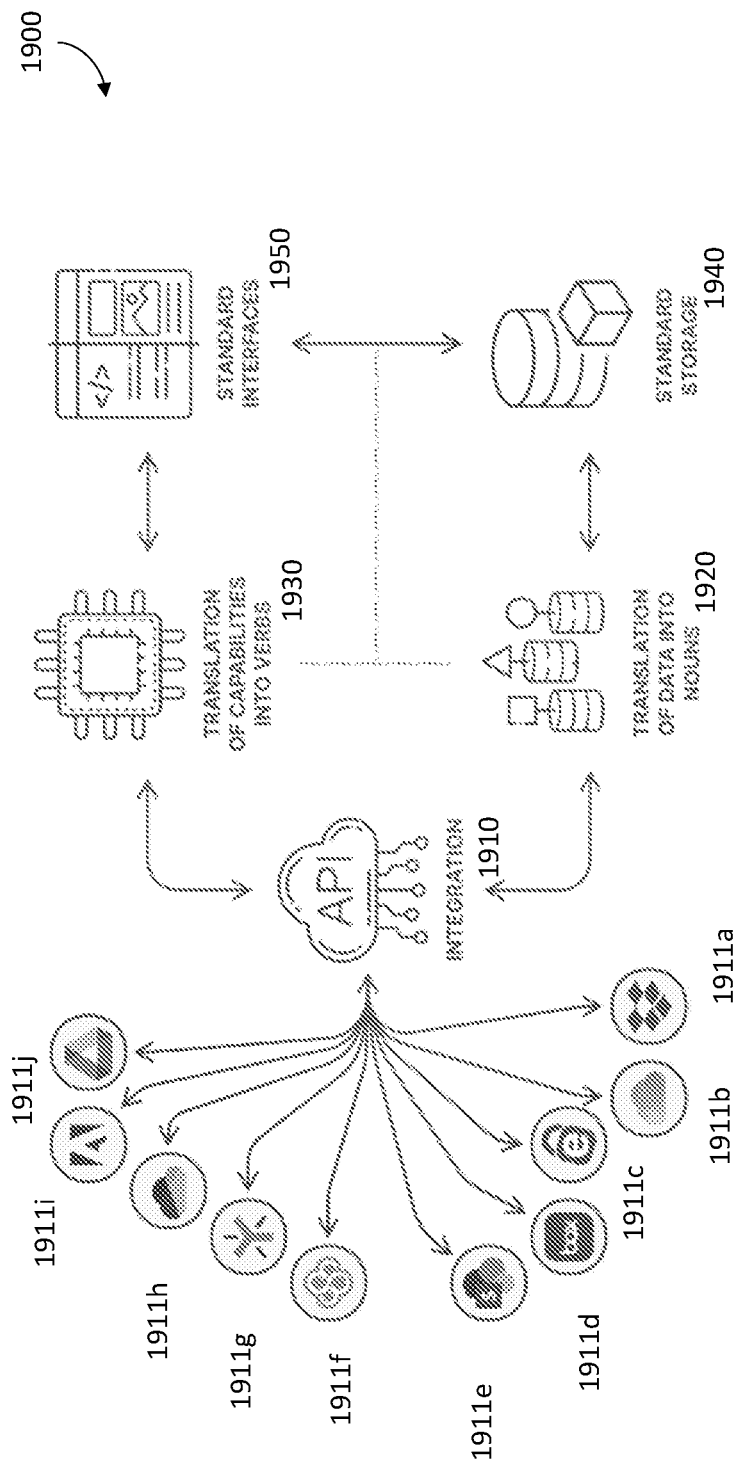
FIG. 19 is a visual representation of various components that make up a Standard Knowledge Language framework, in accordance with an embodiment.

FIG. 19 illustrates a conceptual diagram of various components that make up Standard Knowledge Language framework 1900, according to an embodiment. In this embodiment, SKL is a protocol that may be built to work with a wide variety of software, regardless of whether that software was built according to an SKL specification or not. As such, in this embodiment, there may be an abstraction/translation of software and components (e.g., proprietary APIs and their data) into a universal language of data, capabilities, interface components, storage solutions, and more. As described herein, the various components are represented abstractly through Schemas which include Nouns 1920, Verbs 1930, Integrations 1911, Interfaces 1950, and the like.

According to this embodiment, Standard Storage 1940 may be an SKDS provider that offers various different types of SKDSs. Similar to how Integrations 1911*a-j* may each be represented by Schema such as an OpenAPI specification that SKL tooling may use, each SKDSs offered by Standard Storage 1940 may be represented through an SKDS Schema.

Abstractions that represent data as Nouns 1920, capabilities as Verbs 1930, interfaces as Interfaces 1950, and data stores as SKDS Schemas may assist the SKL framework 1900 to understand each piece deterministically in a standard way. By centering all software components around an ontology, and providing tooling to help build software semantically, each component may represent data based on what it is rather than where it comes from or how it is stored. Each component may access a capability in a standard way regardless of whether that capability is executed remotely or not. Each component may be able to access data from a data store regardless of whether they know the how that data store handles persistence, and so on. Furthermore, because these abstractions or Schema may be stored as a configuration, they may easily be shared across programming languages, execution environments, etc. In this way, these abstractions may be easily ported and/or shared between tools. Moreover, because SKL components may be connected through Mappings, and because their Schemas may specify their attributes as configuration, SKL systems may be able to evaluate which components are compatible with their needs in a standard way.

Due to the modular nature of the SKL ecosystem's components, in some embodiments each type of component may be used independently. According to some embodiments, every component need not be used together. For example, a developer of an existing application (e.g., Gmail®) could choose to use a Standard SDK to build integrations with other tools. Similarly, a developer could choose to build a SKApp that communicates with SKDSs without using other components. In yet another non-limiting example, a developer could choose to use SKApp with Standard Interfaces that connects to an Integration without using an SKDS.

According to some embodiments, as more Schemas are created for a wider variety of components and needs, and as those component Schemas are mapped to more ontologies, it may become increasingly easy for developers and users to develop solutions with SKL. In other words, because SKL is highly composable and parametric, it may have the ability to offer value to its users because any component for a solution may be able to be reused and repurposed for a second solution with ease. As more applications, platforms, and data sources are mapped to a given ontology, the easier it may be to integrate novel software into that industry or domain area. For example, in some embodiments, developers may be able to integrate with a given ontology to connect to a theoretically infinite number of applications. In this way, SKL technologies and methods may replace any closed and proprietary "unified API" service that restricts application developers from extending capabilities such as which integrations the unified API supports, that requires the application using the unified API to route all data through their the unified API company's servers, that charges high amounts per throughput, etc.

Figure 20:
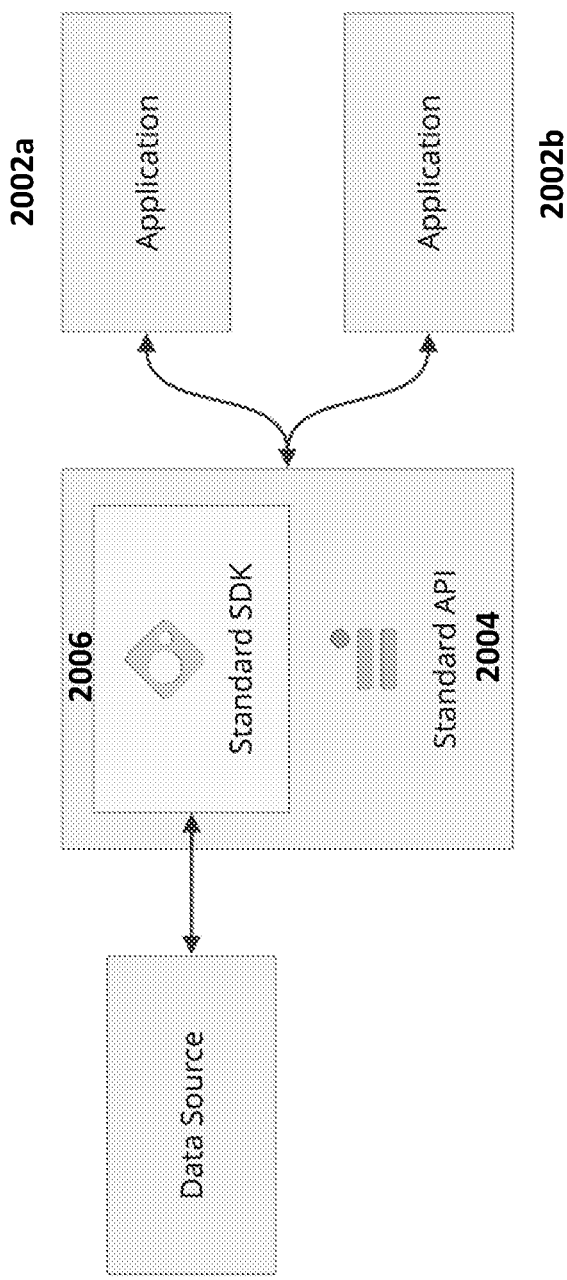
FIG. 20 is a visual representation of two different applications using a single Standard Knowledge Framework to access a single data source, in accordance with an embodiment.

Turning now to FIG. 20, two different applications 2002a-b using a Standard API 2004 (as described herein) are shown. In this embodiment, the standard API 2004 may use Schemas to expose endpoints corresponding to Nouns and Verbs.

Figure 21:
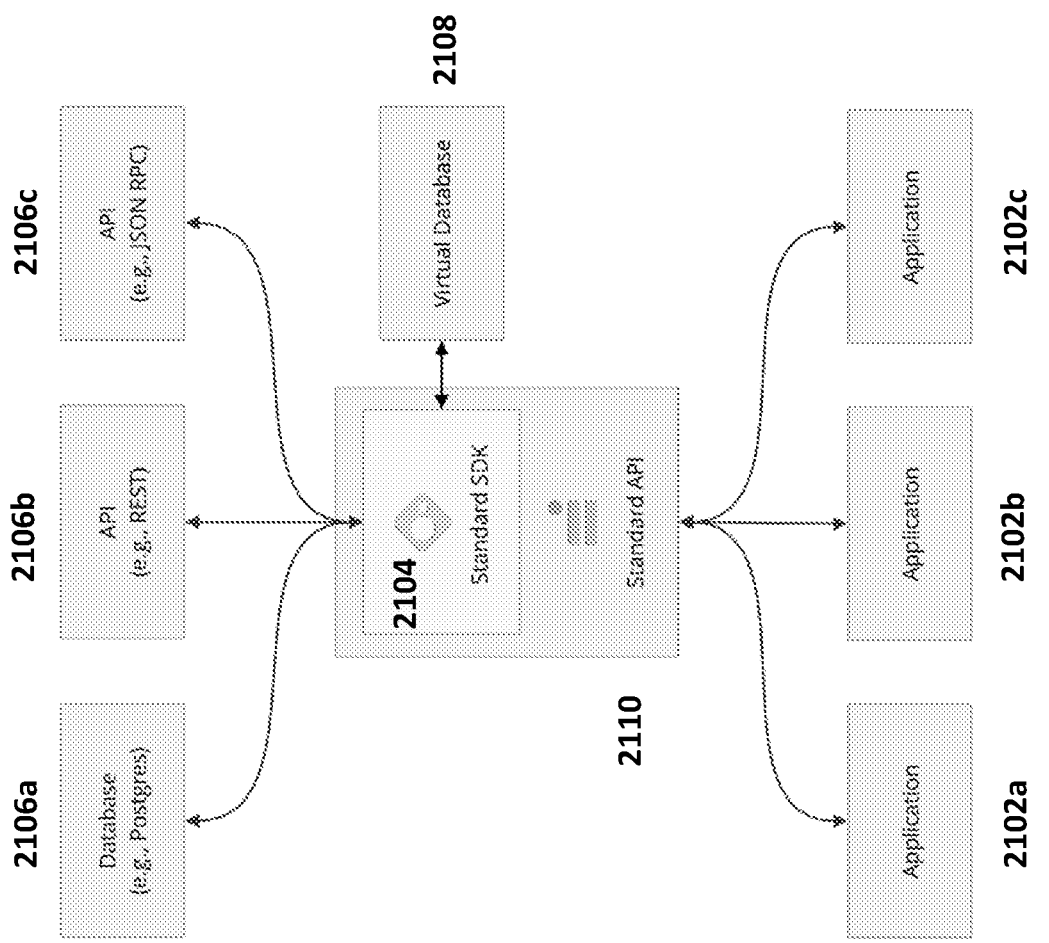
FIG. 21 is a visual representation of three different applications using a single Standard Knowledge Framework to integrate with three distinct sources of data, in accordance with an embodiment.

FIG. 21 shows an embodiment wherein multiple applications 2102a-c use a Standard A 2110 (as described herein) that may use Schemas to expose endpoints corresponding to Nouns and Verbs in order to interact with multiple Integrations. In one embodiment, a Standard SDK 2104 may use a Virtual Database 2108 technology which, when queried through the Standard API 2110, federates requests to multiple databases, multiple tables of those databases, and/or multiple Integrations to construct a complete response in the format of the domain model. Such a Virtual Database 2108 could be used not only to federate queries to multiple databases but also to one or more web APIs 2106b (e.g., REST, GraphQL, etc.), or files 2106c (e.g., JSON, CSV, etc.).

Figure 22:
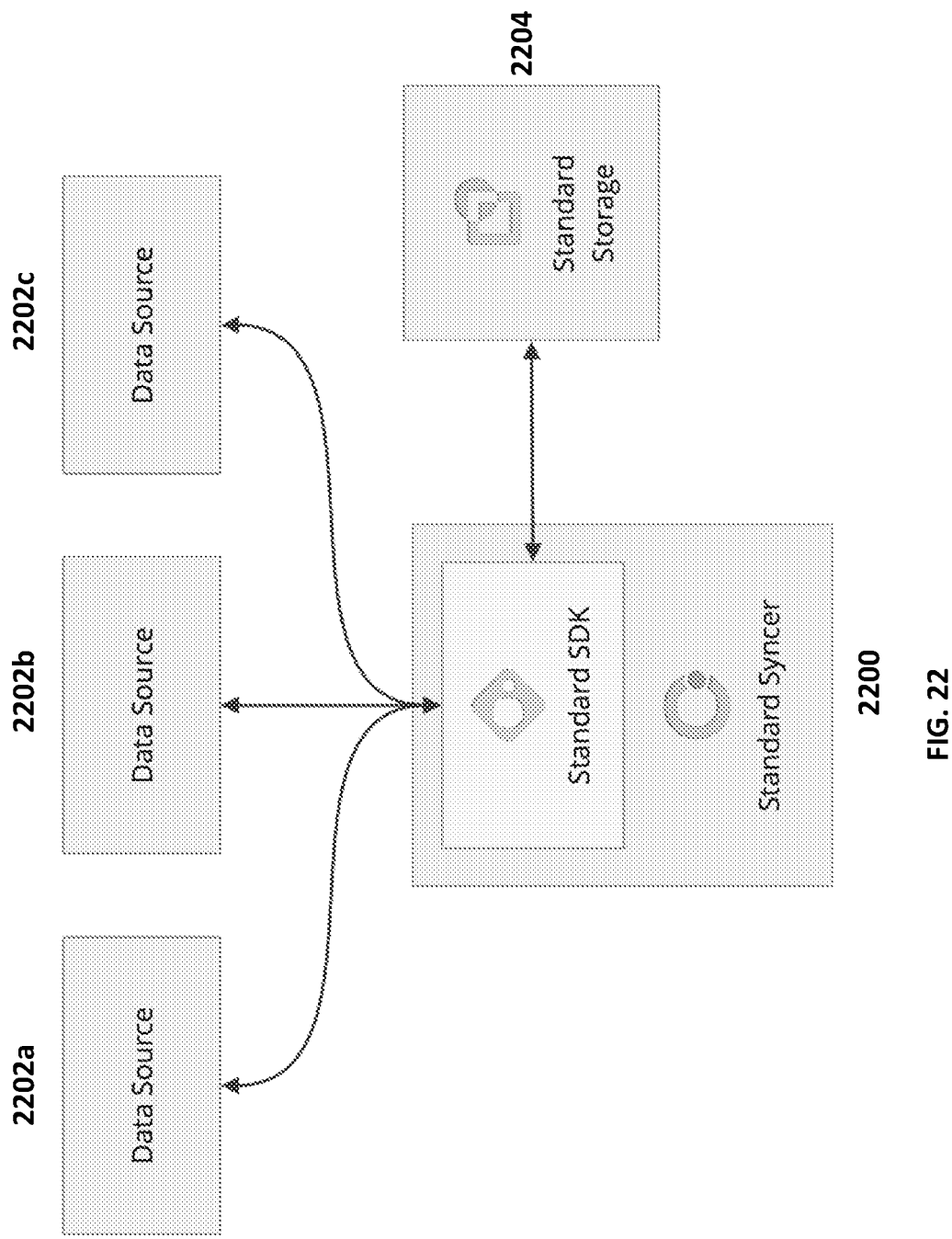
FIG. 22 is a visual representation of Standard Syncer pulling data from three distinct data sources through the use of a single Standard SDK, in accordance with an embodiment.

In yet another embodiment, FIG. 22 illustrates a single SKApp 2200 (in some embodiment called a "Standard Syncer") which may be used to continuously sync information from multiple data sources, databases, and/or Integrations 2202a-c into a standard knowledge data storage ("SKDS") 2204 that may be used by other applications (e.g., SKApps).

Figure 23:
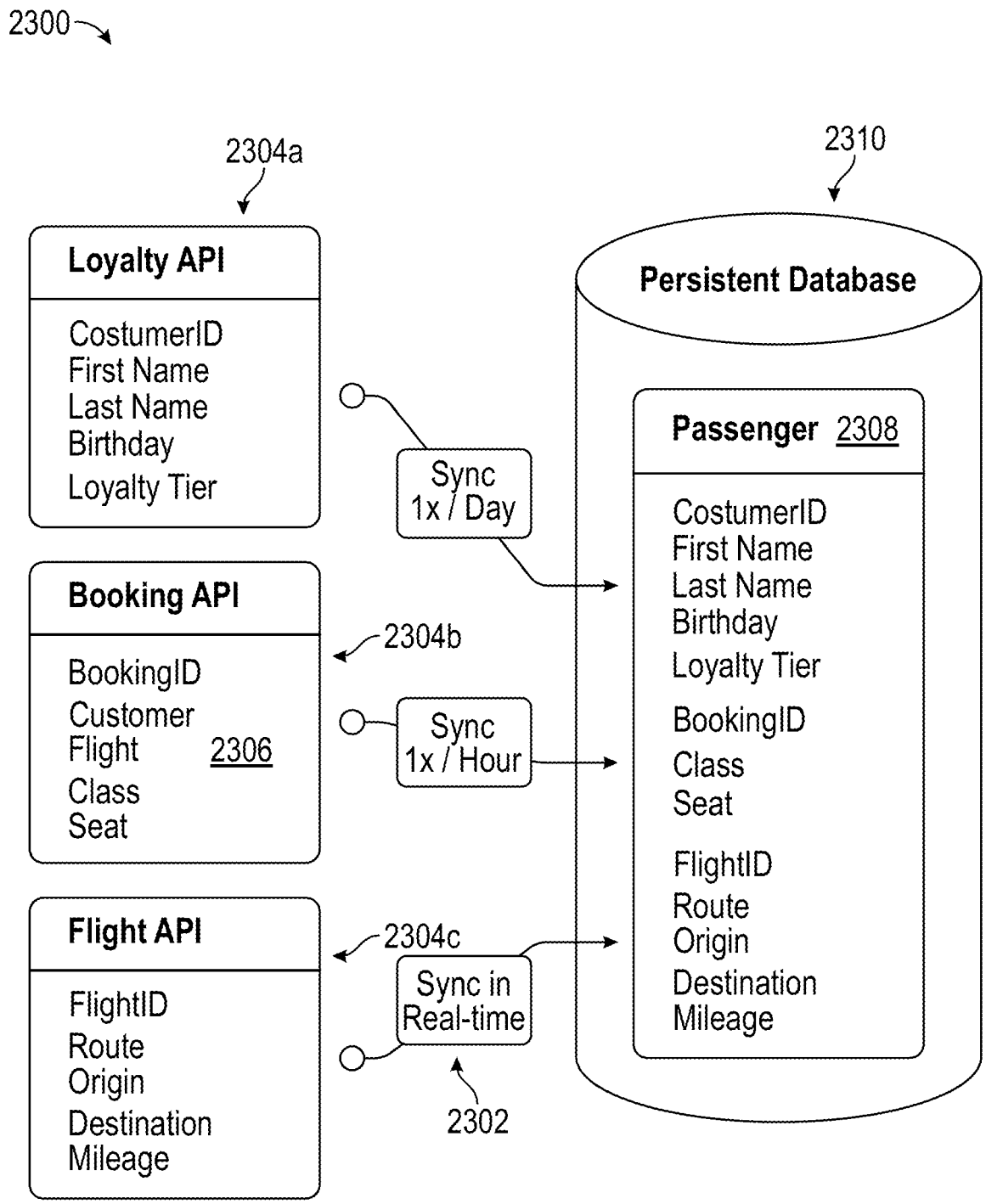
FIG. 23 is a visual representation of a Persistent Database with contents from various constituent databases, using a Standard Syncer, in accordance with an embodiment.

FIG. 23 illustrates how the Standard Syncer SKApp of FIG. 22 may be configured to "coordinate" syncing 2302 from the different data sources in custom ways (e.g., using a cron schedule). In this embodiment, the Standard Syncer SKApp 2300 may be considered a Coordinator. In this embodiment, the Standard Syncer SKApp may be used to consolidate data from multiple source into a unified data model which is described by Nouns. In this example, the unified data model (i.e., the ontology) includes FLIGHT 2306 and PASSENGER 2308 Nouns The Entities are stored on a persistent database or an SKDS 2310.

Automations and Rules Engines

Figure 24:
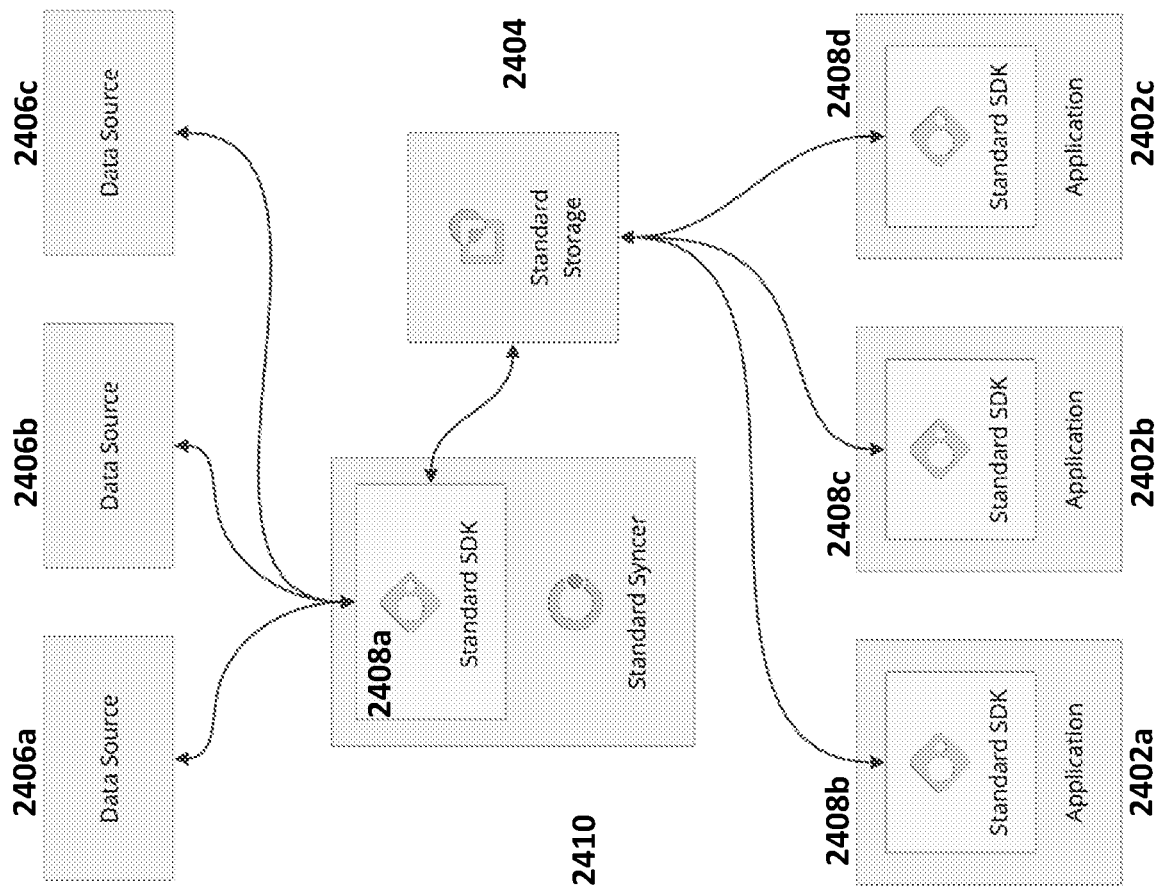
FIG. 24 is a visual representation of several applications using a Standard SDK to access data from a data storage, in accordance with an embodiment.

Turning now to FIG. 24. According to some embodiments, a process is shown in which applications 2402a-c may query an SKDS 2404 for data synced from multiple data sources 2406a-c using a Standard SDK 2408a. In this non-limiting embodiment, each SKApp 2402a-c may use a Standard SDK 2408b-d to access the SKDS's 2404 Schema to feed data into interfaces, such as those for a rules-engine SKApp illustrated in FIGS. 25-28. FIGS. 25-28 correspond various interfaces of the same rules-engine SKApp.

Considering the Standard Syncer SKApp of FIG. 23, the Standard Syncer SKApp 2410 may be used to consolidate data from multiple sources into a unified data model which is described by Nouns. In this example, the unified data model (i.e., the ontology) includes FLIGHT and PASSENGER Nouns. The unified data model may then be used by SKApps (e.g., 2402a-c) to create a filtered and ordered list of PASSENGERS for any given FLIGHT that meet certain criteria according to the values on the fields of the PASSENGER and FLIGHT Entities as illustrated in FIG. 25.

Figure 25:
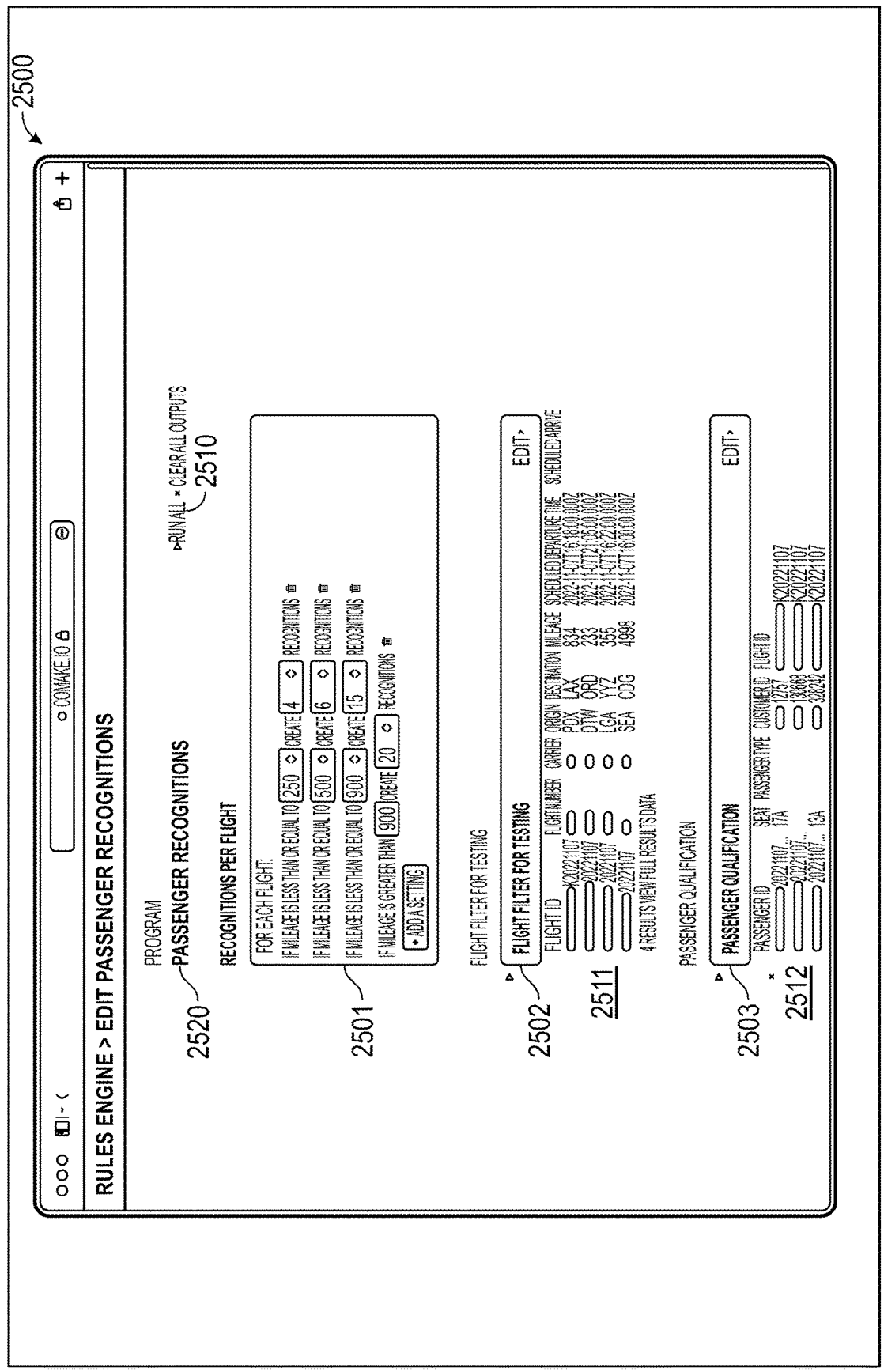
FIG. 25 is a graphical user interface displayed by a rules engine, in accordance with an embodiment.

FIG. 25 slow a non-limiting embodiment of the interface for a rules-engine SKApp 2500 that allows non-technical users to easily customize the parameters for how PASSENGERS are filtered on a given FLIGHT. In this example, interface component 2501 can be used by a non-technical user to determine variable numbers of PASSENGERS in each list of PASSENGERS according to certain parameters associated with a FLIGHT. As depicted, interface component 2501 can use the travel distance (e.g., the MILEAGE property) of a FLIGHT Entity in order to establish that: a list of 4 PASSENGERS should be generated for FLIGHTS with a travel distance of less than or equal to 250 miles; a list of 6 PASSENGERS should be generated for FLIGHTS with a travel distance greater than 250 and less than or equal to 500 miles; a list of 15 PASSENGERS should be generated for FLIGHTS with a travel distance greater than 500 and less than or equal to 900 miles; and a list of 20 PASSENGERS should be generated for FLIGHTS with a travel distance greater than 900. Interface component 2502 illustrates how non-technical users may create, modify, and use certain FLIGHT filters in order to facilitate the testing of a particular overall configuration for a program 2520 on the rules-engine 2500. Similarly, Interface component 2503 illustrates how non-technical users may create, modify, and use certain PASSENGER filters or qualifications that should be applied to all PASSENGERS that get added to any list generated by the program 2520.

Figure 27:
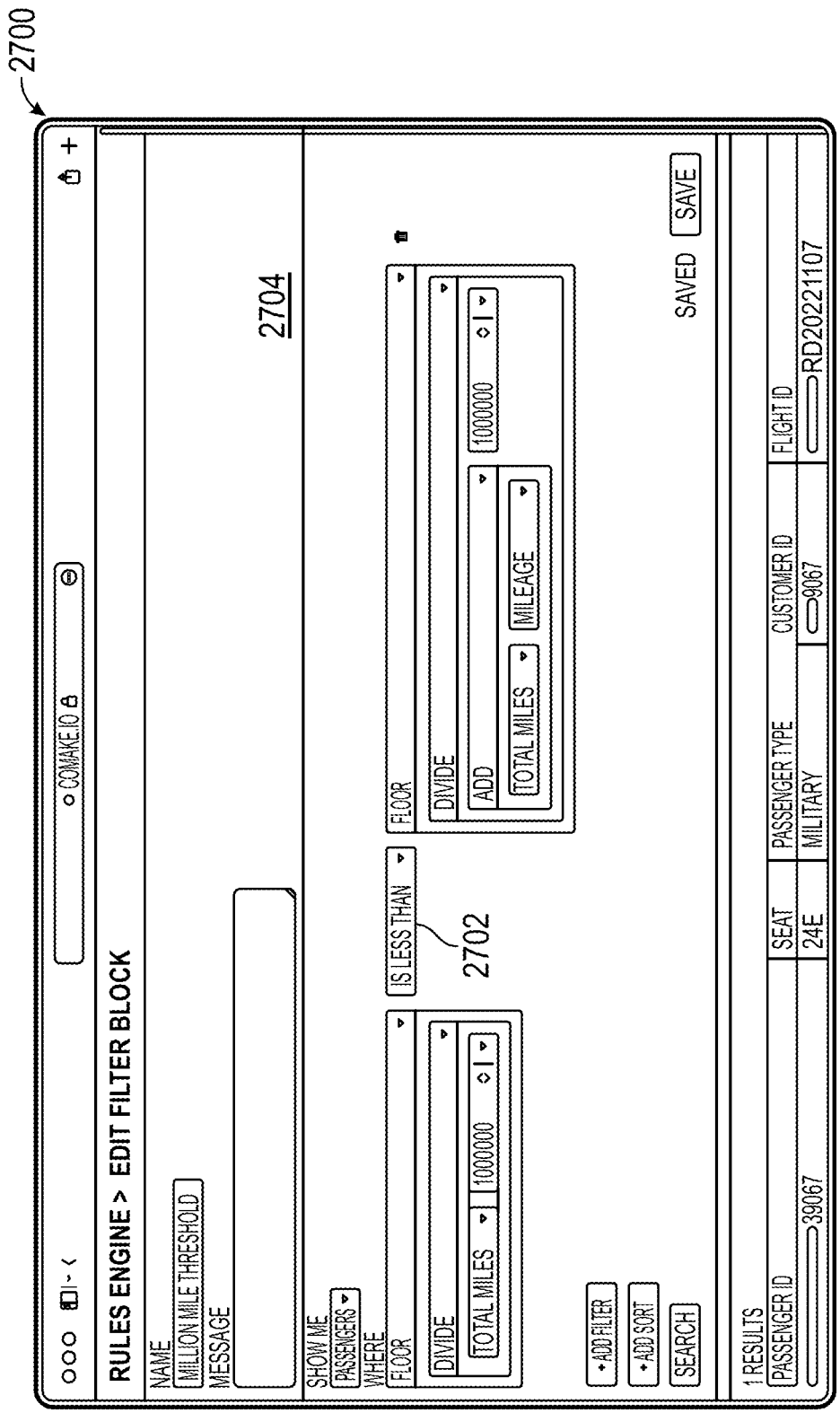
FIG. 27 is a graphical user interface displayed by a rules engine, in accordance with an embodiment.

Non-technical users are able to test the program 2520 by using running it according to the configuration set through interface components 2501, 2502, and 2503. The interface component. 2510 provides a simple way for non-technical users to click a button that will automatically query the SKDS 2404 for Entities that match the criteria established through interface components 2501, 2502, and 2503. The resulting data after each step can be seen contextually on the SKApp's interface 2500. Interface component 2511 shows that four FLIGHT Entities were identified in SKDS 2404 that match the configuration set through interface component 2502, and lists out certain fields associated with those flights as well as the ability to see more detail associated with the results. Interface component 2512 shows that at least three PASSENGER Entities were identified in SKDS 2404 that match the configuration set through interface component 2503. FIG. 27, described further below shows the continuation of the interface 2500 and how there are 198 PASSENGERS that meet the criteria determined through interface component 2503.

FIG. 26 shows a non-limiting embodiment of how the Schemas for the PASSENGER and FLIGHT Nouns shown in FIG. 23 may be used to populate information into the interfaces shown by the rules-engine SKApp 2600. According to this embodiment, exemplary fields include LAST_FLOWN 2602a, LOYALTY_NUM 2602b, and BIRTHDAY 2602c. The SKApp 2600 could use an Interface Component 2604 which accepts one or more Noun Schemas as inputs in order to provide filtering capabilities based on the properties associated with those Schema(s). Simple query logic, such as is EQUAL TO, is GREATER THAN, CONTAINS, etc. could then be used to evaluate whether a given Entity of that type of Noun in the SKDS matches the query provided. Interface Component 2605 could then provide a detailed list of Entities that match the filtering criteria provided in Interface Component 2604, similar to Interface Components 2511 and 2512. Additional capabilities, such as sorting may also be used as is shown on in Interface Components 2603a and 2603b. In this example, the PASSENGER Entities that match the filters 2602a-c should be sorted in ascending order by LAST_FLOWN (as shown in Interface Component 2603a) and any PASSENGERS with the same value on LAST_FLOWN should be consecutively sorted in descending order by the LAST_FLOWN parameter (as shown in Interface Component 2603b). The SKApp could then save these filters as a configuration (e.g., as an Entity of the RECOGNTIONCATEGORY Noun with a given name or ID shown as "Welcome Back" in Interface Component 2610) along with a related Entity of type MESSAGE as shown in Interface Component 2620.

FIG. 27 shows the configuration for a different Entity of the RECOGNTIONCATEGORY Noun (e.g., "Million Mile Threshold") in the Interface Component 2700, which could expose more sophisticated filtering capabilities, such as using an equation 2702. The example below shows an Interface Component 2700 that may be used to build a query 2704 (e.g., using SKQL, or SQL: SELECT PASSENGER FROM FLIGHT WHERE FLOOR (TOTAL_MILES/1,000,000)<>FLOOR (TOTAL_MILES+MILES_TODAY/1,000,000)) that may be saved and/or sent directly to the SKDS. The different Entities of type RECOGNTIONCATEGORY could be used to save different configurations and/or filters that can be used to create different lists of PASSENGERS that match different criteria.

Figure 28:
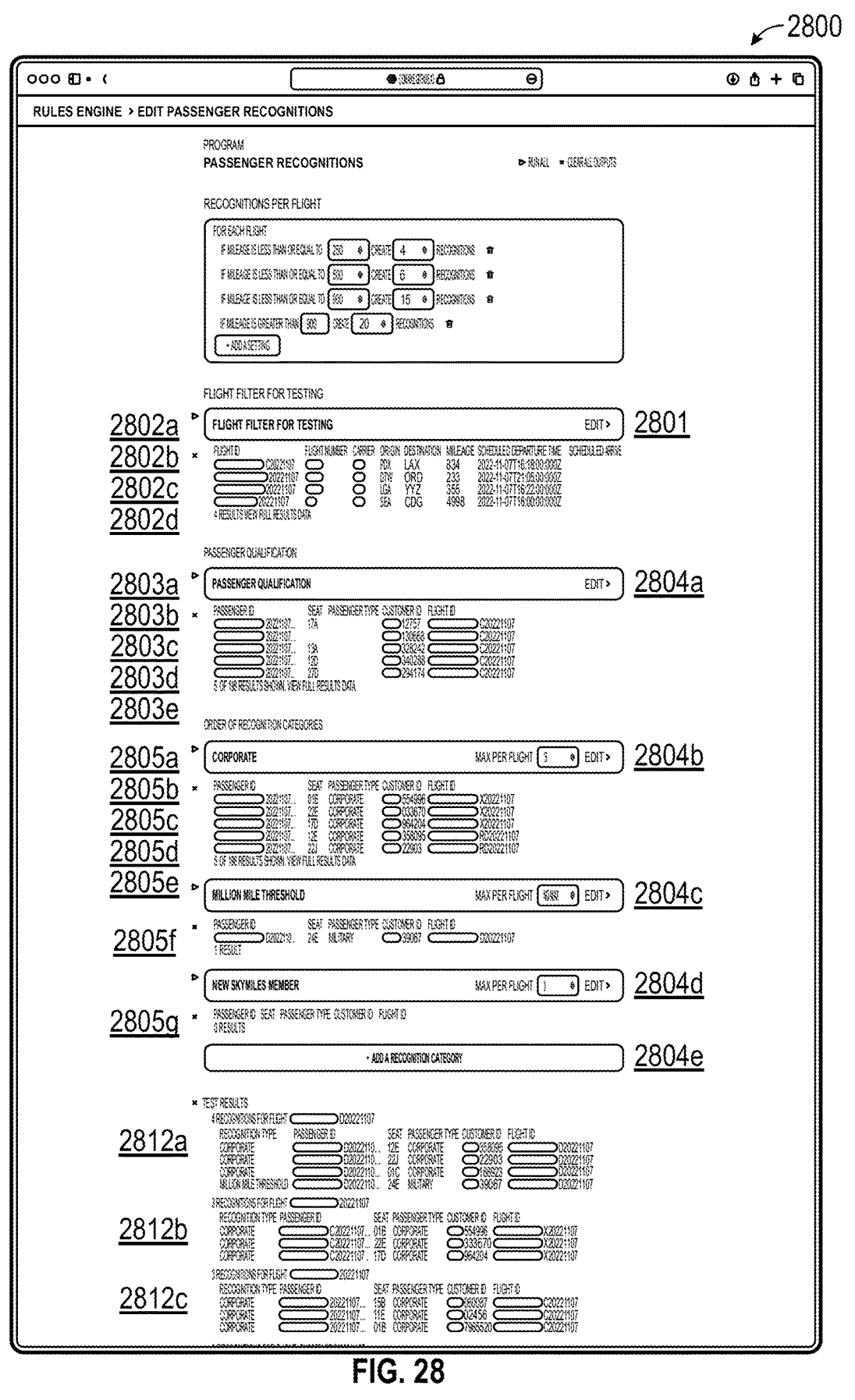

Turning now to FIG. 28, which shows the rest of the interface 2500, according to a non-limiting embodiment. Interface 2800 shows all the configuration and test results for steps of a the program 2520. In this example, a Verb GENERATERECOGNITIONS may be configured to create recognitions for one or more Entities of type FLIGHT. For example, the four flights 2802a-d could each be taken through a series of consecutive steps as may be defined in the GENERATERECOGNITIONS Verb. These steps may be defined in several ways, including by creating other Verbs such as GENERATERECOGNITIONSFORCATEGORY which could require an Entity of type RECOGNITIONCATEGORY to specify the configurations for the filtering that would be specified by an Entity of RECOGNITIONCATEGORY (e.g., Corporate, MillionMileThreshold, LoyaltyMember). In this example, the four flights 2802a-d are each run through the program 2520 by first filtering the passengers on those flights by the criteria set at step 2804a, which returns 198 passengers, of which the first five of which are shown in Interface Components 2803a-e. The program 2520 then filters the 198 passengers on those flights by the Entities of RECOGNITIONCATEGORY shown in interfaces 2804b-d. According to this embodiment, the steps 2804b-d are run on each flight in order starting with 2804b, then 2804c, and finally ending with 2804d. A use could edit the configuration for the "Million Mile Threshold" RECOGNITIONCATEGORY 2804c by clicking "Edit" which would bring up interface 2700.

According to this embodiment, a user could easily create new and/or add existing Entities of RECOGNITIONCATEGORY (e.g., such as the "Welcome Back" Entity shown in FIG. 26) by clicking the interface component 2804e. A user may also click and drag to change the order of RECOGNITIONCATEGORIES 2804b-d. Each of these changes could be saved as configuration in a different Entity of type RULESENGINEPROGRAM, where the configuration of number of passengers per flight 2501, the flight filters for testing 2801, the overall passenger qualifications 2804a, and the various recognition categories and their order 2804b-d (which may be stored as references to the RECOGNITIONCATEGORIES Entities 2804b-d) could be the information stored by the Entity. In this example, the GENERATERECOGNITIONS Verb could accept a given FLIGHT Entity as well as a RULESENGINEPROGRAM Entity (e.g., program 2520) and take the flight through all the steps of program 2520 in order to output the resulting data, which in this case is a list of passengers that should be recognized on the flight Entity provided to the Verb. For the sake of testing, the interface 2800 can show the user the resulting lists of passengers that should be recognized on each flight as shown in interface components 2812a-c, as well as the corresponding RECOGNITIONCATEGORY that resulted in that passenger being recognized on that flight.

In another embodiment, the Verb that runs the workflow according to the configuration set may be made accessible or exposed via a Standard API endpoint or simply called by a Standard SDK of another SKApp that is interacting with the SKDS. These other applications could trigger the workflow remotely through the GENERATERECOGNITIONS Verb for any given flight or set or flights.

According to another configuration, a different program of a rules-engine SKApp may use Verbs, which execute one or more other Verbs that include Triggers and Actions that may be connected together and run automatically. In one embodiment, a shared email account may receive an email. The receipt of this email may then trigger a Verb which finds named entities (e.g., FINDNAMEDENTITIES) in the email, followed by a second Verb to compare identified named entities to a predetermined list (e.g., project 1, client 2, deal 3). If there is a match, the Verb may then find the person that is associated as a lead on that project/deal/client/etc. in a data source. Once the person is found, the Verb may then (1) create a task that references the email, the project/deal/client/etc., (2) assign it to the lead, and (3) forward that person the email and include a reference to the task in the forwarded email.

In this way, SKL abstractions may make it easier to interact with data from multiple sources and Integrations. Tools such as IFTTT®, Zapier®, Tray.io®, and Mulesoft® offer workflow automation builders by offering connectors and easy drag/drop interfaces to workflows between specific Integrations. However, because of SKL, a SKApp which utilizes rule engines of FIGS. 25-28 may easily build automations and workflows by leveraging the full power and range of capabilities that Nouns and Verbs offer.

In another embodiment, a SKApp can use programs, business processes, automations, process workflows, etc. like these to establish links between nodes within a nodal data structure. For instance, when a user copies & pastes information from one place to another, the analytics server may automatically create a link between the Entity that corresponds to the copied data and the Entity corresponding to the pasted data and label that link between those Entities (e.g., managing the Metadata to that relationship) accordingly such as labeling that one Entity is a source for the other. In another example, automations like those done with popular automation tools may create links between content and may add Metadata to the edges/relationships. In another example, a user (or system) that navigates to a certain website or piece of information from a different piece of information may establish a relationship between both of those nodes and add the appropriate Metadata to the edge (e.g. a user accessing a website by clicking a link in a particular text message, and then navigating to another webpage may establish and/or alter the links, relationships, and metadata about and/or between the nodes). Specifically, the analytics server may also score a variety of aspects related to this system, such as: the potential relevance of relationships being established between nodes that a user interacts with, the confidence on the potential labels and metadata established on and/or between nodes, etc.

Connecting SKL to Interfaces

Figure 29:
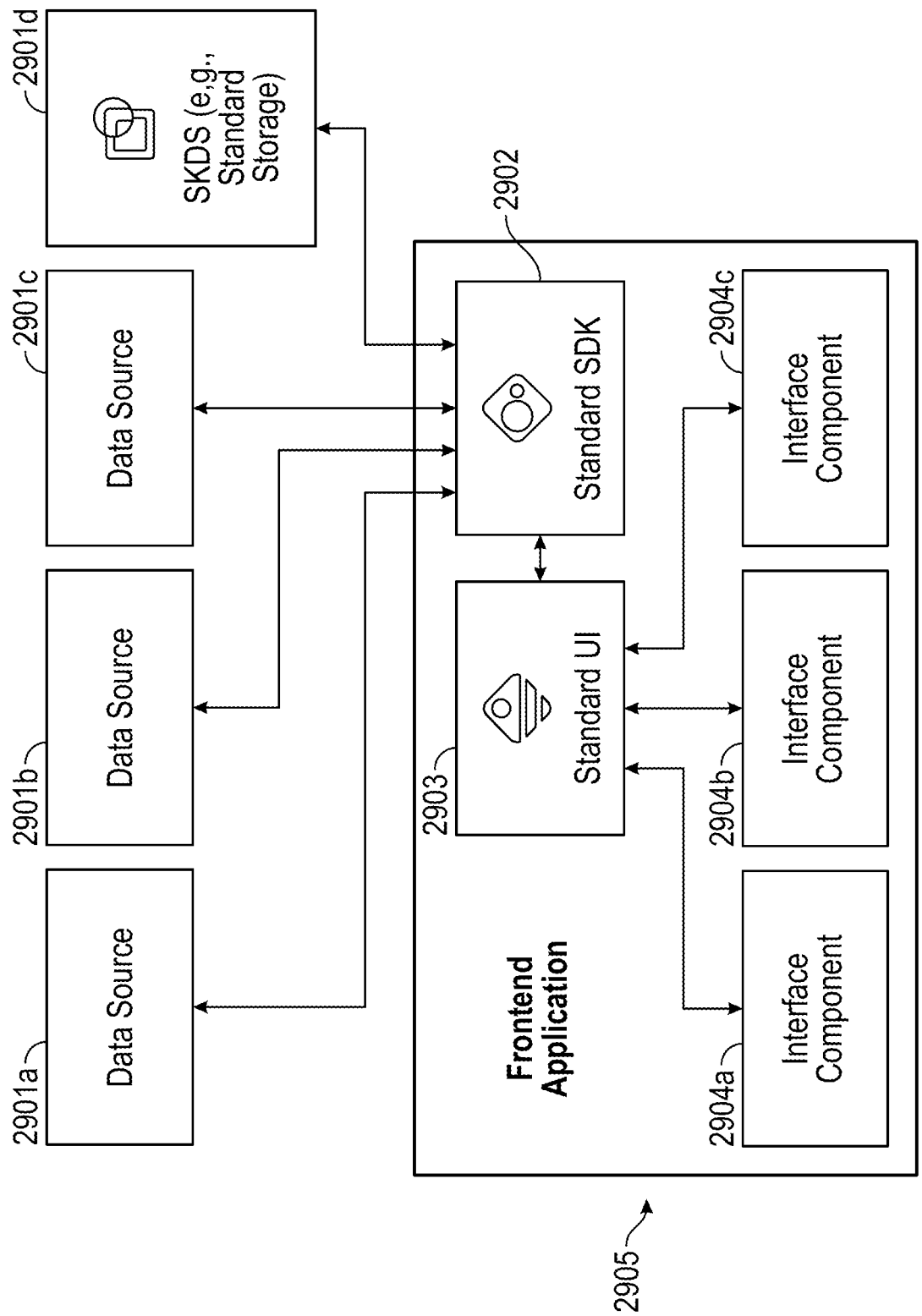
FIG. 29 is a visual representation of a frontend application using a Standard SDK.

FIG. 29 illustrates a conceptual diagram of how an SKApp 2905 can use a Standard SDK 2902 to retrieve data from various data sources 2901a-d according to the Schemas of Nouns and then use a Standard UI Engine 2903 to provide the data to various different Interface Components 2904a-c, according to an embodiment. In this example, the SKApp 2905 can execute Standard SDK 2902 requests in order to feed data to or respond to events from Standard UI Engine 2903. In some embodiments, in order to do this the SKApp 2905 can have one or more top-level Interface Components 2904a-c or files which import or have access to both the Standard SDK 2902 and the Standard UI Engine 2903.

Figure 30:
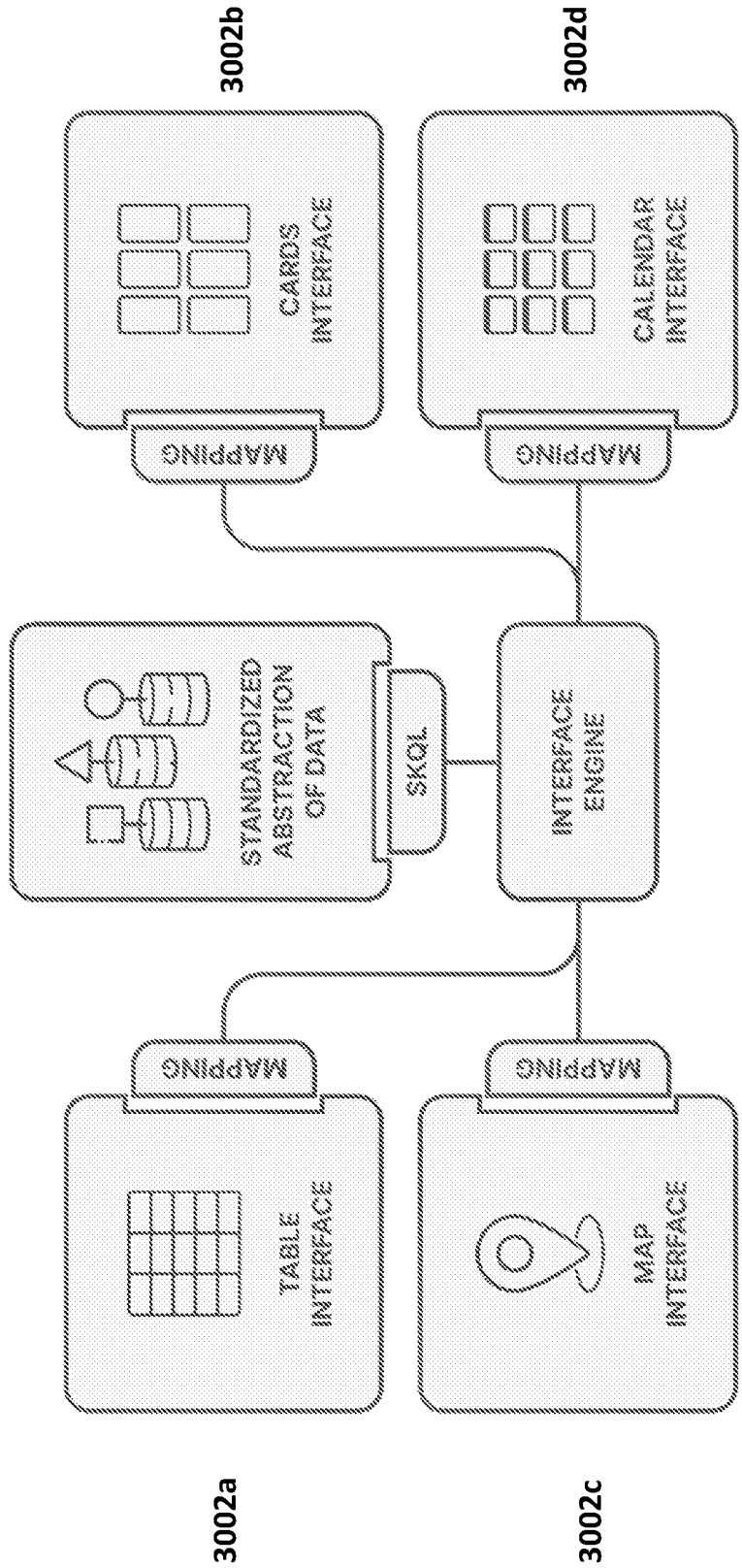
FIG. 30 is a visual representation of how a noun may be mapped to a variety of Interface Components, in accordance with an embodiment.

According to some embodiments, an SKI, framework may provide a frontend engine (e.g., Standard UI Engine) that applies similar concepts as the Standard SDK, but to Interface Components. By using NOUNINTERFACEMAPPINGS, a developer may create a relationship between certain parameters of a Noun's Schema and certain fields of an Interface's Schema. The fields of an Interface's Schema might in turn correspond to the props for a React component. For example, FIG. 30 shows how a certain Noun may be mapped, according to an embodiment, to a variety of Interface Components. In other words, a Noun like SCHEMA.ORG: EVENT could be mapped to four different Interface Components: TABLE 3002a, CARD 3002b, MAP 3002c, and CALENDAR 3002d. The various properties of the SCHEMA.ORG:EVENT such as TITLE, DATE, etc. could then be mapped to the inputs of the various Interface Components.

In some embodiments, if relationships exist between different Noun Schemas—such as a CONCERT being (1) mapped to, (2) a subtype of, or otherwise (3) has a relationship to the SCHEMA.ORG:EVENT Noun—then CONCERT may automatically work with any Interface Component that is mapped to SCHEMA.ORG:EVENT.

FIG. 31 shows, according to some embodiments, how the methods of the various embodiments of SKL as described herein (including the abstraction of Integrations, the Mappings to standardized Nouns, and the Mappings to Interface Components) may be used to show data from multiple sources in a standard way on a map interface. Because of how SKL works, the interface could be swapped out at any time with relative ease. In some embodiments, the Schemas for Interface Components may be used to represent components from different frameworks (e.g., React, Standard interfaces, etc.).

Figure 50:
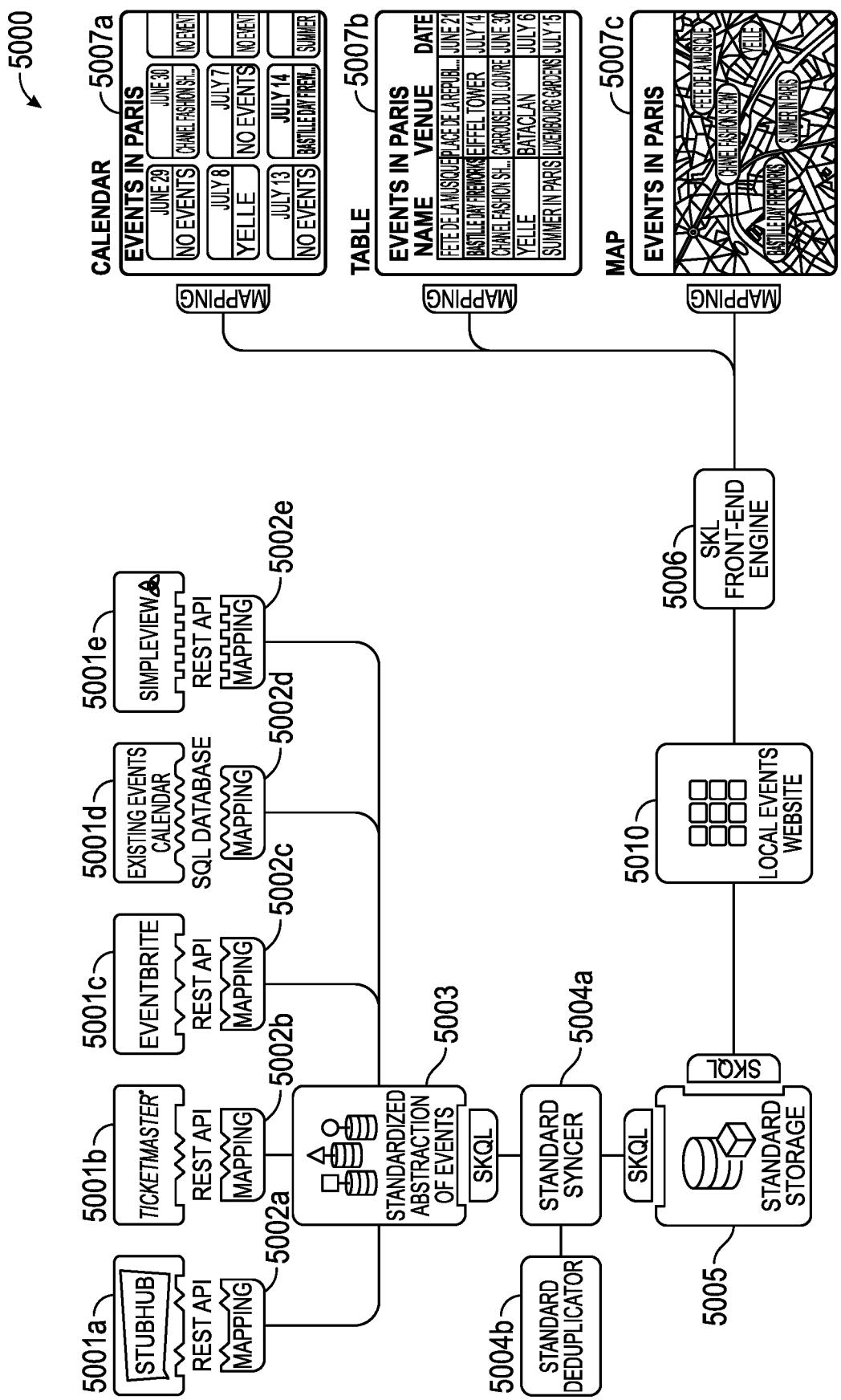
FIG. 50 illustrates a noun mapping system with a Syncer SKApp, in accordance with an embodiment, in accordance with an embodiment.

FIG. 50 shows a conceptual diagram 5000 that combines the concepts from FIG. 30 and FIG. 31, according to an embodiment. In this example several Integrations 5001a-e are connected to a Syncing SKApp 5004a, that includes a deduplication process 5004b. As with other examples, the Syncing SKApp 5004a-b may use Schemas to represent each Integration 5001a-e, the standardized Nouns 5003 and Verbs that are used to interact with the various Integrations 5001a-e, and the Mappings 5002a-e that translate the various data formats and capabilities offered by each Integration 5001a-e into their standardized representation(s) 5003. Using the methods described herein, the Syncer SKApp also reads and writes Entities from and to the SKDS 5005 which a third-party website 5010 is able to query directly. In this example, the website may also use a Standard UI Engine 5006 to help various interface Components 5007a-c access and interact with the standardized Nouns and Verbs that are stored in SKDS 5005.

FIGS. 42-49 illustrate the graphical user interface of SKApp 5010 that lets end users easily and dynamically modify Schemas in order to customize almost any part of the SKApp, according to an embodiment. Referring first to FIG. 42a, graphical user interface 4200 shows three main panes: a Schema navigator 4210 that lets users easily view and modify all the Schemas, as well as create new and/or load in other existing Schemas from other sources (e.g., the SKL Library) using interface component 4211; a Schema inspector and editor 4220 which may let users easily open SKI Schemas and modify any of the embedded and/or related configuration, and a section 4230a that uses the Standard UI Engine to render Entities of a given type according to a chosen Interface Component Schema. In this example, the user has chosen to add a Ticketmaster® account 5001b, and then selected that account from the Schema navigator 4210. In this example, the purpose of the SKApp 5010 is to sync and deduplicate Events (e.g., sports matches, concerts, festivals, etc.) from various data sources and to show them in in a unified interface.

According to this embodiment, the configuration for a given Ticketmaster® account 5001b is represented through two Schema files, one for the security credentials (e.g., API token) and one for the configuration of syncing of data from that integration. The Schemas to represent the Ticketmaster® API (e.g., the Ticketmaster® OpenAPI spec), standardized Events, and the Verbs and Mappings necessary to get them are all within their own subsection in panel 4210.

This example provides a manual trigger for syncing 4222 and a couple syncing parameters that can be changed for the Ticketmaster® account such as the number of results to grab and a given city to get Events for 4221a. For the sake of simplicity this example has been limited to a couple editable parameters but other embodiments can allow users to edit other parameters, as well as to use automatic triggers and syncing schedules as described elsewhere herein. Given that the relevant "city" parameter 4221a in this example is set to New York, the EVENT Entities shown in panel 4230a are events that take place in in New York City. Referring now to FIG. 42b, changing the "city" parameter 4221b to Atlanta and resyncing adds events that take place in the city of Atlanta as is shown in panel 4230b. In this way, SKL is able to abstract away a significant amount of complexity and make it accessible via parametric configuration files.

Figure 42A:
FIG. 42a illustrate the graphical user interface of SKApp, in accordance with an embodiment.
Figure 42C:
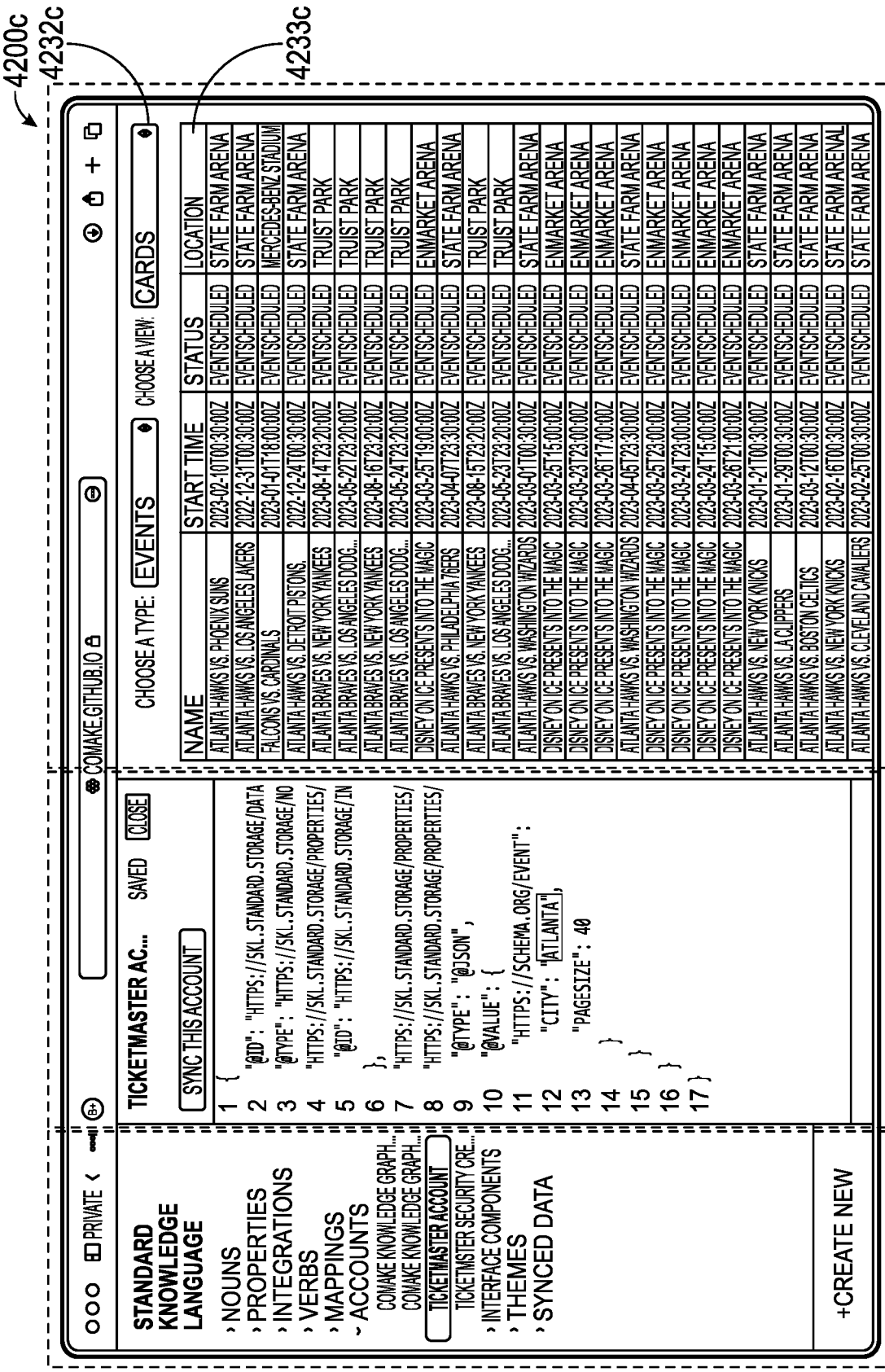
FIG. 42c illustrate the graphical user interface of a SKApp, in accordance with an embodiment.
Figure 45:
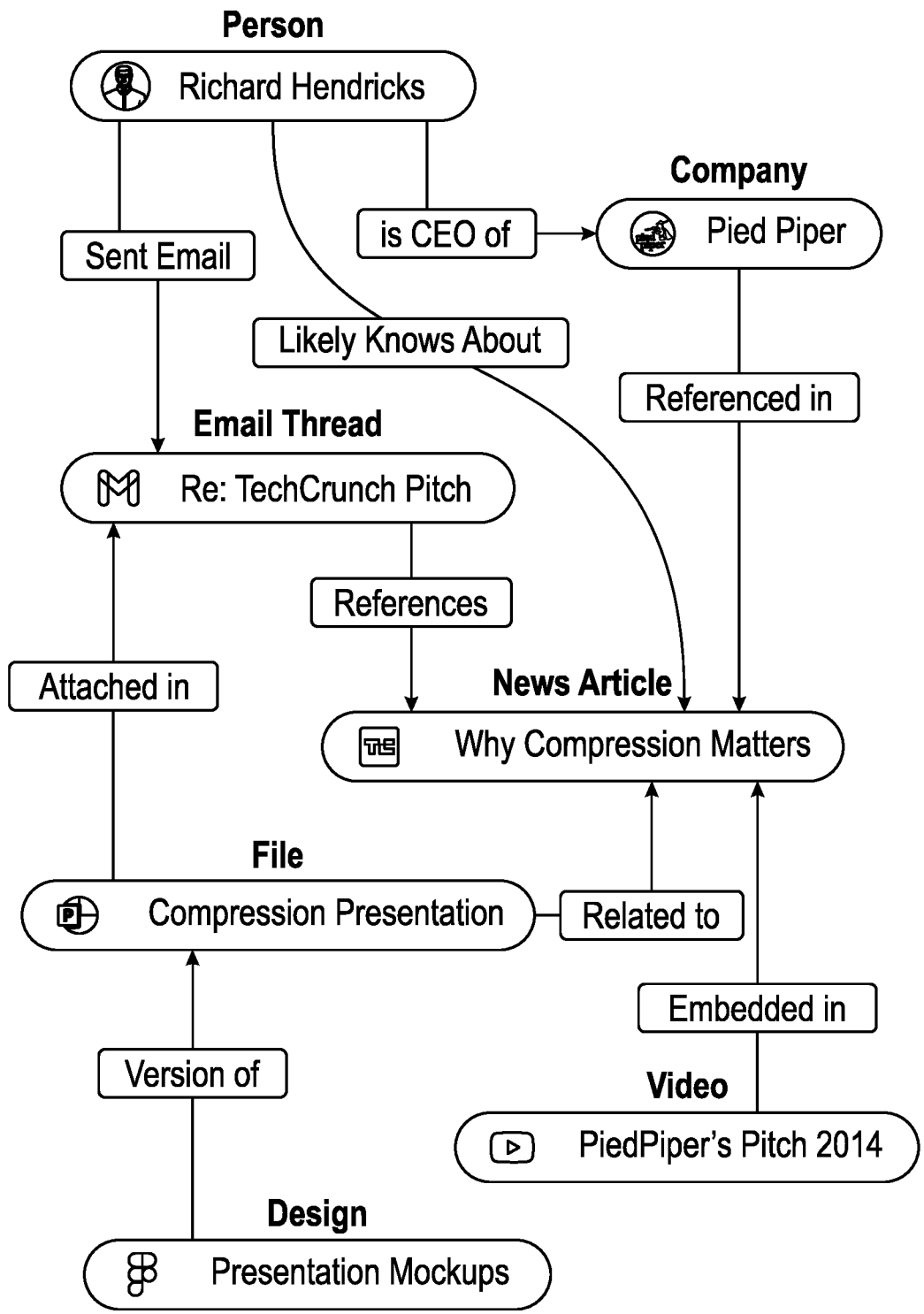
FIG. 45 is a graphical illustration of a system architecture, in accordance with an embodiment.
Figure 46:
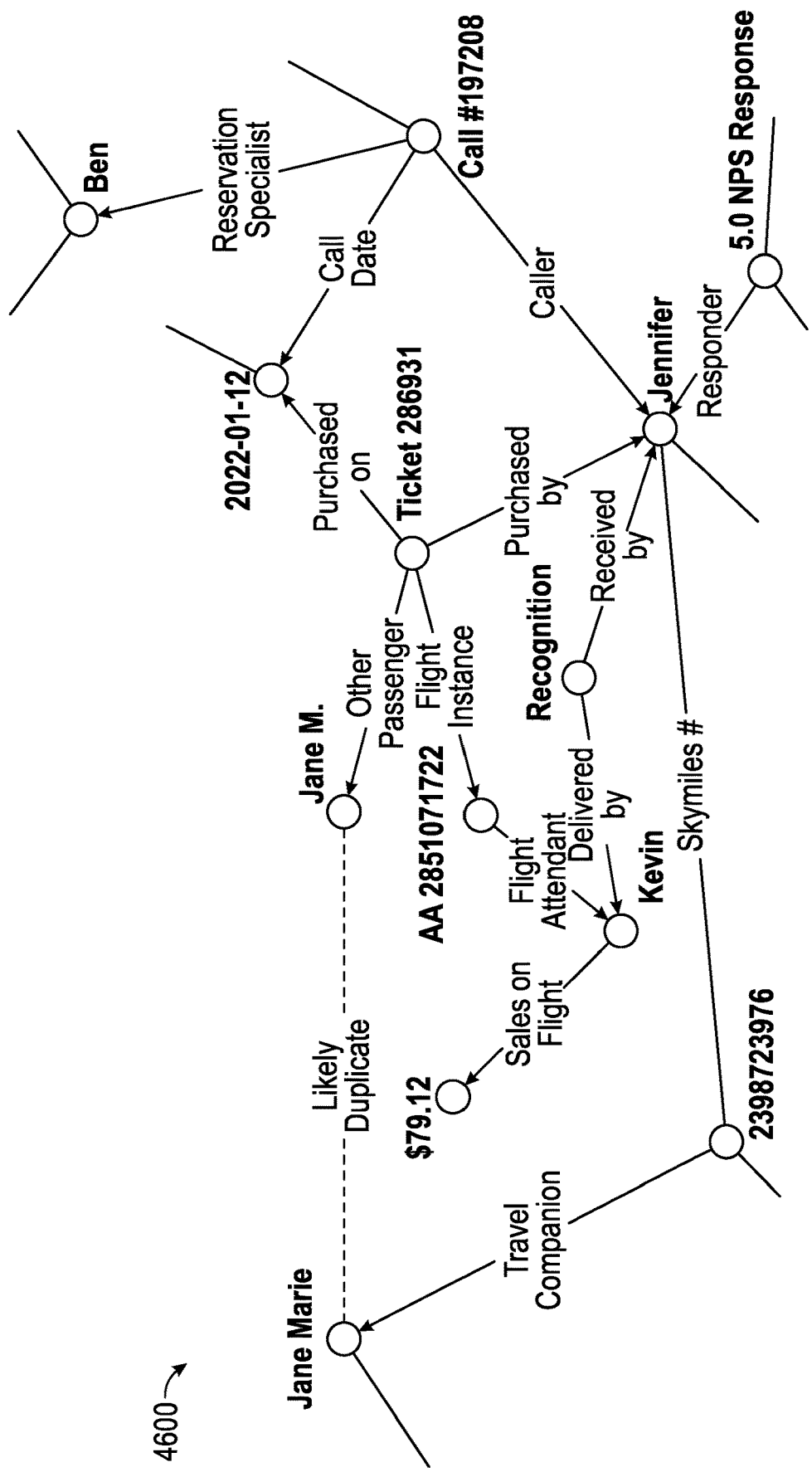
FIG. 46 depicts a nodal data structure, in accordance with an embodiment.

Referring back to FIG. 42a for a moment, interface component 4231 can be used to specify how what types of Entities returned by the syncer should be displayed in panel 4030a. Since the syncer is likely to return multiple types of Entities like LOCATIONS, PERFORMERS, and EVENTS from a data source like Ticketmaster®, a user may want to filter them down by a given type of Entity. Similarly, interface component 4232a can be used to specify how the EVENT Entities returned by the syncer should be displayed within panel 4030a. In this case, a user has specified that the EVENT Entities should be displayed in Interface Components of type CARD. Entities synced with the New York parameter 4221a and Entities synced with the Atlanta parameter 4221b both can be displayed in cards as shown in interface components 4233a and 4233b respectively. Referring now to FIG. 42c, because Interface Components in SKL may be easily mapped to Noun Schemas as explained herein, any Interface Component previously mapped to the standardized EVENT Noun (e.g., SCHEMA.ORG:EVENT Noun) may be loaded into this SKApp 5010 and used to display EVENT Entities. For instance, a user can choose to change the CARD component 4232a for a TABLE Interface Component 4232c that has been appropriately mapped in order to easily view the EVENT Entities according to their varied needs.

Figure 43:
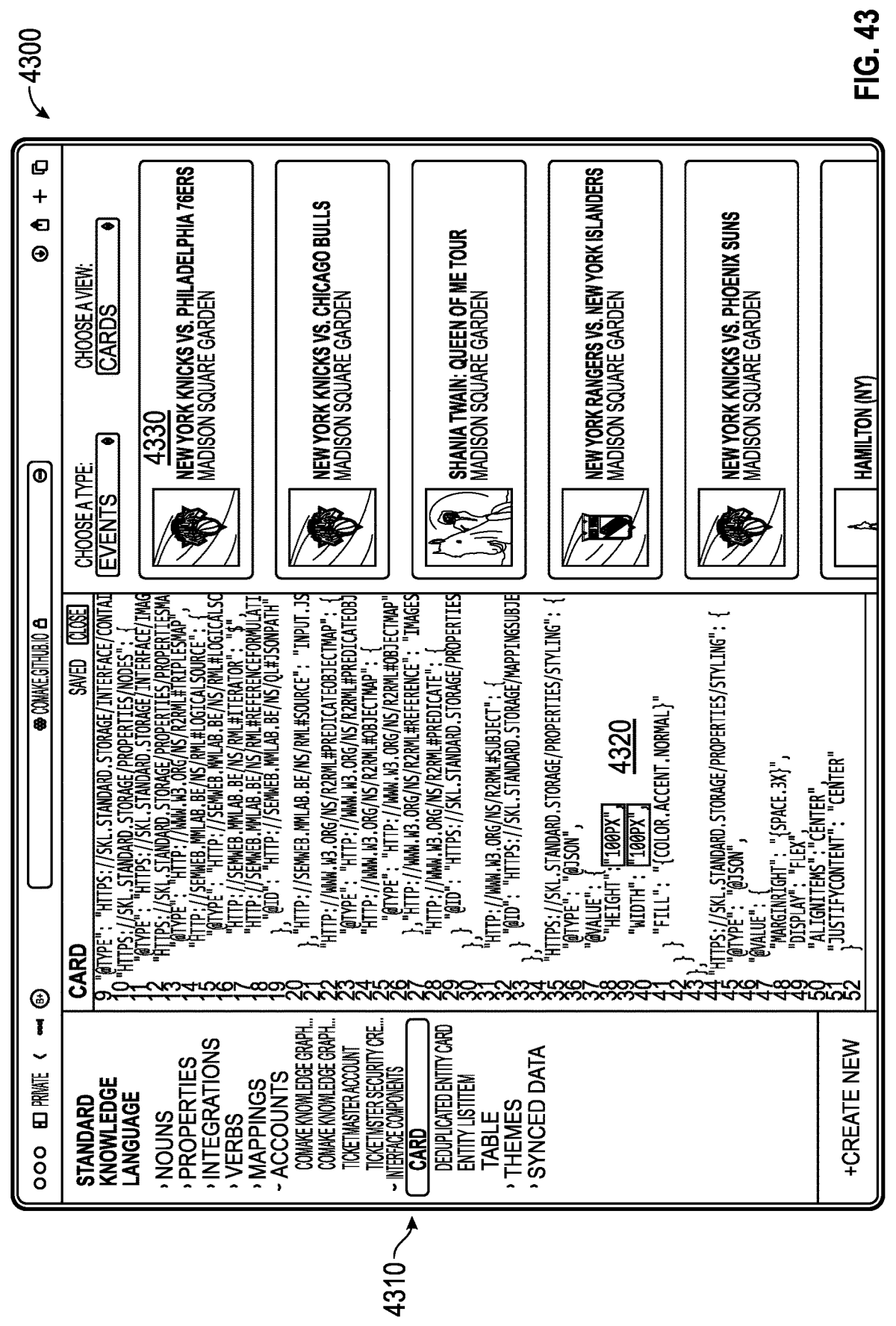
Figure 44:
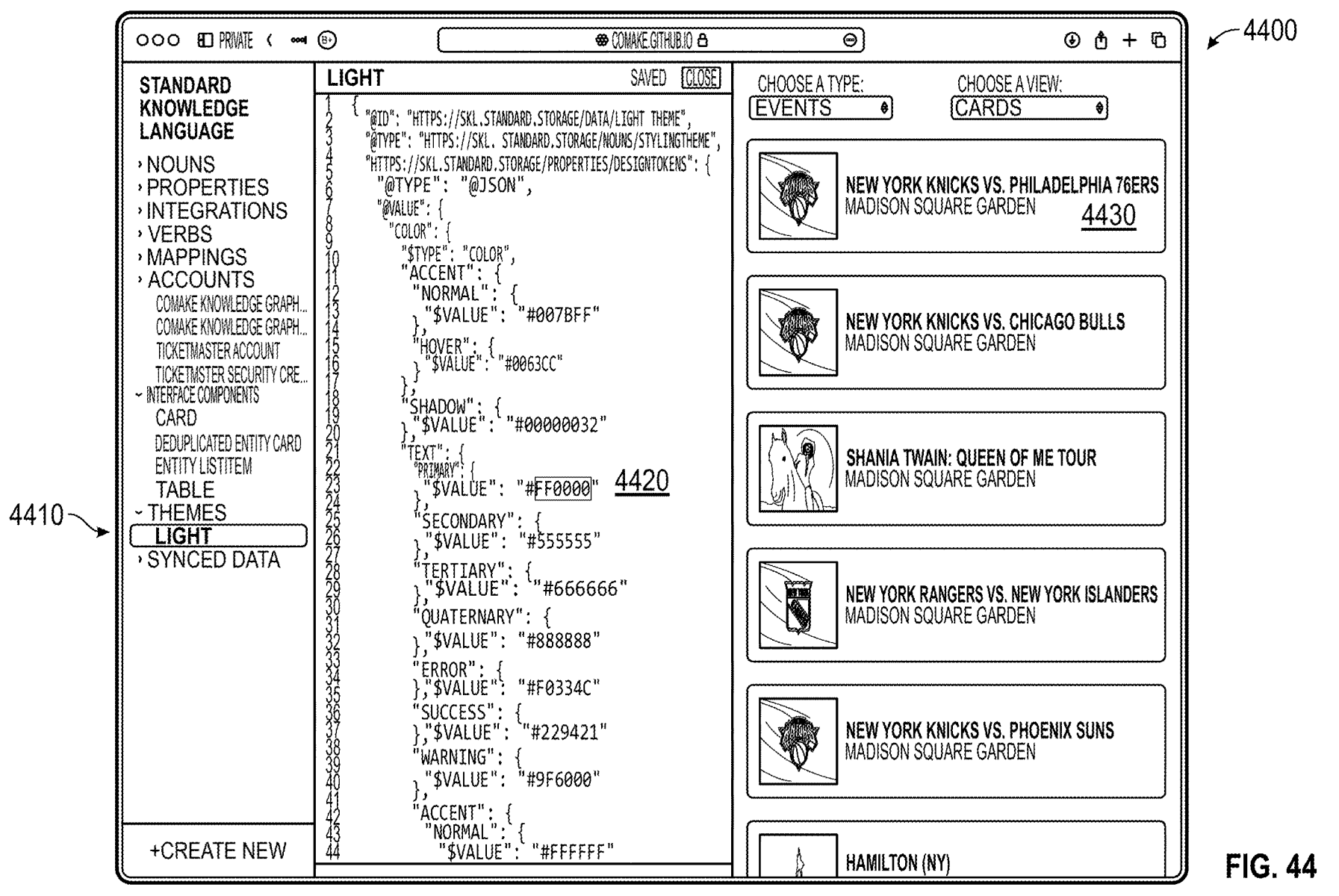

Referring now to FIGS. 43-44, in a similar way to how users may change the syncing parameters for an Integration, they may also choose to parametrically edit Interface Components, their styling, spacing, and more. For instance, FIG. 43 shows how a user might select to view the Schema 4310 for the CARD component and change certain parameters like the size of the image 4320 from 30 px in FIGS. 42a-c to 100 px, according to an embodiment. Similarly, as described elsewhere herein, certain shared styles (e.g., design tokens, CSS classes, etc.) could be applied to multiple Interface Components in order to facilitate the customization of multiple Interface Components simultaneously. FIG. 44 shows how a particular theme 4410 has its own Schema that can be easily and parametrically modified to change the styles of any Interface Components whose properties reference the Style Schema's parameters, according to an embodiment. In this example, the CARD component's 4430 Schema says that some of the text in the CARD component should be colored according to a theme's primary text color value 4420. In this way, changing the value of the primary text color 4420 in the theme's Schema will result in a change to the color of some of the text in the CARD component 4430.

Figure 49:
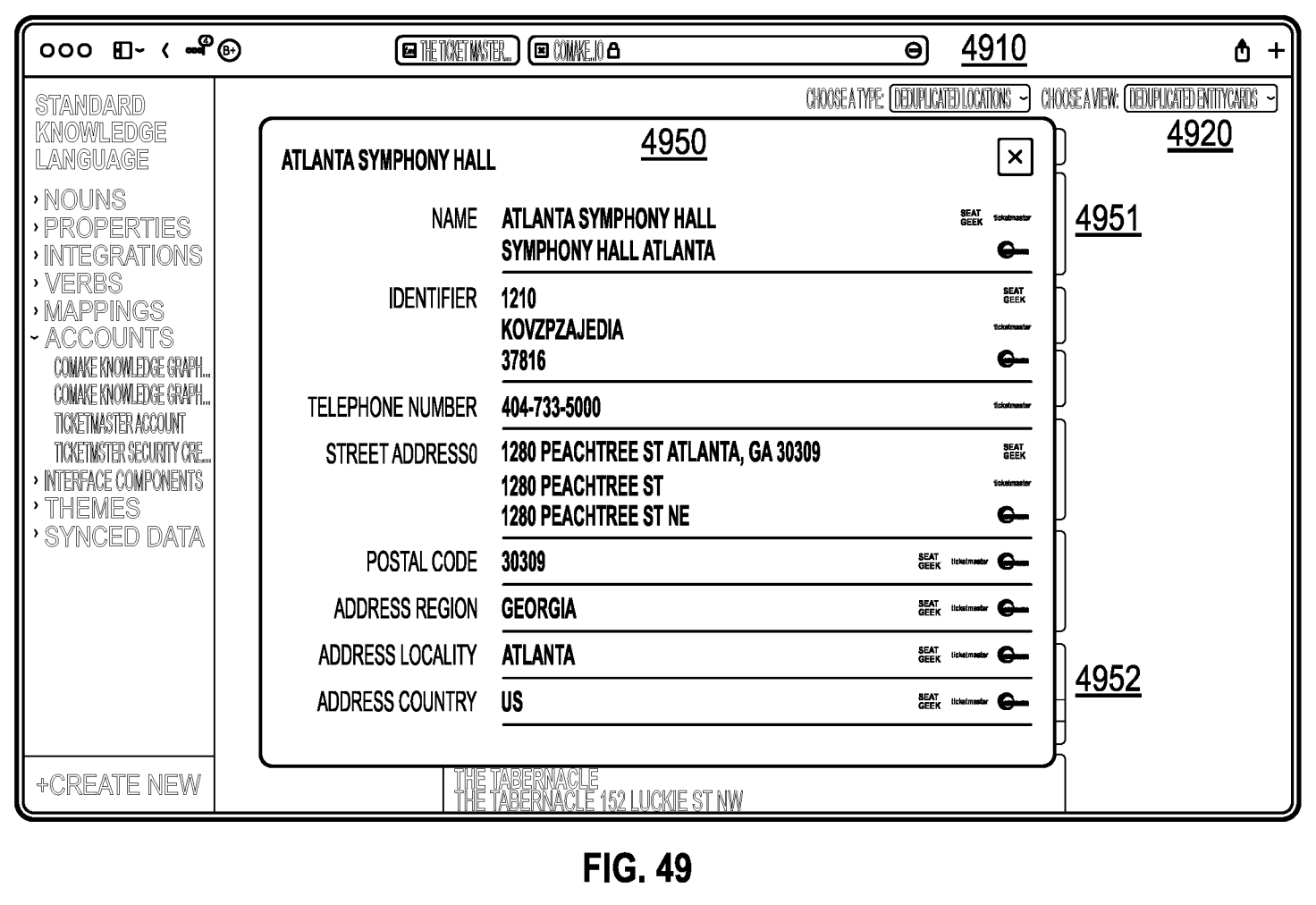

FIG. 49 illustrates a graphical user interface for SKApp 5010 that shows deduplicated Entities from multiple data sources for events and venues, according to an embodiment. In this example, a user chose to view Entities of type DEDUPLICATEDLOCATION (e.g., venues) through Interface Component 4910 and to view them with the DEDPLICATEDENTITY-CARD through Interface Component 4920. The DEDPLICATEDENTITYCARD Interface Component 4950 shows how different fields from various data sources can be combined into one deduplicated Entity stored in an SKDS 5005. For instance, some fields like the NAME field 4951 of the DEDUPLICATEDLOCATION Entity shows how two data sources share the name "Atlanta Symphony Hall" and a third data source has a different name "Symphony Hall Atlanta". This is in contrast to the ADDRESSLOCALITY field, for which all three data sources share the same value.

In some embodiments, if a deduplicated Entity has the same value from all sources but one, it could be used to suggest to the one outlier that the data is wrong. In other embodiments, certain data sources can be given a higher authority than other data sources. In these ways, deduplication of Entities can actually be used to clean up data across one or more sources.

SKL Library

According to some embodiments, an "SKL Library" may document and allow for the discovery, creation, editing, and management of Schemas, configurations (e.g., ontologies, Nouns, Verbs, Interfaces, Mappings, Code Packages, AI models, etc.), SKApps, Authentication Servers, Standard SDKs, Standard UI Client Libraries, and/or any other SKL artifacts and SKL-compatible components (the "Artifacts"). Other types of Artifacts in the SKL Library may also include elements related to open-source contributions (e.g., notes, bugs, feature requests, pull request, sample data, etc.) and collaboration (e.g., messages, posts, threads, tasks, etc.). An SKL Library may be sometimes referred to herein as "The Library," "SKL Dictionary," "The Dictionary," and the like.

In some embodiments, any Artifact may be related to any other Artifact. As such, each Artifact (e.g., an Entity) may provide, for example, contextual access to other related Artifacts such as comment threads, version histories, bugs, change requests, and/or any other Artifacts. According to a non-limiting embodiment, the SKL Library may use Linked Data to allow each Artifact to reference other Artifacts. This may be similar to how a nodal data structure (e.g., an "SKDS") might be used to record relationships between different Entities (e.g., files and messages) and to surface related Entities (e.g., through search, contextually through relationships in nodal data structure, through Relevance Scores, using other machine learning techniques, using other natural language processing techniques, etc.). In some embodiments, given a Verb Schema, SKL Libraries may be used to access Noun Schemas which are related to that Verb as inputs or outputs. SKL Libraries may link and/or provide access to Entities through Mappings (e.g., any Mappings that specify relationships between Artifacts such as an Integration endpoint and a Verb, a Noun and a Verb, a Noun and an Interface, etc.), and/or other means such as edges between nodes, Relevance Scores, and more.

Figure 32:
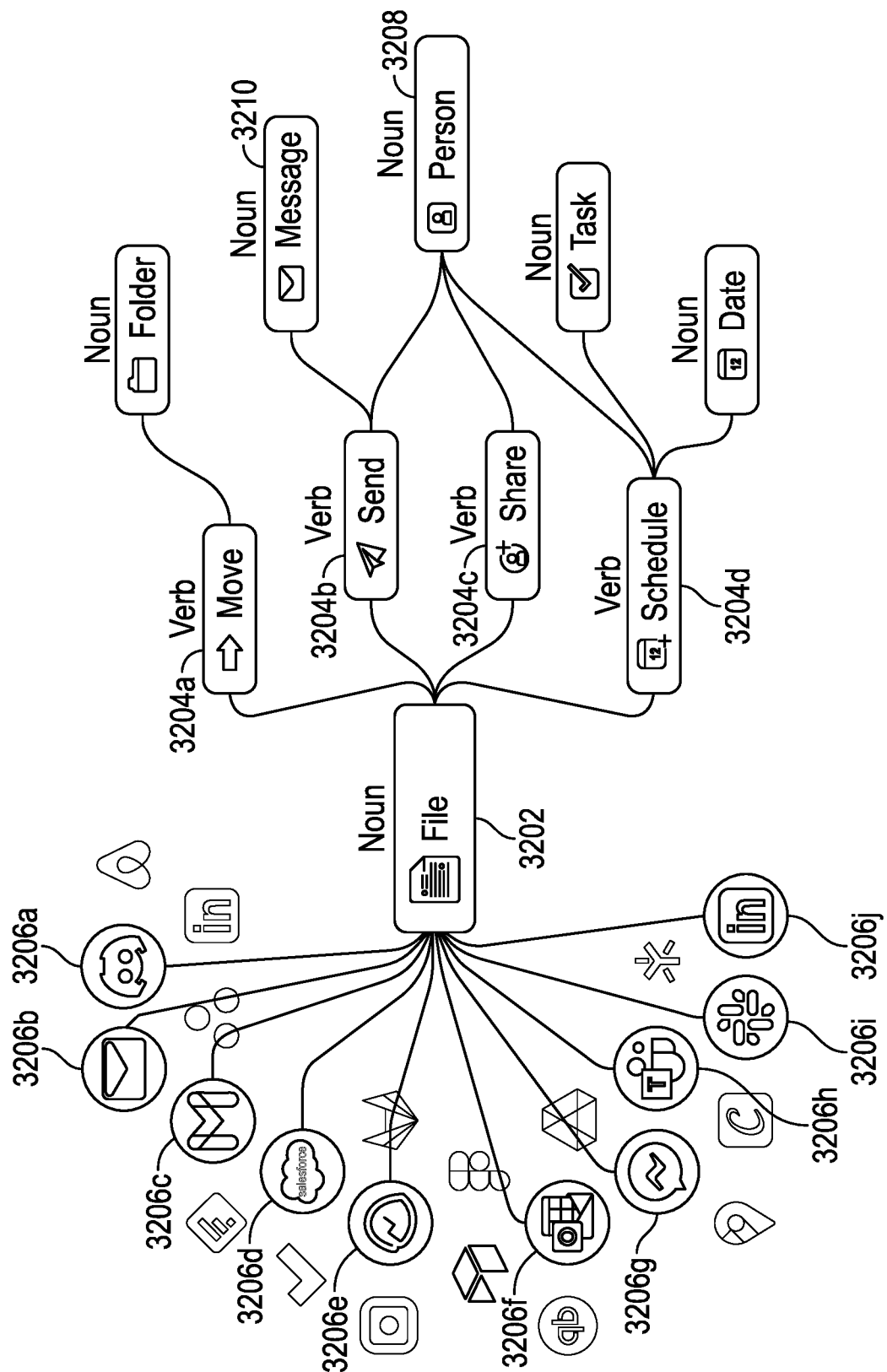
FIG. 32 illustrates a conceptual diagram of how the SKL Library may relate different SKL Attributes, in accordance with an embodiment.

FIG. 32 illustrates a conceptual diagram, according to one embodiment, of how the SKL Library may relate different SKL Attributes. The Noun 3202 in the SKL Library SKDS in this example represents a FILE Schema. Since this FILE Noun 3202 has been mapped to a variety of Verbs such as MOVE 3204*a*, SEND 3204*b* (or SENDINMESSAGE), SHARE 3204*c*, SCHEDULE 3204*d*, and more (e.g., GETFILESINFOLDER, GETATTACHMENTSINEMAIL, GETFILECONTENTSASSTRING, GETNAMEDENTITIESINFILE, etc. which could be used by a syncing SKApp), an SKL Library may present them as capabilities for files. Different embodiments or processes for a Verb that is meant to send a file may include a sending a file in a message, sending a file through Bluetooth®, sending a file through AirDrop®, and other means.

These various capabilities may be abstracted away through a single SEND Verb, that will use different Schemas like Mappings and Nouns and/or combinations of different Schemas, to parametrically and/or intelligently determine which specific process should be used. In other embodiments, an SKL Library may help a developer trying to use a FILE Noun 3202 together with a SEND Verb 3204*b* to automatically determine what Integrations 3206*a-j* may be used to send the file, what other Schemas may be needed (e.g., a PERSON Noun 3208 to send the file to, a MESSAGE Noun 3210 to send with the file, and more. These relationships and various other Schemas could be accessed through a variety of methods, including but not limited to, by browsing, searching, and interacting with a website, by referencing one of the Schemas in an Integrated Development Environment (an "IDE") and seeing suggestions, by querying to an API, by interacting with a file inside a SKApp that helps a non-technical user centralize their health information, and more. As such, when a developer, or any other user of software that leverages SKL, interacts with any SKL Artifact (e.g., in the SKL Library, within a SKApp), they may easily access the documentation for that Artifact and they may easily view all related other Artifacts (e.g., organized by category, by relevance, etc.). In other embodiments, the developer may filter by some criteria like Operating Environment, pre-approved by an organization, etc.).

An SKL Library may hold this information in an SKDS, but in some embodiments the information may be stored in other ways, such as files in a codebase, on a blockchain, across multiple data stores and Integrations, etc. An SKL Library may have one or more corresponding SKApps, such as website, webapp, local application, dapp, etc. to help users create, find, interact with, or otherwise manage Artifacts. Users may also interface with an SKL Library in sever ways in order to interact with Artifacts (e.g., code, SKQL, web requests (e.g, to a REST API), etc.)

Display & Search

At least one embodiment of an SKL Library may be considered "Official SKL Library" (sometimes called the "Official Library," "Official Dictionary," and the like). The Official Library may serve as the main public distribution of Attributes. Other SKL Libraries may exist simultaneously, such as private SKL Libraries, or other domain-specific SKL Libraries which may be considered to be part of the Official Library. In some embodiments, an organization may also choose to have an Official SKL Library for their organization while keeping some Attributes private and publishing some Attributes to the public Official Library.

The Official Library may serve as the official public library/dictionary for a SKL to allow individuals and companies to learn about, discover, contribute, and use any aspect of it in a composable way. The Official Library may be organized by various methods such as relational data, indexing and search, and more. The Official Library may implement one or more SKDSs and SKApps to store and serve the data.

Figure 37:
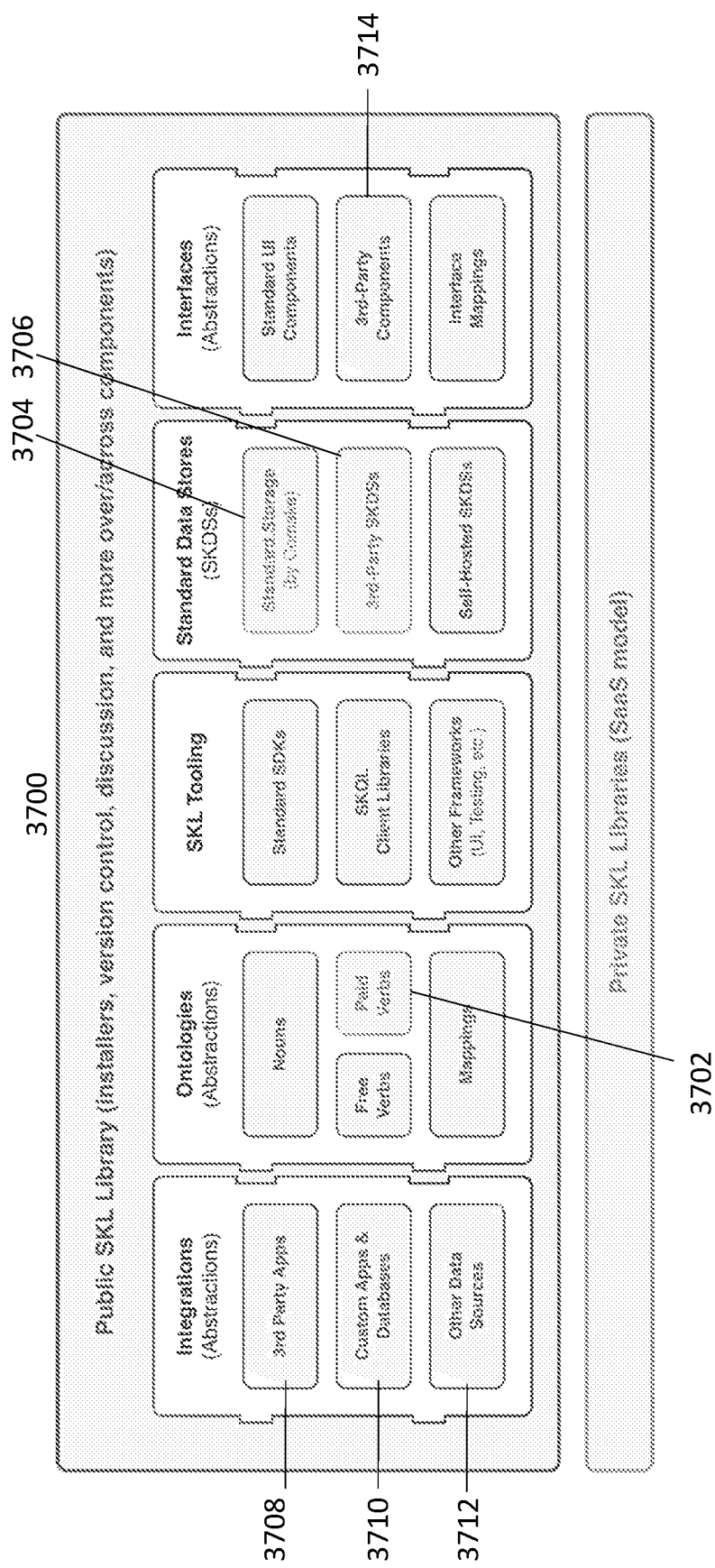
FIG. 37 depicts the composition the Official Library and some of the various SKL Artifacts and SKL Libraries that can compose it, in accordance with an embodiment.

FIG. 37 depicts the composition the Official Library 3700, and some of the various SKL Artifacts and SKL Libraries that can compose it, according to an embodiment. In this example, the Official Library includes all of the Schemas, configuration files, code, infrastructure templates, documentation and anything else necessary to: find, use, create, and modify SKApps; find, use, create, and modify Nouns; find, use, create, and modify Verbs; find, use, create, and modify Integrations; find, use, create, and modify Interfaces; find, use create, and modify any other configurations, code, or documentation a user or developer may need to interact with SKL; and so on. The Official Library may also include an index of all registered SKApps and their details; different Interfaces and Verbs that can be used to interact with the data inside SKI, Libraries including all the users who choose to have a profile on the Official Dictionary and their contributions, discussions, etc.; information related to APIs and other interfaces SKQL) that can be used to programmatically interact the data in the Official Dictionary, and so on. Certain components can require payment by users 3702-3706 and certain other components can be originally developed to follow other protocols and programming standards (e.g., that are not related SKL) but that are able to be abstracted and represented through SKL Schemas and thereby made interoperable and composable with the SKL ecosystem 3708-3714.

In some embodiments, a user of the Official Library may search for, view, interact, and create new SKL Artifacts, as well as relationships to other resources. In other words, Artifacts in the Official Library may be full-text searchable and filterable, for example via any of its Metadata, Schema, or relationships. Upon selection of an Artifact (e.g., an Integration, an SKDS, a Verb, a Noun, a SKApp, an Interface Component, a message, a task, etc.) the SKApp for the Official Library may generate and/or display a "profile" for that Artifact.

According to some embodiments, the profile for an Integration in an Official Library SKApp might include various information. For example, the profile might include the following: Metadata about the Integration (e.g., name, domain, developer, provider, execution environments, pricing, reviews, keyboard shortcuts, related API endpoints, URL structures, whether it may be used to train AI models or in conjunction with AI models, etc.); information related to how the Integration and data, capabilities, instances, Artifacts, etc. related to the Integration may be automatically identified by software; the Schemas which detail how a Verb may read and write data to and from the Integration and how data from the Integration may be converted to Nouns; any Nouns, Verbs, Interfaces, and SKApps which work with the Integration or which could potentially be easily configured to work with the Integration; information about Integration usage (e.g., any users that have used, interacted with, etc. the Integration, according to the privacy settings of those users); any relationships to other Integrations, contributors, developers, etc.; the edit history, versions, etc. of the Integration; and the like.

In some embodiments, SKL Libraries can facilitate access to "dummy data" and/or public/non-confidential data that can be provided when the API endpoints of an Integration are queried with certain special parameters (e.g., queryAsTest). These example responses may be used within a code testing suite to mock the responses of endpoints and test other components of the system without sending real HTTP requests.

FIG. 33 is a non-limiting example of how an Integration's profile on the Official Library (and/or another SKL Library) may appear. This particular embodiment shows what the profile for Google Drive® Integration might look like, including: general information about the Integration, its developer and/or provider, pricing, privacy practices, performance, persistence type, terms & conditions, how to access it and/or use, reviews, etc.; different relevant UI components including icons, Interface Components which may work with the Integration; Schemas, documentation, and any other information representing or relevant to the API; relevant ontologies that have or could be integrated including Nouns and Verbs SKApps which work or could work with the Integration; a timeline of contributions, changes, edits, usage, etc.; issues, bug reports, feature requests, forks, pull requests, and other capabilities to help with the management of Schemas; and more.

According to a non-limiting embodiment, an SKDS's profile on the Official Library (and/or another SKL Library) might include: general information and Metadata about the SKDS (e.g., developer and/or provider, pricing, security and privacy certifications and practices, performance, persistence type, terms and conditions, how to access it and/or use, reviews, execution environments, whether it may be used to train AI models or in conjunction with AI models, etc.); information related to how the SKDS and data, capabilities, instances, Artifacts, etc. related to the SKDS may be automatically identified by software; the Schemas which detail how data may be read and written to and from the SKDS; information related to which SKApps and Interfaces may work with the SKDS or which could potentially be easily configured to work with the SKDS; information about SKDS usage (e.g., usage and performance metrics, any users that have used, interacted with, etc. the SKDS, according to the privacy settings of those users); any relationships to other SKDSs, icons, images, contributors, developers, etc.; the edit history, versions, other Artifacts, etc. of the SKDS; and the like. Each SKDS may also include custom adapters that help map SKQL functionality (e.g., via the SKQL ORM) to whatever the language the database or databases offered by SKDSs natively offer (e.g., SQL, DQL, GraphQL, etc.).

According to a non-limiting embodiment, a Verb's profile on the Official Library (and/or another SKL Library) might include: general information and Metadata about the Verb (e.g., developer and/or provider, pricing, security and privacy certifications and practices, performance, terms & conditions, how to access it and/or use, reviews, execution environments, whether it may be used to train AI models or in conjunction with AI models, etc.); information related to how the Verb and data, AI models, capabilities, instances, Artifacts, etc. related to the Verb that may be automatically identified by software; the Schemas which detail when the Verb may or should be run, what its inputs and outputs are including the Nouns and possible SKDSs and Integrations it works with; information related to which SKApps and Interfaces use the Verb or which could potentially be easily configured to work with the Verb; information about the Verb's usage (e.g., usage and performance metrics, any users that have used, interacted with, etc. the Verb, according to the privacy settings of those users); any relationships to other Verbs, icons, images, contributors, developers, other Artifacts, etc.; the edit history, versions, etc. of the Verb; and the like.

In some embodiments, and in a similar fashion to Integrations (and sometimes in conjunction with the dummy data associated with an Integration), SKL Libraries may facilitate access to "dummy responses" for a given Verb, enabling developers, SKApps, users, etc. to more easily run tests and determine if a given SKApp is working properly (e.g., executing Verbs at the right time, with the right parameters, and correctly handling the responses and/or emitted events).

According to a non-limiting embodiment, a Noun's profile on the Official Library (and/or another SKL Library) might include: general information and Metadata about the Noun (e.g., developer and/or provider, pricing, security and privacy certifications and practices, performance, terms and conditions, how to access it and/or use, reviews, execution environments, whether it may be used to train AI models or in conjunction with AI models, etc.); information related to how the Noun and data, AI models, capabilities, instances, Artifacts, etc. related to the Noun may be automatically identified by software; other criteria for identifying, deduplicating, and/or processing Entities of that type of Noun; the Schemas which detail the Noun's larger ontology, properties, fields, actions, and possible Verbs, SKDSs, and Integrations (e.g., Integrations that emit events which may be translated into data of the Noun) it works with; information related to which SKApps and Interfaces use the Noun or which could potentially be easily configured to work with the Noun; information about the Noun's usage (e.g., usage and performance metrics, any users that have used, interacted with, etc. the Noun, according to the privacy settings of those users); any relationships to other Nouns, icons, images, contributors, developers, other Artifacts etc.; the edit history, versions, etc. of the Noun; and the like.

In some embodiments, and in a similar fashion to other types of Schemas (and sometimes in conjunction with the dummy data and responses from those other Schema Entities), SKL Libraries may facilitate access to "dummy data", publicly accessible data, non-confidential data, etc. for a given Noun. In other words, each Noun can provide access to a large number of examples of Entities that correspond to that Noun from a variety of sources (e.g., from Integrations, from SKDSs, from the Library itself, automatically generated Entities, etc.) that can be used in a variety of different ways, ranging from testing software (e.g., running test suites), training AI models, and more. In other words, beyond helping with test data, certain machine learning and artificial intelligence models (e.g., classification of data types) could be trained using the "dummy data" that is made accessible through a given Noun (e.g., CAT, IMAGE, FILE, MESSAGE, ARTICLE, LOGO, SPORTSEVENT, SVGICON, etc.). For example, as the Official Library grows, it could help provide the training data for a model that can classify types of Nouns as a variety of different data is encountered by users in SKApps ("in the wild" so to speak).

In some embodiments, multiple methods and criteria can be made available through SKL Libraries to help with the recognition, identification, and/or classification of certain types of Nouns. For instance a PDF may be identified by its mime type, a PERSON referenced in an online news article may be identified by the metadata in the websites header. (e.g., schema.org), a CAT (or a representation of a "CAT") may be identified in a 3D model, a video, and/or an image by using computer vision techniques such as object recognition, etc.

According to a non-limiting embodiment, an Interface's profile on the Official Library (and/or another SKL Library) might include: general information and Metadata about the Interface (e.g., developer and/or provider, pricing, security and privacy certifications and practices, performance, terms & conditions, how to access it and/or use, reviews, execution environments, whether it may be used to train AI, etc.); information related to how the Interface may be automatically identified by software; the Schemas which detail the Interfaces" inputs and outputs are, including the Nouns, Verbs, and other SKL components it works with; information related to which SKApps and SKDSs use the Interface or which could potentially be easily configured to work with the Interface; information about the Interface's usage (e.g., usage and performance metrics, any users that have used, interacted with, etc. the Interface, according to the privacy settings of those users); any relationships to other Interfaces, contributors, developers, other Artifacts, etc.; the edit history, versions, etc. of the Verb; and the like.

According to a non-limiting embodiment, a SKApp's profile on the Official Library (and/or another SKL Library) might include: general information and Metadata about the SKApp (e.g., developer and/or provider, pricing, security and privacy certifications and practices, performance, terms & conditions, how to access it and/or use, reviews, execution environments, whether it was generated with AI, etc.); information related to how the SKApp may be automatically identified by software; the Schemas which detail what Nouns, Verbs, Interfaces, SKDSs, etc. the SKApps works with, and which others it could be configured to work with; information related to other SKL components which use the SKApp or which could potentially be easily configured to work with the Interface; information about the SKApps's usage (e.g., usage and performance metrics, any users that have used, interacted with, etc. the Interface, according to the privacy settings of those users); any relationships to other SKApps, contributors, developers, other Artifacts, etc.; the edit history, versions, etc. of the Verb; and the like.

According to some embodiments, in addition to the lists herein, each profile for a resource on the Official Library could include discussion about the resource, and contributions of developers to the configuration, code, or anything else about the resource.

According to a non-limiting embodiment, the Official Library may also include profiles for each user displaying the Integrations, Verbs, Nouns, SKApps, SKDSs, Interfaces, etc. they use (e.g., if they allow this information to be public) as well as their contributions, reviews, comments, discussions, etc. around each.

In some embodiments, the Official Library (and/or another SKL Library) Dictionary of Standard Knowledge (including private or branched instances of the dictionary) may incorporate sample data following the Schemas of Nouns that may be manually created or automatically generated. As the SKL Libraries grow, they may provide these data examples (e.g., through hosting the data and/or Mappings to trusted data sources with Entities of those types of Nouns) in order to test easily. This sample data may be used in test cases to test the functionality of different parts for the SKApps (e.g., without having to hard code them into the SKApp).

Interface Libraries

According to some embodiments, the SKL Library may include a registry of Interface Components which developers may use to build Interfaces for users (e.g., for graphical interfaces which use the React JavaScript® library). Interface Components may follow the Standard UI Framework or simply use Schemas to represent the Metadata, properties, design tokens, etc. that components written in other frameworks (e.g., React, VueJS, Angular, etc.). Moreover SKL Libraries may include Artifacts like colors, themes, design tokens, icons, and more which may each be related to—and used by—the various other relevant SKL components (e.g., Interfaces, SKApps, etc.). In addition, SKL UI Libraries may include utility Interface Components for keyboard navigable lists, forms, form inputs, buttons, dropdowns, search bars, views for Metadata, graphs, charts, maps, etc. In some embodiments, developers may "plug and play" these different interfaces in no-code (i.e., without having to write code) or low-code environments through the use of a GUI. This would empower the average person to be able to develop sophisticated software that meets their needs exactly, without sacrificing the interoperability or longevity of data.

The system also allows for interface libraries focused non-graphical Interfaces. For example, developers of voice assistant software agents could access components that help translate speech into usable commands. Similarly, other Interface Components could be used to represent brain interfaces, haptic controls, and other forms of human-computer interaction.

SKL Libraries may also include other types of Artifacts related to UI, such as scraping scripts or Verbs for certain Interfaces, Integrations, Nouns, and/or combinations thereof. For example, developers using SKL could share or publish a library of code for scraping the profile information on a social media site in order to enrich a user's contacts.

Packages

According to some embodiments, artifacts within the Official Library may be exposed for use via an SKDS interface such as an API. A developer wanting to use certain SKL artifacts in a SKApp may specify that they want to work with certain Integrations, Nouns and Verbs and the Official Library may find or help the user create the necessary Mappings and Schemas in order to combine them into an easily installable package in the SKApp (e.g., similar to NPM modules). For example, a developer or user may specify that they want their application to work with FILES, PEOPLE, TASKS, and MESSAGES and support Integrations like Google Drive®, Dropbox®, Gmail®, Slack®, and Asana®. The Dictionary could then provide them with a downloadable package that includes the necessary configurations between the specified and/or related Nouns, Verbs, Interfaces, Integrations, etc. Should the developer and/or user decide to support a new Interface or Integration (e.g., Sharepoint®) at some point in the future, they would be able to specify that and get the additional configurations added to their package.

In an alternate embodiment, the SKL Library may include common ontologies and their relationships to whichever other Artifacts a given user desires to "package" in order to facilitate the combination of Schemas. This may allow developers or end users to pick and choose certain functionality they wish to obtain from the SKL Libraries without having to download more than they need. For example, a developer wanting to integrate data from many file storage tools may choose the GENERAL FILE MANAGEMENT package which includes the Schema for FILE, FOLDER, PEOPLE, and FILEPERMISSION Nouns, the GETFILESINFOLDER, MOVE, COPY, and DOWNLOAD Verbs, and Mappings between those Nouns and Verbs to the most popular Integrations like Dropbox®, Google Drive®, and OneDrive®.

In an alternate configuration, developers could simply reference Artifacts and then SKApps could access individual Artifacts directly from the Official Library at runtime (e.g., via a REST API). In this way, developers may not have to download the configurations from the Library, but rather simply access the right version of each of configuration stored directly in the Official Library.

In yet another configuration, the Official Library may provide additional tooling to help developers download Artifacts in alternate ways that might make most sense for their specific needs. For example, the Official Library could help translate Noun Schemas into SQL in order to serve as the Schema relational databases, classes in a programming language like Ruby® or Java®, type interfaces and/or classes in JavaScript® or Typescript®, etc.

Schema Manager

According to some embodiments, SKL Libraries may include tooling to facilitate the installing, uninstalling, editing, and otherwise managing versions for SKL Schemas in a similar way to popular methods and tooling like Git push, Ruby Gems, npm install, etc. Different embodiments of SKL Libraries may help manage Schemas in other codebases, databases, SKDSs, through SKApps' user interfaces, within the SKL Library itself, etc. In other embodiments, SKL Libraries may also provide or integrate with graphical user interfaces that may facilitate Schema management. SKL Libraries may also include other interfaces like a command line interface and REST interface.

In a non-limiting, SKL Libraries may automatically different Schemas in a way similar to Git in order to help see changes between Schemas. In one embodiment, a user may work with an SKDS that uses a Noun called FILE version 1 and then they want to install a SKApp that uses expects FILE v2. When installing the SKApp on the SKDS, the SKApp may show the user a diff of what is different between both Schemas and ask the user if they want to migrate their Entities of FILE from v1 to v2. In another embodiment, the SKApp could show the user the diff of what is different between both Schema versions and ask the user to either install or create a Mapping to address those changes so that the user's SKDS is able to work with SKApps that expect v1 and v2. In this way, if a given SKApp installs/uses a new Noun that is a synonym or a different version to/of another Noun already in use within an SKDS, then the Schema manager (which may be embedded in the SKDS, the SKL Library, the SKApp, etc.) could look for one or more Mapping between both (from one or more SKL Libraries) and install that Mapping(s) in the SKDS in order to enable the different Nouns to be translated.

Branching & Versioning

According to some embodiments, Artifacts and Schemas in SKL Libraries may each have a URI. Each of these Artifacts may also have version identifier that allows the collaborative editing and management of Schemas. This version identifier could for example be in the URI, in the Schema as its own field, in related Mappings.

According to an embodiment, the Official Library may simply need to index and reference the locations and versions for other ontologies' Schemas. In another embodiment, the Schemas may be cloned to the Official Library. In yet another embodiment, the Schemas may be cloned to locally hosted SKL Libraries. Any changes to Schemas cloned from the Official Library may be proposed as changes back to the Schemas hosted by the Official Library. The Official Library may provide discussion and collaboration features in order for the person responsible for changing the ontology to explain and discuss the proposed changes. If the Schemas' maintainers do not want to make the changes, or the Schemas in the SKL Library are references to ontologies managed elsewhere, their respective Schemas may be forked into a different ontology.

According to some embodiments, version and release management for each Schema may be done according to the Semantic Versioning specification.

An embodiment of a SKApp is one that may clone a local copy of Schemas for some of the most popular Integrations from the Official Library. In some embodiments, this SKApp may be termed KnowledgeOS. In order to support custom KnowledgeOS features, these Schemas may be unique customizations or extensions of the normal Schemas that the Official Library shares publicly and that other SKApps use for the same Integrations. For example, KnowledgeOS, or any other SKApp, might use the Schemas for an Integration which detail the Integration's keyboard shortcuts to display as a reminder for users. The SKApp may also provide additional keyboard shortcuts whenever a user is looking at content from that Integration. To do so, it can modify, and thus use a custom version of, the Schema for each Integration to include the additional keyboard shortcuts According to some embodiments, when using KnowledgeOS, if a user visits a website (e.g., an Integration) which is not represented in the Official Library, the SKApp may create an Integration from the Schema for the INTEGRATION data type and include as much information it may about the website (e.g., via the DOM, the Browser API, etc.) and upload this to the Official Library as a "suggested" Integration. The process until this point may be entirely automated. The maintainers of the Official Library may then choose to manually review, edit, accept, or reject the changes to the public repository. In some embodiments, the creation and/or the review and acceptance of changes may also be automated. For example, a heuristic or artificial intelligence could be used to automatically review, edit, accept, or reject the changes. Similarly, web scrapers, web crawlers, and other methods and processes could be employed to automate the generation of Integration profiles, including Schemas, Metadata, configs, etc. The same may be done for other aspects of SKL, such as the collection of data, creation, review, and approval of Schemas (e.g., Nouns, Verbs, Interfaces, etc.).

In a non-limiting embodiment, updates to Schemas are versioned using a standard versioning scheme (e.g., SemVer). SKApps and other components may have the ability to choose both which branch of the Artifacts they prefer to use (e.g., main vs. a custom branch vs. a branch with suggested changes), as well as the version they use if on the main branch.

In another non-limiting embodiment, SKApps and SKDSs also have the option of subscribing to a branch for a given Schema or set of Schemas in order to automatically receive notifications about changes to the resources as they are suggested or edited.

According to some embodiments, a SKApp or an SKDS may use and store alternate versions of any Artifacts, as this may enable non-standard or custom implementations. For example, an organization might use a custom, proprietary, and confidential data ontology, including custom Nouns, Verbs, etc. In this embodiment, the Schemas and Artifacts corresponding to this confidential ontology are in a locally hosted SKL Library that is not accessible to anyone outside the organization. The Schemas and Artifacts could even be totally disconnected from the Internet so that the Official SKL Library may not be aware of them. If the organization decides to make a Mapping from their proprietary Schemas to one or more popular and public ontologies with Mappings to other components in the Official Library, then that company's proprietary Schemas, and the SKL components that work with the proprietary Schema, may now also be able to work with several of the components that previously only worked with the public ontology.

Registry

In yet another embodiment, Artifacts in the SKL Library are able to be viewed and downloaded publicly, in an open source way. However, attribution and control of changes and versioning may be given to individuals and organizations by listing certain Schemas, configurations, code or other Artifacts under the profile page of the individual or organization that first introduced said Artifact to the Library. Such individuals or organizations may maintain ownership over those Artifacts and control the approval of requested changes and versioning. They may also choose to give such permissions to other individuals or organizations to help manage and maintain the Artifacts, including but not limited to restricting the training of AI models and/or the use of the artifact by AI models in composing software. In this embodiment, the SKL Library forms a registry wherein developers upload contributions to be shared with the community.

In some embodiments, the record of such contributions by individuals and organizations to the Library of Artifacts and Mappings could be maintained using blockchain technologies. In the event that money flows through the SKL Library to pay for specific Verbs, Interfaces, and more, the SKL Library may distribute payments or micropayments for every transaction according to the contributions made by various individuals/organizations, which could be stored on a blockchain.

According to some embodiments, smart contracts could be considered types of Verbs that get executed when certain conditions are met, such as a payment for a SKApp or a Verb that uses certain other components contributed by other people. Using SKL in conjunction with smart contracts, those payments could automatically be distributed to the people that created or contributed to the one or more components that make up the Knowledge App receiving payment. In some embodiments, an app store provider takes a percentage of the payments that are made through the platform. In this embodiment, people may be properly incentivized to make components in exchange for payments, micropayments or otherwise pre-programmed value that would be distributed through the use of the components and Mappings they created.

Private SKL Libraries

According to some embodiments, the system may support the hosting and management of private SKL Libraries that may either be connected to the Official Library or hosted in isolation. In this way, organizations and/or individuals may choose to create private Schemas, configurations, code, etc. following the SKL protocol. According to at least one embodiment, these private Artifacts could be hosted privately on the Official Library, in a separate private library such as a private SKDS, or in some combination of the concepts discussed herein. In an embodiment, a bank may want to build applications that integrate with a proprietary database technology which they do not want external individuals or companies to discover. The bank may build Mappings in accordance with the SKL protocol which it uploads to the SKL Library (via the API or website interface) with a field marking them as private to their organization. Only developers that are members of that bank's organization or applications with security keys authenticating them with the organization may be able to download and use the Mappings to the proprietary database technology.

Similarly, in yet another embodiment, an organization (e.g., the U.S. Navy) may want to create and manage a custom private ontology that may be represented via custom standard Nouns and/or Verbs that abstract away endpoints from a variety of Integrations. These custom Artifacts could exist in isolation such that they are only mapped to each other privately. Alternatively, they could be related to the Artifacts in the public Library such that they are able to make use of the total capabilities that are publicly available. In other words, the U.S. Navy could make a custom representation of a "Contractor" and only relate it to Nouns, Verbs, Interfaces, and other Artifacts within their private library. Alternatively, they could relate CONTRACTOR to the public representation of CONTRACTOR, if it exists, or ORGANIZATION and thereby make many of the public Noun ORGANIZATION'S public capabilities and relationships also available via their private Noun CONTRACTOR. For example, the public Noun ORGANIZATION may have an associated Verb that may help keep track of public news mentions (e.g., TRACKNEWSMENTIONS). By relating the necessary fields of the private Noun CONTRACTOR to the public Noun ORGANIZATION, and further classifying it as a child of ORGANIZATION, the public Verb TRACKNEWSMENTIONS could automatically work with any instance of the private Noun contractor even though the public Verb and the private Noun were never directly mapped to each other.

In some embodiments, users may be able to create custom Verbs without having to upload them to any Dictionary; public or private. Since Verbs may follow a certain Schema, their configuration may be easily created, customized, or otherwise altered directly within an SKDS, the code for a given application, or wherever they are defined. In other words, since Verbs may be composed of a configuration that does not actually contain the processing logic within it, but rather what logic to call and when. This may enable the simple creation of Verbs that may call other Verbs according to specified configuration and triggers, such as a specific schedule or trigger(s). In this embodiment, users and developers may be able to use custom Verbs to create automations that may in turn be composed of, or otherwise reference, standard Nouns and Verbs. The benefit of this approach is that an automation may be easily made to run over all Messages regardless of which Integration that message is actually sent through. The user may be able to easily determine what to do with every Message, such as check for customers' PII (personally identifiable information) or other sensitive information that should not be shared externally, regardless of the messaging service.

Operating Environments

According to some embodiments, SKL components may have Metadata to suggest which ecosystem and/or platforms they may run on. For example, certain components may only be able to work on a blockchain such as Ethereum®, while others may only be able to work on a device that runs iOS® (such as an iPhone®). In other embodiments, users may only want to connect components that meet certain security and/or privacy requirements for compliance (e.g., SOC 2, HIPAA, etc.). The configurations that determine the operating environment for a given set of connected SKL components may be automatically managed or manually specified. In various embodiments, these configurations may be held within the SKDS, as part of the Coordinator, and/or within Knowledge Apps.

In some embodiments, when configurations are held by an SKDS, that SKDS may restrict which Verbs, Interfaces, and Knowledge Apps are able to interact with data within that SKDS. For example, an organization might manually create a whitelist of acceptable components and/or Knowledge Apps that may be connected to their SKDS. Alternatively, they might simply specify that only HIPAA certified components and/or Knowledge Apps are able to be connected. In yet another embodiment, the SKDS may exist on a device that is not connected to the internet and is therefore only able to work with other components that may be run on device or otherwise within its network without having to connect to the internet. In another embodiment, an SKDS that only stores data in a decentralized way may specify that all data must be stored on IPFS (InterPlanetary File System) and that all processing must be documented via transactions stored on the Ethereum® blockchain (or for example, other layer 1 chains that might support smart contracts). Similarly, certain SKL Artifacts might only work in virtual or augmented environments.

In some embodiments, SKDSs may restrict which processors/interfaces/etc. are used together. This may, for example, be embedded into the SKDS configuration in the Library. This is a way for enterprise customers (e.g., the U.S. Navy) to ensure that only approved software components are used with their data.

Managing Libraries

According to a non-limiting embodiment, SKL Libraries may provide a variety of systems and methods that can deduplicate, correlate, interrelate, and provide recommendations of Entities. Since, according to the embodiment, an SKL Library is an SKDS that primarily hold the SKL Schemas in and of themselves (e.g., the Schema for a FILE Noun, a SHARE Verb, a CARD Interface, etc.), the SKL Library's nodal data structure and the methods and processes used to build and maintain it can therefore applied to the Schemas and other Artifacts.

Figure 34:
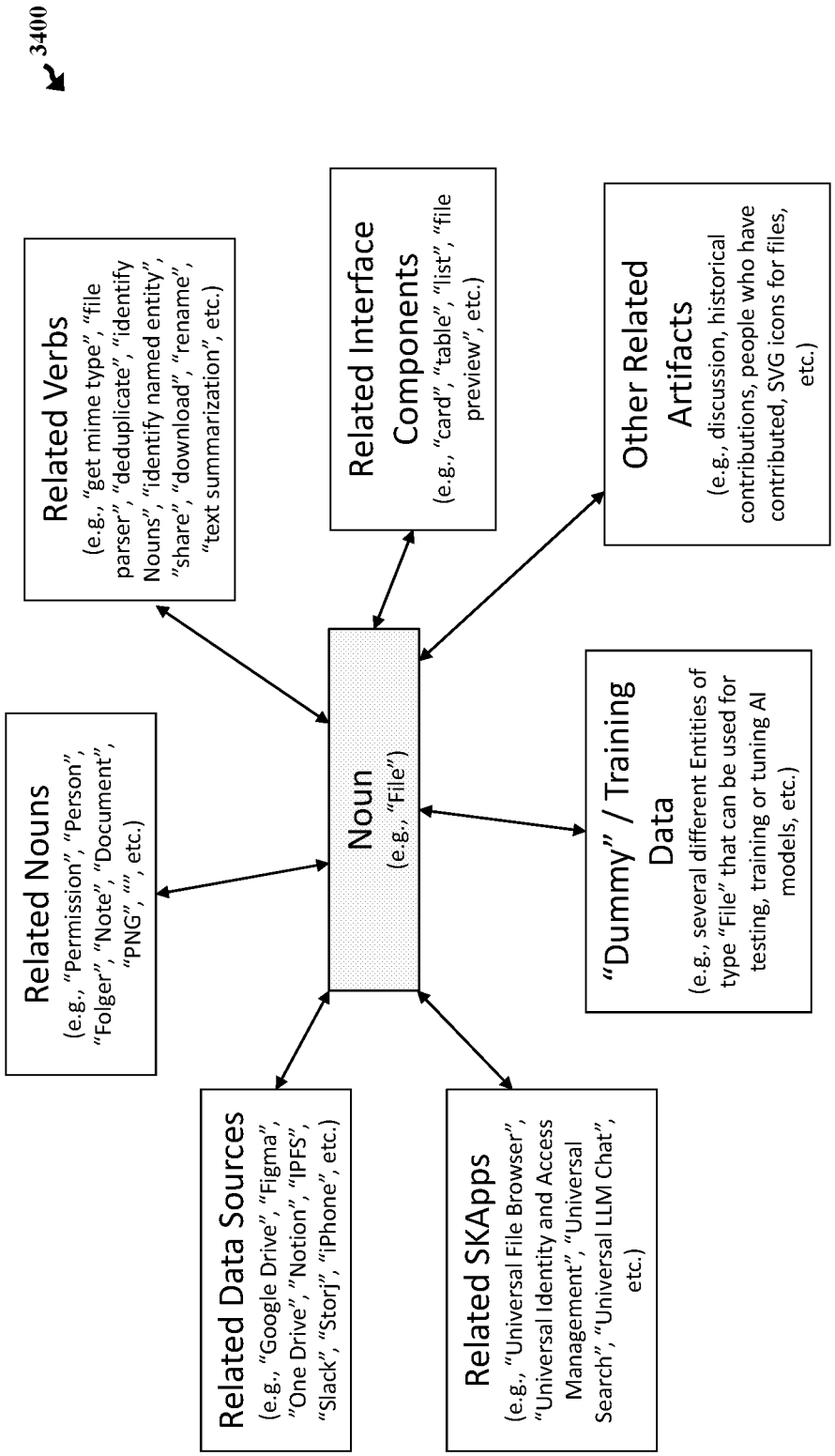
FIG. 34 illustrates a clustering of entities based on their properties and/or relationships to other Entities, in accordance with an embodiment.

In other words, the Official Library can store or otherwise index or represent Entities in an SKDS that can be deduplicated, interlinked, and contextualized. For example, an SKL Library may establish that the Google Drive® API and Google Drive® website are both two different representations of a broader Google Drive® Integration Entity. This association can be made by, for example, automatically comparing metadata and establishing CueIDs and/or Unique IDs associated with each Entity, how that Entity is used, what common relationships any two given Entities may have, and more. Similarly, Entities can be clustered based on their properties and/or relationships to other Entities (e.g., both Google Drive® API and Google Drive® website have relationships to a FILE Noun, a FOLDER Noun, etc.), as depicted in FIG. 34. Machine learning algorithms, such as k-means clustering, and/or some of the other methods described herein can also be used to find similar Entities within SKL Libraries. In another non-limiting example, semantic similarity between words can be established (e.g., Google Drive® API and Google Drive® website use many similar words). In yet another example, users can establish and classify links manually across Entities.

Several types of relationships between Entities and/or Artifacts can be established and managed automatically, semi-automatically, and/or manually. For example, any type of Schemas and Artifacts, not just Integrations, can be linked, classified, and/or otherwise have a relationship with one or more Entities in the nodal data structure change. This includes not just the deduplication of Nouns, Verbs, Interfaces, SKDSs, SKApps, and the data they represent, but also other types of relationship-building and relationship-management.

For example, SKL Libraries may let users upload OpenAPI® specifications for given Integrations in order to help facilitate the creation and management of Schemas and Mappings related to the Integration. The SKL Library may then automatically parse the contents of the OpenAPI® specification and compare the methods, inputs, outputs, and any other information provided or otherwise available (e.g., the Integration's website, the Integration API's website documenting the API, other third-party information such as Wikidata®, etc.) in order to gather information, automatically or semi-automatically build Schemas, create or modify CueIDs and/or UniqueIDs related to that Integration (e.g., for each API endpoint) such that they can be automatically compared to other existing Schemas that may each also have one or more Cue Ds and/or UniqueIDs, and so on. In this way an SKL Library may use the methods described herein in order to automatically and/or semi-automatically help establish relationships and recommendations, such as deduplication, Noun, Verb, and Mapping recommendations, between related Entities (e.g., Schemas, components, Artifacts, etc.).

In an alternate embodiment, various Schemas (e.g., Nouns and Verbs) can be automatically created that are unique to each Integration. For instance, each Integration's representation of Nouns and Verbs (such as PERSON, ORGANIZATION, SHARE, etc.) can be created as Schema and then deduplicated. In some embodiments, this may create redundancies between the Integration Schema and the Integration-specific Verbs and Nouns (e.g., because the Verbs may are already defined as Schema through OpenAPI®), however, doing so may be helpful with the automated and/or semi-automated management of various Schemas in SKL Libraries by being able to more effectively compare specific Schemas in discrete ways. Similar results may be otherwise achieved through the use of natural language processing techniques such as tokenization.

Recommendations of SKL Library Artifacts

According to a non-limiting embodiment, SKL Libraries can provide automatically, semi-automatically, and/or manually generated and/or recommended relationships and/or classifications between SKL Artifacts (e.g., and the data the Schemas represent) to users in a variety of ways. For instance, administrators of the SKL Libraries trying to manage Artifacts in an SKL Library may manually link two or more Noun nodes as being related (or manually create a Mapping between at least one Verb and a Noun, etc.). In the process of manually linking two Nouns (e.g., as synonyms, or some other type of relationship) the administrators may use a graphical user interface showing the profile of a Noun, similar to the Integration profile shown in FIG. 33, in order to access a button to "add a relationship" (not shown in FIG. 33) between that Noun and some other Entity. This can reveal a list of other Artifacts (e.g., Nouns) that have been or are being suggested (e.g., automatically, by another user, etc.) as related to the current Noun. The administrators may choose to establish a link with any Artifact in that Est, or they may alternatively search for a different Artifacts. In either case, the SKL Library may employ one or more different algorithms to rank the results presented (e.g., based on existing linkages, based on semantic similarity, based on CueIDs and/or UniqueIDs, etc.).

In another example, as a user or developer searches for, creates, modifies, and/or otherwise interacts with the Library of SKI, Artifacts, the SKL Library may provide and/or recommend other related SKL Artifacts that may be relevant. In other words, a user or developer creating a new Noun called HUMAN can be presented with other existing Nouns which are synonyms or which may otherwise be relevant to his/her work such as PERSON, MAN, WOMAN, INDI-VIDUAL, etc. The SKL Library might similarly provide other relevant SKL Artifacts including related Interfaces, Verbs, and more. This can help the user or developer avoid creating duplicate Nouns and take most advantage of the work that has already done within the Library. In this way, contextually relevant information can be identified and presented around any given SKL Artifact. Furthermore, these methods can also help avoid the duplication of Nouns, Verbs, and SKL Artifacts, and thereby help maintain a clean and usable SKL Library.

In some embodiments, SKL Libraries can suggest relationships as well as the classifications for those relationships between any given Entities, as described elsewhere herein.

Further described, each Noun within an SKL Library can dictate and/or reference a one or more methods for the identification of said data type/Noun. For example, while a user is interacting with a given website, the SKL Library might have the information necessary to identify what type of data that website represents. SKL configurations can automatically look through the website's HTML for embedded information that might classify the page as a social profile or alternatively classify that the website is a social profile for a Person by matching the website's URL structure to existing configurations in the SKL Library. Once a given piece of data is identified as being a particular Noun, or a particular Noun from a particular Integration, the SKL Library will be able to match a variety of other SKL components that can work with the data in its existing environment. For example, if a user is looking at someone's LinkedIn® profile, the SKL Library can suggest a variety of existing Verbs (and/or other SKL Artifacts) that a user can easily use over that profile. For example, the user can elect to create a new, or enrich an existing, Contact in his/her SKDS with the data found on the LinkedIn page. The user can similarly choose to run a Verb that uses a separate integration to find the email and other contact information for the person shown on the LinkedIn profile. In this way, relevant Verbs and other SKL Library Artifacts can be easily shown and/or recommended contextually as the user is working.

Some of these SKL Artifacts can be preinstalled or preconfigured to run automatically any time the user visits a person's LinkedIn® profile, so that the user's existing contacts are constantly being enriched and updated with data from their LinkedIn® profiles. Furthermore, as is described in more detail below, some of these SKL Artifacts, such as the LinkedIn® contact enriching Verb, can require payment from the user by the Verb creator.

In another embodiment, the analytics server might be able to identify the user's intent based on more than just the identification of what he/she may have in focus on the screen. For example, the analytics server may be able to draw more information from a user's SKDS such as his/her current role, project, and objective and start to recommend specific actions, Verbs, and other SKL Artifacts that may be useful to the user. For instance, if a user is reviewing a document that relates to a particular project and then opens a new spreadsheet while billing his time to the project. As a result, it can be assumed that the user's interaction with the spreadsheet is related to the project.

Using the various methods described herein, an analytics server, in conjunction with an SKL Library, can identify a user's electronic content and electronic context and then present potentially related and/or relevant Nouns, Verbs, Interfaces, Integrations, SKDS, etc. as shown in the figure below. Relevance can between SKL Artifacts and electronic content and/or electronic context can be established in a number of ways, including but not limited to graphical analyses, semantic analyses, activity analyses, and more. As described herein, relationships and recommendations can be synthesized, such as by analyses of text, images, videos, and more in order to establish semantic similarity, content similarity, activity similarity, etc.

Figure 18:
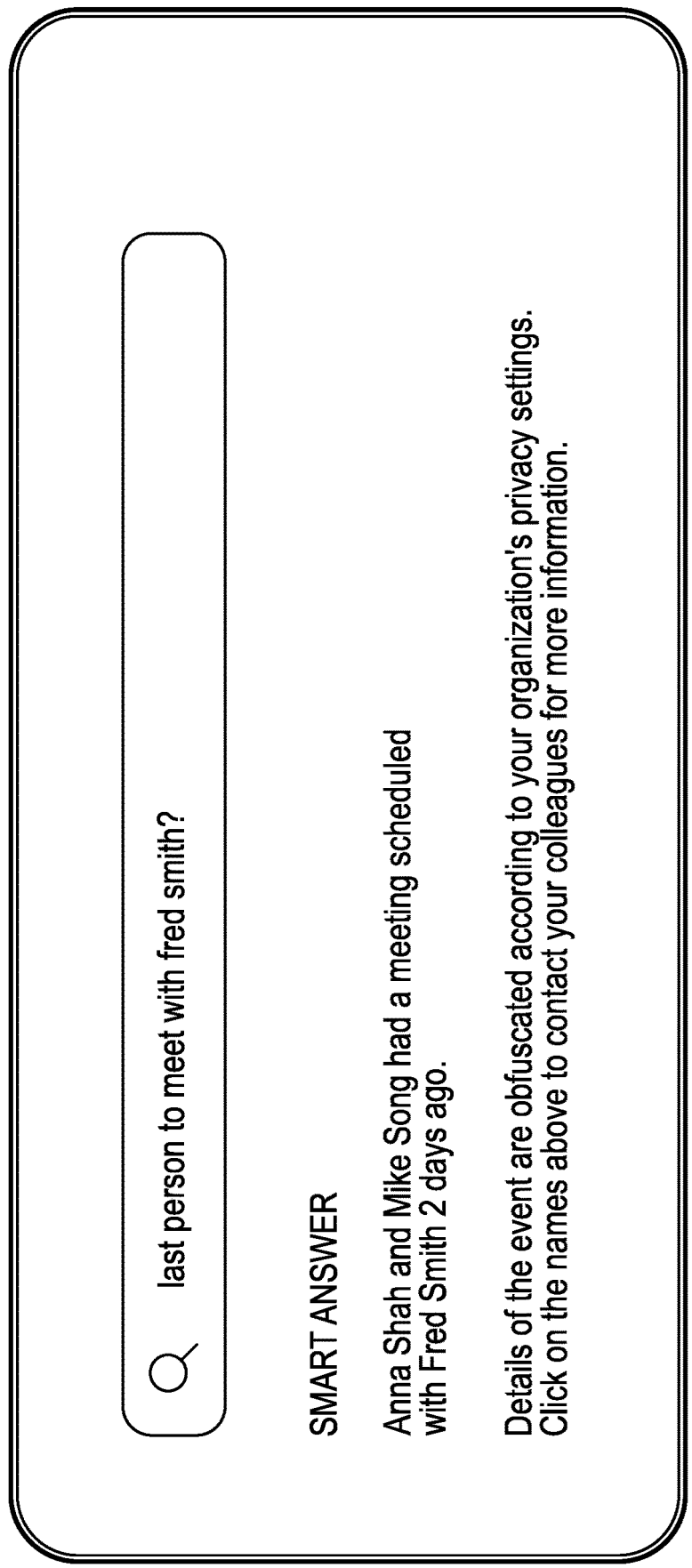
FIG. 18 depicts exploring the data inside a document through a natural-language query.
Figure 35:
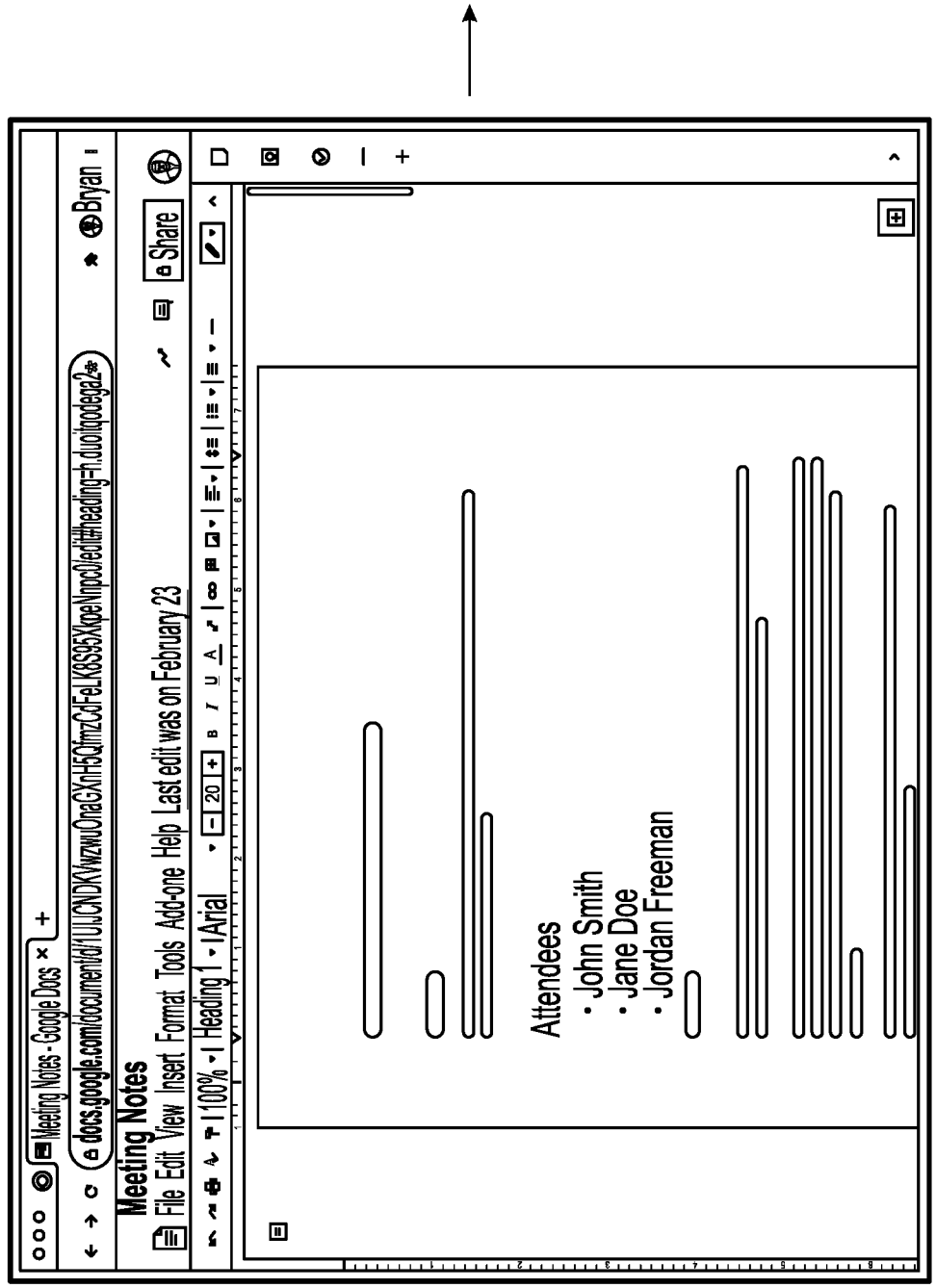
FIG. 35 depicts a graphical user interface of an online word processor application, in accordance with an embodiment.
Figure 35:
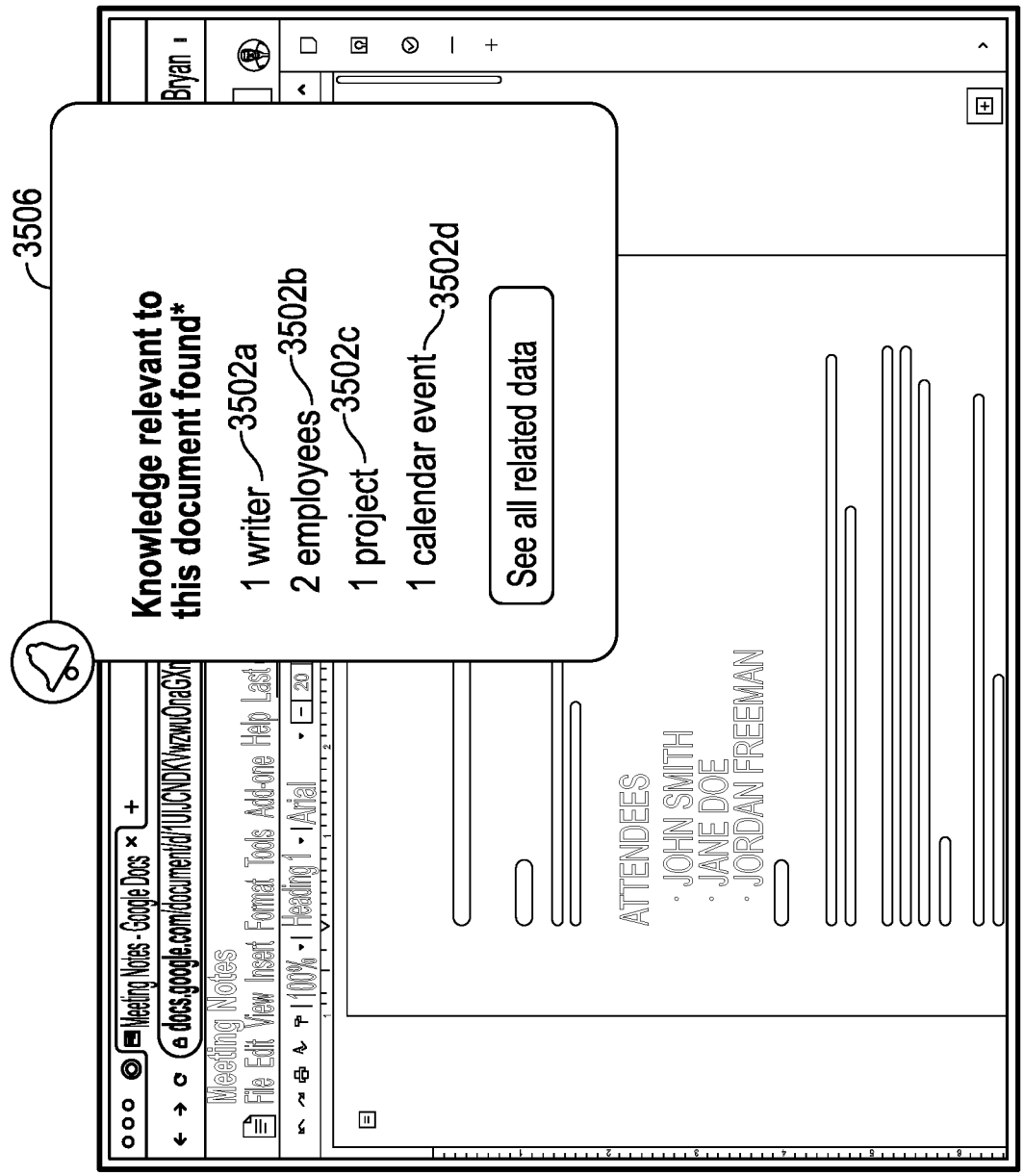
Figure 36:
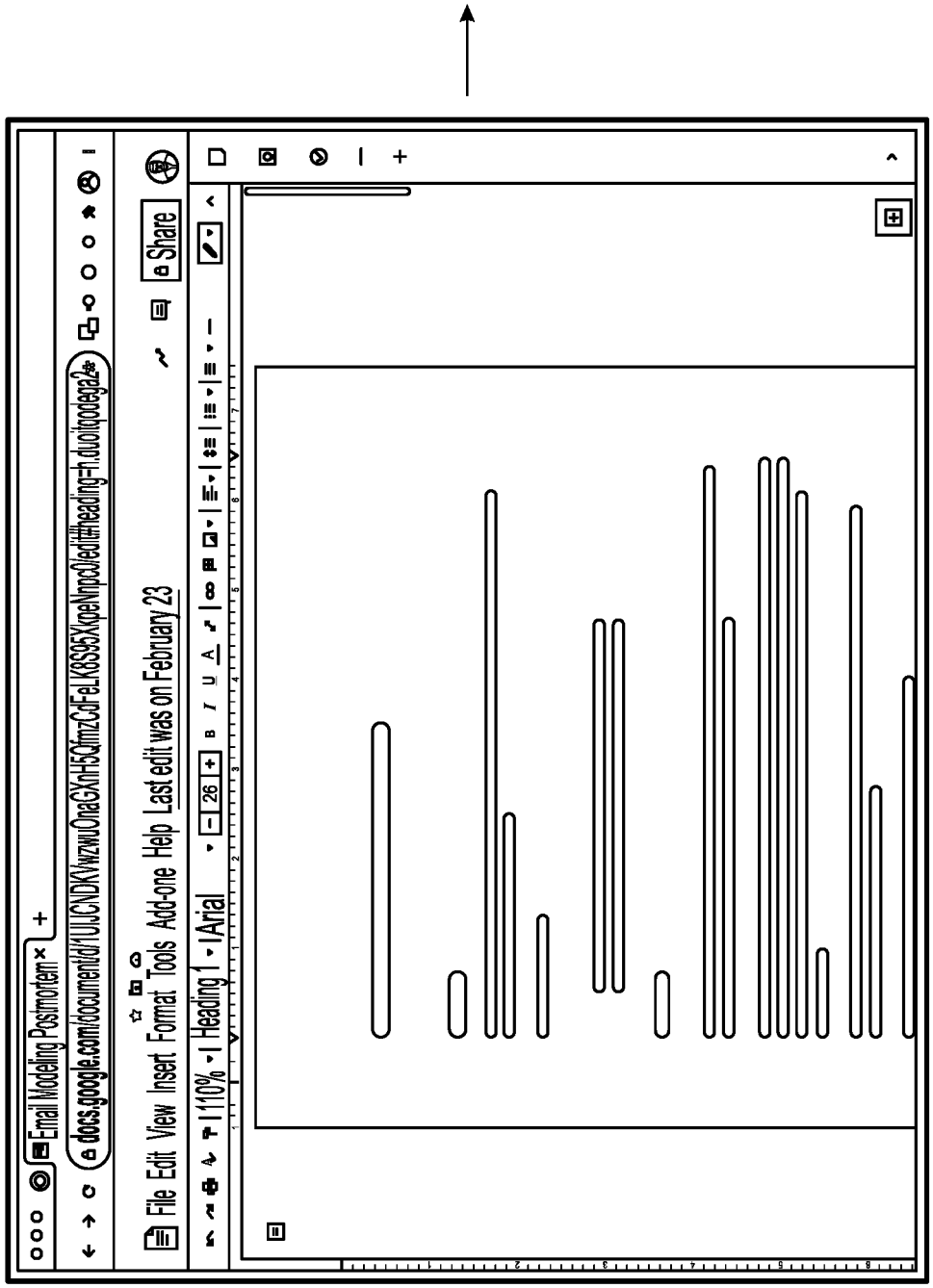
FIG. 36 illustrates some of the Nouns that an analytics server may automatically identify within electronic content, in accordance with an embodiment.
Figure 36:
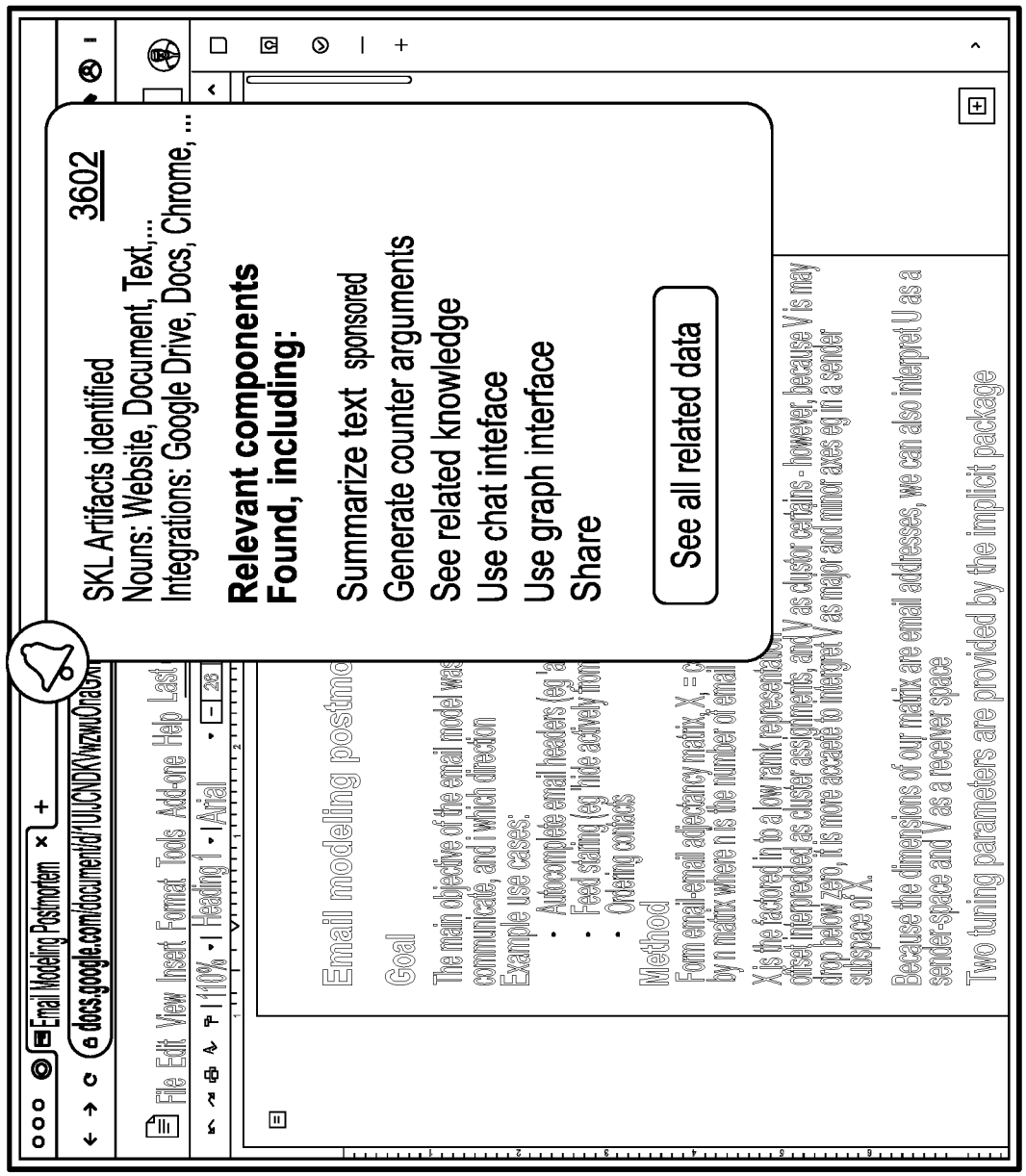

For example, FIG. 35 depicts a graphical user interface of an online word processor application 3504, according to an embodiment. In this example, the analytics server establishes that certain SKL Artifacts 3502a-d are included in the electronic content and therefore is able to present other relevant Artifacts that may add value to end users of the online word processor. In this non-limiting example, FIG. 36 illustrates some of the Nouns 3602 that the analytics server may automatically identify within electronic content include WEBSITE, DOCUMENT, TEXT, GOGGLE DRIVE, GOGGLE DOCS, and GOGGLE CHROME. Using an SKL Library, the analytics server is thereby able to identify related Verbs such as SHARE, SUMMARIZETEXT, GENERATECOUNTERARGUMENTS, and SEERELATEDKNOWLEDGE, as well as present other capabilities that the SKL Library can facilitate. Some of these related Verbs may be sponsored by a given provider (e.g., services like OpenAI®, Google Cloud Platform®, Azure®, Amazon Web Services®, etc. that may have been previously only accessible to developers and/or users with technical know-how) that wants to market certain capabilities to end-users directly based on the identified electronic content and/or electronic context. These capabilities may include exploring the data inside the document through a natural-language query such as the one shown on FIG. 18 where the user can ask questions about a document (and/or related Entities) or access more information, a graph-like interface where the user can explore relationships and similarities to other Entities in one or more SKDSs (e.g., SKL Libraries, private nodal data structures with productivity data and/or personal health information, etc.).

Figure 51:
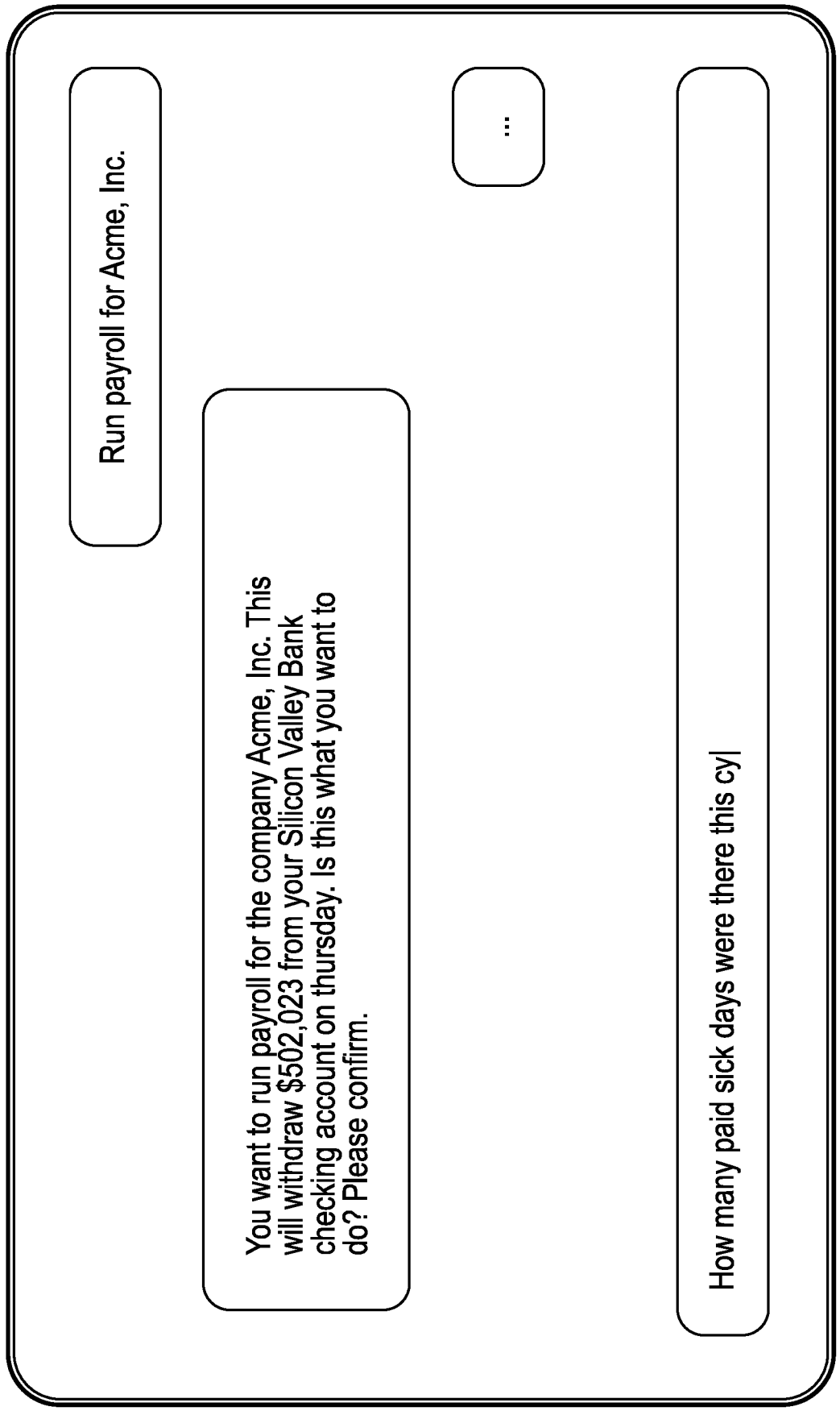
FIG. 51 shows a graphical user interface where a user is interacting with a large language model that is able to retrieve data, in accordance with an embodiment.

FIG. 51 shows a graphical user interface where a user is interacting with a large language model that is able to retrieve data (e.g., Entities, and information about and related to Entities) and execute capabilities defined through SKL (e.g., Verbs in a user's SKDS, in an SKL Library, etc.) in a chat-like interface, according to an embodiment. In this example a user is able to execute Verbs such as "run payroll" through natural language commands communicated conversationally. The user is further able to engage with the chat-like interface to ask for clarification, gather more information contextually, change parameters, and more. In some embodiments, the user is able to speak to the chat-like interface rather than type out questions, commands, responses, and the like.

In this way, SKI, Libraries can be used to present contextually relevant data and capabilities to end-users. Some of these capabilities can be abstracted away from a variety of competing products such as text summarization services from Amazon Web Services®, Google Cloud Platform®, Azure®, etc. Certain providers may choose to pay the providers of certain analytics servers and/or SKL Libraries for a higher ranking on suggestions.

In some embodiments, a user is able to use other types of human-computer interaction interfaces such as haptic devices, brain interface, and the like to communicate with an SKL-powered system. For instance, a brain interface might be able to recognize certain intentions (e.g., language expressions, feelings, etc.) through monitoring brain signals and be able to find data and capabilities from SKDSs, Integrations, and/or SKL Libraries in order to contextually enable the user to access data and/or leverage Monetization and Management of SKL As discussed herein, certain SKL Artifacts may require payment. For example, a user reading a long article may wish to use a text summarization Verb to help him/her understand the gist of what he/she is reading in a short amount of time. According to an embodiment, user of a SKApp a web browser, a browser extension, etc.) may choose ahereinSUMMARIZETEXTthereinVerb while reading the long article and be able to specify whether he/she wants to use a given Integration to summarize said text, such as Google® Cloud Platform's service, Amazon Web Services®' service, OpenAI's® service, and so on, Several of these services require payment which can be facilitated via the Official Library. The Official Library may charge a processing and/or platform fee over whatever payment is made through the Official Library.

Furthermore, the developers that contributed the Schemas Integrations, Nouns, Verbs, and/or Mappings) to the Official Library may also request compensation on any payment that uses their Schemas and/or SKL Artifacts. In this case, the platform fee can be distributed in part or in whole to all the contributors that contribute to the Official Library. This creates an incentive for people to contribute components to the overall system, thereby increasing the ability of any individual to build and customize software that solves an ever-increasing breadth of use cases.

In a non-limiting embodiment, all contributions to and usage of SKL Artifacts, including Nouns, Verbs, Mappings, Interfaces, and more may be tracked so that they can be properly attributed. The Official Library can distribute payments to contributors proportional to the amount of usage their Artifacts are receiving.

In another non-limiting embodiment, all contributions to SKL Artifacts can be maintained on a blockchain, and any payment logic can be embedded within smart contracts on said chain such that any payment related to and/or usage of SKL Artifacts can automatically distribute the payments to the corresponding contributors in a pre-established manner. In other words, the Official Library can establish a protocol to track and incentivize the contributions to, and development of, SKL. Furthermore, a decentralized autonomous organization ("DAO") can be established to set the rules for how payments and incentives are distributed to stakeholders of the Official Library and ecosystem (e.g., the process to share revenue based on contributions, what the Official Library's commission is, etc.).

In some embodiments, there may be incentive structures to encourage people to contribute to this community, for example by tokenizing contributions, requiring that contributions are staked by something of value, and/or using a logic for evaluating the value of contributions.

In yet another embodiment, the SKL Library may also provide advertising opportunities such as the prioritization in the placement of Google Cloud's® text summarization service over Amazon's® text summarization service in the example herein. Given that the Official Library can become the central access point for software components that either use or are represented with SKL methods or Schemas, the Official Library may be considered as the marketplace of software components, including Nouns, Verbs, Integrations, Interfaces, and more. The Official Library can offer one or more interfaces to be able to access all the Artifacts it contains. For example, the Official Library GUI can help users search and browse for components and the Official Library API can help users search or access information in other ways that enable contextual access while they are working normally.

According to some embodiments, the SKL Libraries may also offer to organizations various managed, private SKL Libraries along in exchange for a subscription fee (e.g., software as a service, platform as a service, etc.). In this way, and as described elsewhere herein, an organization can accumulate private SKL Artifacts that can help them establish a competitive advantage over time by compounding their ability to reuse software components across needs, projects, and use cases.

Low-Code and No-Code Composition

In a non-limiting example, an airline has a variety of different systems and databases that each hold historical and operational records related to flights, passengers, tickets, loyalty program statuses, stewardesses, pilots, and more. The airline wants to be able to easily create portals, interfaces, and/or apps that can easily access data regardless of where that data resides. In other words, it, wants to create unified APIs for all of its data and software capabilities. Using SKL, it abstract away the various systems into one easily manageable ontology that allows it to search for all the flights that have been flown, are currently in the air or scheduled, along with all the passengers, bags, stewardesses, pilots, and more. This airline could do this within an SKL Library that allows them to create and edit Schemas in a low- or no-code way. In yet a third example, the Official Library might expose certain Verbs such as herein SUGGESTONTOLOGY or GENERATEONTOLOGY given a particular set of descriptions, data source Schemas, and/or other information such as desired use cases and/or user stories. These Verbs could in turn use artificial intelligence techniques, such as leveraging large language models, to propose the ontology the airline may need as well as the Mappings to all the necessary data sources.

Beyond unifying software capabilities, SKL can enable this airline to unify its data, for example by deduplicating and/or recommending deduplications and/or other relationships between people across databases, records, etc. This would improve the airline's ability to create and manage custom software that help provide holistic data, analyses, compliance, automations, and more.

The airline might then choose to create Mappings between its ontology and other existing Schemas in the Official Dictionary, such as other Nouns, Verbs, Interfaces, etc. As described herein, these relationships could be established and managed in a manual, semi-automatic, or fully-automatic way. As they create the SKL Schemas to represent and translate and/or transform data types (Nouns), capabilities (Verbs), Interfaces, Knowledge Apps, other data sources and systems (Integrations), Mappings, and more into a given ontology, they are all accumulated in a unified index of SKL components (e.g., an SKL Library). This Library of composable components would serve as the repository of "Lego® bricks" (so to speak) that can be customized and/or put together to make new SKApps, Verbs, automations, etc. according to the airline's needs.

Described further, the airline is then able to use their growing SKL Library of components to easily create automations such as a loyalty recognition program where they can choose which passenger(s) on a given flight to recognize and or give special treatment to based on data about each passenger's flight history, personal information, and more. Where previously this would have required a lot of complex logic tied to various data sources, SKL abstracts and simplifies the process through a semantic integration approach. The airline is then able to use any existing components from the Official Library to build their custom applications, automations, SKApps, etc.

In some embodiments, these SKL components can be compiled together by a developer building an application using custom code or manually using a code editor interface. In other embodiments, these components can be fit together using a no-code interface. Such an interface would allow non-developers to create new systems by combining and/or customizing components similar to popular no-code application and workflow builders. FIGS. 42-44 illustrate non-limiting embodiments of how Schemas can be parametrically altered to change Interface Components and FIGS. 25-28 illustrate how more easily usable graphical user interfaces can be added over Schemas to facilitate the ability of non-technical users to edit Schemas. Together these examples demonstrate how SKL Libraries could be used find various Schemas, combine them, and customize them in order to build sophisticated applications in no-code ways.

In yet another embodiment, a user is able to describe (e.g., through natural language, through comparison, through reference, etc.) the software and capabilities they want (e.g., an application that can consolidate all productivity data from file storage tools, communication tools, scheduling tools, and project management tools), the data they want the users to interact with (e.g., where productivity data includes files, messages, tasks, and people), how they want the data stored (e.g., where each user stores their data in a graph database locally on their Macbook® Pro running Apple® silicon), and how they interact with the application (e.g., and where the users can interact with the application using a search functionality and profiles for entities that look similar to LinkedIn profiles). In this non-limiting example, the SKL, Library, and/or the analytics server processing the data, may be able to use a large language model ("LLM") to find the SKL Schemas most relevant to the description. To do so, a developer may find or create a language model suitable for distinguishing between features of SKL Schemas. Then, a vector embedding may be created for each SKL Schema and those vectors inserted into a vector database. Next, it may process the description by generating one or move vector embeddings from the input text. The input embedding may then be used to query against a database of vectors representing each SKL Schema using a distance metric (e.g., Euclidean, Cosine, etc.) to collect relevant and/or similar Nouns, Verbs, Interfaces, SKDSs, SKApps, etc. from the Official Library (and elsewhere). The Schemas found most relevant may be combined into a fully working SKApp according to the description. This synthesis step could be performed by a large language model trained on vast amounts of code and possibly aided by some heuristics about SKL so that it can predict how a library like Standard SDK would be used to create the described application.

In the event that there are multiple options for components, (e.g., multiple ontologies, multiple interfaces, etc.) that can be chosen (e.g., by the analytics server) in the composition of the SKApp, then the AI system could either automatically make a decision, or prompt the user for additional input, feedback, and/or clarification.

In another embodiment, after receiving the description from the user, the system might generate new Nouns, Verbs, Mappings, Integrations, etc. using a large language model trained with data from SKL Libraries. The LLM might also use third-party data as part of its training set in order to improve the capabilities of the model in generating new components that have not previously existed in SKL, Libraries.

In another embodiment, after receiving the description of the application from the user, the system may also query one or more SKL Libraries and/or other sources to collect relevant and/or similar Schemas and SKL components in order to generate entirely new Schemas and components using generative AI techniques, and then combine them into a cohesive SKApp.

Due to the potential modular, interoperable, and parametrically editable nature of SKL, a user creating software across any of these examples may use the output of any of these processes as a starting point for further editing of the software. In other words, a user may start programming a custom SKApp, then move it into the no-code/low-code graphical user interface builder mentioned herein to customize certain components. The user could then add in new features and functionality by describing the desired capabilities to an input (e.g., a chat interface) that can use a LLM to help generate new and/or combine existing components and add them to the SKApp. Any output of SKL Schemas that are used to create a SKApp could then be parametrically altered, tweaked, and customized after the fact according to the methods described above (e.g., through traditional programming and software development, through the configuration of Schemas as shown in FIGS. 42-44, through custom interfaces as suggested through FIGS. 25-28, some combination of these methods, etc.).

In these ways and more, SKL Libraries can be used to easily create and manage custom components, Schemas, SKApps, and more that can deliver complex, sophisticated, and powerful solutions through software.

SKL App Frontend Frameworks

According to some embodiments, the SKL Interface Components may be defined through Schemas and configuration such that a front-end framework can enable application developers to contribute, reuse, and share UI components that are capable of being interoperable over many different data formats. This is referred to herein as the SKL Interface System, SKL Interface Framework, or Standard UI, and may consist of several parts.

First, a protocol for how applications may automatically translate data types into the particular formats required by UI components. This may be done using SKL Mappings. Second, a protocol for communication between UI components and their embedding application. Third, an open source registry where anyone may publish their UI components and Mappings for other people to discover and use. This is part of the Standard Knowledge Library.

Mappings

According to some embodiments, upon receipt of a specific component to render and data conforming to a specific SKL Noun, the Interface Engine searches for a NounInterfaceMapping, which relates the Interface Component and the Noun. This Mapping may be executed using an SKL Engine, and the response may be used to render the component. Optionally, if a Mapping is not found, the Engine may choose to pass the data directly to the component to be rendered as the fields used by the data may naturally match up with the properties expected by the component. To render the component, the Engine may either load the component's code from its sourceUrl property or recursively render the UI defined in its nodesProperty.

Nodes Definition

According to some embodiments, Interface Components which do not require complex logic defined through code, may have their entire content specified through their SKL Schema in the nodes field. Many UI frameworks may include a set of built in "primitives." For example, HTML may have a set of standard tags which are expected to be implemented in the same way by any HTML rendering engine such as "div," "p," "h1," "h2," etc. Likewise, the SKL Interface Framework may expect Engines to implement a standard set of primitive interface components. According to various configurations, these components—while not limited to—may include the following:

Container—defining a section which may contain a sub tree of other components.

Text—defining a block which contains a text which may be styled.

Image—defining a block which displays an image through a source URL.

These primitive components may be constructed as a tree of RDF nodes in RDF serialization. According to one embodiment using JSON-LD (context omitted for brevity):

```
{
...
"https://skl.standard.storage/properties/nodes": [
    {
        "@type": "https://skl.standard.storage/interface/Container,"
        "https://skl.standard.storage/properties/styling": { ... },
        "https://skl.standard.storage/properties/nodes": [
            {
                "@type": "https://skl.standard.storage/interface/Text,"
                "https://skl.standard.storage/properties/styling": { ... },
                "https://skl.standard.storage/properties/propertiesMapping": {
                    "@type": "rr: TriplesMap,"
                    "rml:logicalSource": { ... },
                    "rr:subjectMap": { ... },
                    "rr:predicateObjectMap": [ ... ]
                }
            }
        ]
    }
],
...
}
```

As shown herein, in addition to a tree of sub-nodes, a Node may include properties specifying styling, and a property Mapping.

Styling & Themes

According to some embodiments, a UI rendering engine may include a specific format or ontology of styling which may be applied to components within the system, for example, CSS within web browsers. Such styling formats as CSS may be constructed of rather simple key value pairs and may thus be translated easily between formats and languages. Thus, the styling field of a node may be written in a generalized styling format and translated by the SKL Interface Engine it is read by into the specific styling language used by the environment that a component is being rendered into (e.g., web browser vs. mobile app).

In one embodiment, the styling field includes styling rules written in the format required by a CSS-in-JS library (e.g., Emotion, Styled Components, etc.), built to be rendered in React® or another JavaScript® UI framework.

In another embodiment, the values of the styles defined in the styling field could use a special format to encode Design Tokens following a specification, such as that defined by the W3C Design Tokens Community Group. These values may be swapped out when the component is rendered based on a supplied theme, or "source" of those design tokens. For example, take the styling field defined within a component like so:

```
"https://skl.standard.storage/properties/styling": {
"borderRadius"; "{size.radius.3x},"
"padding": "{space.3x},"
```

```
    "Box®Shadow": "{shadow},"
    "backgroundColor": "{color.background.primary},"
    "border": "{border.normal},"
    "display": "flex,"
    "alignItems": "center,"
    "cursor": "pointer,"
    "maxWidth": "800px,"
    "margin": "0 auto {space.2x} auto"
    }
```

Each value within the styling object which contains a value surrounded by curly brackets { . . . } denotes where a value should be replaced from the currently used theme. Using the Design Tokens specification, a dot within one of these sections of curly brackets, may denote accessing a nested property of an object. As such, the values for the tokens in the snippet herein would be able to be filled with values from the designTokens field of the following theme (shown in JSON-LD):

```
{
"@context": {
  "https://skl.standard.storage/properties/designTokens":
{ "@type": "@json"
}.
"@id": "https://skl. standard.storage/data/LightTheme,"
"@type": "https://skl.standard.storage/nouns/StylingTheme,"
"https://skl.standard.storage/properties/name": "Light,"
"https://skl.standard.storage/properties/designTokens": {
  "color": {
  "$type": "color."
  "shadow": { "$value": "#00000014" },
  "text": {
    "primary": { "$value": "#333333" },
    "secondary": { "$value": "#555555" }
  },
  "background": {
    "primary": { "$value": "#FFFFFF" },
    "secondary": { "$value": "#F2F2F2" },
    "error": { "$value": "#fdb0ba80" }.
    "success": { "$value": "#88ef9080" },
    "warning": { "Svalue": "#ffde4080" }
  },
  "border": {
    "primary": { "$value": "#a6a6a6" },
    "secondary": { "$value": "#BFBFBF" }
  },
},
"space": {
  "$type": "dimension,"
  "0x": { "$value":"0px" },
  "1x": { "$value": "5px" },
  "2x": { "$value": "10px" },
  "3x": { "$value": "15px" }
},
"size": {
  "$type": "dimension,"
  "0x": { "$value": "{space.0x)" },
  "1x": { "$value": "{space.1x}" },
  "2x": { "$value": "{space.2x}" },
  "radius": {
    "0x": { "$value": "0px" },
    "1x": { "$value": "3px" },
    "2": { "$value": "5px" },
  }
},
"shadow": {
"$type": "shadow."
"$value": {
  "color": "{color.shadow},"
  offsetX": "0rem,"
  "offsetY": "0.25rem,"
  "blur": "0.5rem,"
  "spread": "0rem"
  }
```

```
  },
  "border": {
    "normal": {
      "$type": "border,"
      "$value": {
        "color": "{color.border.primary},"
        "width": "1px,"
        "style": "solid"
      }
    },
    "hover": {
      "$type": "border,"
      "$value": {
        "color": "{color.border.secondary},"
        "width": "1px,"
        "style": "solid"
      }
    }
  }
  }
  }
}
```

According to an embodiment, the SKL Interface Engine may be responsible for resolving the theme styling for any component it renders. As shown in the snippet herein, a theme used by an SKL Interface Engine may itself be a Noun within the SKL framework. In this embodiment, an application developer or user of an application could choose to have several themes available to switch between. An application may hardcode a set of themes, or use an SKL Engine to find the available themes within a user's chosen Schemas and display them by name somewhere in the application's interface to choose between. Switching a theme would change the styling of the components rendered by the SKL Interface Engine in real time.

In other embodiments, styles may also be applied through a list of reusable labels attached to a predefined set of styles, such as CSS classes, specified statically in a field of an SKL Interface Component, or specified dynamically via a property that an SKL Interface Component accepts. In a non-limiting example below, an Interface Component's configuration may contain one of the following:

"https://skl.standard.storage/properties/classes": "left-aligned thick-border medium-padding"

"https://skl.standard.storage/properties/classes": ["left-aligned," "thick-border," "medium-padding"]

These additions and variations may be standardized within SKL, or left open to the Engine implementation. In the latter embodiment, it may be that only specific component configurations would be able to be used with specific SKL Interface Engines.

Property Mapping

According to some embodiments, Mappings may not be included within a Schema, in other embodiments Mappings may be included within a Schema. In such an embodiment, these Mappings are meant to move properties from a higher-level set of data to a more specific subset. According to some embodiments, the property Mappings are simply selecting certain fields to use within nested primitive components down the tree of nodes. For example, in constructing the configuration for a Card component, the Card may include an outer Container component, with an image and some text inside. The SKL Interface Engine that will render a Card's configuration may include support for primitives for 'Container,' Image,' and 'Text.' As such, there may be a specification stating that the Image primitive component accepts a parameter called src for the URL of the image, and the 'Text' component has a parameter called contents for the text it will contain. The 'Container' component may render its sub-nodes inside of a wrapper element.

According to an embodiment, the 'Card' component may be called 'imageSrc' and 'headerText.' RML may be used to define the configuration so that 'imageSrc' and 'headerTex' get used as the src and contents properties of the primitive Image and Text components respectively. The following is an example of the configuration used to implement the scenario described herein with various omissions for brevity:

```
{
  "@id": "https://skl.standard.storage/data/cardInterface,"
  "@type": "https://skl.standard.storage/nouns/InterfaceComponent,"
  "https://skl.standard.storage/properties/name": "Card,"
  "https://skl.standard.storage/properties/parameters": {
    "@type": "shacl:NodeShape,"
    "shacl:targetClass": "https://skl.standard.storage/nouns/Parameters,"
    "shacl property": [
      {
        "shacl:datatype": "xsd:string,"
        "shacl:maxCount": 1,
        "shacl name": "imageSrc."
        "shacl:path": "https://skl.standard.storage/properties/imageSrc"
      },
      {
        "shacl:datatype": "xsd:string."
        "shacl:maxCount": 1,
        "shacl name": "title,"
        "shacl:path": "https://skl.standard.storage/properties/headerText"
      }
    ]
  },
  "https://skl.standard.storage/properties/parametersContext": {
    "imageSrc": {
      "@id": "https://skl.standard.storage/properties/imageSrc,"
      "@type": "http://www.w3.org/2001/XMLSchema#string"
    },
    "headerText": {
      "@id": "https://skl.standard.storage/properties/title,"
      "@type": "http://www.w3.org/2001/XMLSchema#string"
    }
  },
  "https://skl.standard.storage/properties/nodes": [
    {
      "@type": "https://skl.standard.storage/interface/Container,"
      "https://skl.standard.storage/properties/nodes": [
        {
          "@type": "https://skl.standard.storage/interface/Image,"
          "https://skl.standard.storage/properties/propertiesMapping": {
            "@type": "rr:TriplesMap,"
            "rml:logicalSource": { ... },
            "rr:subjectMap": { ... },
            "rr:predicateObjectMap": [
              {
                "@type": "rr:PredicateObjectMap,"
                "rr:object": "https://skl.standard.storage/Mappings/frameObject,"
                "rr:predicate": "rdf:type"
              },
              {
                "@type": "rr:PredicateObjectMap,"
                "rr:predicate": "https://skl.standard.storage/properties/src,"
                "rr:objectMap": {
                  "@type": "rr:ObjectMap,"
                  "rr:reference": "imageSrc"
                }
              }
            ]
          }
        },
        {
          "@type": "https://skl.standard.storage/interface/Text,"
          "https://skl.standard.storage/properties/propertiesMapping": {
            "@type": "rr:TriplesMap,"
            "rml:logicalSource": { ... },
            "rr subjectMap": { ... },
            "rr:predicateObjectMap": [
              {
                "@type": "rr: PredicateObjectMap,"
                "rr:object": "https://skl.standard.storage/Mappings/frameObject,"
                "rr:predicate": "rdf:type"
              },
              {
                "@type": "rr:PredicateObjectMap,"
                "rr:predicate": "https://skl.standard.storage/properties/contents,"
                "rr:objectMap": {
                  "@type": "rr:ObjectMap,"
                  "rr:reference": "headerText"
                }
              }
            ]
          }
        }
      ]
    }
  ]
}
```

As seen with the Container node, if any node within the tree does not specify a PROPERTIESMAPPING field, the SKL Interface Engine may be expected to pass all the properties supplied to it to any children it renders (the Image and Textcomponents in this case). The Engine may then perform the Mappings specified in the nested configuration for the Image and Text components and render each with the output of the Mappings. In this embodiment, more complex or larger interface components may be easily composed out of smaller or simpler building blocks through configuration alone.

Source Definition

In yet another non-limiting embodiment, a component may instead specify a SOURCEURL field from which the source code of the component may be downloaded and run. Depending on the SKL Interface Engine used and the environment that Engine is rendering into, there may be restrictions on the components that may be rendered. For example, using an Engine that is built for rendering SKL Interface Components into web pages, an applicable component's source code might have to be a JavaScript module, served with the Content-Type: text/javascript header and include specially formatted configuration file (e.g., a package.json file in a node package module).

Upon encountering a component with a SOURCEURL, an SKL Interface Engine may download the component's source code, or retrieve it from a cache if it has downloaded the same version of the component before. As noted previously, the Engine may find and perform a Mapping to translate the supplied data into the format required as properties to the component.

Registry

As noted previously, both the configuration of SKL Interface Components and their implementations in code (if they specify a SOURCEURL) may be made available in the SKL Libraries (e.g., the Official Library), according to some embodiments. In addition to documenting their configurations and uses, and showing examples and test cases, the Library may also act as a registry from which component configurations and implementations may be downloaded.

A major use case of the Official Library may be to facilitate individuals to install SKL Schemas into their personal SKDS so that applications they may access preferred component configurations, themes, and more. However, in other embodiments, the SKL Interface Framework may be used entirely independently of the rest of the Standard Knowledge ecosystem. An application may choose to construct and bundle its own set of custom Schemas for Interface Components, Themes, and Mappings, and use them with an SKL Interface Engine to build its user interface without using the registry nor building in compatibility with users" SKDSs.

API Abstraction

According to some embodiments, general API conventions may have standardized and widely used specifications which serve as a bridge between the human and machine understandings of APIs. In these embodiments, these specifications are used for documentation and SDK code generation. SKL Engines may use OpenAPI specifications to dynamically send web requests to REST APIs based on an OpenAPI operation name. OpenAPI specifications may be used by users of Standard API to describe the API endpoints they wish to make available through a SKApp. This SKApp may be called Standard API. Once these are defined, Standard API may dynamically validate and authenticate incoming web requests according to the specification and perform Mappings to fulfill the request's operation and respond with a response also validate against the specification.

A user of Standard API may have an OpenAPI operation such as the one below (various omissions for brevity):

```
...
"/files/get_Metadata": {
  "post": {
    "summary": "Files - Get Metadata."
    "operationID": "FilesGetMetadata,"
    "security": [
      '{ "apiKey": [ ] }
    ],
    "requestBody": {
    "$ref": "#/components/requestBodies/GetMetadataRequestBody"
    },
    "responses": {
      "200": {
        "$ref": "#/components/responses/GetMetadataResultResponse"
      },
      "default": {
        "$ref": "#/
        "#/components/responses/GetMetadataErrorResponse"
      }
    }
  }
}
...
```

According to some embodiments, the Standard API server processing incoming requests on behalf of a user may match requests against the path and method defined in the configuration herein using regular expressions or simple string equality. If there is no configuration matching a request, the server may respond with a 501 HTTP error code to signify that such a method is not implemented. In some embodiments, a Standard API might keep a record of these requests in order to recommend that an administrator or developer using Standard API can create the Schemas and Mappings at a later point in time. In other embodiments, certain Mappings and or components may be automatically generated using one or more methods, as described elsewhere herein. Upon receipt of a matching request, the server may then verify the format and contents of the requests headers, query parameters, and/or body to ensure any parameters required in the specification have been supplied. If not, it may return a 400 HTTP error code signifying a bad request sent by the client. In some embodiments, if the data provided to the server is complete, and is just not in the correct format, the server might use certain techniques to restructure the query according to the correct format.

After matching and validating the request against an OpenAPI operation, the Standard API server may search the Schemas associated with the user's account to find one or more Mappings for the operation. In the majority of cases, a Mapping will execute a Verb or query for data from a database and return a response. After performing the Mapping(s) the server may then validate the retrieved response data, or lack thereof, against the OpenAPI operation's responses field. If the response data is not valid according to the specification, the server may respond with an internal server error with HTTP response code 500. Otherwise, the properly formatted response data may be encoded according to the specification and sent to the client.

While the embodiments herein use an OpenAPI specification to construct a REST API and dynamically handle requests, roughly the same procedure may be performed using specifications for other types of APIs. For example, a Web Services Description Language (WSDL) document may be used as an abstraction of a SOAP API. In this case, the SKL Engine matching and validating SOAP compliant messages to the server may have to parse the XWL of a WSDL document. Tooling may exist to parse and manipulate XML in most programming languages. Upon receiving a message, the Standard API server may match the message to an operation name defined in the WSDL document, validate the input parameters according to the operation definition, find a Mapping for the operation, perform the response, then validate and return the response.

In yet another embodiment, a similar procedure may also be performed for an Asynchronous API or an Event-Driven Architecture (EDA) via the AsyncAPI specification. Within an EDA, the Standard API server may act as a broker. As such, it may register or initialize an endpoint, websocket, or other connection mechanism to listen for events or messages from Producers when it starts up by reading the user's chosen AsyncAPI specifications. It then may implement an endpoint, websocket, or other connection mechanism for Subscribers to register their subscription per AsyncAPI defined channel. When a Subscriber connects, the Standard API server may keep track of their connection status and channels they have subscribed to by performing a Mapping which writes the Subscribers information into a persistent data store. Upon receipt of a message from a Publisher, the server may use the AsyncAPI specification to validate the existence of the channel the message was sent on and the format of the payload. It then uses a Mapping which queries a data source to translate the channel name into a list of Subscribers to send the event or message to. It may then send the event or message to all subscribers of the channel.

Even GraphQL, an alternate API format constructed of a type-based query language with its own Schema definition language, may be abstracted into a format that may easily be used by an SKL, according to another embodiment. GraphQL APIs may have the ability to introspect their Schema including types, query types, and mutation types. The result from the introspection query may be a JSON structure. Although this format may not be widely used by GraphQL API designers and engineers, it may be used by the Standard API server to dynamically match and validate GraphQL queries and mutations, and produce a response based on a Mapping. The Standard API system may create a system wherein an API's possible interactions may be defined through an abstraction and executed according to labeled business logic (called resolvers in GraphQL). However, Standard API may be more configurable and accessible to people with less technical expertise by replacing any custom, ecosystem-specific, or framework-specific code with SKL Schemas and Mappings.

Mappings

According to some embodiments, once a web request or, in the case of an event-driven architecture, a message in a channel, has been matched and validated according to the API abstraction, the Standard API server may find and execute one or more SKL Mappings to perform an operation in a data source or to simply transform the data in some way. A Mapping for a Standard API operation may include a reference to the identifier of the operation as it exists in the API abstraction. For example, in some embodiments, a Mapping that is to be executed when processing a web request that matched with an operation in an OpenAPI specification may have a field whose value is equal to the operationID of the OpenAPI operation like so:

```
{
...
"https://skl.standard.storage/properties/operation": "SearchEvents,"
...
}
```

According to some embodiments, once such a Mapping is found, it may be executed using an SKL Engine. As noted previously, Mappings may transform data, use constants, compare values, fetch data from other APIs, query databases, and more. According to some embodiments, a Standard API may translate between a request and a data store to perform the operation specified in the API abstraction.

One form of querying a data source is one in which queries are hard coded into the Mapping. In some configurations, when Mapping between a web request and a relational database, the R2RML ontology may be used to send a pre-constructed query to the database and translate the result. R2RML is the W3C standard to express customized Mappings from relational databases to RDF. A simple embodiment of an R2RML Mapping follows (prefixes omitted for brevity):

```
<#TriplesMap>
rr:logicalTable rr: sqlQuery """"SELECT ID, NAME FROM EVENTS;"""" ;
rr:subjectMap [
  rr:template "http://data.example.com/{ID}",
  rr:class Schema:Event;
];
rr:predicateObjectMap [
  rr:predicate Schema:name;
  rr:objectMap [ rr:column "NAME" ];
].
```

This embodiment may not be dynamic as it does not include any parameters from the request in the query. APIs commonly paginate the response, filter the retrieved entities, or write data to the database based on the parameters of the request. RML, a more general-purpose Mapping language based on R2RML, may be used to construct queries dynamically through conditional logic and/or string concatenation. For example, to add pagination to the query herein, the following RML Mapping may be used:

```
<#TriplesMap>
rml:logicalSource [
  a rml: LogicalSource ;
  rml:iterator "$" ;
  rml:referenceFormulation <http://semweb.mmlab.be/ns/q#JSONPath> ;
  rml:source "input.json"
];
rr:predicateObjectMap [
  a rr:PredicateObjectMap ;
  rr:objectMap [
    a rr:ObjectMap ;
    fnml:function Value [
      a fnml:Function Value ;
      rr:predicateObjectMap [
        a rr:PredicateObjectMap ;
        rr:object <http://example.com/idlab/function/concat> ;
        rr:predicate <https://w3id.org/function/ontology#executes>
      ],
      [
        a rr:PredicateObjectMap ;
        rr:object "SELECT ID, NAME FROM EVENTS LIMIT 40 OFFSET ",
        rr:predicate <http://example.com/idlab/function/str>
      ],
      [
        a rr:PredicateObjectMap ;
        rr:objectMap [
          a rr:ObjectMap ;
          rml :reference "offset"
        ];
        rr:predicate <http://example.com/idlab/function/otherStr>
      ];
    ];
  ]:
].
```

Some data sources may have a specific query language that is used to send them procedures to execute. Thus, a Mapping may need to construct one or more queries, or otherwise inform a Standard SDK what query to perform.

This Mapping generates the query:

SELECT ID, NAME FROM EVENTS LIMIT 40 OFFSET {offset}

Where {offset} is equal to the offset field in the supplied input.json. The SKL Engine may execute this Mapping to get the dynamically created SQL query; it then may execute the query against the database and apply another Mapping to the response from the database to return as the response of the request. This method of string concatenation may be used to allow any part of a query to be parametrically defined.

Another alternative embodiment to generate queries dynamically is to create multiple Mappings which specify the correspondence between the data models of a data source and the RDF graph. This may make it so that the data sources may be queried as if they were RDF graphs using a query language like SPARQL.

In yet other embodiments, the same process may be used to translate requests to a Standard API server into other APIs and query languages such as REST, GraphQL, SOAP, or SPARQL.

Dynamic API from Nouns

Instead of responding to web requests based on a predefined API specification such as OpenAPI, Standard APIs may also be configured dynamically, based on Noun and Verb Schemas. For example, a Standard API could be implemented to allow for a certain set of standard operations on entities of any type of Noun in a user's SDKS. To do so, according to a non-limiting embodiment, the Standard API server would accept requests according to a certain pattern. For example: HTTPS://EXAMPLE.COM/API/NOUN/{NOUN} where EXAMPLE.COM is the domain of the Standard API server and where {NOUN} is the name of the Noun data type of the entity(ies) a developer is sending a request about. In one REST API approach, this same URL can be used with multiple HTTP request types to create, read, update, or destroy entities (CRUD).

According to a non-limiting embodiment, a developer or application may create an entity conforming to the Noun by sending a POST request to the URL with a JavaScript object in the body of the request conforming to an entity of the Noun. Upon receiving the request, the Standard API Server would query the user's SKDS to obtain the Noun Schema with name matching the {NOUN} part of the path. If the Noun Schema cannot be found, the server may return an error to the developer and/or look for the Noun Schema elsewhere (e.g., the Official Library). If the Noun Schema is found, it can be used to validate the entity in the request body to ensure it is conformant to the Noun Schema. If it is not, the server may return an error to the developer. Otherwise, the Entity is inserted into the user's SKDS and a success response is returned to the developer.

According to a non-limiting embodiment, a developer or application can update an Entity conforming to the Noun by sending a PUT or PATCH request to the URL with an entity ID and any fields and corresponding values to update in the body of the request. Just like in the creation example herein, the server can validate the format of the data being updated against the Noun Schema and either return an error or update the entity in the user's SKDS accordingly.

According to a non-limiting embodiment, a developer or application can delete an Entity conforming to the Noun by sending a DELETE request to the URL with and Entity ID in the body of the request. No validation needs to occur for this operation, the server can simply delete the entity from the user's SKDS.

According to a non-limiting embodiment, a developer or application can obtain one or more Entities of the Noun data type by sending a GET request with the request body containing either (a) one or more IDs of Entities to obtain or (b) one or more field and value pairs acting as filters on the data that the server should return. In the first case, the server can simply query the user's SKDS for the Entities with matching IDs. In the latter case, the server may first validate that the Noun Schema contains all the fields included in the filters. If not, it can return an error to the developer. If all the queried fields are valid, the server can query the user's SKDS and return the matching entities.

According to another non-limiting embodiment, a Standard API server could support a GraphQL interface for which it would expose only one endpoint, but allow a set of queries and mutations corresponding to the CRUD operations described herein. Instead of using a predefined type system, the available types to query may be based on the Noun Schemas present in the user's SKDS. Likewise, standard GraphQL mutations may be made available for each Noun Schema, for example to create, update, or destroy an Entity. Instead of a pattern of URLs and HTTP methods, this GraphQL API would be interacted with according to a pattern of queries and mutations by Noun.

Dynamic API from Verbs

In addition to creating endpoints for performing operations on entities based on their Noun data type, the API could also dynamically respond to endpoints to execute Verbs, according to a non-limiting embodiment. To do so, the Standard API server may accept requests according to a different pattern. For example: HTTPS://EXAMPLE.COM/API/VERB/{VERB} where EXAMPLE.COM is the domain of the Standard API server and where {VERB} is the name of the Verb a developer wants to execute. Upon receiving such a request, the Standard API server can search for the Verb Schema by the name of the Verb. As before, if the Schema or Schemas are not found, the server may return an error and/or try and find the missing Schema(s) elsewhere. Otherwise, the server begins performing the same steps as Standard SDK would to perform the Verb. In some embodiments, the Standard API server may use a Standard SDK to perform the Verb. The parameters of the Verb may be any data sent in the body of the request such as data encoded as multipart/form-data or as JSON which should conform to the Verb's parameters Schema. After executing the Verb, its standard return value will be returned in the response of the request to the developer.

Authentication

In addition to controlling which Nouns and Verbs are accessible through API endpoints in a Standard API instance as described herein, a Standard API provider could offer the ability for the API to be secured via different authentication and authorization mechanisms. For example, one set of API endpoints through which consumers can read Entities that do not contain sensitive or personal information could be made public and not require any authentication or authorization. Alternatively, some endpoints which deal with Nouns that are more sensitive may require an Oauth2.0 access token to identify and authorize the consumer.

Documentation

In order for developers to know how to use this dynamic API derived from the Schemas in a user's or developer's SKDS, the Standard API server can also serve a webpage with documentation derived from the data in a user's SKDS, and elsewhere (e.g., SKL Libraries, existing API documentation websites that are similar or relevant, etc.). For example, the documentation could describe a developer's ability to send a HTTP request with the method POST to HTTPS://EXAMPLE.COM/API/NOUNS/NOTE with title, body and tags parameters in the body of the request in order to create an entity of the Noun Note in the SKDS.

In other embodiments, API documentation can be generated locally by running a script which reads a user's SKDS, either from local files, a database running on the same computer, or from a remote server, such as a cloud hosted SKDS. The API documentation generated could be in the format of an open-source API documentation standard such as OpenAPI in YAML, XML, or JSON.

No-Code API Builder

In some embodiments, as a user's SKDS is filled with more and more types of Nouns and Verbs, the Standard API server will automatically respond to endpoints for manipulating data of any Noun types and executing any Verbs that are existing in the Schema at the time of the API request. In other embodiments, the Standard API server may require users or developers to perform some action to "re-build" the API periodically to update it according to new or updated Nouns and/or Verbs. In other embodiments, the Standard API server may offer an interface (GUI or programmatic) for the user or a developer to customize which specific Nouns and Verbs should be available to interact with via the Standard API and which should not. Such an interface for selection of API endpoints could be marketed as a "No-code" API builder. The Standard API provider offering this service could also enable its users to create multiple versions of their API with different endpoints enabled for different sets of Nouns and Verbs. In this way, a developer using an SKDS could expose different read and write capabilities to different consumers.

According to a non-limiting embodiment, an analytics server could automatically generate Schemas from APIs and/or Documentation. As described elsewhere herein, certain machine learning models could be trained and/or tuned with SKL Schemas in order to help with the creation and maintenance of said Schemas. For instance, an AI model may be trained with OpenAPI Schemas and their respective API documentation websites in order to help automatically generate or partially generate one given the other. In other words, given an OpenAPI spec, a certain AI model may generate a documentation website for that API. Similarly, given API documentation, a certain AI model may generate an OpenAPI spec. Furthermore, as described elsewhere herein, a certain AI model might be trained to help generate Mappings between other Schemas. In these ways, certain methods (e.g., using large language models) can be used to automatically generate and/or partially generate SKL Schemas given other types of information about Integrations and data sources (e.g., documentation about APIs on websites).

Similarly, according to some embodiments, and using the various methods described herein, API endpoints and/or documentation can be automatically and/or semi-automatically generated and/or manipulated by providing SKL Schemas. Furthermore, in some embodiments the server can combine Schemas and additional information from other data sources, such as SKL Libraries and public sources, in order to include descriptions of Schemas, dummy data for testing, and more. In this way, a Standard API is able to have documentation that is automatically or semi-automatically generated and/or maintained. Similarly, any changes to the API documentation could also be used to update and/or recommend changes to SKL Libraries and/or other SKL components.

In these ways, and more, Schemas may be automatically generated from information about Integrations (e.g., API documentation, discussion, Q&A forums, etc.). In these ways, and more, API endpoints and/or documentation may be automatically generated from Schemas and information about Schemas. In these ways, and more, API endpoints can be automatically generated from information about data sources.

Depending on the needs or requirements for a given Standard API, different Verbs, Schemas, and/or other configurations could be used. Different embodiments of Standard APIs could therefore include, but not be limited to, using a virtual database to query and merge data from multiple data sources into one endpoint, triggering a secondary process such as syncing data from multiple data sources into a given data store when a particular endpoint is hit, using a Standard SDK to query one data source at a time with the parameters provided by an endpoint, using Mappings to run hardcoded queries or queries built through string concatenation rather than using abstractions of data sources, and so on.

Similarly, certain other Verbs and capabilities may be added to Standard APIs, such as certain security services that help identify certain requests and traffic as potentially dangerous, certain performance and analytics services that monitor requests and help track of usage and latency, and so on. As described elsewhere herein, according to some embodiments, some of these various services and expansions on a Standard API SKApp may require payment, which could be processed through the Official Library and/or other SKL Libraries which host the various capabilities and extensions to the Standard API SKApp.

Syncer

Standard Syncer (also referred to herein as the "Syncer") is a non-limiting example of a SKApp which can ingest historical data and continuously monitor and/or listen for changes, additions to, or deletions of data (in near real time), from nearly any data source or Integration that Standard SDKs are compatible with (e.g., a REST API).

According to an embodiment, it is constructed of a queueing system, a database to store ingestion state, and a proprietary algorithm which reads SKL Schemas to determine how to sync data from each data source. The syncing algorithm goes through a series of parameterized steps in order to sync many different types of data from many different data sources in a scalable way.

Figure 48:
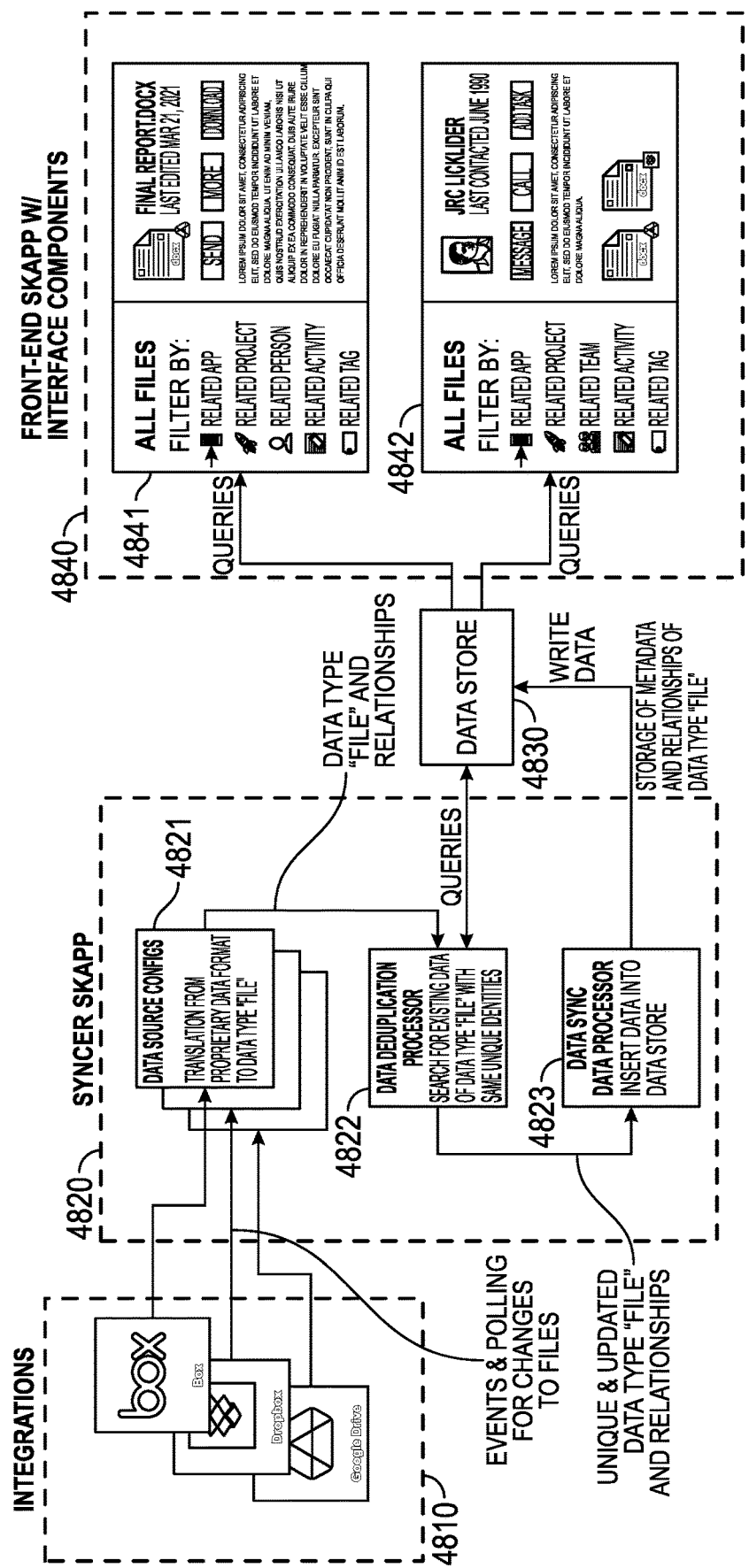
FIG. 48 illustrates a conceptual diagram of the Syncer SKApp, in accordance with an embodiment.

FIG. 48 illustrates a conceptual diagram of the Syncer SKApp 4820, according to an embodiment. In this example, the Syncer 4820 uses Schemas and Mappings related to three different file storage Integrations 4810 (e.g., data source configs) in order to transform the data from each API into the relevant Noun Schemas (e.g., FILE) and pass them through a data deduplication process 4822 which creates one or more CueIDs and/or Unique ID and/or Relevance Scores relative to other Entities in the SKDS 4830. As mentioned above, the generation of CueIDs and/or Unique IDs and the comparison of newly processed Entities have been to other existing Entities in the SKDS 4830 can be largely parameterized and configured through Schemas, as well as run in its own background process with its own set of workers in order to prevent the Syncing SKApp from potentially suffering from performance issues while Syncing large amounts of data. Once this step is complete, the Syncing SKApp can write or update the data 4823 corresponding to the newly synced Entities into or in the SKDS 4830. Ultimately, because the Entities are persisted in an SKDS along with their Schemas, various Interface Components 4841 and 4842 can be used interchangeably to view and interact with data as described elsewhere herein.

Figure 10:
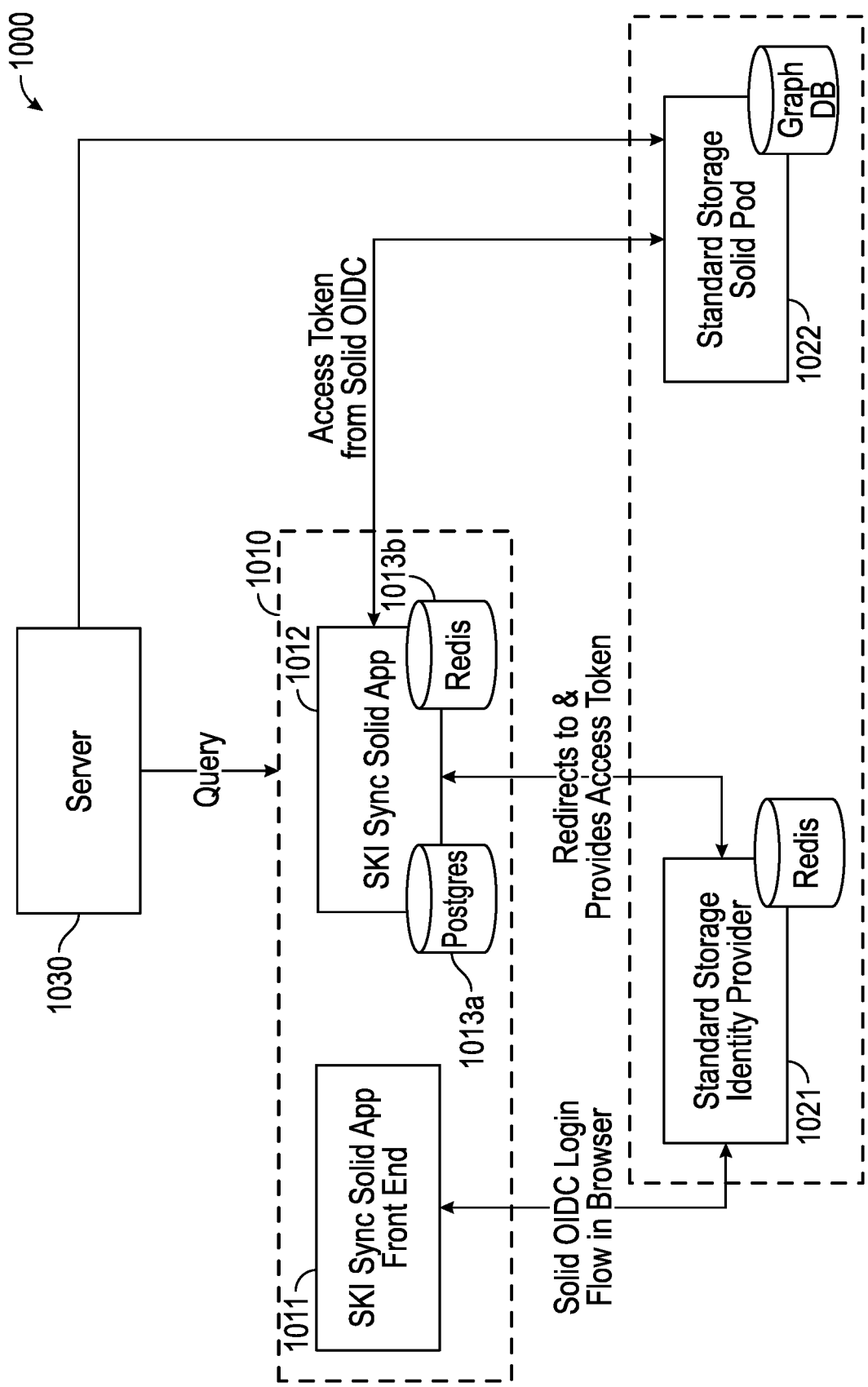
FIG. 10 is a visual representation of a Standard Knowledge Data Store following a Solid specification, including a Standard Syncer, in accordance with an embodiment.

FIG. 10 illustrates a system architecture diagram of the Syncer, according to a non-limiting embodiment that follows the solid specification. In this example, the Solid-compliant Authentication Server 1021 provides users with WebIDs that can be used across any Solid App that implements the Solid OIDC authentication specification. This particular embodiment of the Authentication Server 1021 stores WebIDs and WebID profile information for users in a Redis database. The overall Syncer application 1010 then provides a front-end 1011 that lets users authenticate through Solid OIDC with the Solid-compliant Authentication Server 1021. Once authenticated, users are able to configure the Syncer backend 1012, which may write and read data from one or more databases 1013a-b in order to store information about which WebIDs are authorized to use the Syncer backend 1012, configurations and data from given users that don't have independent SKDSs, and more. In this scenario, the Redis database 1013b may be used to store information about subscriptions and the Postgres® database may be used to store Entities for users that do not have a Solid Pod. For users that do have an SKDS 1022, the Syncer backend 1012 may read and write Schemas, configuration, Entities, etc. to and from a user's SKDS 1022. A server or external application 1030 may either query the Syncer backend 1012 and/or the SKDS 1022 according to its needs.

According to the embodiments shown through FIGS. 22-24 and FIG. 50, a Standard Syncer can be configured in a variety of ways in order to solve for any of a variety of use cases as described elsewhere herein.

SyncStatus

According to an embodiment, upon the receipt of a new user's account needing to be synced, the Syncer creates a record in the database called a SYNCSTATUS. It may include the following:

1. The URI of the account. An account here may represent any entity provisioned by a data source for a person or company which has some identifier (e.g., CueID, UID) in that data source (e.g., email address, username, API key, etc.) and may have a set of security credentials for the data source. Each account should have a corresponding SKL Schema from which one can access metadata, API security credentials, and configuration for how to sync the account.

2. Standard Syncer may also represent and work with public data sources, for which the account identifier and synced data could be shared across Standard Syncer users, or could be duplicated per user.

3. A reference to a user record. For example, a foreign key referencing the ID column of another table in the database. This separate table may hold internal metadata, profile information, and/or sales or subscription information for the user.

4. A link to the source of the SKL Schemas to use or a field containing the schemas themselves. The source of the SKL Schemas could point to files publicly accessible over the internet or to data stored in a private database. Schemas being accessed from an external source may be stored on a user's SKDS where they can be controlled and managed by the user. In such embodiments, the Syncer may also need to obtain and store authentication credentials like an access token retrieved via Solid OpenID Connect.

5. If a user does not require storage of their Schemas to be external, the user can choose to upload their preferred schemas via the Standard Syncer's API, or choose from a list of preconfigured sets of Schemas offered by the Standard Syncer and/or from the Official Library. In this case, the Schemas may be stored as JSON in a database.

6. In an alternate embodiment, all SKL Schemas could be managed and controlled by the Standard Syncer and be constructed on a case-by-case basis per user, customer, or client.

7. In an alternate embodiment, the Syncer could use a mixture of both pre-set SKL schemas managed by Standard Syncer and a set of SKL schemas configured and controlled by the user, either on an SKDS or other database or uploaded to the Standard Syncer server.

8. Initialized fields to store the state of the syncing process as the account is synced.

Procedure

According to an embodiment, the Syncer can sync an account after initializing the information listed herein. Syncing begins either when the account is created or at the next regularly scheduled syncing interval which finds all accounts that have not started syncing and starts syncing them. The orchestration and syncing interval can be defined through Schemas as defined elsewhere herein (e.g., cron schedules, custom Verbs with triggers, etc.) As such, the choice of when to start syncing is configurable based on the integration and the use case of the user adding the account. For example, if an individual person using a productivity product which syncs their files and folders from a file storage tool, they may want to have synced entities displayed to them in a UI as soon as possible, even in real time as they are synced. Alternatively, if the user represents an organization which plans to use a Standard SDK to query for synced Entities only once per day, the configuration does not need to start syncing immediately and can wait for the next syncing process scheduled to happen once per day.

According to an embodiment, syncing works by executing a series of steps that correlate with the types of Nouns and Verbs exposed via the API of the data source. The set of steps exist as configuration on each integration associated with an account but may also be overwritten by an individual account's configuration. The Syncer may loop through the steps in the order that they appear in the account or integration configuration.

According to an embodiment, the Syncer may execute the following procedure to sync an account:

1. Initialize the parameters for the step. The account related to the SYNCSTATUS may include a set of configurations for the step. These parameters may include some default parameters to use when syncing that step and information about what type of organizational structure the Syncer needs to parse and iterate over for that step in that particular account. The parameters are saved in the SYNCSTATUS.

2. Queue a background job to execute the step asynchronously. This is done in order to not block the current process of the Syncer server for an extended period.

3. Retrieve the saved parameters for the step from the SYNCSTATUS.

4. Call the SYNC Verb using a Standard SDK with the parameters, the identifier of the step, and the account as arguments. The identifier of the step may be the URI of an SKL Noun. The SYNC Verb is a NOUNMAPPEDVERB that gets paired with a Mapping, called a VERBNOUNMAPPING, to translate its parameters into another Verb to call and return the response of. This allows a single Verb to be called with the name of the step and it may automatically execute one or more other, more specific, Verbs to obtain the data required for the step.

5. Get the results from executing the SYNC Verb

6. If the current step's configuration and/or the response from calling the SYNC Verb specifies that not all the data for the step has been retrieved due to limitations of or a special organizational structure used by the data source's API, the Syncer may:

a. Update the state and/or the parameters for the current step saved in the SYNCSTATUS;
    b. Queue a new background job to continue the step;
    c. Do this repeatedly until all data for the step has been synced.

Examples of the limitations or special organizational structures certain data sources might have are:

A certain user wants the Syncer to sync all the events from a ticketing service in the Atlanta metro area happening in the next 3 months, of which there are more than 1000. The API endpoint of the ticketing service only allows developers to retrieve a maximum of 100 events at a time. Its API endpoint responds with a current page number and the number of total events across. The Verb to GETEVENTS, called as a result of the mapping from the EVENTS Noun (the label of the step) and the special SYNC NounMappedVerb, maps the ticketing service's API response into a boolean value called HASNEXTPAGE which indicates to the Syncer whether it should increment the PAGE parameter and continue syncing the current step.

In another non-limiting example, a data source API may use a cursor or token-based pagination instead of a page number. In this case, the response from the SYNC Verb would include a TOKEN field if there is more data available, or no token if not. If the token is present, the Syncer may continue syncing the current step. It not, it moves on to the next step.

In another non-limiting example, a data source's API requires requests for certain resources to include a parameter derived from another resource in their API. For example, the APIs of some file storage tools may not offer an endpoint to retrieve files and folders from anywhere in the hierarchical tree of files stored in that tool. Instead, the endpoint may require specification of an identifier of a parent folder, which the endpoint will only retrieve the direct descendants of. Thus, the Syncer must recursively iterate through the folder structure, keeping track of all the subfolders it "sees" when syncing a parent and syncing them once all of the parent's direct descendants have been processed. To do so, the SYNCSTATUS can have a special field (e.g., RECURSEON), which informs the Syncer how to filter the results of the SYNC Verb to get the resources which should be recursed on for the current step. These filtered resources are added to a RECURSELIST field held in the SYNCSTATUS state to await processing. When determining if the Syncer should continue the current step, the RECURSELIST is checked for resources. If available, the first resource in the RECURSELIST may be set as a parameter in the SYNCSTATUS for the current step according to a recurseArgument configuration held in the SYNCSTATUS. A new background job is queued to continue the step with the new parameters. In another non-limiting example, a user may require syncing all their messages from a workplace chat app. The API of the chat app, however, only allows queries to obtain messages from the API by the identifier of the chat they are in. To achieve this, the Syncer may sync using a layered approach. First, the step's initial parameters to the SYNC Verb are mapped to a Verb which gets a list of all chats the user has access to.

If a field called SUBSTEP is set in the SYNCSTATUS configuration, the Syncer sets a STEPSUBPARAMS field which holds parameters for the sub step including the name of the sub step (in this case a URI for the Message Noun), a SUBLIST field to hold all the chats needing their messages synced, and the first chat in the SUBLIST set as a parameter according to a SUBSTEPARGUMENT configuration. Until the SUBLIST has been exhausted, the Syncer continues on the same step using the STEPSUBPARAMS when calling the SYNC Verb to sync messages within each chat. While syncing using STEPSUBPARAMS, the SYNC Verb's response may include page- or cursor-based pagination information which should be used according to the same procedure listed above, with the exception that it is added to the STEPSUBPARAMS instead of the normal PARAMS for the parent step. Once the SUBLIST is empty, the STEPSUBPARAMS are removed from the SYNCSTATUS and syncing continues with the normal PARAMS for the step if needed according to the presence of page or cursor-based pagination information in the original request for chats. A slightly modified procedure could be used in cases where a top-level resource has multiple types of sub resources which need to be synced. In this case, the configuration could be altered to have an array of SUBSTEPS, rather than a single SUBSTEP.

The Syncer may be made to parametrically sync many different organizational structures of data such as flat lists, tree structures, networks, tables (list of lists), etc. These configurations may be included per account or per integration so that the organizational structure and the resulting method of syncing are not defined per Noun, but rather as a relationship between a Noun, or some other attribute of the data, and an account and/or integration.

The Syncer may determine what steps to take according to the configuration of the integration of the account. In one embodiment, the procedure begins by initializing the parameters and queuing a new background job to run the next step. It continues in this way until there are no steps left to sync. If there are no steps left, the Syncer may mark that the SYNCSTATUS has completed syncing, stores the timestamp of when it completed, and deletes any state it had used while syncing.

Continuous Sync

According to some embodiments, the configuration for the account, or the account's integration, associated with a SYNCSTATUS may also specify that it should be synced upon a repeating schedule and/or some other trigger(s).

According to a non-limiting embodiment, the schedule configuration can be specified as a time-based interval using a format like cron, or just an integer representing a duration in a specific unit of time such as of milliseconds. A Syncer could use a queuing system backed by a persistent cache to handle execution of the schedule on which the account will be synced. In this scenario, the queuing system would execute a job on the schedule that would create the Syncer object and tell it to sync the account. This may make it so that the Syncer may not have to keep track of or check the configured schedule on which an account should be synced. Rather, it just syncs when told to.

According to another embodiment, the Syncer can have a polling schedule of its own. A job could be configured check for accounts that need to be synced on a particular schedule (e.g., every 10 minutes). The SYNCSTATUS which references the account will either be checked against to find out if the account has not yet been synced, or if the account has completed syncing previously but the minimum time interval between re-syncs has been met and thus the account should be synced again. If either of these cases is true, the account gets synced by the Syncer.

Verbs

The SYNC Verb may have a special Mapping which translates the request to sync into another Verb according to the parameters SYNC is called with. The resulting, more specific Verb can be one which maps to many different types of operations including, but not limited to: (1) web request sent to a REST API or GraphQL API; (2) a SQL query sent to a relational database; (3) a Cypher query sent to a graph database; (4) a SPARQL query sent to a SPARQL endpoint; (5) a CSS selector to execute via JavaScript to get data from a webpage; and (6) a JavaScript function to get data from a webpage.

Similar methods and processes to the ones described herein could be used for other types of Integrations in order to enable the Syncer to query and/or interact with in other ways.

Deduplication

According to some embodiments, once Entities from multiple data sources and/or accounts have been, or are, being synced by the Syncer into a database or cache (e.g., a relational database, an SDKS, or otherwise) they may be de-duplicated. Deduplication may be based on a number of configurable parameters and processes.

One embodiment of deduplication is using a unique identifier already existing in the synced data. For example, the APIs of some file storage tools may return a unique MD5 or SHA hash of the contents of files within the metadata of the file. If two of these hashes are equal for files obtained from different data sources or accounts, the files may be the same and can be deduplicated. Likewise, for a user or company syncing data about people using the Syncer, certain APIs might include those persons' social security number. If two people entities from different data sources or accounts have the same social security number, they may be deduplicated. According to some embodiments, these special deduplication fields can be added as a configuration on Nouns so that a deduplication service can query for and deduplicate entities of many different types parametrically.

As described elsewhere herein, sometimes a Cue ID or unique identifier does not exist within the synced data but can be derived by applying some processing, transformation, or calculation on the metadata of synced entities. For example, when syncing files and folders from a variety of data sources as described above, one data source does not include a unique hash of the file contents in their API. If the data does, however, contain the contents of the file as a string, it can be run through a hash calculating algorithm and thus have a unique hash to compare it with other files. Alternatively, if the data does not include the contents of the file as a string, the deduplication process can be configured to use the DOWNLOADFILE Verb to retrieve the contents of the file from the file storage tool's API so that it can calculate a unique hash of its contents. The entire process of downloading the file contents then calculating its hash could be configured into one composite Verb for example called DOWNLOADANDCALCULATEMD5HASH.

As described elsewhere herein, in some cases certain Entity types may require analyses and/or comparisons across multiple fields to find likely duplicates. One method to do this is by using a vector comparison algorithm such as cosine similarity, euclidean distance, or hamming distance. In order to calculate these similarity scores, each entity of a particular Noun type has to have a vector representation created for it, either upon human created features, or using a vector embedding algorithm run over certain fields of the entities. Once vectors are created, statistical algorithm like k-Nearest Neighbor can be applied over the features to find the most likely duplicates. The configuration for the Noun in question may include a field denoting the minimum similarity score for automatic deduplication.

Ontology

According to some embodiments, the configuration described above used to sync data forms a syncing ontology that can be described via a semantic web language and serialized as an RDF. Thus, a Standard SDK or a SKApp built to sync data may be written in any programming language. Thus, the same sets of configurations can be shared between, and used by, many different users regardless of their syncing "engine".

Non-Limiting Use Cases

SKL, like HTTP, may be used for an almost infinite number of use cases. Various alternative non-limiting examples of use cases follow.

Universal File Browser

According to some embodiments, an application may display to users all their files and folders across integrated applications (e.g., Dropbox®, Google Drive®, OneDrive®, etc.).

For example, according to some embodiments, the application may contain code which uses SKL to recursively request and copy the Metadata of all files and folders within a user's accounts regardless of what service they exist in so that it may display and index them. This application may work with the "File" and "Folder" Nouns, Verbs like "getFilesInFolder," "Move," "Copy," "Download," and use Mappings that translate between those Verbs and each file storage tool's API.

In some embodiments, the application may also offer options to move and copy files between Integrations or download a file regardless of where it may be stored. Rather than building custom processes that interface directly with each file storage tool's API, the developer may create custom processes (i.e., Verbs) that use other relevant SKL standard Verbs (e.g. "Move," "Copy," "Rename"). When the user or developer wants to support an additional integration, all he/she may need to do is add an additional translation/Mapping between the standard Verb and the new Integration. Since these Mappings are configurations and not code, there may be no need to change the programming of or otherwise repackage the universal file browser application in order to support the new Integration. Additionally, since any custom logic and interface is built to work with standard Nouns, the new Integration may be built and deployed in hours rather than weeks.

Since this file browser may be made to represent and interact with the standard "Files" Noun, it may also easily represent other Files that might come from different types of integrated application. In some embodiments, these may include files that might be attached to or referenced in integrated email and messaging tools (e.g., Gmail®, Slack®, etc.) and Files that are attached in project management tools (e.g., Asana®, Monday.com®, etc.).

Centralizing Customer Information

In yet another embodiment, a marketing team wants to see consolidated profile information about each of their customers but the data is spread across multiple software tools. The team may use SKL to map each software tool's representation of their customers to the standard "Customer" Noun, matching data on known identifiers such as email address, and phone number to create a more complete picture about each customer.

According to some embodiments, the "Customer" Noun entities could be mapped to the "Person" Noun so that other SKL components (e.g., Interfaces, Verbs, etc.) that work with "Person" could automatically work with data that is persisted as type "Customer." For example, an Interface Component like a profile card that is built to show a Person's name and other basic info in specific places could automatically work with data stored as the "Customer" Noun without anyone having to write code to map the "Customer" directly to the profile card Interface.

Centralizing Health Information

According to another embodiment, a healthcare patient wants to build up and maintain his/her own consolidated electronic health record (EHR) with data from multiple providers in a simple, secure, and decentralized way. This person may want to: (1) easily compile a comprehensive historical digital record of his/her health at any time, (2) have control of his/her health data, for example by storing it in a dedicated and isolated database in the cloud or on their own device, and having the ability to change storage providers at any time, (3) manage and easily provide or revoke third-party access to data in their personal EHR (e.g., to a provider, family member, pharmaceutical company, etc.), and (4) build and/or leverage a fully-integrated no-code and low-code patient-facing applications and workflows. This may enable the healthcare patient to avoid having to refill similar forms every time he or she visits a doctor or other healthcare provider. It would also empower a provider to offer more holistic healthcare by having a more complete view of the patient's health history.

According to some embodiments, an SKL may work as the glue that connects health-tech services across various providers in order to allow the consolidation of health data. It may enable translations between data (e.g., those defined through the FHIR data standard such as "Patient") and a variety of platforms. Furthermore, if existing platforms have software integration, data processing, and/or other useful services that a developer/user may want to leverage, then they may be mapped to the corresponding SKL Nouns and Verbs in order to make those services accessible in a modular way. SKL could serve as the dictionary/library of compatible services and components built by a variety of developers.

An ecosystem where every patient has a personally-owned EHR could enable a variety of monetizable services, such as ones that (a) help patients manage payments, insurance claims, prescriptions, etc., (b) run an anonymizing service that compiles health data and sells it to pharmaceutical/research companies, (c) provide privacy-conscious health recommendations (pharmaceuticals, providers, diet, exercise, etc.), (d) offer ML-based services that may be run over patient test results for augmented diagnoses, (e) establish a cross-platform "platform" for personal health devices and wearables to connect to, (f) and more. In various embodiments, these monetizable services could be built using SKL components and logic.

Centralized Health Data on a Blockchain

According to some embodiments, a person's unified health data could be stored in a variety of different ways, such as in a private database on someone's private device, in SOLID pods, in centralized servers, on a blockchain, and more. If the data is stored on a blockchain, smart contracts could be leveraged such that any given person could choose to share their data with research and pharmaceutical companies in a way that may trigger certain responses, including but not limited to automatic payments, micropayments, notifications, feedback, and suggestions when relevant discoveries are made over that data, and/or other scenarios.

Unified API for Warehouse Management Systems

According to another embodiment, a company that builds warehouse automation robots wants to integrate with a variety of warehouse management systems. Rather than building a series of one-to-one integrations between their software system and the various warehouse management systems, they may establish or use existing SKL Mappings and map the translations for the various third-party warehouse management systems and the desired Nouns and Verbs (e.g., "Order," "Product," "Pick," etc.).

Interoperable and Distributed "Metaverse"

According to another embodiment, several different "metaverses" may be offered by a variety of providers. A given user may want to use different metaverses for different purposes, such as to interact with different social groups, for fun vs. work, etc. As the user builds up his or her equity (e.g., his/her avatar's capabilities, acquired items, friends, contact lists, etc.) in each metaverse, he/she may want to avoid vendor lock-in and be able to take his/her friend list, user preferences, etc. to a different metaverse. Given that each metaverse was developed independently by various software providers, the data and capability associated with the user in that metaverse may be represented in proprietary formats. In order to help the user maintain control of his/her data, and to facilitate the sharing of data across metaverses (and other ecosystems and mediums), SKL and its various methods could be used.

For example, basic information about a user, such as contact lists and achievements could be translated to and from proprietary formats into Nouns that the user can control. Moreover, certain items, such as clothing items, hair styles, etc. could also be stored according to Standard Nouns. Mappings could then be used to translate the data to each metaverse's proprietary format whenever the user wants to interact with, through, or in that metaverse. Moreover, in the event that exact translations are not possible (e.g., one metaverse support SWORD items and a second metaverse does not) certain approaches could be used to find approximate matches. For instance, relevance scores (e.g., using machine learning and/or artificial intelligence models) could be used to find Entities that most closely resemble one another across both metaverses.

Simplified Privacy and Security Assessments and Certifications

According to some embodiments, developers may build software that is secure and that follows regulatory requirements with minimum effort and cost. SKL may offer pre-certified and tested components of software, like SKDSs, Interface Components, Verbs, and Mappings. These components may be offered as packages, infrastructure, APIs, etc. to other developers/companies as SOC-2 compliant, HIPAA-compliant, GDPR-compliant, CCPA-compliant, able to access Google® restricted scopes, etc.

Due to various embodiments of SKL, developers may use composable software elements that may be "clicked" together like building blocks to facilitate third-party development of custom applications. Developers may also add custom code and components that may be run on third-party infrastructure. SKL may offer a streamlined way of having these third-party developers reach compliance and get any third-party built/run software properly certified (e.g., for Google® restricted scopes) and tested (e.g., pen-tests) by only requiring that their new components be tested. In this way, in some embodiments, SKL may allow these third-party components to reach certification and compliance in a simpler and faster way.

Contextual Intelligence

Figure 54:
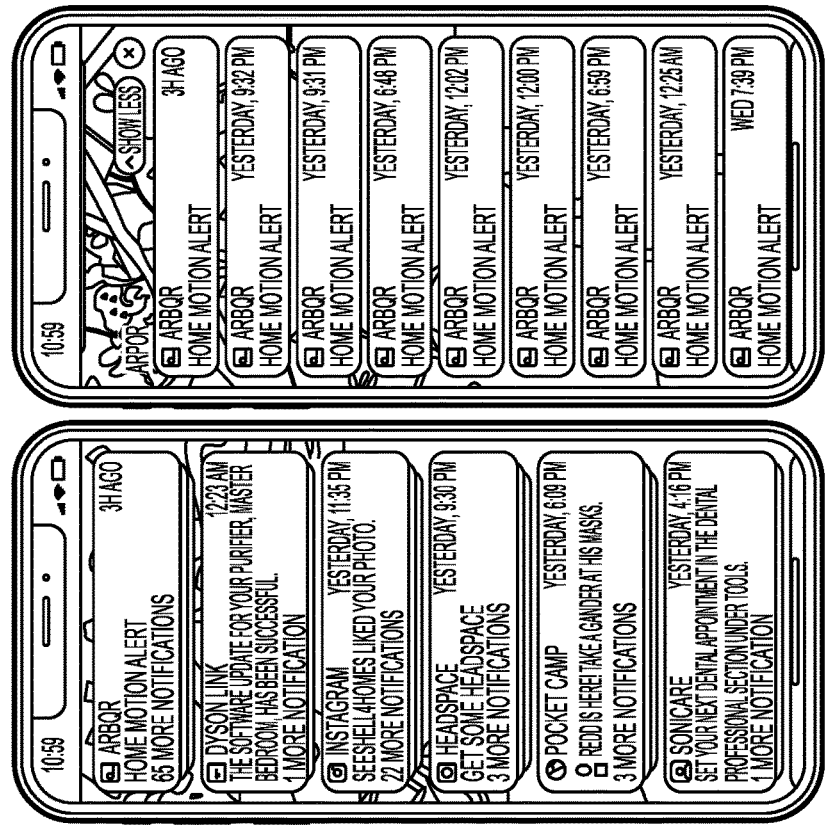
FIG. 54 illustrates a series of steps that a SKApp may take in order to contextualize and then synthesize natural language summaries of notifications from various different data sources.

FIG. 54 illustrates a series of steps that a SKApp may take in order to contextualize and then synthesize natural language summaries of notifications from various different data sources, according to an embodiment. At step 5401, various integrations are programmed to provide a user (e.g., an account, a device, etc.) with notifications specifically related to a given application. At step 5402, a SKApp that is configured to accept notifications from the various applications (e.g., Integrations) periodically receives the notifications (and/or events and/or logs representing other users" activity) and generates CueIDs and/or Unique IDs for the incoming activity-related data (e.g., Entities) and/or links them to the relevant Entities in an SKDS. In this way, the SKApp is able to provide the user different ways to interact with activity, to understand what other users (e.g., people, collaborators, automated processes, etc.) are doing and what is new. The user and or the SKApp may determine that certain Entities and or activity are relevant to the user and/or to the user's electronic content and/or electronic context and provide information about the new relevant activity, grouped and ranked according to these determinations. At step 5403, the SKApp may generate natural language summaries of activity and/or notifications that are relevant to a user, to a user's electronic content, and/or to a user's electronic context. In some embodiments, the user may also use alternate interfaces to engage with a SKApp that can synthesize activity and notifications (e.g., via a chat-like interface like FIG. 51, via a smart question-answering interface.

Figure 41:
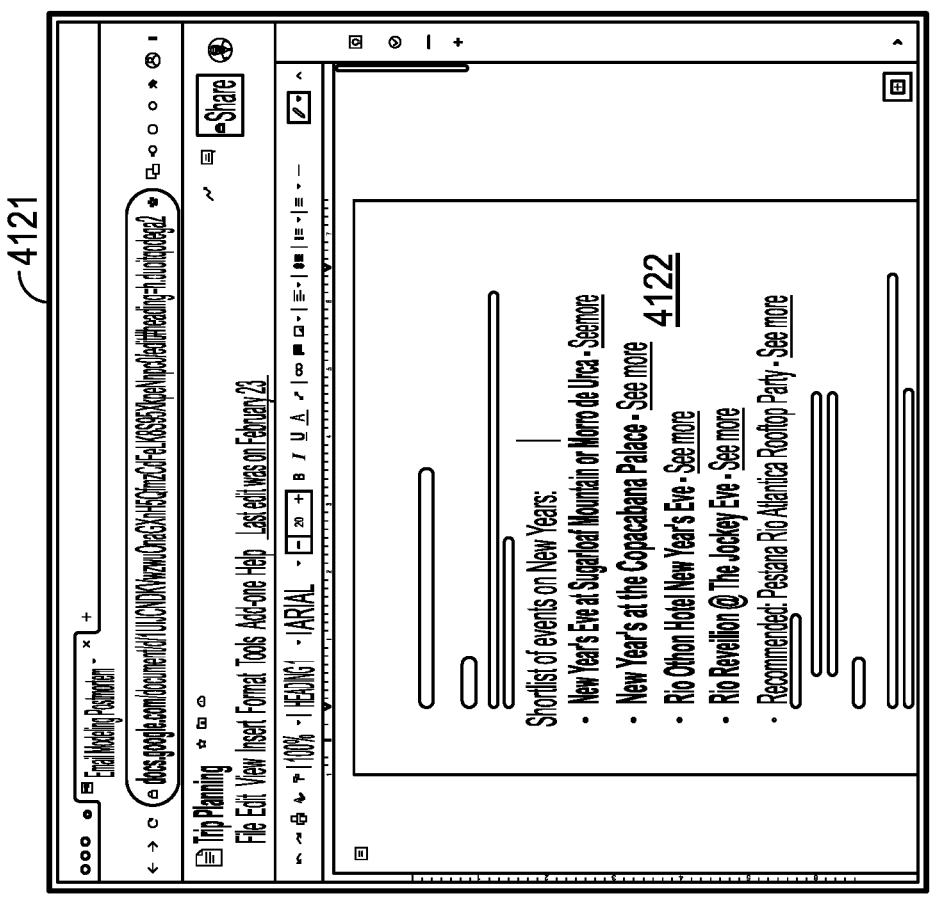
FIG. 41 shows a series of graphical user interfaces where a SKApp may provide contextually useful information and capabilities to an end user based on electronic content and electronic context, in accordance with an embodiment.

FIG. 41 shows a series of graphical user interfaces where a SKApp may provide contextually useful information and capabilities to an end user based on electronic content and electronic context. In this example, a user is working in a word processing application as shown in the graphical user interface at step 4101. As the user writes certain information that suggests that they are looking for information that may reside in their SKDS the SKApp may determine, with a certain confidence score, that the user might benefit from additional information. If the confidence score is high enough, the SKApp may highlight, or otherwise communicate, the identified opportunity for contextual augmentation. At step 4111, the user may elect to investigate the suggested contextual augmentation by opening Interface Component 4112. Here the interface component 4112 is letting the user know that it has identified four relevant events from their private data sources and information shared with them across Integrations. The Interface Component 4112 may also show other suggestions such as the ability to do a more thorough search including public sources. The user is therefore easily able to get the information they need and even auto-populate the identified Entities as shown at step 4121. At this point, the SKApp can automatically fill in the data corresponding to relevant Entities in one or more SKDSs as well provide links to view more information about those Entities. In some embodiments, the SKApp may also offer other types of capabilities and recommendations such as suggested links to purchase tickets the events.

In some embodiments, the SKApp may also recommend Entities from sources that are not owned by the user (e.g., public sources, company source, shared premium knowledge-bases, etc.). This personalization can help the user discover new information that may be relevant. In some cases, these recommendations can be sponsored advertisements.

Figure 38:
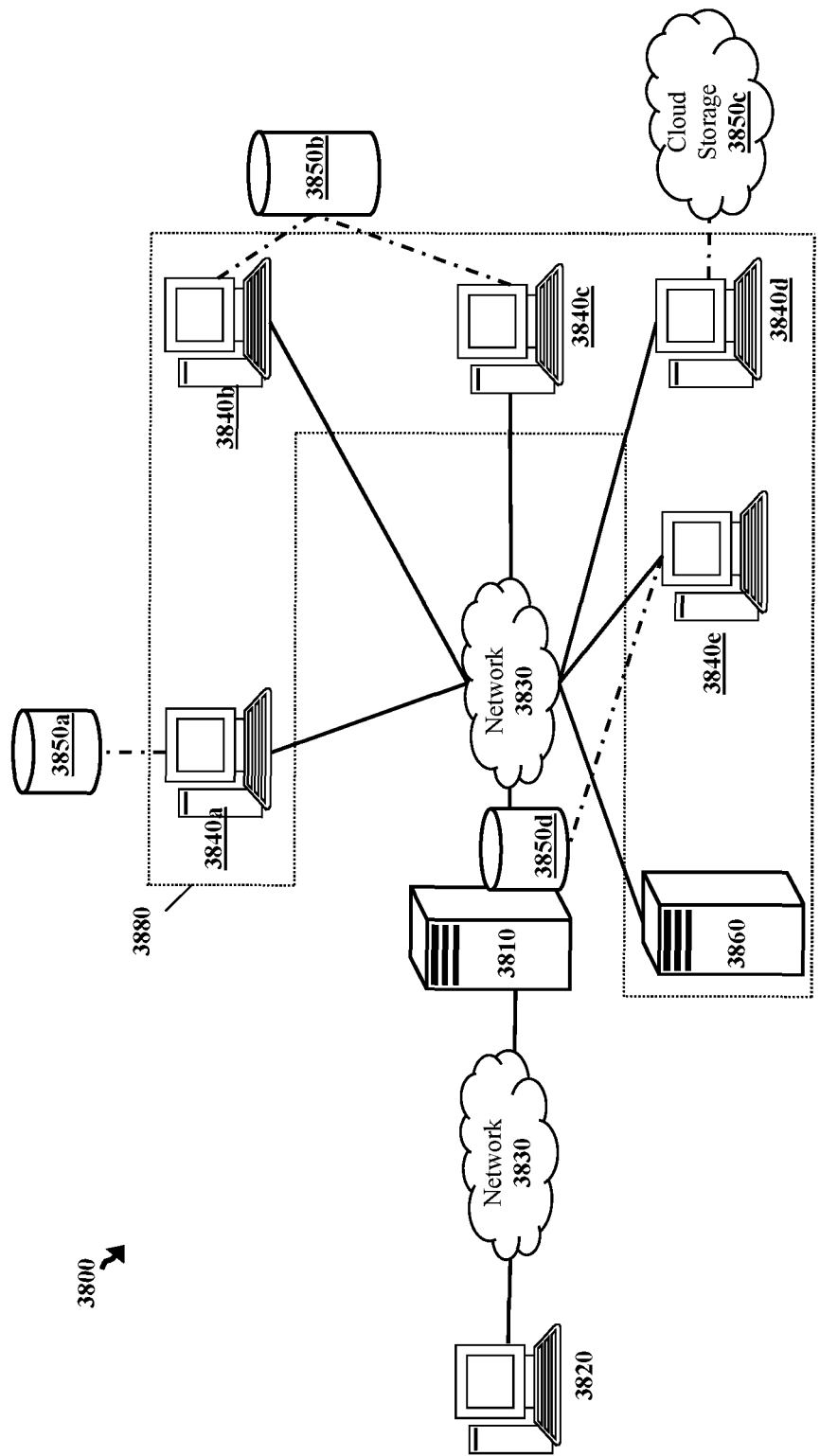
FIG. 38 illustrates components of an electronic workflow management system, in accordance with an embodiment.

FIG. 38 illustrates components of an electronic workflow management system 40800. The electronic workflow management system 3800 may also be referred to herein at the electronic workflow management system. The electronic workflow management system 3800 may include an analytics server 3810, an administrator computing device 3820, user computing devices 3840a-e (collectively user computing devices 3840), electronic data repositories 3850a-d (collectively electronic data repositories 3850), and third-party server 3860. The above-mentioned components may be connected to each other through a network 3830. The examples of the network 3830 may include, but are not limited to, private or public LAN, WLAN, MAN, WAN, and the Internet. The network 3830 may include both wired and wireless communications according to one or more standards and/or via one or more transport mediums.

The communication over the network 3830 may be performed in accordance with various communication protocols such as Transmission Control Protocol and Internet Protocol (TCP/IP), User Datagram Protocol (UDP), and IEEE communication protocols. In one example, the network 3830 may include wireless communications according to Bluetooth specification sets, or another standard or proprietary wireless communication protocol. In another example, the network 3830 may also include communications over a cellular network, including, e.g., a GSM (Global System for Mobile Communications), CDMA (Code Division Multiple Access), EDGE (Enhanced Data for Global Evolution) network.

The electronic workflow management system 3800 is not confined to the components described herein and may include additional or alternate components, not shown for brevity, which are to be considered within the scope of the electronic workflow management system 3800.

The analytics server 3810 may generate and display a graphical user interface (GUI) on each user computing devices 3840 within a network 3880. The analytics server 3810 may also display the GUI on the administrator-computing device 3820. An example of the GUI generated and hosted by the analytics server 3810 may be a web-based application or a website.

The analytics server 3810 may host a website accessible to end-users, where the content presented via the various webpages may be controlled based upon each particular user's role. The analytics server 3810 may be any computing device comprising a processor and non-transitory machine-readable storage capable of executing the various tasks and processes described herein. Non-limiting examples of such computing devices may include workstation computers, laptop computers, server computers, cell phones, and the like. While the electronic workflow management system 3800 includes a single analytics server 3810, in some configurations, the analytics server 3810 may include any number of computing devices operating in a distributed computing environment to achieve the functionalities described herein.

The analytics server 3810 may execute software applications configured to display the GUI (e.g., host a website), which may generate and serve various webpages to each user computing device 3840 and/or the administrator computing device 3820. Different users operating the user computing devices 3840 may use the website to generate, access, and store data (e.g., files) stored on one or more of the electronic data repositories 3850. In some implementations, the analytics server 3810 may be configured to require user authentication based upon a set of user authorization credentials (e.g., username, password, biometrics, cryptographic certificate, and the like). In such implementations, the analytics server 3810 may access a system database 3850d configured to store user credentials, which the analytics server 3810 may be configured to reference in order to determine whether a set of entered credentials (purportedly authenticating the user) match an appropriate set of credentials that identify and authenticate the user.

As described herein a file refers to contained data available to at least one operating system and/or at least one software program. A file may contain data, such as text, video, computer program, audio, and the like. Furthermore, a file can also refer to a path associated with data. For example, a file, as used herein, can refer to a traditional file or folder on a local machine, a shortcut to a file/folder on a different machine, and/or a reference to a file/folder in an email message. Another non-limiting example of a file may include a reference to the location of a file/folder by website URL or file/folder path, a file/folder that only exists online or is not traditionally saved to a local machine's normal file. The path may not be accessible through the main system's file browser (e.g., Google Docs®, Evernote Notes®, and the like) that are not typically accessible through a computer's Windows Explorer or MacOS Finder unless explicitly downloaded to a folder in a different format that might lose either functionality or context such as related content and comments),In some configurations, the analytics server 3810 may provide an application native to the user computing devices 3840 or other electronic devices used by users where users may access the native application using the user computing devices 3840 or any other computing devices (e.g., personal electronic devices) to generate, access, store, or otherwise interact with data stored onto the electronic data repositories 3850. The native application may be any application that is directly in communication with the analytics server 3810. For example, the native application may be a mobile application, cloud-based application, universal GUI, and/or virtual/cloud-based "desktop" where users (upon being authenticated) can access, interact with, and manipulate data stored onto the electronic data repositories 3850.

In some configurations, the analytics server 3810 may generate and host webpages based upon a particular user's role within the electronic workflow management system 3800 (e.g., administrator, employee, or the employer). In such implementations, the user's role may be defined by data fields and input fields in user records stored in the system database 3850d. The analytics server 3810 may authenticate each user and may identify the user's role by executing an access directory protocol (e.g., LDAP). The analytics server 3810 may generate webpage content, access or generate data stored in the electronic data repositories 3850, according to the user's role defined by the user record in the system database 3850d. For instance, a user may be defined as a lower level employee who may not be authorized to view all related content to a particular sensitive file. Therefore, the analytics server 3810 may customize the GUI according to the user's authentication level. Furthermore, the analytics server 3810 may customize the GUI according to a user's role (e.g., function type). For instance, the analytics server 3810 may customize the GUI based on whether a user is a designer or an account manager.

In operation, when instructed by the administrator-computing device 3820 and/or any user-computing device 3840, the analytics server 3810 may execute various scanning and crawling protocols to identify and map data stored onto each electronic data repository 3850. As described herein, the analytics server 3810 may also execute various predetermined protocols to generate unique identifiers for the above-described files/data, identify related files, create a nodal data structure, periodically retrieve (e.g., pull data or collect data that is pushed) the electronic data repositories, update the nodal data structure, and display related files and context information on the above-described GUI. In some implementations, the analytics server 3810 may incorporate the GUI into a third-party application, such as a third-party email application or a file sharing/management application while preserving the "look and feel" of the third-party application.

In some configurations, the analytics server 3810 may compare unique identifiers included in the metadata of each file. For instance, a file may have metadata that includes unique identifiers associated with elements related to the file (e.g., email, tasks, storage location, and the like). In some embodiments, the analytics server 3810 may use these unique identifiers to determine whether the file is related to any other files.

User computing devices 3840 may be any computing device comprising a processor and a non-transitory machine-readable storage medium capable of performing the various tasks and processes described herein. Non-limiting examples of a user-computing device 3840 may be a workstation computer, laptop computer, tablet computer, and server computer. As depicted in FIG. 38, the user computing devices 3840 may each be operated by a user within the network 3880. In a non-limiting example, the network 3880 represents an internal network and/or collection of computing devices connected within an entity. For instance, network 3880 may represent all computing devices operated by all employees of a company. User computing devices 3840 may be internally interconnected via an internal and/or private network of the network 3880 (not shown). For instance, a company's intranet or any other private network may connect all the company's computing devices. In FIG. 38, user-computing devices 3840 are interconnected within the network 3880 (e.g., belong to the same company).

Even though the depicted user computing devices 3840 are within the same network (e.g., network 3880), it is expressly understood that the services provided by the analytics server 3810 may not be limited to computers within the same network. For instance, the analytics server 3810 may scan files accessible to one or more user computing devices that are not interconnected and are not within the same network. In some other embodiments, the analytics server 3810 may only monitor a customized and/or predetermined portion of the computing devices 3840. For instance, the administrator-computing device 3820 may customize a list of user computing device 3840 and their corresponding electronic repository 3850 to be monitored by the analytics server 3810.

Each user computing device 3840 may access one or more electronic data repositories 3850 to access (e.g., view, delete, save, revise, share, send, communicate around, and the like) data stored onto the one or more electronic data repositories 3850. For instance, user-computing device 3840a may access data within a local database 3850a. User computing device 3840b and 3840c may access a shared database 3850b. User computing device 3840d may access a cloud storage 3850c. Furthermore, user-computing device 3840e may access a database operationally managed by the analytics server 3810, such as the system database 3850d. The network 3880 may also include the third-party server 3860 where one or more user computing devices 3840 utilize the third-party server 3860 to access, store, and/or manage data. An example of the third-party server 3860 may be an email server, a third party (or homegrown) electronic file management server, a public website for hosting and sharing specific file types (e.g., YouTube® for videos, Behance® for graphic files, and LinkedIn Slideshare® for presentations), or any other server used to access and/or store data files.

In some configurations, data accessible to the user computing devices 3840 may be stored in a distributed manner onto more than one electronic repositories. For instance, one or more files may be stored onto a blockchain accessible to the user computing devices 3840 where the blockchain comprises multiple distributed nodes storing data onto disparate electronic repositories. The analytics sever 3810 may retrieve a public or private blockchain key associated with each user and/or each user computing device 3840 to access the blockchain and monitor data stored onto the blockchain.

Even though different user computing devices 3840 are depicted as having, access to different electronic data repositories 3850, it is expressly understood that in different embodiments and configurations, one or more user computing devices 3840 may have access to a combination of different electronic repositories 3850. For instance, user-computing device 3840*a* may utilize the third-party server 3860 and the local database 3850*a* to store data. In another example, user-computing device 3840*c* may utilize database 3850*b*, cloud storage 3850*c* and the third-party server 3860 to access files/data. For the purpose of brevity, different combinations of different user computing devices 3840 having access to different electronic data repositories 3850 are not shown.

Figure 39:
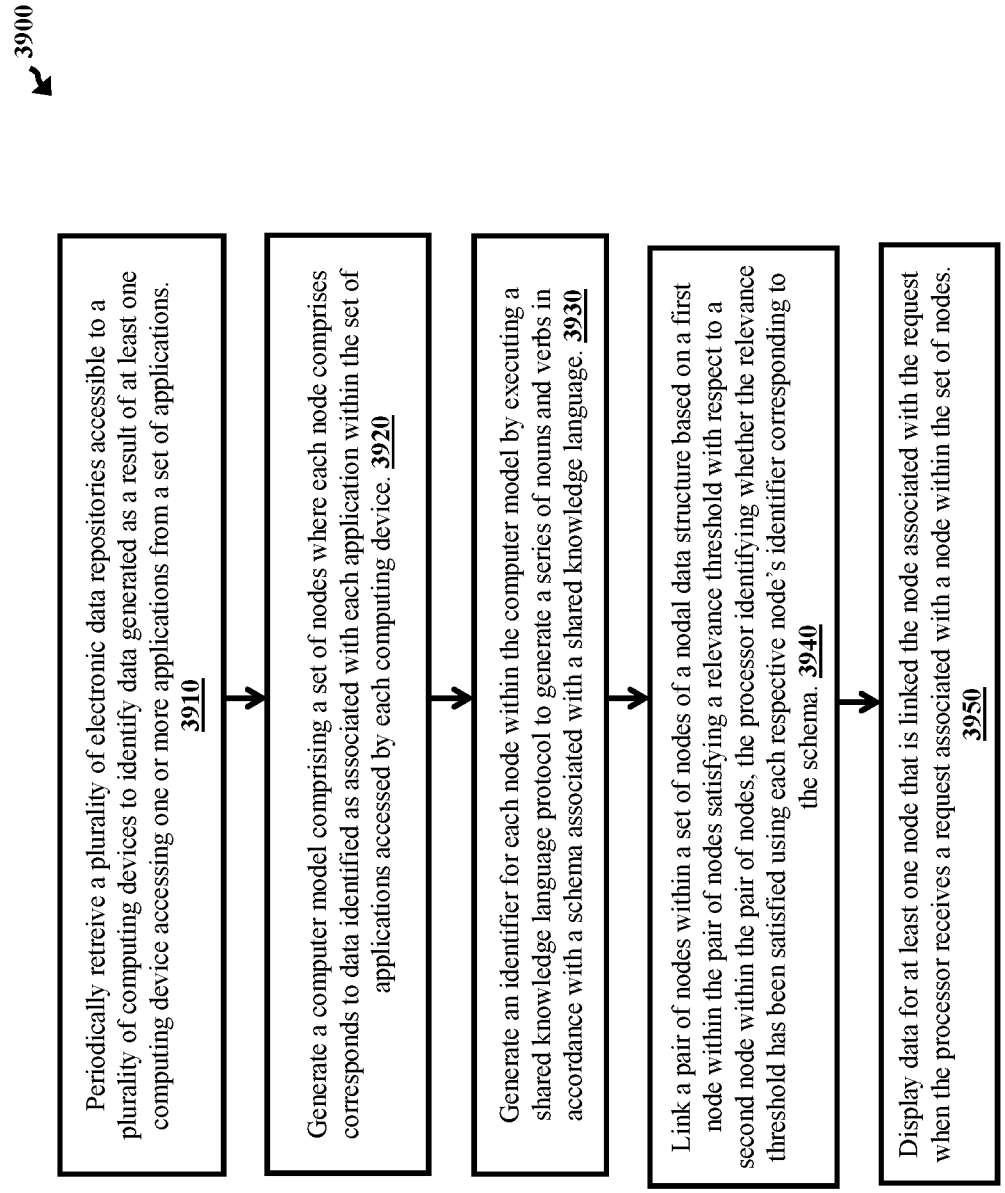
FIG. 39 illustrates a flow diagram of a process executed in an electronic workflow management system, in accordance with an embodiment.

FIG. 39 illustrates a flow diagram of a process executed in an electronic workflow management system, in accordance with an embodiment. The method 3900 includes steps 3910-3970. However, other embodiments may include additional or alternative execution steps, or may omit one or more steps altogether. In addition, the method 3900 is described as being executed by a server, similar to the analytics server described in FIG. 38. However, in some embodiments, steps may be executed by any number of computing devices operating in the distributed computing system described in FIG. 38. One or more user computing devices or an administrator-computing device may, locally perform for instance, part or all the steps described in FIG. 39. Furthermore, even though some aspects of the method 3900 is described in the context of a web-based application, in other configurations, the analytics server may display related data in a mobile application or an application native to the user's desktop.

At step 3910, the analytics server may periodically retrieve a plurality of electronic data repositories accessible to a plurality of computing devices to identify data generated as a result of at least one computing device accessing one or more applications from a set of applications.

The analytics server may require all users to create accounts and grant permission to the analytics server to periodically monitor files accessible to each user and/or computing device operated by each user. In some configurations, the analytics server may provide a web-based application displaying various prompts allowing each user to grant the analytics server permission to periodically monitor all files accessible and/or revised by each user. The web-based application may provide at least five monitoring functionalities: 1) files saved on any electronic data repository accessible by each user; 2) each user's email communication; 3) each user's chat/messaging activity; 4) each user's task management or project management; and 5) each user's calendar events.

During the account registration process, the web-based application may display one or more prompts allowing each user to connect his or her email accounts, messaging tools, task management tools, project management tools, calendars, organizational or knowledge management tools (e.g., Evernote®, Atlassian Confluence®, etc.), other collaborative tools (e.g., Basecamp®, Smartsheet®, etc.) and/or electronic repository systems (e.g., local database, cloud storage systems, and the like) to the analytics server. The prompt may also include one or more text input fields where each user can input identification and authentication credentials for his email accounts, messaging tools, electronic repository systems, and/or third party applications, such as project management tool, time tracking applications, billing, issue tracking, web accounts (e.g., YouTube®), online applications (e.g., FIGMA, ONSHAPE, GOOGLE DOCS, and the like). For example, a user may enter his email address and password in the input fields displayed by the analytics server. Upon receipt, the analytics server may use the authentication credentials to remotely login the above-described portals and monitor all files accessible and/or revised by each user and/or all files saved on the electronic data repositories.

Upon receiving permission and/or authorization from users, the analytics server may retrieve data from the one or more electronic data repositories accessible to each user. The analytics server may execute a scanning or crawling protocol where the analytics server crawls different databases to identify all files accessible to each user.

As discussed above, an electronic repository may represent any electronic repository storing files that are accessible to one or more computers within an entity or a network. Non-limiting examples of an electronic repository may include a database, cloud storage system, third-party shared drives, third-party application as described above, internal file transfer protocol (FTP), and internal or external database operated by the analytics server, email storage, HR systems, accounting systems, customer relationship management (CRM) systems, and the like.

The analytics server may, upon receiving permission from one or more computing devices periodically scan the above-described electronic repositories and identify one or more files stored onto these electronic repositories. For instance, an administrator of an entity may grant permission to the analytics server to retrieve data (e.g., scan all repositories accessible to all computers within the entity).

Upon identification of each file, the analytics server may search data associated with the identified files and may re-create an activity timeline for each user. The activity timeline may present historical data associated with each file and each user. For instance, when the analytics server identifies a file (e.g., Sample.doc), the analytics server may further identify a history of Sample.doc by analyzing said file's history (e.g., revision, communication, and access history of the file). As a result, the analytics server may create a timeline that indicates every interaction (e.g., file generation, revisions, modification, and the like) with Sample.doc.

In some configurations, the analytics server may retrieve the file history and other related data (e.g., context data) using an application programming (API) interface in communication with the electronic data repositories. For instance, the analytics server may be prohibited from accessing a third-party shared drive. In those embodiments, the analytics server may use an API configured to communicate with the third party shared drive to identify and monitor files. The analytics server may further use a similar protocol to determine whether a file has been revised/modified. For instance, the analytics server may cause an API to connect/sync with a third-party document sharing application. The analytics server may also cause the API to transmit a notification for each instance that a file, stored on the third-party document sharing application, is accessed and/or revised by a user.

In some configurations, third-party service providers of shared document drives may not allow the API to transfer detailed data regarding file revisions. For instance, third-party service providers may only transmit a notification that a file has been accessed and/or revised by a user. However, the API notification may not contain the revision (e.g., change of text, formatting, and the like) to the file. In those embodiments, the analytics server may remotely access the shared drive, using credentials obtained from the user during the account registration process, obtain a copy of the file, and compare the file to a previous version.

The analytics server may also include the API notification in the metadata profile of each identified file. For instance, the analytics server may receive an API notification that a first user has shared File X with a second user on a third-party document sharing application. The API notification may not include any specific data regarding the content of File X because the analytics server may be prohibited from retrieving a copy of File X. The analytics server may include the document sharing activity in the metadata of File X (within the nodal data structure described herein), which may include a timestamp of the document share and data associated with the first user and the second user. As a result, the analytics server may reconstruct an activity timeline for File X that includes information on how File X was shared (e.g., medium and timestamp) and different users who interacted with File X.

In another example, user 1 may share File X with user 2 using a third-party file management application. Using an API connect to the third-party file management application, the analytics server may receive a notification that File X was shared between two users at a certain time. The API notification may not include user identifiers and may not identify the sender or the receiver of File X. The third-party file management application may also notify user 1 and/or user 2 regarding the file sharing. For instance, the third-party file management application may send an email to user 2 informing user 2 that user 1 has shared File X with user 2. The email may also include an identifier associated with File X (e.g., URL of File X). Because the analytics server has access to emails of user 1 and user 2, the analytics server can identify that user 1 has shared File X with user 2. The analytics server may then include the file path, timestamp of the email, and timestamp of the file share, in the File X's metadata file. In some configurations, the analytics server may create a node for the email and/or the file path (e.g., URL) included in the email.

At step 3920, the analytics server may generate a computer model comprising a set of nodes where each node comprises corresponds to data identified as associated with each application within the set of applications accessed by each computing device. Each node may represent a vector that includes various information discussed herein.

The analytics server may create a computer model comprising a nodal data structure (or data graph) where each node represents an identified file. The analytics server may store the nodal data structure in the system database (or any other electronic data repository, such as a cloud bases storage, local/internal data storage, distributed storage, blockchain, and the like) described in FIG. 38.

The nodal data structure may be a complete map of all the files identified in step 3910. Each node may also contain metadata further comprising historical (e.g., context) data associated with the file, such as the generated unique identifier of the file, title, mime type, file permissions, comments, and the like. The metadata may also indicate a revision history associated with each file. For instance, the metadata may include timestamp of every revision for each file, a unique identifier (e.g., user ID, IP address, MAC address and the like) of the user and/or the computing device who accessed and/or revised the file, and the like. Other context data may include, but not limited to, email identifiers (e.g., unique email identifiers, sender identifier, receiver identifier, and the like), tasks associated with the files, user identifiers, mime type, collaboration information, viewing permission, title of each file, and the like.

The metadata may also include context information associated with each file. For instance, the metadata may include email/chat communication that are related to each file. In another example, if the analytics server determines that a file has been transmitted via an email or other electronic communication protocols (e.g., referenced or attached in an email message, referenced in a chat session, and the like), the analytics server may include a transcript of the electronic communication (e.g., body of the email) in the node, as metadata. The analytics server may index each node based on its associated metadata and make each node searchable based on its metadata.

The analytics server may compare the unique identifiers for of all the files identified in step 3910. When the unique identifiers of two or more files match, the analytics server may link the nodes representing the two or more files in the above-described nodal data structure. A link (or edge) may connect similar or associated nodes within a nodal data structure such that the analytics server may retrieve context metadata more efficiently. Edges can be directed, meaning they point from one node to the next, or undirected, in which case they are bidirectional. The analytics server may use different directed or undirected edges to link different nodes. Edges between nodes can be given special classifications, including but not limited to "copy," "version," "parent," "child," "derivative," "shared email," "shared task," "shared tag," and "shared folder." The analytics server may also combine relevant metadata from related files and display to the client (e.g., files A and B are copies of each other, and file B is attached in an email message. When user previews file A, the email message for file B can be displayed). As described herein, the analytics server may use the links to identify a latest version of a related family of files.

Figure 40:
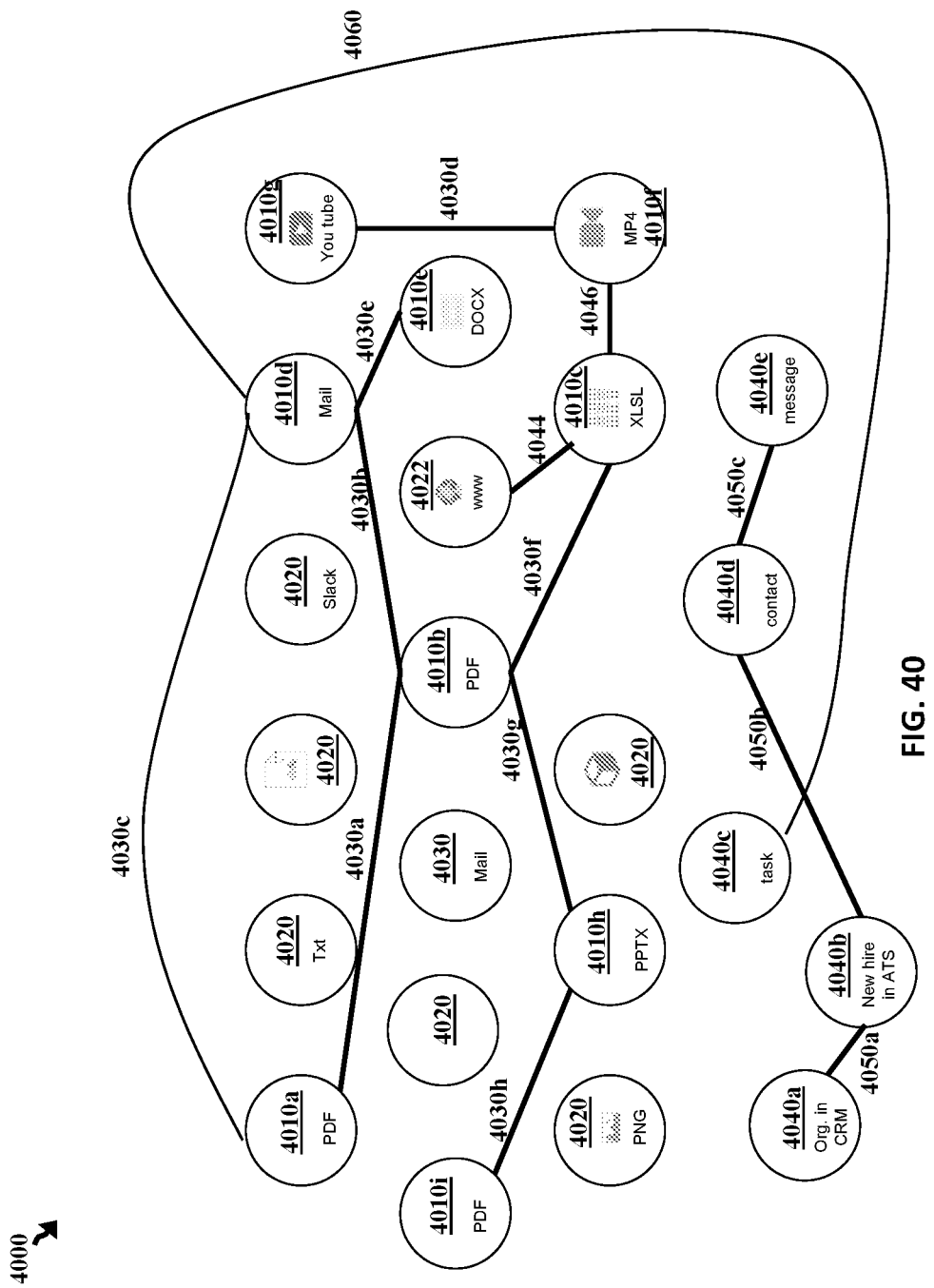
FIG. 40 represent a nodal structure created based on a set of identified files and related nodes connected via different edges, in accordance with an embodiment.

Referring now to FIG. 40, nodal data structure 4000 represent a nodal structure created based a set of identified files and related nodes connected via different edges. As depicted in FIG. 40, the analytics server identifies 17 files and creates a node for each file (nodes 4010*a-i* and nodes 4020). For instance, node 4010*b* represent a pdf file stored locally on a computer of an entity (e.g., computer within a network of computers); node 4010*h* may be a PowerPoint Open XML file stored on a cloud storage accessible to another computer within the same network. As described above, each node may include an indication of a location where the file is stored. For instance, node 4010*e* may represent a DOCX file stored in a local database. Therefore, node 4010*e* may include metadata comprising a path of the DOCX file to the local database. Additionally, as described above, multiple nodes may be linked together. For instance, links 4030*a-h* connect nodes 4010*a-i* that represent related files. Furthermore, because the analytics server identifies that nodes 4020 are not related, the analytics server does not link nodes 4020, as depicted in FIG. 40. As described above, a "file" may also refer to a path associated with data. For instance, a file may refer to the underlying data regardless of where the data is stored and/or hosted or the application needed to view the data. For instance, a file may include a link (directing a user to view the underlying file). The file may only exist as on online file and may only be accessible through an internet browser or mobile application, and in some cases, it may not be able to be downloaded to a local machine without some type of conversion (e.g., Google Docs® or Google Slides® only exist online, but can be downloaded as DOCX or PPTX).

A path may specify a unique location of a file within a file system or an electronic data repository. In some configurations, a path may point to a file system location by following the directory tree hierarchy expressed in a string of characters in which each component of the string, separated by a delimiting character, represents a directory. In some configurations, the analytics server may use a uniform resource locator (URL) to identify each file's stored location. For instance, when a file is stored onto a cloud storage or when a file is stored onto a third-party shared drive, the analytics server may include a URL of the file in the nodal data structure.

In some configurations, and as described above, the nodal structure may not include the identified files and may only comprise nodes representing file locations (and other metadata) and edges representing how different files are related. For instance, instead of storing multiple files (and possibly multiple version of the same file and/or related files) the analytics server may only store the nodal data structure in a local or external database. In this way, the analytics server may conserve significant storage space because storing a representation of a file requires significantly less storage capacity than storing the file itself. Furthermore, as described herein, identifying relationships (and executing various protocols to identify context, relationship or other related data for each file) is much less computationally intensive when performed on the above-described nodal data structure than executing the same protocols on the files themselves. In this way, the analytics server may conserve significant computing and processing power needed to provide file management services. As a result, the analytics may deliver results in a faster and more efficient manner than provided by conventional and existing file management methods.

As depicted, the nodal data structure 4000 may include all data associated with users' workflow. For instance, the wild the nodes described above represent different files, nodes 4040a-e may represent workflow components generated because of users' work. For instance, the node 4040a corresponds to organization chart generated based on customer relationship management (CRM) software solution (internal or third party solution). The node 4040b may correspond to new employees hired where the data is generated based on an applicant tracking system software solution (internal or third party solution).

The node 4040c may correspond to one or more tasks associated with one or more employees. For instance, an organization may use an internal or third party software solution to help employees execute various tasks efficiently. The analytics server may identify the tasks I may generate a node for each task. Accordingly, the analytics server may identify that one or more tasks may be related to one or more files and/or work components within the nodal data structure 4000.

The node 4040d may correspond to a contact within a contact list of an employee/user. The analytics server may scan various software solutions (internal and/or external) and may identify contacts associated with each user/employee. The analytics server may then generate a node for each contact accordingly. As described herein, the analytics server may then identify that a contact is related to another node that may represent a file and/or a workflow component within an organization. The node 4040e respond to one or more messages generated and transmitted among users, such as emails or any other messages (chat applications).

As depicted, the analytics server may not differentiate between files stored on data repositories accessible to one or more users and workflow components generated/accessible to the users. The analytics server may execute various analytical protocols described herein to identify related nodes and may use edges to link or merge the related nodes. For instance, the analytics server may use edges 4050a-c to connect related work component nodes. The analytics server may also use age 4060 two connect node 4040c (workflow component) to the node 4010d, and indirectly connect node 4040d to nodes 4010a, 4010b, 4010e, 4010c, 4010h, and 4010i.

Referring back to FIG. 39, the analytics server may periodically retrieve the plurality of electronic data repositories, to monitor updated data associated with users and their activities. The analytics server may periodically retrieve data (e.g., scan the electronic repository as discussed herein). In some configurations, the frequency of data retrieval may be predetermined or may be adjusted by an administrator in accordance with an entity's needs. For instance, an administrator may require the analytics server to scan the electronic data repositories every week, day, or multiple times per day depending on their unique needs and data sensitivity.

In some configurations, the analytics server may only retrieve data from the electronic data repositories in response to receiving a notification or a trigger from another server, such as an email message, a third party API or a data management server operationally in communication with a data repository. The analytics server may use application-programming interfaces and/or web hooks to achieve the above-described results. For instance, as described above, the analytics server may utilize various APIs to monitor the identified files. Therefore, the analytics server may receive a notification, from an API, that a file has been revised. In some embodiments, the API may transmit details of the revisions (e.g., user name, timestamp, and the like). In some other embodiments, the API may not be configured or authorized to transmit such detailed data. In those embodiments, in response to receiving the notification from the API indicating that a file has been revised, the analytics server may further scan the electronic repository (or other repositories, such as email, third-party applications, and other repositories) on which the file is stored. As a result, the analytics server may retrieve revision details associated with the revised file.

At step 3930, the analytics server may generate an identifier for each node within the computer model by executing a shared knowledge language protocol to generate a series of nouns and verbs.

As discussed herein, the computer model may include a set of nodes and each node may include data generated as a result of each user's interactions with different applications or any other activities conducted by the users. For instance, a node may correspond to any action (or a series of actions) performed by one or more.

As discussed herein, data corresponding to user activities may be transformed using schemas discussed herein, such that the data is made into a uniform and common (e.g., SKL). In order to do so, the analytics server may perform various methodologies discussed herein to generate nouns and verbs from actions performed by users (e.g., data corresponding to different nodes). As a result, each node may include (e.g., as metadata) an SKL that is common among all nodes. Accordingly, activities conducted by a user may be transformed, such that the transformed data does not depend upon the user, application, and/or the source of the application. Therefore, the transformed data may be uniform and only focus on the underlying activity (e.g., regardless of which application was accessed, which user accessed the application, which platform was used, or which electronic data repository/source was accessed). This data, application, source agnostic approach allows activity across different applications platforms to be unified, such that the data for different nodes can be compared against each other. For instance, activities corresponding to a first node related to accessing a spreadsheet can be compared with a second node related to a social media platform browsing history.

At step 3940, the analytics server may link a pair of nodes within a set of nodes of a nodal data structure based on a first node within the pair of nodes satisfying a relevance threshold with respect to a second node within the pair of nodes, the processor identifying whether the relevance threshold has been satisfied using each respective node's identifier.

The analytics server may, for each instance of the server detecting a related file to the first file, merge the first node where the merged first node corresponds to a context data of related files (e.g., storage location and a timestamp of the related file to the first file and context data of the first file). In response to identifying a revision or a modification to a file, the analytics server may revise the nodal data structure accordingly. For instance, as described above, the analytics server may identify that a file has been revised or modified by a user within the network. The analytics server may then update the metadata associated with the node and the respective edge representing the revised file with revision/modification data. For instance, the analytics server may update the node metadata with a user identifier, timestamp, content of the revision, and other historical data. When the analytics server identifies a revision of the file, the revised file is no longer a "copy" of the original file. Therefore, the analytics server updates the metadata of the revised file from "copy" of the original file to a "version" of the original file.

In some configurations, the analytics server identifies related files based on their context data stored onto one or more nodes representing each respective file. For instance, in some embodiments, the analytics server may update or revise the nodal data structure by generating new nodes and/or edges. For instance, when the analytics server discovers that a user has attached a file in an email communication, the analytics server may generate a node that represents the email communication. The analytics server may then update the node's metadata with information associated with the email communication (e.g., timestamp, email body, email address, sender user identification, receiver's user identification, and other context data described herein).

In some configurations, if the email communication includes other files or web links, the analytics server may create individual nodes for other related files. For instance, and referring to FIG. 40, node 4010*d* represents email communication between two users where one user attached a pdf file represented by node 4010*b*. Furthermore, in the email represented by node 4010*d*, the user also attached a document represented by node 4010*e*. As depicted in nodal data structure 4000, the analytics server may also link the above-described nodes using edges 4030*b* and 4030*e*. As a result, the analytics server may continuously and iteratively update the nodal data structure. Therefore, the nodal data structure is a dynamic computer model, which adapts to user interactions.

In some configurations, the analytics server may combine metadata from multiple related nodes into a single metadata file. Instead of each node having a separate metadata file, the analytic server may create a single metadata file associated with a file where the metadata file contains all metadata associated with all (or a given subset of) related nodes. For instance, if File A is related to Files B-F, the analytics server may create a single metadata file and combine metadata associated with Files A-F. Upon identifying additional related files (or other related data, such as tasks, messages, and the like), the analytics server may update the metadata file accordingly.

In some configurations, the analytics server may augment the metadata file using public data. For instance, in addition to retrieving data from the electronic repositories described herein, the analytics server may also retrieve data from publicly accessible repositories (e.g., public websites or other publicly accessible data). When the analytics server identifies a public file related to an identified file, the analytics server may augment the identified file's metadata file. For instance, the analytics server may identify a video file stored locally onto a user's computer. The analytics data may then determine that the identified video is similar to a video publicly shared on a website (e.g., YouTube®). Consequently, the analytics server may augment the identified video's metadata file using data associated with the publicly share video (e.g., URL of the video).

As described above, the analytics server may use two methods to merge two nodes where the two nodes represent two related files (e.g., copies of the same file, and/or files that have been determined to be related). First, the analytics server may create a new node for the newly discovered related file and may link the nodes together. Second, the analytics server may combine the metadata of the newly discovered file with the original file (e.g., create a single metadata file and combine all metadata corresponding to context information of the related file to the original file). The analytics server may also use one or both of the above-described methods when merging two nodes.

At step 3950, the analytics server may display data for at least one node that is linked the node associated with the request when the processor receives a request associated with a node within the set of nodes.

Upon retrieving the identified node, the analytics server may retrieve all related nodes and metadata associated with the identified nodes and/or the related nodes within the nodal data structure. The analytics server may analyze the metadata retrieved and identify all related files (including a latest version of the requested file). For instance, the analytics server may retrieve all timestamps for all nodes related to a node representing the requested file. The analytics server may then compare all timestamps to identify the latest version of the requested file. The analytics server may also identify relationships between files by determining relationships between different nodes representing those files. These relationships (identified related nodes) may be displayed on the GUI viewed by the user. For instance, when a user accesses a file, the analytics server may identify the original file, different copies, versions, derivative, shared tasks, shared comments, shared emails, shared tags, and shared folders that are associated with the file.

Figure 52:
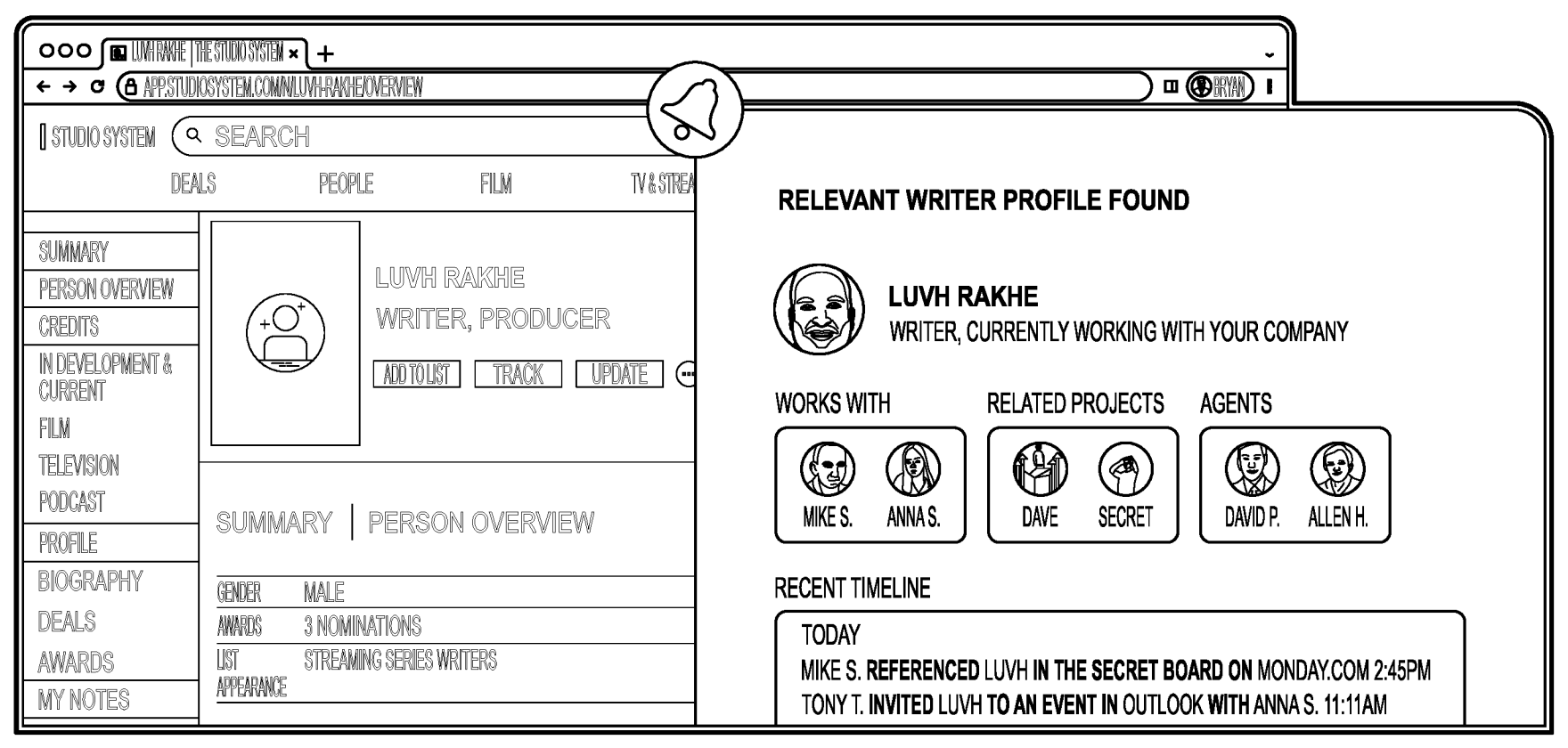
Figure 53:
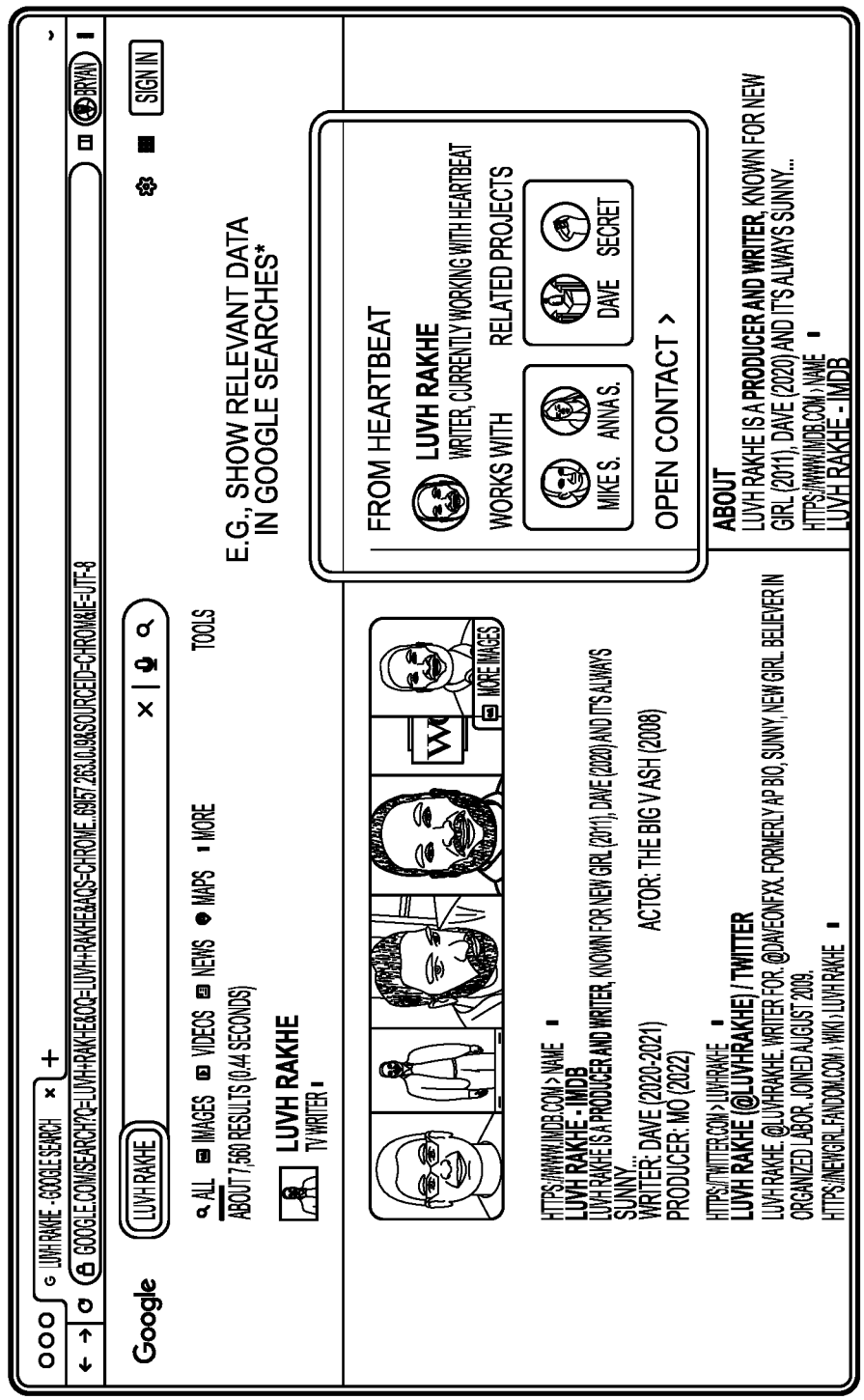

In some embodiments, such as depicted in FIGS. 52-53, the relevant data may be displayed on a web browser while the web browser is directed towards an electronic search page.

For instance, as depicted, a user may search for Luvh Rakhe in a search engine. In addition to displaying the search results (provide by the search engine), the analytics server may display a prompt (e.g., pop-up window) that displays data retrieved from the nodal data structure.

Figure 55:
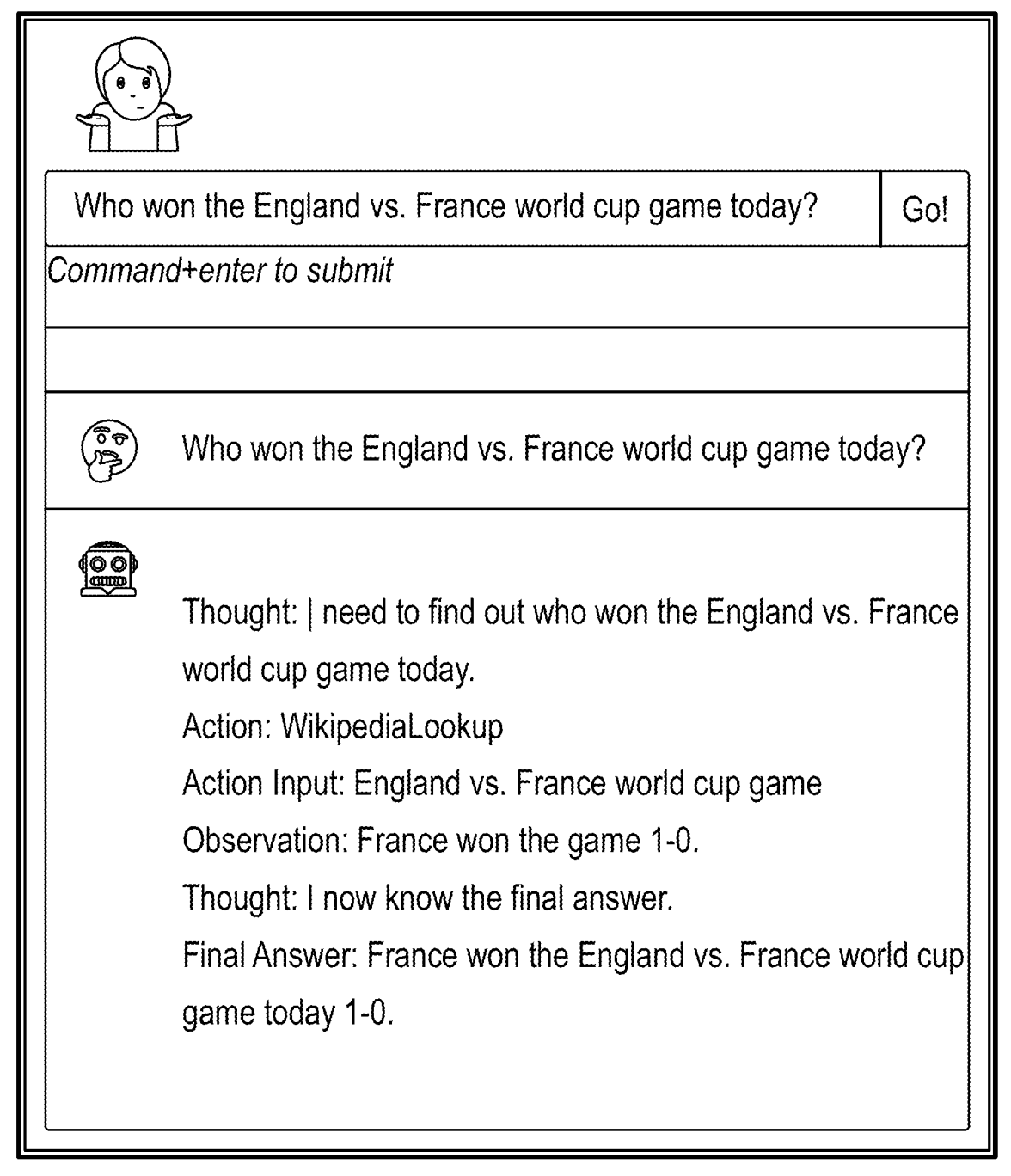

In some other embodiments, as depicted in FIG. 55, the LLM may generate a query (using the search query inputted by the user into a search engine). The analytics server may then perform a query using the search term. Accordingly, the LLM can search (look up) information in real-time from an SKDS.

Using the methods and systems described herein, data collected can be transformed using various methods discussed herein (e.g., schemas of SKLs). Using the SKLs, various nodes within the nodal data structure can be analyzed and relevant nodes can be linked. Using the SKLs, various linked or similar nodes can be identified and de-duplicated a well.

The SKL can also be used to configure various APIs. For instance, an API can be configured to using SKL Schemas and transmit data to one or more processors, such as the analytics server. In some embodiments, an API (e.g., third party API) may be mapped to generate data according to SKL Schemas instead its own third-party proprietary data structures. The analytics server may also generate map SKL Schemas and components from data traditionally provided third-party APIs such as documentation, SDKs, and OpenAPI schemas. In another example, a third-party API may be hosted by the analytics server.

The methods and systems described herein can also allow a processor to generate abstractions of SKL Schemas and/or Entities conforming to those Schemas that correspond to an event or a series of events. For instance, after collecting raw data that corresponds to a user's interaction with an application, or notifications that correspond to activity from other users, the analytics server may transform the data into a activity events according to an SKL Schema. The analytics server may then generate a semantic summary of one or more users' activity.

The methods described herein can also allow a processor to identify and/or generate relevant SKL Schemas from and/or with the aid of external data sources such as one or more SKL Libraries. For instance, an application may be able to identify, access, download, and/or install Schemas from an SKL Library in order to support an integration with a given application. In some cases, the application may identity and use these Schemas automatically and/or semi-automatically. The application may also upload Schemas and artifacts to the SKL Library in an automated and/or semi-automated way. In another example, a user of an SKL Library, such as a developer or an application, may provide certain parameters, such as certain integrations, nouns, verbs, interface, etc. of interest, to the Library or Libraries in order to get a packaged set of Schemas back from the Library or Libraries that best match the capabilities that the user specified. In other words, the user can specify what types of data (Noun) they want to work with, what integrations they would like to connect to, what types of interfaces they want to use to represent the data, and then the Library can find the best Schemas and provide them to the user in a clean package. The user may also provide the Library with certain requirements in natural language and the Library or Libraries may use the requirements to identify and return the best Schemas and SKL components. In some cases, the Library may also generate new Schemas to meet the requirements using certain methods, such as a large language model trained with SKL Schemas.

As illustrated in FIG. 41, the methods described herein can also be used to provide users of SKApps with recommendations/marketing/advertising for other cases not related to components of SKL Libraries. For example, a user could opt-in to see advertisements when certain conditions are met with electronic content and/or context. In other words, if a user is working in a document and interacting with a certain data type such as LIVEEVENTS, CONSUMERPRODUCTS, SOFTWARE the user may determine that they want a processor/application to provide them additional recommendations and/or advertisements that are relevant to what they are doing. For example, if a user is writing a shortlist of potential vacation ideas, an SKApp could provide them with privacy-conscious recommendations or sponsored recommendations that are contextually aware and relevant of the other ideas that the user is writing. In some cases, one or more recommendation SKApps could get anonymized data related to the users' electronic content and/or context in order to find similar Entities from external sources which could be mapped to relevant Nouns in the SKL Library.

The methods described herein can be used to provide users recommendations/marketing/advertising of Verbs/Interfaces/other components rather than whole applications.

The methods described herein can be used to provide financial incentives to contributors of Schemas, Mappings, and other SKL components that can then be used by end-users of SKApps. For instance, a user paying the provider of a software capability such as text summarization through an SKL SUMMARIZETEXT Verb can contribute a fee (e.g., a processing fee and a Mappings fee) to the SKL Library and to the user or users of the Library that contributed the Schemas necessary to offer and/or support that capability through SKL.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of this disclosure or the claims.

Embodiments implemented in computer software may be implemented in software, firmware, middleware, microcode, hardware description languages, or any combination thereof. A code segment or machine-executable instructions may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

The actual software code or specialized control hardware used to implement these systems and methods is not limiting of the claimed features or this disclosure. Thus, the operation and behavior of the systems and methods were described without reference to the specific software code being understood that software and control hardware can be designed to implement the systems and methods based on the description herein.

When implemented in software, the functions may be stored as one or more instructions or code on a non-transitory computer-readable or processor-readable storage medium. The steps of a method or algorithm disclosed herein may be embodied in a processor-executable software module, which may reside on a computer-readable or processor-readable storage medium. A non-transitory computer-readable or processor-readable media includes both computer storage media and tangible storage media that facilitate transfer of a computer program from one place to another. A non-transitory processor-readable storage media may be any available media that may be accessed by a computer. By way of example, and not limitation, such non-transitory processor-readable media may comprise RAM, ROM, EEPROM, CD-ROM or other optical disk storage, magnetic disk storage or other magnetic storage devices, or any other tangible storage medium that may be used to store desired program code in the form of instructions or data structures and that may be accessed by a computer or processor. Disk and disc, as used herein, include compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and/or instructions on a non-transitory processor-readable medium and/or computer-readable medium, which may be incorporated into a computer program product.

The preceding description of the disclosed embodiments is provided to enable any person skilled in the art to make or use the embodiments described herein and variations thereof. Various modifications to these embodiments will be readily apparent to those skilled in the art, and the principles defined herein may be applied to other embodiments without departing from the spirit or scope of the subject matter disclosed herein. Thus, the present disclosure is not intended to be limited to the embodiments shown herein but is to be accorded the widest scope consistent with the following claims and the principles and novel features disclosed herein.

While various aspects and embodiments have been disclosed, other aspects and embodiments are contemplated. The various aspects and embodiments disclosed are for purposes of illustration and are not intended to be limiting, with the true scope and spirit being indicated by the following claims.

What we claim is:

1. A method comprising:
   periodically retrieving, by one or more processors from a plurality of electronic data repositories accessible to a plurality of computing devices, data generated as a result of at least one computing device accessing and using one or more applications from a set of applications;
   generating, by the one or more processors, a computer model comprising a nodal data structure of a set of nodes where each node corresponds to data identified as associated with each application within the set of applications accessed and used by each computing device, each node having an identifier corresponding to a series of nouns and verbs generated in accordance with a schema associated with a shared knowledge language, wherein the series of nouns define one or more types of data and the series of verbs define one or more software processes;
   transforming, by the one or more processors, the retrieved data into a series of nouns and verbs in accordance with the schema;
   adding, by the one or more processors, the transformed data to the nodal data structure as a set of nodes within the nodal data structure;
   deduplicating, by the one or more processors, one or more nodes within the nodal data structure that satisfy a relevance score; and
   when the one or more processors receives a request:
      identifying, by the one or more processors, a node within the set of nodes that corresponds to the request;
      retrieving, by the one or more processors, a pair of related nodes within the set of nodes of the nodal data structure that correspond to the node associated with the request, wherein when a first node within the pair of nodes satisfies a relevance threshold with respect to a second node within the pair of nodes, the first node and the second node are linked as related, the processor identifying whether the relevance threshold has been satisfied using each respective node's identifier corresponding to the schema; and
      displaying, by the one or more processors, data for at least one node that is linked to the node associated with the request.

2. The method of claim 1, further comprising:
   generating, by the one or more processors, the nouns and verbs based on an application programming interface.

3. The method of claim 1, wherein an indication of the schema is received from a user from a library of schemas.

4. The method of claim 3, further comprising:
   executing, by the one or more processors, a natural language protocol to identify the indication of the schema.

5. The method of claim 1, wherein the schema is uploaded by a user.

6. The method of claim 1, wherein the schema has a set of parameters corresponding to a set of schemas of a schema library.

7. The method of claim 1, further comprising:
   de-duplicating, by the one or more processors, the pair of nodes, based on their respective identifiers.

8. The method of claim 1, further comprising:
   executing, by the one or more processors, an artificial intelligence model to identify the nouns or verbs.

9. The method of claim 1, further comprising:
   displaying, by the one or more processors, a user interface configured to receive an input corresponding to at least one of installing, uninstalling, or editing the schema.

10. A system comprising:
   a non-transitory computer readable medium having a set of instructions that when executed, cause a processor to:
      periodically retrieve, from a plurality of electronic data repositories accessible to a plurality of computing devices, data generated as a result of at least one computing device accessing and using one or more applications from a set of applications;
      generate a computer model comprising a nodal data structure of a set of nodes where each node corresponds to data identified as associated with each application within the set of applications accessed and used by each computing device, each node having an identifier corresponding to a series of nouns and verbs generated in accordance with a schema associated with a shared knowledge language, wherein the series of nouns define one or more types of data and the series of verbs define one or more software processes;

transform the retrieved data into a series of nouns and verbs in accordance with the schema;

adding the transformed data to the nodal data structure as a set of nodes within the nodal data structure;

deduplicate one or more nodes within the nodal data structure that satisfy a relevance score; and when the processor receives a request:
  identify a node within the set of nodes that corresponds to the request;
  retrieve a pair of related nodes within the set of nodes of the nodal data structure that correspond to the node associated with the request, wherein when a first node within the pair of nodes satisfies a relevance threshold with respect to a second node within the pair of nodes, the first node and the second node are linked as related, the processor identifying whether the relevance threshold has been satisfied using each respective node's identifier corresponding to the schema; and
  display data for at least one node that is linked to the node associated with the request.

11. The system of claim 10, wherein the set of instructions further cause the processor to:
generate the nouns and verbs based on an application programming interface.

12. The system of claim 10, wherein an indication of the schema is received from a user from a library of schemas.

13. The system of claim 12, wherein the set of instructions further cause the processor to:
execute a natural language protocol to identify the indication of the schema.

14. The system of claim 10, wherein the schema is uploaded by a user.

15. The system of claim 10, wherein the schema has a set of parameters corresponding to a set of schemas of a schema library.

16. The system of claim 10, wherein the set of instructions further cause the processor to:
de-duplicate the pair of nodes, based on their respective identifiers.

17. The system of claim 10, wherein the set of instructions further cause the processor to:
execute an artificial intelligence model to identify the nouns or verbs.

18. The system of claim 10, wherein the set of instructions further cause the processor to:
display a user interface configured to receive an input corresponding to at least one of installing, uninstalling, or editing the schema.

19. A system comprising:
a plurality of electronic data repositories; and
a processor in communication with the plurality of electronic data repositories, the processor configured to:
  periodically retrieve from the plurality of electronic data repositories accessible to a plurality of computing devices, data generated as a result of at least one computing device accessing and using one or more applications from a set of applications;
  generate a computer model comprising a nodal data structure of a set of nodes where each node corresponds to data identified as associated with each application within the set of applications accessed and used by each computing device, each node having an identifier corresponding to a series of nouns and verbs generated in accordance with a schema associated with a shared knowledge language, wherein the series of nouns define one or more types of data and the series of verbs define one or more software processes;
  transforming, by the one or more processors, the retrieved data into a series of nouns and verbs using in accordance with the schema;
  add the transformed data to the nodal data structure as a set of nodes within the nodal data structure;
  deduplicate one or more nodes within the nodal data structure that satisfy a relevance score; and
  when the processor receives a request:
    identify a node within the set of nodes that corresponds to the request;
    retrieve a pair of related nodes within the set of nodes of the nodal data structure that correspond to the node associated with the request, wherein when a first node within the pair of nodes satisfies a relevance threshold with respect to a second node within the pair of nodes, the first node and the second node are linked as related, the processor identifying whether the relevance threshold has been satisfied using each respective node's identifier corresponding to the schema; and
    display data for at least one node that is linked to the node associated with the request.

20. The system of claim 19, wherein an indication of the schema is received from a user from a library of schemas.

* * * * *